(12) United States Patent
Warren

(10) Patent No.: US 8,397,222 B2
(45) Date of Patent: Mar. 12, 2013

(54) ANY-TO-ANY SYSTEM FOR DOING COMPUTING

(76) Inventor: Peter D. Warren, Cannes (FR)

(*) Notice: Subject to any disclaimer, the term of this patent is extended or adjusted under 35 U.S.C. 154(b) by 185 days.

(21) Appl. No.: 12/328,865

(22) Filed: Dec. 5, 2008

(65) Prior Publication Data

US 2010/0257507 A1    Oct. 7, 2010

(51) Int. Cl.
*G06F 9/45* (2006.01)
(52) U.S. Cl. ......... 717/143; 717/136; 717/137; 717/140
(58) Field of Classification Search ........................ None
See application file for complete search history.

(56) References Cited

U.S. PATENT DOCUMENTS

| | | | |
|---|---|---|---|
| 7,152,073 B2* | 12/2006 | Gudbjartsson et al. | 1/1 |
| 7,165,244 B2* | 1/2007 | Maine | 717/137 |
| 7,210,130 B2* | 4/2007 | Fairweather | 717/136 |
| 7,263,691 B2* | 8/2007 | Vehkomaki | 717/140 |
| 7,506,324 B2* | 3/2009 | Thiagarajan et al. | 717/140 |
| 7,680,782 B2* | 3/2010 | Chen et al. | 707/999.004 |
| 7,707,561 B2* | 4/2010 | Vera | 717/136 |
| 7,730,079 B2* | 6/2010 | Meijer et al. | 707/760 |
| 7,823,139 B2* | 10/2010 | Zatloukal | 717/140 |
| 2002/0138819 A1* | 9/2002 | Hills | 717/114 |
| 2003/0033284 A1 | 2/2003 | Warren et al. | |
| 2003/0058267 A1 | 3/2003 | Warren | |
| 2003/0101165 A1 | 5/2003 | Warren | |
| 2003/0154183 A1 | 8/2003 | Warren | |
| 2003/0163779 A1 | 8/2003 | Warren | |
| 2003/0164857 A1 | 9/2003 | Warren | |
| 2003/0187661 A1 | 10/2003 | Warren et al. | |
| 2004/0036715 A1 | 2/2004 | Warren | |
| 2004/0036718 A1 | 2/2004 | Warren | |
| 2004/0036722 A1 | 2/2004 | Warren | |
| 2004/0039989 A1 | 2/2004 | Warren | |

(Continued)

FOREIGN PATENT DOCUMENTS

| | | |
|---|---|---|
| WO | 9848360 A | 10/1998 |
| WO | 0135216 A2 | 5/2001 |

OTHER PUBLICATIONS

Yates et al., Detecting parser errors using web-based semantic filters, Jul. 2006, 8 pages, <http://delivery.acm.org/10.1145/1620000/1610080/p27-yates.pdf>.*

(Continued)

*Primary Examiner* — Thuy Dao
(74) *Attorney, Agent, or Firm* — Robert A. Blaha; Smith Risley Tempel Santos LLC

(57) ABSTRACT

Methods for constructing an Any-to-Any data machine (consisting of Any-to-Any data components and their environmental requirements) and an Any-to-Any code machine (consisting of Any-to-Any code components and their environmental requirements) and relating them together so that they harmoniously interact and so that the data Any-to-Any machine controls and is also acted upon by the code Any-to-Any machine so as to produce an Any-to-Any system that transforms data in a manner that is useful and which is analogous to the harmonious interaction of the Any-Any binary code and Any-to-Any transistor systems, and which handles data and transforms it in a sufficiently similar manner to the manner in which the human handles and transforms data that the human finds it easy and intuitive to operate, all supported by methods that enable data to be stored in a single logical grid structure that can accept and correctly relate, transmit and receive any data, together examples of methods to derive benefits from these inventions.

11 Claims, 28 Drawing Sheets

U.S. PATENT DOCUMENTS

| | | | | |
|---|---|---|---|---|
| 2004/0154004 | A1* | 8/2004 | Maine | 717/136 |
| 2006/0117307 | A1* | 6/2006 | Averbuch et al. | 717/143 |
| 2006/0271920 | A1* | 11/2006 | Abouelsaadat | 717/137 |
| 2007/0022414 | A1* | 1/2007 | Bird | 717/143 |
| 2007/0100784 | A1 | 5/2007 | Arthur et al. | |
| 2007/0169037 | A1* | 7/2007 | Subramanian et al. | 717/143 |
| 2007/0255751 | A1* | 11/2007 | Bansal et al. | 707/103 R |
| 2008/0155519 | A1* | 6/2008 | Mulvaney et al. | 717/143 |
| 2009/0063530 | A1* | 3/2009 | Lee et al. | 707/101 |

OTHER PUBLICATIONS

Kaptein et al., Using parsimonious language models on web data, Jul. 2008, 2 pages, <http://delivery.acm.org/10.1145/1400000/1390491/p763-kaptein.pdf>.*

Whiting et al., Enabling massive scale document transformation for the semantic web: the universal parsing agent.TM., Nov. 2005, 3 pages, <http://delivery.acm.org/10.1145/1100000/1096608/p23-whiting.pdf>.*

Cordes R. et al. "The use of decomposition in an object-oriented approach to present and represent multimedia documents" System Sciences, 1989, vol. II: ISBN: 978-0-8186-1912-0.

Linden Van Der F. et al. "Composing Product Families From Reusable Components" Mar. 6, 1995.

Williams S. et al. "The Component Object Model. The Foundation for Ole Services" Dr. Dobbs's Special Report; Dec. 21, 1994.

* cited by examiner

FIG. 3

| | | Administrative Fields | | | | | | | Data Fields | | | | | | | | | |
|---|---|---|---|---|---|---|---|---|---|---|---|---|---|---|---|---|---|---|
| | | View | List | CTRL | Help | Name | Label Record Number | Life | | | Time | Space | Energy | | | Matter | | |
| Record Identifier | Record Type | 2 | 3 | 4 | 5 | 6 | 7 | 8 | 9 | 10 | 11 | 12 | 13 | 14 | 15 | 16 | 17 | 18 |
| 1 | 5 (FL ExoParent) | | | | | Comp. | 30 | | | | | | | | | | |
| 76 | 25 (User BossMod) | 130 | 131 | 205 | | E-Add | 70 | | | | | | FL1 | | | | |
| 130 | 26 (U. BossMod Execution Ctrl List) | | | | | | | 70 | | | 72 | 73 | 74 Add | 75 | | | |
| 131 | 1 (= label) | | | | | Comp. | 70 | First Name | Last Name | Base Concept | Time | Location | Action | Type | Email Address | Content | Spelling |
| 70 | 6 (User data) | | | | | | 1 | 76 | 76 | 76 | 76 | 76 | 76 | 76 | 76 | 76 | 76 |
| 71 | 7 (Execution) | | | | | | | Y | Y | Y | Y | Y | Y | Y | X | | |
| 72 | 8 (Which Field) | | | | | | | | | | | | | | Adr:Fmt | | |
| 73 | 9 (Condition) | | | | | | | | | | | | | | | | | |
| 74 | 10 Director | | | 209 | | | | | | | | | | | | | Y |
| 75 | 11 (View BossMod) | | 101 | 201 | | | | | | | | | | | | | |
| 100 | 12 (View List) | | | 202 | | | | 102 | 103 | 104 | 105 | FL2 | 105 | | | | 103 |
| 101 | 13 (Exec.Data Dsp) | | | | | | | FL2 | FL2 | FL2 | FL2 | FL2 | FL2 | FL2 | FL2 | FL2 | FL2 |
| 102 | 14 (Shape Color) | | | | | | | XXX | XXX | XXX | XXX | XXX | XXX | XXX | XXX | XXX | XXX |
| 103 | 15 (Shape Number) | | | | | | | XXX | XXX | XXX | XXX | XXX | XXX | XXX | XXX | XXX | XXX |
| 104 | 16 (Color) | | | | | | | XXX | XXX | XXX | XXX | XXX | XXX | XXX | XXX | XXX | XXX |
| 105 | 17 (Prompt Bkgd) | | 107 | 201 | | | | 108 | 102 | | | | | | | | |
| 106 | 18 (List (Prompt) | | | | | | | XXX | XXX | XXX | XXX | XXX | XXX | XXX | XXX | XXX | FL2 |
| 107 | 19 (Prompt Data) | | 110 | | | | | XXX | FL2 | | | | | | | | |
| 108 | 13 (Exec.Data Dsp) | | | 203 | | | | 111 | 102 | | 112 | 102 | 105 | | | | |
| 109 | 21 (Help BossMod) | | | | | | | XXX | XXX | XXX | XXX | XXX | XXX | XXX | XXX | XXX | XXX |
| 110 | 22 (List (Help) | | | | | | | FL2 | FL2 | FL2 | FL2 | FL2 | FL2 | FL2 | FL2 | FL2 | FL2 |
| 111 | 23 (Help L1 Data) | | | 202 | | | | XXX | XXX | XXX | XXX | XXX | XXX | XXX | XXX | XXX | XXX |
| 102 | 23 (Help L2 Data) | | | | | | | FL2 | FL2 | FL2 | FL2 | FL2 | FL2 | FL2 | FL2 | FL2 | FL2 |
| 112 | 13 (Exec.Data Dsp) | | | 202 | | | | XXX | XXX | XXX | XXX | XXX | XXX | XXX | XXX | XXX | XXX |

FIG. 6

| Record Identity | Record Type | View | List | CTRL | Help | Name | Label Record Number | Life | | | Time Space | Energy | | E-mail Address | Matter | | |
|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 |
| 133 | 60 (Commander Record) | | | | | | 70 | | | | 12 | | Add | 8 | E-mail Address | | |
| 130 | 25 (User BossModule) Commanded record | | 131 | | | | 70 | | | | | | Add | 8 | E-mail Address | | |

FIG. 7

| ID# | Record type | Administration | | | 10 | Life | | Data | | Matter | | |
|---|---|---|---|---|---|---|---|---|---|---|---|---|
| | | Rec Sub-Type 700 | Snr Label Record 701 | Label Used 8 | | 702 | 703 | Space Direction 704 | 705 | 15 | 16 | 706 |
| 1 | Label | DRT | | | Last Name | Capacity | People Group | Direction | Quantity | Type | Sub-Type | Cost |
| 2 | User data | ExoBrain Owner | 1 | 1 | Jackson | Snr user | ExoBrain Users | Both | | | | $10.00 |
| 3 | User Data | ExoBrain | 1 | 1 | All | ExoBrain | ExoBrain | Both | 1 | Mk 1 | Genesius | |
| 4 | Label | Email Out | 1 | | Last Name | Capacity | Pple Gps/Clubs | Sender | Quantity | Type | Sub-Type | Cost |
| 5 | User Data | Email out | 1 | 4 | Jackson | Member | Premiere Golf | Sender | 1 | Electronic | | |
| 6 | User Data | Email In | 1 | | Last Name | Capacity | Clubs | Receiver | Quantity | Type | Sub-Type | Cost |
| 7 | User Data | Email In | 1 | 5 | Jones | President | Premiere Golf | Receiver | | Electronic | | |
| 8 | Label | Letter In | 1 | | Last Name | Capacity | Company Name | Receiver | Quantity | Type | Sub-Type | Cost |
| 9 | User Data | Letter in | 1 | 8 | Hammon | Salesman | Supplier snc | Receiver | 2 | Printed | | $0.21 |
| 10 | Label | Clubs | 1 | | Last Name | Capacity | Clubs | Direction | Quantity | Fee Type | Sub-Type | Amount |
| 11 | User Data | Address | 1 | 10 | Jones | President | Premiere Golf | | 1 | Membership | Annual | $12,149.88 |
| 12 | User data | Personnel | 1 | 10 | Newman | Leader | Recipe Circle | | | | | |
| 13 | Label | Household | 1 | | Last Name | Capacity | Company Name | Direction | Quantity | Type | Sub-Type | Cost |
| 14 | User data | Address | 1 | 13 | Newman | Team Ldr | Plumbers Inc | Out | 1 | Labor | | $25.00 |
| 15 | User data | Personal | 1 | 13 | Hipram | Act Mgr | Health Ins | | | | | |
| 16 | Label | Accounts | 13 | | Last Name | Capacity | Institutions | | Quantity | Type | Sub-Type | Cost |
| 17 | User data | Plumbing | 13 | 8 | Jones | Accts Mgr | Plumbers Inc | Out | 4 | Labor | | $100.00 |
| 18 | User data | Petty Cash | 13 | 8 | Jackson | Father | Family | In | 1 | Paycheck | | $4,014.00 |
| 19 | Label | Receipt Sales | 13 | | Last Name | Capacity | Team Number | Direction | Drink A | Drink B | Hamburg 1 | Cost |
| 20 | User data | Check | 18 | 19 | Mason | Server | 1 | Out | $1.33 | $4.21 | $3.88 | $9.53 |
| 21 | Label | Co Accounts | 1 | | Last Name | Capacity | Company Name | In | | | | Cost |
| 22 | User data | Invoice | 1 | 21 | Jones | Purchaser | Good Client ltd | In | 44 | Cartons | Renaissance | $11,823.21 |
| 23 | User data | Disbursement | 1 | 21 | Hammon | Salesman | Supplier inc | Out | 22 | Thread | Job 14 | $4,314 |
| 24 | User Data | Balance | 1 | 21 | Jackson | Accountant | Profit Center A | | | | | $7,607 |
| 25 | Label | Manufacturing | | | Last Name | Capacity | ID | Subunit 1 | S-unit 2 | S-Unit 3 | S-Unit 4 | S-Unit 5 |
| 26 | Label | Machine | 25 | | Last Name | Capacity | | Control | Needle | Roller | Thread unit | Motor1 |
| 27 | User data | Machine | 25 | 26 | Pronor | Maintainer | Schon 2 | At H1 | 2B4.4 | 21.B3 | Ab3344 | 99R |
| 28 | Label | Schon 2 Stitch | 25 | | Last Name | Capacity | Job# | Unit ID | Needle 1 | Needle 2 | Needle 3 | Needle N |
| 29 | User data | Thread color | 25 | 28 | Mason | Operator | Job 14 | Schon 2 | Blue 14 | White 3 | Green 14 | Yellow 4 |
| 30 | User data | Stitch tension | 25 | 28 | Mason | Operator | Job 14 | Schon 2 | 11 | 12 | 13 | 13 |
| 31 | User data | Stitch tension | 25 | 28 | Mason | Operator | Job 14 | Schon 2 | 9 | 8 | 7 | 7 |

FIG. 9

| Administration | | | | Data | | |
|---|---|---|---|---|---|---|
| | | | | | Matter | |
| ID # | Record type | Life | Space Direction | Matter, Other | Matter Reference Number | Matter Reference Number Type |
| | 2 | 10 | 704 | 910 | 911 | 912 |
| | Label | | | | | |
| 913 | User data | | | | | |
| 914 | User Data | | | | +1 444 444 4444 | Telephone number |
| 915 | User Data | | | | AR247.PP4314 | Passport Number |
| 916 | User Data | | | | XX.YY.xx.BB | Password |
| 917 | User Data | | | | +1 444 444 4422 | Fax number |
| 918 | User Data | | | | 374826783741212 | UPC Code |
| 919 | User Data | | | | +3 333 333 3333 | Telephone Number |
| 920 | User Data | | | | +3 333 333 3334 | Fax Number |
| 921 | User Data | | | chair | | |
| 922 | User Data | | | bananas | | |
| 923 | User Data | | | apples | | |

FIG. 12

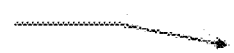

| First Name | Last Name | Bday | City | Activity | Salary | Weight |
|---|---|---|---|---|---|---|
| Bill | | | | | 150 | |

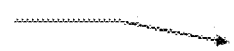

| First Name | Last Name | Bday | City | Activity | Salary | Weight |
|---|---|---|---|---|---|---|
| Bill | Jones | May | NY | Writer | 100 | 200 |
| Bill | Jones | May | NY | Actor | 150 | 200 |
| Sammy | Jones | May | NY | Lawyer | 150 | 200 |
| Bill | Jones | May | NY | Lawyer | 500 | 200 |
| Bill | Jones | April | NY | Dentist | 200 | 190 |
| Bill | Jones | April | NY | Cleaner | 150 | 190 |
| Bill | Davids | April | NY | Cleaner | 150 | 190 |
| Bill | Field | April | LA | Cleaner | 150 | 190 |

| First Name | Last Name | Bday | City | Activity | Salary | Weight |
|---|---|---|---|---|---|---|
| Bill | | | | Cleaner | 150 | |

← 1203

| First Name | Last Name | Bday | City | Activity | Salary | Weight |
|---|---|---|---|---|---|---|
| Bill | Jones | May | NY | Actor | 150 | 200 |
| Bill | Jones | April | NY | Cleaner | 150 | 190 |
| Bill | Davids | April | NY | Cleaner | 150 | 190 |
| Bill | Field | April | LA | Cleaner | 150 | 190 |

← 1204

| First Name | Last Name | Bday | City | Activity | Salary | Weight |
|---|---|---|---|---|---|---|
| Bill | | | LA | Cleaner | 150 | |

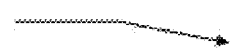

| First Name | Last Name | Bday | City | Activity | Salary | Weight |
|---|---|---|---|---|---|---|
| Bill | Jones | April | NY | Cleaner | 150 | 190 |
| Bill | Davids | April | NY | Cleaner | 150 | 190 |
| Bill | Field | April | LA | Cleaner | 150 | 190 |

| First Name | Last Name | Bday | City | Activity | Salary | Weight |
|---|---|---|---|---|---|---|
| Bill | | | LA | Cleaner | 150 | |

← 1207

| First Name | Last Name | Bday | City | Activity | Salary | Weight |
|---|---|---|---|---|---|---|
| Bill | Field | April | LA | Cleaner | 150 | 190 |

← 1208

FIG. 15 page 2

| | | | | | | | |
|---|---|---|---|---|---|---|---|
| 1524 | | | | | | | |
| 1525 | | | | | | | |
| 1526 | | colspan=7 | Decryption BossModule & Reception BossModule | | | | |
| 1527 | | 1579 | Query | 1 | aaa | | | Fish |
| 1528 | | 1589 | Query | 2 | bbb | | | Fish |
| 1529 | | colspan=7 | Command Matcher Process | | | | |
| 1530 | | colspan=7 | Incoming Query BossModule | | | | |
| 1531 | | colspan=3 | Administration | | | colspan=3 | Data | | |
| 1532 | | Record ID | Record Type | ExoBrain ID | ExoBrain IP | Life | Matter | |
| 1533 | | 1 | 2 | 1596 | 1597 | 703 | 15 | 16 |
| 1534 | ExoBrain III at the Fish shop | 1592 | Label | 3 | ccc | Group | Type | Sub-Type |
| | | 1593 | ExoBrain | 3 | ccc | Fish Shop | | |
| | | 1594 | User Data | 3 | ccc | | Fish | Cod |
| | | 1595 | User Data | 3 | ccc | | Fish | Turbot |
| | | colspan=7 | Outgoing Response BossModule | | | | |
| 1535 | | 1579 | Query | 1 | aaa | | | Fish |
| 1536 | | 1589 | Query | 2 | bbb | | | Fish |
| 1537 | | 1594 | User Data | 3 | ccc | | Fish | Cod |
| 1538 | | 1595 | User Data | 3 | ccc | | Fish | Turbot |
| 1539 | | colspan=7 | Encryption BossModule & Transmission BossModule | | | | |
| 1510→ 1540 | | | | | | | | |
| 1541 | | colspan=7 | Decryption BossModule & Reception BossModule | | | | |
| 1542 | | 1579 | Query | 1 | aaa | | | Fish |
| 1543 | | 1589 | Query | 2 | bbb | | | Fish |
| 1544 | | 1594 | User Data | 3 | ccc | | Fish | Cod |
| 1545 | | 1595 | User Data | 3 | ccc | | Fish | Turbot |
| 1546 | | colspan=7 | Command Matcher Process | | | | |
| 1547 | | colspan=7 | Incoming Response BossModule | | | | |
| 1548 | | colspan=3 | Administration | | | colspan=3 | Data | | |
| 1549 | | Record ID | Record Type | ExoBrain ID | ExoBrain IP | Life | Matter | |
| 1550 | | 1 | 2 | 1596 | 1597 | 703 | 15 | 16 |
| 1551 | | 1585 | Label | 1 | bbb | Group | Type | Sub-Type |
| | | 1586 | ExoBrain | 2 | bbb | SearchBrain | | |
| | ExoBrain II Search ExoBrain | 1587 | ExoBrain | 3 | ccc | | | |
| | | 1588 | ExoBrain | 4 | ddd | | | |
| | | 1579 | Query | 1 | aaa | | | Fish |
| | | 1589 | Query | 2 | bbb | | | Fish |
| | | 1590 | ExoBrain Content Type | 3 | ccc | Fish Shop | Seafood | Fish |

FIG. 15 page 3

| | | 1591 | ExoBrain Content Type | 4 | add | Shell Fish Shop | Seafood | Shellfish |
|---|---|---|---|---|---|---|---|---|
| 1552 | | | Outgoing Response BossModule | | | | | |
| 1553 | | 1579 | Query | 1 | aaa | | | Fish |
| 1554 | | 1594 | User Data | 3 | ccc | | Fish | Cod |
| 1555 | | 1595 | User Data | 3 | ccc | | Fish | Turbot |
| 1556 | | | Encryption BossModule & Transmission BossModule | | | | | |
| 1510 | | | | | | | | |
| 1557 | | | | | | | | |
| 1558 | | | Decryption BossModule & Reception BossModule | | | | | |
| 1559 | | 1579 | Query | 1 | aaa | | | Fish |
| 1560 | | 1594 | User Data | 3 | ccc | | Fish | Cod |
| 1561 | | 1595 | User Data | 3 | ccc | | Fish | Turbot |
| 1562 | | | Command Matcher Process | | | | | |
| 1563 | | | Incoming Query BossModule | | | | | |
| 1564 | | | Administration | | | | Data | |
| 1565 | | Record ID | Record Type | ExoBrain ID | ExoBrain IF | Life | Matter | |
| 1566 | | | 2 | 1596 | 1597 | 703 | 15 | 16 |
| 1567 | | 1580 | Label | 1 | aaa | Group | Type | Sub-Type |
| | | 1581 | ExoBrain | 1 | aaa | | | |
| | | 1582 | ExoBrain | 2 | bbb | SearchBrain | | |
| 1574 | | 1579 | User Query | | | | | Fish |
| | ExoBrain I User ExoBrain | 1583 | ExoBrain Content Type | 2 | bbb | | | Seafood |
| | | 1584 | Activity Concept Hierarchy data | 1 | aaa | B8 | Seafood | Fish |
| 1568 | | | Screen output to user | | | | | |
| 1569 | | 1579 | User Query | | | | | Fish |
| 1570 | | 1594 | User Data | 3 | ccc | | Fish | Cod |
| 1571 | | 1595 | User Data | 3 | ccc | | Fish | Turbot |

FIG. 17

| Data Category | Parent Data Category (if any) | Field Number | Data Class |
|---|---|---|---|
| Administration Fields (not user accessible), PART I | | 1 | Data Relation Table Identity (Any-to-Any System ID) |
| | | 2 | Sub-Data Relation Table Identity |
| | | 3 | Creating DRT ID |
| | | 4 | Record Identity |
| | | 5 | Record Creation Time |
| | | 6 | Record Creation Location |
| | | 7 | Time (at which) Saved |
| | | 8 | User |
| | | 9 | User Status |
| | | 10 | Record Type |
| | | 11 | Record Sub-Type |
| | | 12 | Record Sub-2 Type |
| | | 13 | Record Sub-3 Type |
| | | 14 | Record Sub-4 Type |
| | | 15 | Sequence Flag |
| | | 16 | NEXT V (and V) |
| | | 17 | PREVIOUS V (and V was) |
| | | 18 | NEXT H (and H) |
| | | 19 | PREVIOUS H (and H was) |
| | | 20 | BACK (and back) |
| | | 21 | FRONT (and front) |
| | | 22 | Sub Assembly Ref |
| | | 23 | Start Date and Time (Creation Date) |
| | | 24 | End Date and Time |
| | | 25 | Time Use (amount of time) for item creation |
| | | 26 | Last Use |
| | | 27 | Use Count |
| | | 28 | Use Index |
| | | 29 | List |
| | | 30 | Data Location |
| | | 31 | Input / Creation / Edit Name |
| | | 32 | Creation /Edit Machine Name |
| | | 33 | Creation Edit Machine Type |
| | | 34 | Creation / Edit Machine Device Setting |
| | | 35 | Creation /Edit Data Specification Key Data / Extractor |
| | | 36 | Creation / Edit View Specification/ Key Data |
| | | 37 | Creation Edit View Specs |
| | | 38 | View Container |
| | | 39 | Button / Menu |
| | | 40 | Destination |
| | | 41 | Sub-Destination |

FIG. 18

| Data Category | Parent Data Category (if any) | Field Number | Data Class |
|---|---|---|---|
| Administration Fields (not user accessible), PART II | | 42 | Origin |
| | | 43 | Prior Origin |
| | | 44 | TokenIn |
| | | 45 | TokenOut |
| | | 46 | Controller |
| | | 47 | Method |
| | | 48 | Condition |
| | | 49 | Except For |
| | | 50 | Director |
| | | 51 | Directed On / Target |
| | | 52 | Looked (at by) |
| | | 53 | Inform |
| | | 54 | Authenticate |
| | | 55 | Confidential To |
| | | 56 | Confidential From |
| | | 57 | CanDo (Permit, Permission) |
| | | 58 | CantDo (Not Permit, No Permission) |
| | | 59 | Token In |
| | | 60 | Token Out |
| | | 61 | Acknowledge |
| | | 62 | Programmer Notes |
| | | 63 | User Notes |
| | | 64 | About |
| | | 65 | Personality |
| | | 66 | Message / Help level |
| | | 67 | Message |
| | | 68 | Mini-Help |
| | | 69 | User Help |
| | | 70 | Prompt |
| | | 71 | Senior Label Record |
| | | 72 | Label |
| | | 73 | Sub-Label |
| | | 74 | Redefine |
| | | 75 | Spelling (word or phrase) |
| | | 76 | Sound / Sound Phrase Number |
| | | 77 | Base Concept |
| | | 78 | Other |
| | | 79 | Other Type |

*FIG. 19*

| Data Category | Parent Data Category (if any) | Field Number | Data Class |
|---|---|---|---|
| | | 80 | User / Created by User |
| | | 81 | User Identifiers |
| | | 82 | Item Number / Quantity |
| | | 83 | Quality |
| | | 84 | Quality Degree |
| | | 85 | Quality Type |
| | | 86 | Sense (right / wrong) Exist, Positive Negative |
| | | 87 | Record Status |
| | | 88 | Status (Software) |
| | | 89 | Status (User Statement) |
| | | 90 | Seniority / Priority |
| | | 91 | Importance |
| | | 92 | Reason |
| Administration Fields, User Accessible | | 93 | Alternative |
| | | 94 | Approximation |
| | | 95 | Concerning |
| | | 96 | User reference Number for this Item / Abbreviation |
| | | 97 | Reference Number type |
| | | 98 | Group Name / Flag |
| | | 99 | Data Category of Group |
| | | 100 | Relation(ship) A |
| | | 101 | Relation(ship) B |
| | | 102 | Item Plan / Attachments List |
| | | 103 | User Name for this item (nickname) |
| | | 104 | Given Name for This Item |
| | | 105 | Type |
| | | 106 | Sub-Type |
| | | 107 | Version Number |
| | | 108 | Marking / Order |
| | | 109 | Other |
| | | 110 | Other Type |

FIG. 20

| Data Category | Parent Data Category (if any) | Field Number | Data Class |
|---|---|---|---|
| | | 111 | Number / Quantity |
| | | 112 | User Reference Number / Abbreviation |
| | | 113 | Reference Number Type |
| | | 114 | Quality |
| | | 115 | Quality Degree |
| | | 116 | Quality Type |
| | | 117 | Life Group Name /Flag |
| | | 118 | Life / People Plan / Organization |
| | | 119 | Nickname (Equivalent to user Name for This) |
| | | 120 | First Name |
| | | 121 | Middle Name |
| Life Data Category | | 122 | Last Name |
| | | 123 | Name of Non-Physical Existence /Creation |
| | | 124 | Type of Non-Physical Existence /Creation |
| | | 125 | Sub-Type of Non-Physical Existence /Creation |
| | | 126 | Preferred |
| | | 127 | Title |
| | | 128 | Greeting |
| | | 129 | Qualifications |
| | | 130 | Capacity |
| | | 131 | Signature |
| | | 132 | Sex |
| | | 133 | Language |
| | | 134 | Expression |
| | | 135 | Expression type |
| | | 136 | Emotion |
| | | 137 | Emotion Strength |
| | | 138 | Other |
| | | 139 | Other Type |

FIG. 21

| Data Category | Parent Data Category if any | Field Number | Data Class |
|---|---|---|---|
| Time Data Category | Life | 140 | Time Number / Quantity |
| | Life | 141 | Time Quality |
| | Life | 142 | Quality Degree |
| | Life | 143 | Quality Type |
| | Life | 144 | Reference Number / Abbreviation |
| | | 145 | Time Group |
| | | 146 | Time Plan Frequency |
| | Life | 147 | User Name for this Time (Nickname) |
| | | 148 | Given Name of Time |
| | | 149 | Time Type |
| | | 150 | Time Sub-Type |
| | | 151 | Viewpoint/ Direction |
| | | 152 | Start Time |
| | | 153 | End Time |
| | | 154 | Amount of Time |
| | | 155 | Time Unit |
| | | 156 | Other |
| | | 157 | Other Type |

FIG. 22

| Data Category | Parent Data Category (if any) | Field Number | Data Class |
|---|---|---|---|
| Space Data Category (Location) | | 158 | Space Number /Quantity |
| | Life | 159 | Space Quality |
| | Life | 160 | Quality Degree |
| | Life | 161 | Quality Type |
| | Life | 162 | Reference Number Abbreviation |
| | Life | 163 | Space Group /Flag |
| | | 164 | Direction /Space Relation |
| | | 165 | Space Plan /Map |
| | Life | 166 | User Name for this Space |
| | | 167 | Given Name of this space |
| | | 168 | Type of Space |
| | | 169 | Sub-Type of Space |
| | | 170 | Coordinate System in use (type) |
| | | 171 | Coordinate 1 |
| | | 172 | Coordinate 2 |
| | | 173 | Coordinate 3 |
| | | 174 | Adjoining Coordinates |
| | | 175 | Route |
| | | 176 | Measurement Amount |
| | | 177 | Measurement Unit |
| | | 178 | Other |
| | | 179 | Other Type |

FIG. 23

| Data Category | Parent Data Category (if any) | Field Number | Data Class |
|---|---|---|---|
| | Life | 180 | Action Number / Quantity |
| | Life | 181 | Action Quality |
| | Life | 182 | Quality Degree |
| | Life | 183 | Quality Type |
| | Life | 184 | User Reference Number / Abbreviation |
| | Life | 185 | Action Group / Flag |
| | | 186 | Direction / Action Relation |
| | | 187 | Action Plan |
| | Life | 188 | User Name for this Action |
| | | 189 | Given Name for this Action / Able / Can Do |
| | | 190 | Action Type |
| Energy Data Category (Action) | | 191 | Action Sub-Type |
| | | 192 | Action Status, Start / Change / Stop |
| | | 193 | Unable (Can't) |
| | | 194 | Must Not |
| | | 195 | Must |
| | | 196 | Code / Software Name |
| | | 197 | Speed |
| | | 198 | Speed Unit Type |
| | | 199 | Measurement of Action |
| | | 200 | Action Measurement Unit Type |
| | | 201 | Formula |
| | | 202 | Calculation Result |
| | | 203 | Unit of Calculation Result |
| | | 204 | Other |
| | | 205 | Other Type |

FIG. 24

| Data Category | Parent Data Category (if any) | Field Number | Data Class |
|---|---|---|---|
| | Life | 206 | Number/Quantity |
| | Life | 207 | Quantity Unit |
| | Life | 208 | Matter Quality |
| | Life | 209 | Quality Degree |
| | Life | 210 | Quality Type |
| | Life | 211 | Color |
| | Life | 212 | Color Type |
| | Life | 213 | Color Quality |
| | Life | 214 | Matter Reference Number / Abbreviation |
| | Life | 215 | Matter Reference Number Type |
| | | 216 | Matter Group / Flag |
| Matter Data Category, Part I | | 217 | Matter Plan |
| | Life | 218 | User Name for this Matter |
| | Life | 219 | Brand Name |
| | | 220 | (Given) Name for this Matter |
| | | 221 | Matter Type |
| | | 222 | Matter Sub-type |
| | | 223 | Document type |
| | | 224 | Document Format |
| | | 225 | Consists of |
| | | 226 | Money (Exchange) Amount |
| | | 227 | Money (exchange) Unit (Currency) |
| | | 228 | Exchange Represents (Type, eg. "cost") |
| | | 229 | Title |
| | | 230 | Sub-Title |

FIG. 25

| Data Category | Parent Data Category if any | Field Number | Data Class |
|---|---|---|---|
| Master Data Category, Part II | | 231 | Content, Original |
| | | 232 | Content, Text |
| | | 233 | Content, Other Software |
| | | 234 | File type |
| | | 235 | Content, Notes |
| | | 236 | Content, Other |
| | | 237 | Content, Other, Type |
| | | 238 | Content, Other, File Format |
| | | 239 | Format |
| | | 240 | Range of Content Name |
| | | 241 | Range of Content, from |
| | | 242 | Range of Content, to |
| | | 243 | Output Name |
| | | 244 | Output Data Spec |
| | | 245 | Output View Spec |
| | | 246 | Output View |
| | | 247 | Output Machine Name(s) |
| | | 248 | Output Machine Type |
| | | 249 | Output Machine Device Setting |
| | | 250 | Output Count |
| | | 251 | Output Media |
| | | 252 | Measurement of Matter |
| | | 253 | Measurement Unit |
| | | 254 | Other |
| | | 255 | Other Type |

FIG. 26

| | Administration | | | | Data | | | | |
|---|---|---|---|---|---|---|---|---|---|
| ID # | Record type | Label Used | Language | User Number | Name | | | | |
| | 2 | 8 | 2601 | 2602 | 7 | 1020 | 1021 | 1022 | 1023 | 1024 |
| 1004 | Label | | English | | 2604 | Fruit | Soft | Segments | Reddish Flesh color | Sweet |
| 2603 | Label | | French | | | Fruit | Pulpeuse | Gousse | Rouge coeur de chair | Sucre |
| 2604 | Name | 1004 | English | | | Eat | Squishy | Sections | Red inside | Sugary |
| 1005 | User Data | 1004 | | | Orange | Yes | Yes | Yes | Yes | Yes |
| 1006 | User Data | 1004 | | | 2605 (Grapefruit) | Grapefruit | Pamplemousse | | | |
| 2605 | Language Label | 2606 | | | | English | French | | | |
| 2606 | List of Label Regs | | | | | 1004 | 2603 | | | |
| 2607 | List of Label Regs | 2606 | | | | Yes | Yes | Yes | | |
| 1007 | User Data | 1004 | | | Lemon | Yes | Yes | Yes | | |
| 1008 | User Data | 1004 | | | Apple | Yes | Yes | | | |
| 1009 | User Data | 1004 | | | Peanut | Yes | | | Peanut | |
| 1010 | User Data | 1004 | | | Rock | | | | | |
| 2608 | Type List | | | | Fruit | Orange | Lemon | Apple | | |
| 2609 | Execution list | | | | Email Wife | BM 1 | BM2 | BM 3 | | |
| 2610 | Execution List | | | | Copy to Home | BM 4 | BM 4 | BM 6 | | |
| 2611 | Execution Name | | | | Bingo | Email wife | Copy to Home | | | |

# ANY-TO-ANY SYSTEM FOR DOING COMPUTING

TECHNICAL FIELD

This invention relates to computer data and software and, more specifically, relates to breakthrough and novel methods for creating data and code to animate a computing device. Without software, a computer is inanimate matter that is in a state that is only useful as an ornament or as a boat anchor. Many years ago someone invented code methods and means of writing computer code such that the code then transformed and animated the inanimate metals and substances of the computer and transformed them into a different state (as witnessed by the change in electrical potentials in the computer's circuits) and thereby transformed the metals and substances into a computing machine that has been broadly useful to man. This process is analogous to bombarding atoms with energy beams so that they give off light. Without the bombardment, the atoms are in one state, and with it they are in another and different physical state. Similarly computer code causes the physical state of the physical parts of the computers to change into different physical states. While the fact has not previously been clearly identified, until now, man has invented only one basic method for bringing about this miraculous transformation of inanimate metal into the useful computer we all use today—a method characterized by large lumps of codes in the form of files on the one hand and large lumps of data in the form of other files on the other hand. The present invention invents a new and complete different method for bringing about a different but analogous transformation of useless metal and materials into man-useful computing activities, and this method has many advantages essentially because it uses computer versions of the principles that people themselves use to handle data and to perform activities. The invention describes the methods needed to construct data and computer-animating code as a newly-discovered powerful machine type termed an Any-to-Any machine that was discovered by studying human data handling methods. The invention consists of methods for building an independently useful data Any-to-Any machine and a matching but independently useful computer code Any-to-Any machine in a computing device, and of further methods for causing them to harmoniously interact under human control to produce a new and extremely powerful Any-to-Any data-activity system (analogous to software) in a computer that interact in a manner that is closely analogous to the way binary code and transistors (which were also discovered to be Any-to-Any machines) harmoniously interact to do all computing. Differently to today's computers which cannot do this, the Any-to-Any system computer which the methods of this invention create, are able to emulate the human data system and data handling methods in a computer and therefore has the useful ability to transform any data in a far more powerful manner than is possible with state of the art software construction methods. It is also more intuitive because it emulates human data handling methods, and has many other benefits, one of which is that it enables useful software to be built that cannot effectively be built with state of the art software construction methods.

BACKGROUND OF THE INVENTION

1. Field of the Invention

The present invention relates generally to the field of creation of software for computing systems in which the fundamental underlying construction principles for constructing software have existed essentially unchanged since their first creation 60 years ago or so. The present invention is a new and radically different construction method for constructing human-computer data-activity systems (colloquially and together generally called "software") that bears almost no resemblance to any previous software construction system. The invention is the result of some eleven years of research, trial and error and practical tests into discovering the anatomy of the human data system and its data handling methods which lead to the discovery of a new type of machine termed an Any-to-Any machine, of which only a handful exist in the world, all of which are extremely powerful machines—some examples are binary code, the transistor, base 10 arithmetic, music notation system, display screens, genetic code human data handling and human activity handling. Methods were then invented (which are the subject of this patent) to construct data and code in a computer environment so as to make them comply with the newly-discovered Any-to-Any machine construction principles. People using software constructed with this new construction system perceive the software as being intuitive and very easy to use, doubtless because the new style of software produced by the new construction system handles data in a similar manner to the way a human handles data with other humans. The new software construction system is also more powerful in that it has enabled software to be constructed comparatively easily and quickly that does things state of the art software is not able to do—such as enabling unskilled and untrained users to construct their own applications without programming and enabling test samples from the 85% of the world's population who are not computer users to use the resulting applications without any outside assistance whatsoever and to like it sufficiently well that 47% of non users tested wanted to buy it and a further 26% thought they might buy it, for a total of 73%. The average for all users was 73% would buy it, 12% might buy it, total 85%. The invention also enables computers to meet one definition of intelligence and enables them to learn from humans and from other similar computers, and does both simply and easily.

2. Description of the Prior Art

Eighty five percent of the world's population does not use computers even today. Acceptance and use of computer systems could be significantly increased by making computer systems easier to use which essentially means making them behave the way a human expects a data handling entity, whether human or computer, to behave. Equally, software should be capable of more powerful applications than are seen today—capabilities such as full language control of a computer, or a computer running a company by itself may sound like science fiction, but there seems to be no real reason why that should not be possible. However the particular software/data construction system in use in the state of the art has two critical groups of shortcomings that between them block the way forward. Firstly, (despite perhaps superficial appearance to the contrary) there are many indications that the state of the art construction methodology is a self-limiting construction system that is now closely approaching or has reached its intrinsic limits and never will be capable of really satisfying a human's data needs, and secondly, the construction system imposes a system for handling human data that is so radically different from the data handling system in normal use between people, that, if practiced by another human, that person would be certified insane on many counts and criminally insane on others. Since insane people are hardly "easy to use" it is not surprising that computers handling data insanely are not easy to use either (at least not for the 85% of the world's population that do not use them). Hence there is an urgent need for an alternative software/data construction system which is not self-limiting and which uses a computer data handling system that humans would consider to be sane, normal, usual, and hence "easy" if a human did things in a similar manner. The system of the invention has been tested and proven to construct software that has radically improved acceptance and ease of use in public tests, is not self-limiting and is more powerful than can be constructed with current methods.

Software Construction Today

Firstly, to briefly describe the nature of today's state of the art software construction and consequent operation, virtually every type of conventional software is constructed as one or more large masses of executable code that is written in one or more source code files, which are compiled into one or more executable files, which typically produce interrelated output data of various types. A particular data output is intimately related to the particular code that produced it and that data cannot be used (without an intermediate transformation step performed by other code) by other executable code built to produce other data. The format of the output data, and the screen displays rendered by the software for showing the output data, are integrally controlled and set up by the executable code, which may further involve integral cooperation with facilities provided by the operating system and other applications, such as commonly-accessed objects, DLLs, device drivers, and the like, all of which result in a staggering number of enormously complex executable files that are almost beyond human comprehension in their complexity. The method consists in essence of building an integrated "lump" of software which is compiled into one or more extremely large blocks of unimaginable complexity—the Windows operating system, if printed in books, is said to go from one end of a football field to the other. These blocks of software operate on other blocks consisting of data of a type that that software has been constructed to produce and handle when interacting with a human. The format of the output data, and the screen displays rendered by the software for showing the output data, are integrally connected to and dependant upon one another and set up by the executable code. Once compiled, the executable files can run on an appropriately equipped computer system to implement the pre-configured functionality and render the output screens that are almost entirely pre-configured.

Apart from the indisputable prosperity brought directly to some 15% of the world's population by their use of this state of the art software, state of the art software constructed by current software system construction methods has other significant observable overall results that are far from positive. Some of these are:

Firstly, the computing system resulting from today's software methods is one in which, of the world's population of over 6.7 billion, about 5.7 billion (85%) (by latest estimate) do not use computers and yet these are the very ones that most need the assistance a computer ought to be able to provide to them, while the comparatively prosperous remainder (about 1 billion or 15%) benefit from the current system, while struggling to deal with it and control it—and using only a small portion of the available functionality by most reports.

Secondly, observation of the software market over the past decade shows that the enthusiasm and adoption that used to greet the latest version of general purpose office suite software (which is an indicator of general computer use to do useful work) has evaporated, and today, the arrival of the latest office version passes unnoticed and adoption is poor. Despite billions of dollars of effort put into adding important new functionality to office suites and operating systems, the result (compared to the leaps forward that used to occur) can be best characterized as re-packaging with little addition of user-significant functionality and less and less enthusiasm for upgrading being evident. The following press quote is typical "AnchorDesk Nov. 27, 2007: 6 upgrades that are downgrades. Here are a few choice examples of upgrades that are downgrades, and why you're better off with the older tech: Vista, the obvious number one product for this list. Vista is the new shiny operating system Microsoft released to replace Windows XP. Except it hasn't, because it's a poor upgrade. It's slower, bigger, and buggier. Many people, not just those in the opportunistic Apple ads (and Apple has its own problems), would rather get a new computer with the old XP operating system." E-week.com, Steven J. Vaughan-Nichols, 28 Jan. 2008: "Technically, Vista is pure misery. It eats system resources like an elephant does peanuts, Windows applications break and its so-called improved security is a joke. I know it. You know it . . . . Vista is not being picked up by corporate users. It's one thing to drop copies of Vista Home Basic and Premium on Best Buy customers who don't know any better. It's another thing entirely to get CIOs and IT managers to spend—or should I say waste?—billions on Vista." Recent general use software offerings can be characterized as different icing on the cake, and as more ways of eating cake, and different recipes for cake, but can no longer be characterized (as they previously could be) as a more and greatly improved cake—and this is not due to lack of resources trying to produce more cake.

Similarly, the arrival of the latest and greatest CPU used to be highly anticipated, but today the introduction of the latest and greatest chip passes almost unnoticed—CPUs long ago became good enough for current general purpose software, and this has itself lead to a steady erosion of chip maker's margins because the added functionality the new chips offer is not enough to command (as it used to command) premium prices except in niche markets. In effect, the unwritten pact that hardware provides the power and software uses that power usefully has been steadily breaking down more and more over recent years, as software is less and less able to add further functionality for which there is a demand. The end result is hardware and software industries that both appear to be stymied, and in need of a solution to open the door to significant progress.

This phenomenon of increasing efforts producing diminishing returns—and eventually almost no returns at all (despite massive and unimaginable resources and effort)—is characteristic of self-limiting building or construction systems that are reaching their intrinsic limits, and examples of such self-limiting construction systems in other spheres are easily found. For example, building systems for buildings remained essentially unchanged for thousands of years and up to the early 1900's the highest buildings were cathedrals, where the top stories were unusable for any practical purposes. Buildings could not be built higher with existing materials or they fell over. Increasing effort in terms of time and expense of building ever-stronger supporting structures lead to diminishing returns—the effort could not add any significant number of usable floors. In short, the particular construction system in use was self-limiting. However, that building system was also self limiting in another way. Structures built with the system were not strong enough to support personnel lifts even though such lifts did exist at the time—coal mines hundreds of feet deep were only usable because of the lifts that serviced them—hence the lifts existed, but an aboveground building structure strong enough to support lifts tens of stories high generally did not. Due to the absence of ease of use lifts, few dwellings or offices existed higher than 5 stories even though builders could easily build higher—nobody wanted to drag shopping and the baby up forty flights of stairs, let alone pay extra for the view. Hence, the building construction system was also self-limiting by lack of ease of use. At the beginning of the 1900's a new building system arrived—steel and pre-stressed concrete—and from that point on the face of construction changed. Previous limits dissolved overnight, structures could be built tens of stories higher, and were strong enough to support lifts, allowing the higher floors to command a significant premium that was more than enough to pay the additional cost of construction of the higher floors—the self-limiting ease of use limit was also removed by the new construction system. Both of the self-limiting facets of the previous construction system resulted from a single root cause—lack of the adequate structural strength in the old construction system.

A human-computer data-activity system is a system in which a programmer attempts to make a computer do things that the human considers to be useful. The computer manipulates (changes) one commodity only—human data—and human data is to the computer, what structural strength is to the building system. For the computer, human data is the single founding factor and therefore, the methods and the way in which it is used by the computer and by the human, are totally critical. To be easy for the human, the data handling method used by the computer and that used by the human should be identical or at least very similar and if they are, there will not be much for the human to learn before he can use such a computer, as it will do what he expects it to do under nearly all circumstances. He has prior experience—since birth—with the human data system; if the computer's data system is radically different to the human's data system (as it is today) the computer will be "hard" to use. Everything it does will have to be newly learned before it can be used, because the human has no prior experience with the computer's different data handling system that is practiced by all state of the art software. It is not a question of which one is right and which one wrong. It is a question of whether they are the same or whether they are different, or not, and since the computer has to please the human, and the human is not there to please the computer, the humans' data handling system—whatever that may be—should be adopted by the computer. The computer should not, as it does today, force the human to adopt and learn the computer's data handling system.

One hundred percent of the world's population of humans have their various habits, ways, methods and systems of manipulating data between one another even if nobody has previously identified what those methods and systems are. Hence the human does have a system and ideally, so that the computer and the human handle data in the same fashion, which would be easiest for the human, it is necessary to identify what that human data handling system is and then implement a computerized version of it in a computer.

Humans, without doubt, exchange data between one another and the data exchanged produces useful activity, much as when a boss orders a secretary to "email to Joe the fax about applies that I sent to Pete last week" and the ability of humans to do this sort of thing makes one human easy for another human to "use". Humans and computers also exchange data with the intention of producing useful results and clearly, while one data-action system (the human one) is easy (for humans) to use, the other one (the human-computer data-action system) clearly is not, and moreover, since it cannot even execute simple commands such as the one illustrated above, something is clearly badly wrong in the state of the art human-computer data system. The apparent inability (despite unimaginable resources never before seen on earth) to add significant functionality (to build higher) and the evident lack of ease of use (inability to add lifts) again despite the availability of unimaginable resources and multiple university faculties working to advance existing technology, bear uncanny indications of similarly to the self limiting phenomena and characteristics of yesterday's self-limiting building construction system and point to the lack of the right construction system—or the use of the wrong one in the state of the art—as being a possible root cause of the problem. The construction system concerned in the building example was the system and methods used to build buildings. In the case of computers, the construction system that could be the root cause of the mentioned problems would be the software construction system and methods (the system used to construct the human-computer data-action system in a computer)—the human-computer data-action system being the system by which data is received, from the human, recorded, handled and then related to action by the computer so as to cause useful activities that are all, in some manner or another, transformations and manipulations of data.

Examination of the State of the Art Construction System—Basic Description of One to Many Machine System Type Similarly to the previous building construction system that also endured a long time after its first use, until now there has been one, (and only one) basic method and system of constructing software (the human-computer data and activity system) and that construction system has remained virtually unchanged in its basic principles and methods over the last sixty years—from the very first beginnings of software. There have of course been many developments of the basic method—such as object oriented construction and so on—but the most basic principles have remained unchanged, with tightly integrated code (using many mechanisms such as inheritance and hierarchical construction in the name of code efficiency) on the one hand, producing separate data of a particular type on the other. The code is in one or more files or blocks of one type and the data produced by it is in one or more files or blocks of a completely different type and structure, and the code block acts on a block (file) of data.

This construction system is a member of one of the two basic types of machine system that have now been identified in the world today as a result of the investigation of the human data system that lead to this invention. The existing software constructions system and methodology fully complies with the requirements of one of those types of machine—the One-To-Many machine type. (The world "machine" is used here in the sense defined by Merriam Webster of "an assemblage of parts that transmit forces, motion, and energy one to another in a predetermined manner"—and clearly these parts can be either physical or logical and are logical parts in this case). A One-To-Many machine is defined as:

"A machine in which One of something works with Many of something else, in a manner that is intrinsically hierarchical and is intrinsically limited."

Examples of such One-to-Many machines are the CD machine system, where there is one CD player, and many CDs read and played by it, or one word processor, and many word processing documents processed by it, or one spreadsheet software One-to-Many machine, and many spreadsheets processed by it, or One operating system, Many programs run by it—and so on, with each One-to-Many machine being a separate entity. The vast majority of machines and machine types that are encountered in daily life are One-to-Many machines constructed with One-to-Many machine construction methods and principles, and state of the art computers and software and today's human-computer software data system are no exception to this—they too are One-to-Many machines built with One-to-Many machine construction methods.

The One-to-Many construction methods used in state of the art software construction and their interrelated data handling are extremely well documented in thousands of books and known to some degree to nearly all computer users and do not require repetition here. If any individual part of such a software construction is examined it will be seen to fit the One-to-Many machine definition given above. In effect, "software" today is a large number of individual One-to-Many machines that are interacting with one another to make an overall, big One-to-Many machine—much as a car is a large number of smaller One-to-Many machines working together to make a big One-to-Many machine that is a car—one car, many roads driven by it.

One-to-Many machines are typically constructed by assembling several components that are sometimes single function and often multi-function. But the nature of the components from which the machine is built is such that one component needs to be assembled with one or more other and specific components in order to function—it cannot function when related to any other component in the machine, but only when related to certain specific other components in the machine. For example, a memory chip in a CD player cannot function if attached to the spindle of the motor turning the CD and will actually prevent the spindle from turning so that, if miss-assembled, it may even break the machine. The memory chip can function—but only when attached to another specific component—a circuit board. In order to function and not break the machine, the memory chip has to be assembled with a specific fixed and hierarchical relationship with power supply components the chip needs to operate and other components to send and receive its data.

The defining characteristics of a One-to-Many machine are as follows:

transferring data from one machine to another requires a translator and the multi-million dollar database integration industry is essentially a translator production industry that arises because databases are also One-to-Many machines none of which can use the other's data without translation. Getting them to talk to one another needs translation and plug together mechanisms that are the more exotic equivalent of taking music on a tape and putting it on a CD. As a solution to providing individual translators to translate between any two One-to-Many software constructions, current effort is to provide them all with translators from their own language into a common language—XML. While that is effective in enabling data to be transmitted, it does not solve the further underlying problem, which is that the data structure of One-to-Many database A, is different to that of One-to-Many database B, and hence even when they can transmit data using XML as a common language, unlike a human who can receive more or less any data and do something useful with it, the two One-to-Many databases cannot necessarily do anything useful with the data that has been received through the common language or relate it to their own data. Data received from the one can't fit in the other as their data structures are different and hence, XML or no, the multi-billion database plug-together industry is still needed to work out how to transform data from Database A in Database A structure, into data that can be used or related to the data of One-to-Many Database B with its warp and woof Database B One-to-Many data structure—one database, many tables. Many records in Table B, all related to one record in Table A.

Self Limiting Increase in Complexity

When applied to building software, the One-to-Many machine construction methods and principles of the state of the art result in a data-activity system that is inherently self-limiting in a number of striking ways, the first of which is that adding functionality results in ever-increasing complexity to

| Defining Characteristic | One-to-Many Machines |
| --- | --- |
| Functions performed by each Component (building block) from which the system is made | Often more than one |
| Other Components in the machine with which a specific Component can be related and function | A Component can only operate with specific other Components with which it was designed to operate. |
| Relationship of any one specific Component to another | Fixed |
| Components exist in a Hierarchy | Always - hierarchy is intrinsic |
| Hierarchy of Component assemblies | Mandatory - intrinsic |
| Flexibility | None outside of built-in One-to-Many relationship. Almost totally limited |
| Machine purpose | Performance of specific and always pre-defined functions |

A first important characteristic of One-to-Many machines is that they are very good at what they do and completely useless at doing anything they were not designed to do. For example, a lawn mower is very good at moving lawns, but is wholly useless for baking bread. The oven is great for baking bread but can't mow lawns. A word processor is great at changing words around on the screen but can't create a presentation; a spreadsheet is wonderful for calculating numbers but can't email them and so on. The second important characteristic is that data from a one One-to-Many machine, can't be used by another One-to-Many machine without transformation. One CD player designed to play Many CDs, cannot play a tape without first transforming the data onto CD. The One-to-Many Tape player designed to play Many tapes, can't play a CD without transforming the data first. Effectively, the point that the complexity becomes overwhelming and prevents further progress, a phenomenon that arises in the following manner:

One to Many construction systems are intrinsically hierarchical and the One-to-Many software construction method that is the state of the art software construction method, is indeed self-limiting in that adding an arithmetic increase in functionality causes a logarithmic increase in code complexity. That phenomenon is easily observed throughout the software world and can for example be seen when comparing the abilities of the first word processors, which would fit on an 8" 128 Kb disk, and those of today, where the program is X thousand times the size, but does not have anything like X thousand times the functionality—code bloat as it is commonly termed. Yet, if one were to imagine everything one might be able to do with text—particularly in terms of its look where possibilities are almost limitless, and compare that with what a word processor today can do with text, an extremely large gap is still apparent, far larger than the gap between the first word processors and those of today. Since recent iterations of major word processors show little addition of user-useful functionality of any importance to the general user, despite the application of gigantic resources, clearly, something is preventing forward movement and the only available candidate is the construction system for the data/software machine that is proving troublesome and resistant.

Today's software, when analyzed and broken down, consists of many small One-to-Many machines, connected together and all related to and affecting one another and assembled into one very large One-to-Many machine system. As a result, if a new functionality has to be added, it affects things in very many individual small One to Many Machines throughout the code, and not always in very predictable ways, leading to a) adding one additional functionality requires many new code connections—causing "code bloat" in conventional parlance b) considerable expense arising from the considerable difficulty of adding functionality. The errors and unpredictable results arising form the complexity are such that today's leading operating system, with all the billions behind it, requires weekly patches (repairs) in order to function at all and even then, shows many flaws, most of which occur unpredictably. This complexity of the code connections between the many One-to-Many machines working together is the fundamental cause of the self-limiting nature of the One-to-many construction system because adding more functionality requires logarithmically greater effort to do so, and this effort eventually, somewhere, becomes so great, and the commercial return for the effort so minimal, that at the end of the day it can't be done in practical or profitable terms, and hence the system is self limiting in terms of effort required to add functionality. While there is no defined limit, the effect is that of a wall of glass—it is always possible to see where the software needs to go and do, but getting there is like trying to go through a flexible glass wall that imposes ever-increasing resistance to progress, a resistance that eventually becomes overwhelming or not commercially viable to overcome.

In contrast, with a human, the opposite is the case; an arithmetic increase in ability (a single new ability just learned) results in a logarithmic increase of functionality as he can apply the new ability anywhere at all and use if with every other ability he has. So if a human learns to add up numbers, the human can do this anywhere—on a sheet of paper, in an email, a letter, in a presentation, on a drawing, on a wall or on the back of an envelope and do it with a pen, a keyboard, or with sand and his finger. The human can take almost Any ability and apply it to Any data (whether doing so is useful or not), and that kind of ability is typical of an Any-to-Any machine which will be described in more detail later, but which is rudimentarily defined as a machine in which Any component (for example the ability to add numbers) can be used with Any component (for example a sheet of paper or with sand).

The dramatic difference and contrast between an Any-to-Any machine and a One-to-Many machine in terms of increase of complexity for a given increase of functionality is easily understood by considering the example of an old fashioned telephone switchboard. Such switchboards had many holes, each one representing a different telephone extension or number and the holes could be connected together by a telephonist with a wire with a jack on each end and by placing one jack in each hole (representing an extension or number) to be connected. This was an Any-to-Any machine in that "Any component (hole) can be used with (connected to) Any component (hole) (by a wire with two jacks) in a manner that is not intrinsically hierarchical (there is no hierarchy between the two holes being connected together) and is intrinsically unlimited (it does not matter if there are nine holes or a thousand as long as the wire is long enough).

Supposing now, that if there are four holes, there are then 6 combinations—ways they can be connected directly to one another. If one more hole is added, there are now 10 combinations, so adding one hole, adds four combinations. If a further hole is added making 6 holes, there are now 15 combinations, so adding one hole, this time added not four, but five new combinations showing that combinations (functionality) increases disproportionately to holes (complexity). So as this little Any-to-Any machine grows, arithmetic increase in complexity produces logarithmic increase in functionality—the same phenomenon that is observable in a human where, when one new ability is learned the humans has thousands of ways he can apply it.

Now supposing that instead of being constructed as an Any-to-Any machine, the switchboard had been constructed as a One-to-Many machine, by wiring each hole directly to every other hole with its own wire—that would make it into a One-to-Many machine—one hole, many wires. In effect, what happens is that whereas only one wire was required before, no matter how many holes there were, now 4 holes require 6 wires to connect them all directly, 5 holes require 10 wires and 6 holes require 15 wires—the addition of 1 hole added 4 wires but the addition of 2 holes added 9 more wires—not only were more wires were need than holes, but adding holes increased the wires disproportionately, and an arithmetic increase in functionality has produced a logarithmic increase in complexity. The enormous increase in code size and complexity with little increase in software functionality seen over the last years is additional characteristic of and a confirmation of the One-to-Many nature of state of the art software.

Imagine now that each hole is one of the atomic meanings of a word (so that a single hole is not just the whole word "fax", but that each hole represents just one single meaning of a word—such as the one meaning of fax, the activity of faxing (as opposed to another meaning of the world "fax" as being fax the piece of paper that can be looked at, or still another meaning of the one word "fax" being the word for the machine with which to send faxes). Now in the state of the art, the programmer uses current One-to-Many construction methods to connect each meaning directly to each of the other meanings he wants enable the user to be able to use, and does this using code. For example, when he builds a One-to-many address book (one address book, many addresses record by it) he connects "First Name" to "Fax" (number) using code. Because this is a laborious process he uses various One-to-Many tricks to cut down the connections, so he writes a One-to-Many field structure which he connects by code to a One-to-Many screen display structure which is connected by code to a number of One-to-Many DLLS which are connected by code to . . . etc. He certainly does not even try to connect every meaning to every other meaning of everything as the human can and does from time to time, so he does not wire together with code the First name in the address book to First name in the accounting program because he can't wire everything direct to everything else or he would be there for ever.

On the other hand, the human that he is attempting to satisfy, can, at any time and at the slightest whim, decide to connect any of these holes (data points or events) directly together in a new way that has not been done before, for example by giving the instruction: "if my wife calls, FAX this to Joe", in other words ordering the computer to connect together one point of 1) the his wife 2) calling, and others of 3) the activity of faxing 4) "this"*(document) and 5) Joe. He is asking the computer to connect certain things together in a way that the programmer has not code-wired them together yet. If enough demand occurs for a specific connection, then that new functionality gets added—which needs nine—or nine thousand—more wires to connect it. Because so much complicated code wiring is needed to connect new data points together, the programmer does not wire the least essential ones and the result today is that there is one Joe Brown in the address book and another in the accounts program. While they are actually the same Joe Brown, the programmer has not wired them together, and so the computer has no way of knowing that they are the same Joe Brown. Consequently if one has just created an invoice addressed to Joe Brown in the accounting program, you can't give an order such as "email it to Joe" because Joe's email address is in the email program where the accounts program can't get at it, and even if it could, the computer does not know they are the same Joe Brown anyway.

Describing problems of directly connecting an additional hole in the switchboard is a comparison of microscopic size compared to the real problems that exist in trying to satisfy the human. Flying over a city at night and considering that each of the lights is a data point that the human may at any time demand to connect to any other light (data) that can be seen anywhere, and then imagining how much wire (code) would result by attempting to wire each lamp directly to each other lamp, soon leads to the conclusion that there would be a pile of wire over the city many miles high; yet this is what today's One-to-Many construction systems attempt to do. As this analogy shows, the objective of connecting Any data to Andy data as the human does and as he would preferably require a computer to do too, is an un-unachievable objective with the state of the art One-to-Many construction system, in which every hole has to be pre-wired to every other hole, and is a system that will self limit at some undefined point with a business decision that adding another 9,000, or 90,000 code wires is not worth the commercial return of doing so.

In effect there is an urgent need for an alternative construction system, in which the programmer does not wire anything to anything at all, but instead builds code wires with plugs on the end and hands these wires with plugs on the end to the user and lets the user get on with plugging together whatever data and activities he wants to plug together. Such a system would reverse the present logarithmic increase of complexity produced by an arithmetic increase in functionality, and instead produce a logarithmic increase of functionality for an arithmetic increase in complexity.

Hence, there is a first requirement for a human-computer data-activity construction system in which adding additional functionality does not add complexity disproportionately but preferably reverses the situation so that—as with a human—arithmetic addition of complexity results in logarithmic increase of functionality.

Self-Limiting Ease of Use

In addition to being self-limiting from the construction aspect, today's human computer-human data-activity (software) construction system and methodology is also self-limiting (just as the previous generation building construction system was) from lack of ease of use.

Where a human is concerned, the more things a human knows how to do—which in computer terms, would be more the more software it has—the easier that human would be to use (work with)—a man is "easier to use" than a baby which cannot even understand what it is asked to do. If a human knew how to do a lot of things (equivalent to a computer with a lot of software), he would be very "easy to use" as he could do pretty well anything and everything he was asked to do. But with a computer today, the exact opposite is the case—the more software it has, and the more the software can do, the harder it becomes to use. They say that even experts take years to learn to use drawing programs—programs that mostly do less then most humans can do with a few pencils, rules and paper.

If one were to take a few ordinary texts and then construct a written menu containing each and every action a human could do to that text and its display (just as today there is a menu entry for each action a computer can do) it is predictable that one would land up with a menu the size of a volume of the Encyclopedia Britannica because what a human can do to data is extensive. The truth of this is easily demonstrated by looking at a text and thinking of all the things one could tell one's secretary or another person to do with the data. A human would easily invent very many things to do (that actually software today cannot do) such as:

"take that paragraph, turn it sideways, put a box with curve lines around it and then put that in the upper part of this photograph of an apple."

"Check if any other machine in the office has a document with that paragraph in it and bring me the document concerned."

"See if that paragraph was ever sent by someone to Joe Brown in Seattle."

And so on. Such a menu would be so large as to be impossible to use in anything like a workable manner In fact, where there are thousands, or tens of thousands of possible things—or even more—that the other entity (person or computer) could be asked to do, a language based command system is the only practical solution. Humans, in order to use one another, use a language interface and that enables them to control almost limitless abilities in one another. Language control is very easy indeed for humans to use—they are trained in it and use it many hours a day each day every day since soon after birth.

So when the number of activity possibilities becomes very large, a menu control system is no longer workable and instead a language selection mechanism is needed where the user can tell the computer—at least in writing—what the person wants it to do, just as that person would tell another human—a secretary or an employee—what they wanted done.

Considering that even today's software exceeds people's ability to easily understand and use its menu systems as the example of drawing software shows, the ability to control computers with normal language would be a desirable improvement, even today.

But there is a reverse side to using language as a control system—if the number of possible activities is not reasonably comprehensive compared to what a human could do with the same data, a language control system is wholly unworkable and this problem arises as follows. On the one hand, humans are very good at limiting their orders to what they think the other person ought to be able to do. A mother will not order her 10 year old son to do the household accounts, but she will tell him to sweep the yard. The other side of that, is a person will tell another to do anything they think the other should be able to do. The household accountant will get asked how much was spent on food, and will get asked to email that to the spouse.

While a person has a fairly good idea of what a child or a household accountant ought to be able to do, the only yardstick he has for what a computer ought to be able to do with given data, is what he knows he could do with it himself or what he knows he could ask another person to do with it. But, if one then compares what a computer can do with any specific data and what a human can do with the same data, it is shocking to observe how very little the computer can do out of everything the human can do. Because of this lack of functionality, even if a language control system were to be installed to control a computer today, it would turn out to be useless and would not be used. It would be useless because it would give the user the freedom to order anything he can think of, and the human would then order anything he thinks the computer ought to be able to do. But since that is an awful lot more than the computer actually can do, when he gives normal language orders, he would find that 95% of his commands could not be done and would fail. After some experience of that, there would inevitably be a frustrated and irritated request to, "tell me what you can do then?" And the only possible response to such a request is a menu—a menu being simply the presentation of ordered lists of what the software can do. Hence, the language command interface, even if available, would be of little use and would not be used because too often it would fail to produce any result because the list of what the computer can do with the data is tiny compared to what a human could do with the same data.

Therefore in order to give a computer a language control system, a first prerequisite is to enable that computer software to do pretty well anything the human might expect the computer to be able to do with the data concerned. But therein lays a catch because today, as already discussed, the existing list of functionality that a computer can do, is quite tiny compared to what a human can do with the same data—and more functionality can't be added because of the self-limiting nature of the construction system being used.

So before language control becomes usable (even if available) the computer has to be made to be able to do pretty well anything the human might expect it to do and therefore might order it to do. But this is impossible today, because creating even the inadequate existing number of activities has already resulted in such complexity that adding any number of further useful activities with the existing state of the art One-to-Many machine construction is almost impossible—as recent efforts with many programs such as Office Suites and Vista have shown.

But it is the nature of things that one wrong solution causes other problems and in fact, today's menu system is not very workable either and is a problem in itself—a problem that derives eventually from the One-to-Many construction system which renders language control impractical because adequate functionality to make language control practical cannot be constructed.

The problem with menu control systems is simple to understand. While menus are often compared to a "tree" with "fruit" (icons) at the end of the branches, they are a tree that the user monkey has to climb blindfolded—he cannot see at the outset at the end of which branch his desired fruit lies, he cannot know if the fruit he wants even exists at all or and cannot know what it looks like. He can only see the fruit that are available once he gets to the end of a particular branch—only to find that none of the available fruit are the fruit he wants and he must start again, and blunder round the tree again. As the available fruit (menu actions) increase from the tens to the hundreds to the thousands, the use of the menu becomes an increasingly daunting task—much like climbing the stairs to the tenth or to the fortieth floor each time and eventually, this effort becomes just too much trouble for the ordinary user. As a consequence in the state of the art, the user is found generally not to use more than 7-10% of the available functionality. Since this cannot be due to lack of desire to use the functionality—a boss will give a secretary or employee much more complex orders to do than are available in existing software—this lack of use of functionality can only be due to absence of desired functionality or difficulty of accessing it or both. In effect the menu system itself is self-limiting the use of the provided functionality. In effect, while it is not possible build higher than the tenth floor with the existing construction system, the tenth floor has been built but few people want to use the tenth floor even if it is built—nobody wants to drag the shopping up that far or blunder blindfolded round the menu tree for another hour or two trying to find out how to do something, that maybe the software cannot do in the first place.

Hence, there is a requirement for a human-computer data-activity construction system that does not limit the ability to add functionality, so that adequate functionality can be added to make easier, human-like language control of the computer acceptable and useful, and so make the power of computing available to more of the world's population because practically everyone in the world can use language control without having to learn anything.

In summary of one set of problems arising from the nature of the software/data construction system, the state of the art One-to-Many data-activity system construction system is a self-limiting blind ally and Catch 22, in which more functionality is needed—but cannot be provided due to increasing complexity resulting in ever-increasing effort in return for ever-decreasing improvement, and even if the needed functionality is provided, it cannot be accessed and used by the user due to excessive menu complexity, and cannot be accessed by language either, due to insufficient available functionality to make language control practical. The result is a series of interlocking "gotchas!" that block forward progress all of which arise from the nature of the state of the art, One-to-Many, 60-year old, self-limiting software construction system and methods still in use today. The effect is that of a dead end, just like the previous generation building construction system was a dead end, and on the very similar counts, a) inability to build higher (build more functionality) and b) lack of ease of use.

While this shows a further need for a non-self-limiting construction system or method to enable software functionality to progress, there is yet another, interlocking set of problems that also block the way forward in the state of the art, and which, if not solved at the same time will also prevent material progress, as follows:

Data Insanities in State of the Art Software

To describe now, the data handling imposed by the state of the art construction system, it is not only the self-limiting nature of the One-to-Many human-computer data-activity system that is in urgent need of improvement by making available a construction system that is not self limiting, but the data-activity system enforced by the state of the art construction methods also requires major improvement. The current computer data system or data model, however one wishes to refer to it, is so different to that in use by humans with other humans, that if humans behaved the same way in their data handling with other humans, they would immediately, and with little hesitation, be certified as insane. Such a certifiably insane data system can hardly be regarded as an ideal data system for a computer that the human has to deal with daily. A computer using a data system that would not be certified as insane if used by another human would be better.

While there are very many ways in which state of the art computer data handling phenomena would be classed as certifiably insane if done by a human, of these, the following eleven data insanities cover a wide range of state of the art software data handling problems and (from a human viewpoint) would be obvious and major insanities if done by a fellow human. Each one is directly caused by the One-to-Many construction system forcing data constructions and behavior that are in direct conflict with the "sane" data handling as practiced by humans:

Data Insanity 1—One to Many Data Exchange

A first example of this data-activity system (software) insanity in the state of the art occurs because a major characteristic of the One-to-Many machine type is that it is almost totally and extremely limited—all such machines are very good at what they were built to do, but are completely limited and completely inflexible and are more or less incapable of doing anything they were not specifically built to do. One of the many limits of the One-to-Many machine that is quite characteristic of this machine type is that data created by or for any one particular One-to-Many machine cannot be read or used by a different One-to-Many machine type without prior transformation or translation. For example, a One-to-Many system CD meant for a CD player cannot be read or played by a tape recorder—the data must be transformed first and placed on a tape. A One-to-Many spreadsheet cannot read data created by a One-to-Many word processor without transforming the data first through OLE or some other mechanism such as XML. Relational databases—the primary human data repository and recovery mechanism that are today responsible to hold, relate and provide most human electronic data—are a particularly dramatic example of a One-to-Many system and the limitation resulting from such systems. In a database:

One set of field names in one table is programmatically related to many entries in that table One entry in Table A is programmatically related to many entries in Table B One Table is programmatically related to many views of it And so on. "Programmatically related" as far as the human user is concerned, means that these things are more or less welded together never to be undone or changed—at least, not by him—and can't be changed on the fly by anybody, even if they are a programmer. This extreme inflexibility and rigidity derives directly from the hierarchical nature of the One-to-Many machine construction, where, for example, the One-to-Many methodology is reflected throughout the warp and woof of the relational database construction. The strict, inflexible, hierarchical nature of the stored data to the One-to-Many relational database machine type that produced it results in such inflexibility that, whereas humans can talk to one another (proved they use the same transmission media (language), different databases can't talk to one another even when they do use the same language to communicate to one another (e.g. XML) and a multi billion dollar industry exists to try to glue together again the world population of database Humpty Dumptys that perhaps should never have been created as un-human-like separate data lumps (databases or applications) in the first place.

This One-to-Many hierarchical methodology produces databases that can't exchange data usefully (unlike humans who can exchange any data with anybody) stems from the days when computers were tiny and getting them to do anything at all was a miracle. In those days storage was equally tiny as well as horrendously expensive. Because of those physical constraints, difficult and equally miraculous software mechanisms that promoted compactness and "efficiency" were at a premium. While—at first glance at the time—such mechanisms were apparently efficient, there was no or little thought detectable in the literature of the epoch as to what the human data-action system might be and how these "efficient" mechanisms might relate to it. One of these universally adopted efficiencies was the hierarchical construction system throughout software, in which the properties of one piece of code were inherited from or depended on, the properties of another piece of code—or usually of many pieces of code—thereby (apparently) saving the many repetitions of the code that would normally be required to (re)produce the property. This hierarchical structure construction method of software, of this depending on that, extends throughout the structure and permeates state of the art ordinary software and data storage software, where One entry in table A is welded together (with code) to many entries in table B.

Hence, and because of the hierarchical nature of the One-to-Many software construction system, each piece of software has its own data format just as each database type does (and in the case of databases made with the same software, they each have their own structure as well), and therein lies the root cause for thousands of human-computer data systems that cannot communicate their data between one another without billion dollar enterprises to assist in the transfer of data and why, even today, the largest multi-billion dollar corporations are unable to see in their own computer system A, data that is produced in another continent in their own computer systems B, C, D, E, F. The best they can do is to browse the data provided that each database has a web interface.

If a situation were to exist in the human data-action system, whereby two groups of humans speaking a common language (much as many different data bases "speak" XML), could not usefully exchange information, one of the two would be considered certifiably insane, and on this count, the computer data-action system, by human standards, is certifiably insane by reason of the inability of one entity to exchange data usefully with another without an armada of technicians to help.

Hence, there is a requirement for a human-computer data-activity construction system such that any computer can exchange and usefully use, any data with any other computer system i.e. where each computer able accept and relate other computer's data, just as a human can accept and relate other human's data.

Data Insanity 2—Joe Brown

A second major area of data-activity system (software) insanity (by human standards) is easily illustrated with something as simple (and as fundamental) as an address book, which is a One-to-Many construction like all software today. In an address book, One address book (complex package of code) is rigidly associated and welded together with code by a programmer to Many addresses which are further welded together by code to the storage format of the data and still further welded together by code to the output screen intended to display the data. Superficially, this appears reasonable and normal, but because this address book and the associated systems such as a spreadsheet are all One to Many machines (different One-to-Many machines), the result is that the exact single and one entry of the name Joe Brown used in the address book cannot be used elsewhere by other software, for example in a spreadsheet called "Joe Brown account", and, as far as the computer is concerned, as soon as that spreadsheet is saved, the data "Joe Brown" appears in the computer twice, or, when "Joe Brown" is further entered in the body of the spreadsheet, three times, or when entered in the body of a letter, 4 times, and so on. It is not possible to re-use the exact one "Joe Brown" entry in the address book again (for example) in the accounts software, because this one Joe Brown entry is not accessible by itself and without anything else, but can only be accessed by using the whole address book itself (a multi-megabyte construction) at the same time. Since it becomes impossibly complex with One-to-Many address book construction to transform the data for other One-to-Many machines (such as a word processor or spreadsheet) and then relate it back to the individual address book entry, this is simply not done—and in fact more or less can't be done as the resulting complexity is overwhelming—a further example of the self-limiting (and user-limiting in this case) effects of the state of the art One-to-Many construction method.

Whereas, in a person's head, there is only one Joe Brown, in a computer, due to the self-limiting nature of the One-to-Many construction method, coupled with the hierarchical structure imposed by it, there may be one "Joe Brown" in the address book, several hundred "Joe Browns" in documents, some more "Joe Browns" in accounts software, and there is no way at all of telling whether these are all the same Joe Brown or different ones and if so, which is which. If a human did not know whether the Joe Brown he wrote to yesterday, is the one to whom he owes $100, or the one who has a Seattle address and is married to his sister, he would be thought to be insane and it well might be said that today's software and data construction system that results in thousands of "Joe Browns" where a person has one only, and in a computer being complete unable to determine which Joe Brown is which, is indeed an insane construction system, in that it produces a data system, which, if seen in another human, would be considered quite certifiably insane.

This illustration points out several facts in the state of the art human-computer data-activity system—firstly that the human-human data-activity system is not the same as the human-computer data-activity system. Secondly it illustrates the fact that a computer will be considered to be easy to use, to the degree that it does what the human would expect another human to do under the same circumstances, based on the human's experience of interaction with other humans. The human has one "Joe Brown" and so does the friend he talks to, and dealing with that friend is intuitive and "easy"— he knows what to expect. But whereas the humans have one "Joe Brown" the computer has thousand, all of which are the same—maybe—and that is not at all what the human expects and as this demonstrates, this state of the art One to Many construction method results in non-intuitive data systems that, by human standards, are insane. The fact that computer data handling, if seen in a human, would classify that human as certifiably insane serves to illustrate how very different are the underlying data-action systems or models.

The illustration of the address book built by state of the art One-to-Many construction methods also illustrates other certifiably-insane characteristics of the data-action system resulting from state of the art methods. If one were to transform just an address book into physical elements like wood and wire, so as to see its construction more clearly, the resulting model would be a system in which a particular component, such as a wire (an address), is only packaged and sold and delivered to consumers preassembled with a headlamp (the address book)—the consumer can only use his one "Joe Brown" entry by using the address book at the same time. So in order for the consumer to connect his TV to the TV antenna on the roof, the consumer would buy the wire (with its cannot-be-disconnected-by-the-consumer headlamp), and connect the TV to the antenna on the roof. And then he would have a headlamp dangling off his TV antenna on the roof and nobody would be surprised if all his neighbors would ask one another what certifiable lunatic lived in that house and whether he should be locked up before he did something really dangerous. Yet this is the situation throughout the software world, where a particular component, such as a wire (First Name), is only packaged and sold and delivered to consumers preassembled with a headlamp (Address book). Again, a human confronted with this situation would consider it insane, and would consider the manager of a hardware store selling wire only with headlamps attached to it to be a candidate for the lunatic asylum. The state of the art software situation is no less insane simply because it is not a physical construction that is so obviously ludicrous as to cause the neighbors to laugh in pity.

Hence, there is a requirement for a human-computer data-activity construction system in which only a single instance of any given data exists and all re-uses of it are only references to the original data, so that when there are multiple Joe Browns or their equivalent, it is always known which one is which, just as a human would know which one is which.

Data Insanity 3—Backwards

A third area of One-to-Many data-action software construction method that results in the human-computer data-action system differing enough from the human-human data-action system so as to be classed as insane if it were to occur in another human, as follows:

Today's state of the art software-data systems work completely backwards when compared to the human data-action system. In the human system, data is received as Step 1 "email to Joe the fax about applies that I sent to Pete last week" and then action is produced as Step 2—the secretary, having received the data, then goes off and performs the actions required. Step 1 is data reception and recording and Step 2 is actions done with that (now recorded) data and in consequence of its nature. The secretary finds the fax (one action) and then performs a second action (emails it to Joe). In short, data (received order) drives the choice of activity (software). Today's software does it backwards. The software must be chosen by some higher outside authority—the computer can't do that itself—and activated as Step 1, (find software) and then—as Step 2, the data (the fax about apples) can be found. Having been found, a new Step 1 is required that the human does not need at all, and new and different software must again be activated by a higher outside authority and then as a new Step 2, the email can be sent—once the outside authority has performed the additional action of transferring the found data to the email program (as software does not necessarily exist to do that for him).

This problem arises because the data-activity systems constructed by the One-to-Many state of the art construction method, result in each software having its own separate data that is the only data it can handle and that only it can access and that in turn has the effect of constructing multiple logical paired boxes in the computer each consisting of a lump of software and another lump of data created by that software that is in a format only that software can read. As soon as there is more than one software that could need to be used next, something or someone has to decide which software is to be used next. Because there is no such something or someone in a computer in the state of the art that can do the deciding, the human has to decide. Hence the state of the art software construction method imposes a sequence that cannot be violated, in which the software must first be accessed or opened, in order to do anything at all with the data, so that the software in use chooses which data and data types can be dealt with. If an email program is being used, it cannot access and manipulate accounts data in a database. The system produced by the state of the art One-to-Many construction system is a software driven system—the software in use dictates the data to be handled.

However, the human's data/activity system is the exact reverse—it is a data driven system in which the data in use decides the activity (i.e. the software) that shall be used with that data. The human accesses or retrieves the data ("finds" it in computer terms) and then does something to the data in consequence of what the data turns out to be, as in this example. "What other friends do we have? Ah, of course, Joe! (retrieved data) We should invite Joe to our party too. Shall we phone him, send him an email or send him a letter? He has no phone and no email? OK, let's post a written invitation (action) to him then". The data in use, selects the action to be performed on it, which simply is not possible in a One-to-Many system in which the One (software) has to be activated before it can do anything to the Many—its data type.

In summary, in today's human-computer data-activity system or model, Software drives Data—which is the exact reverse of the human-human data system where Data drives Software.

Were a human to claim that, before he could think of a person's name, someone had to tell him to activate his people thinking abilities he would be considered insane. If a person could not remember who Joe—or who anybody at all was— unless someone first said to him the people-thinking (address book software) activation phrase, "think about people OK?", then his trip to the lunatic asylum would be swift.

Hence, there is a requirement for a human-computer data-activity construction system in which data drives software selection, so that commands given by the user to the computer to perform specific activities can be performed in the manner the human expects them to be performed and not backwards.

Data Insanity 4—Data Boxes

A fourth aspect of the One-to-Many state of the art software construction model producing a human-computer data-activity system that would be classified as insane if seen in a human, is as follows. In the case of a human, their knowledge (data) and abilities (software) are an integrated whole—there are no separate functional divisions inside a person's head for letters, another for accounts, and yet another for addresses and a third for leg movement activities and another for hand movements and another for address remembering activities and yet another for calculating activities, and so on. A human does not think "ah, I will think about leg movements, let's see what we have got here, Ah yes, left leg—forward!" He accesses each activity and each atom of data directly. He does not have to through any command or structural hierarchy to do an action. He does not have any vias—things he has to go through, or boxes he has to get into before he can do something.

But the One-to-Many software and data construction methods in the state of the art result in large lumps or clusters of distinct bodies of knowledge software and associated separate lumps of activities—software; the word processor code over there, the documents produced by it; the spreadsheet code over here, and documents produced by it in that box there. As a result it is not possible to get to anything at all directly—one can only get there via some hierarchical thing else.

If a human were to claim that he had in his head, a similar division of data and activities, to those that a computer has in its head (hard disc), that person' journey to the lunatic asylum would be swift. If a human had in his head, the filing "system" that a computer has in its head, he would be considered insane indeed, and yet he can find more data faster than a computer can (by itself), so his filing system, whatever it is, can't be so bad. The computer can perhaps remember it much better, but the human can find and access (what he can remember) much better.

Hence, there is a requirement for a human-computer data-activity construction system in which data and activities are a homogenous whole and in effect, as with a human, any data (not just the data from a specific program) can be related to or associated with or interact with any other data in the computer so that each and any individual activity known to the computer can be applied to any of the data in the computer to which that activity is applicable, just as a human can do.

Data Insanity 5—Cannot Branch

A fifth aspect of the One-to-Many state of the art software construction producing a human-computer data-activity (software) system that would be classified as insane if seen in a human, is as follows. A human, in his behavior, will branch off from one thing to another and back to the original thing with total fluid ease. He will for example, start writing a letter, by hand, let us suppose, branch to the phone that he picks up to check the address with someone, branch to his address book, enter the address into the phone book and go back to his letter where he suspended execution in the middle, put in the address and continue writing.

Now take the same example in a One-to-Many email program, in which everything is solidly wired by the programmer to not quite everything else. The user starts to write an email, and opens the address book's address list display to choose an email address for the email, and finds it is not there. He attempts to open the address book to add the missing address only to find he cannot, because he is not allowed to do anything else "while a dialogue box is open". He has to close the address chooser list (terminate the execution), go to the address book, open it, add the contact, re-open the address chooser list and continue—the program cannot branch its execution and then return. It can certainly do all kinds of branching internally, but is prevented from doing so for the user by its One-to-Many this-wired-to-that construction, where one cannot get rid of the headlamp (suspend the chooser list execution) in order to use some wire (add an address). Many examples of inability to suspend execution occur in daily use of state of the art software, but it is only by directly comparing hard-to-use computer behavior to easy-to-user human behavior that they become easily visible.

This is important because, for a computer to be able to execute language orders that a human will give such as "send the email to Joe about apples at his weekend address", it has to be able to suspend execution much as a human would and after starting the email, be able to branch execution, lookup the weekend address, get it from somewhere if it does not have such an address, and return and carry on. A human who gave such an order, only to come back some time later to see a message staring at him "cannot do action while a dialogue box is open" is not going to be happy.

If one were to give an order to a secretary to "send an email to Joe about apples at this weekend address" and the boss were to return an hour later only to see her starting at her address list and to be told "sorry, I can't progress this until you tell me to close my address choosing list so I can add a new address to the address book," she would be thought to be insane. Her trip to the exit door would be a fast one.

Hence, there is a requirement for a human-computer data-activity construction system in which execution can be suspended at any time and then resumed when desired.

Data Insanity 6—Separately Controllable

A sixth aspect of the One-to-Many state of the art software construction producing a human-computer data-activity (software) system that would be classified as insane if seen in a human, is as follows. As pointed out previously, in order to use language control of a computer, it is necessary that the software is able to do anything and everything that the user reasonably expects, as otherwise, language control will fail. This requirement is most easily described in relation to things visible on the screen, where it is hence a requirement that each visible aspect of whatever is the on the screen, needs to be able to be separately controllable by the user's orders and controllable in such a fashion that the user's order (data) controls the execution he wants (software) and not the other way round as previously described and as occurs in the state of the art. This means that if the user wants the left edge of all boxes that appear on the screen to be blue, thick and composed of four lines instead of just one, the middle ones of which are to be wiggly, then The color of each edge must be individually accessible and separately controllable
  The thickness of each edge must be separately accessible and controllable
  Lines must be able to be added in without limit.
  Each of the lines on each edge must each one of them be separately accessible and controllable for thickness and for color and for form
  In the state of the art One-to-Many machine construction it is simply not possible to control each thing separately—for example, to control one edge of a box. It is even less possible to do so across multiple programs, both because the internal construction of each program is composed of many (somewhat different) One-to-Many machines, so that part of a box cannot be controlled separately. And the One-to-Many machines are anyway not quite the same in all the different programs and causing a change across many of them at once is a complication which, due to the nature of the code, would quite by itself cause considerable code bloat.

The argument is sometimes advanced by programmers that it is "not sensible" to make everything customizable, and users "don't want" everything to be customizable. But in a test system that could be so customized, after a few days, no two systems looked at all like one another, just as no two people are identically dressed, nor do they have houses identically decorated and furnished. A human such as secretary can apply any ability she has to any data, without regard to whether it is "sensible" to do so or not. She can—and children often do—color a photograph blue for example, and it is not up to the programmer to dictate and decide in a god-like manner what the human is or is not allowed to do, it is up to the computer to do whatever the human wants done. If one were to tell a secretary to draw boxes on a sheet of paper and make the left edge all boxes blue, thick and composed of four lines instead of just one, the middle ones of which are to be wiggly, and she could not do that, she might not be considered insane, but she would at least be considered to be retarded. But in order to do this, each and every visible thing must be individually and directly accessible without having to go through anything else.

Hence, there is a requirement for a human-computer data-activity construction system in which each of the activities of which the computer is capable are entirely separate from one another so that each one can be separately controllable, and in such a manner that the ability can be applied and the action done, to whatever is in the computer to which it should be physically possible to do that action.

Data Insanity 7—can't Act on its Own
  A seventh aspect of the One-to-Many state of the art software construction producing a human-computer data-activity system (software) that would be classified as insane if seen in a human, is as follows. If one person gives an order to another, then the first person expects the other to go away, get on with it and come back when done. In effect then, a computer should be able to be given orders, and get on with them without bothering the giver of the order, and report back when done. In the state of the art this simply isn't possible. It is not possible to chain orders together as can be done with a person (first do this then do that). If this is attempted on the rare occasions when it can somewhat be done, for example by selecting a number of word processing documents and then ordering them to be printed, what actually happens is that the word processing software opens, and each document flashes on the screen, obliterating whatever work is in progress, prints, and the next document to be printed flashes up on the screen covering whatever one is working on. This occurs because, due to the On-to-Many machine assembly method, the data is welded (by code) to the program (much like the wire and the headlamp are attached to one another), and the part of the program that transforms words (making them bold etc) is welded to the screen display part of the program and the part of the program that prints, is welded to the screen display also. Hence several documents can not be printed without displaying them on the screen, and in effect, the headlamp dangles off the TV antenna. If a secretary were to be given an order to photocopy or print several documents, and as she copied each one, she rushed over to the bosses desk, slapped the document down covering whatever he was working on and then a half second later snatched it away and then came back a few seconds later and did the same thing again with the next document, she would be regarded as out of her mind.

Hence, and again, there is a requirement for a human-computer data-activity construction system in which each of the new activities can be added without affecting old ones, so that each activity can be used without affecting any other activity at all.

Data Insanity 8—Word Based
  Data Insanity 8: an eighth aspect of the One-to-Many state of the art software construction producing a human-computer data-activity system that would be classified as insane if seen in a human, is as follows. It can be envisaged that ultimately, the computer that would be easiest to use would be one in which language can be used to command the computer, so that commands such as "send a fax to Joe" and "find me the fax from Joe" can be correctly executed, something that has not been possible on any broadly useful scale with software constructed with One-to-Many software construction methods in use today.

The word "fax" has several meanings, as do most words and what needs to be done, depends on which meaning is in use. For example, "send a fax to Joe" requires a send activity to SEND the fax, whereas the command "find me the fax from Joe" requires a completely different activity to be done—that of FINDING a fax. To respond to language commands in a useful manner, a computer would have to be able to detect which meaning is in use and act accordingly. In the above example, the first command has the meaning of fax, the activity, while the second has the meaning of fax, the piece of paper.

In the first command, document preparation software is required to prepare the fax itself and another separate One-to-Many machine (fax software) is also required to send the prepared fax. In the second command, neither of those pieces of software are required, and instead another completely different software (find software) is needed (which again shows that the data has to drive the choice of software as described previously). In order to be able to process such commands correctly, the software has to be built to deal with the different atomic meanings individually of words and not just words themselves. Additionally each of those atomic meanings (that the computer has to be able to handle separately, and differentiate between one and another) has to be able to drive and select the correct software to perform the required action.

The above commands illustrate the fact that, to make language command and control of a computer possible, there are two pre-requisites. Firstly, software has to be constructed so that it acts not on the basis of words, but on the basis of atomic meanings. It has to be a meaning machine and not a word machine. But all state of the art text handling and command control software are word machines, not meaning machines. Secondly, those atomic meanings have to be able to be associated on the fly (since there is no prediction when the human will use a particular meaning) with equally atomic software that will perform the activity the meaning requires. In other words, at its lowest level the software data system has to be constructed from atomic meanings and atomic activities (software actions) to go with them, such that meanings and actions can be associated as required, on the fly, and are not each preassembled in large lumps as is the case in the state of the art.

In fact words themselves are each little One-to-Many machines—one word, several meanings and many of them are actually quite complex little assemblies of several One-to-Many meanings. For example the word "dog" is a One-to-Many machine (one word "dog" and Many (several) meanings of it) and even something as apparently simple as "s" that can be used with "dog" to make "dogs" is another One-to-Many machine in its own right that is not written as a separate word, but (meaning-wise) does act as if it were a separate word: one word "s" and many meanings of it. For example "s" can mean, a) more than one b) next thing belongs to previous thing c) is. Hence the word "dogs" is an assembly of two One-to-Many machines. Some words are an assembly of 25 or 30 different pieces and far more than that is not uncommon. For a computer to handle these words correctly, the pieces have to be disassembled first and the computer has to find out or be told in some manner, which meaning is in play and act accordingly, just as the human figures out which meaning is in play and acts accordingly, in all instances.

In contrast to this, the state of the art One-to-Many machine software construction is built round multi meaning words and not on the basis of atomic (single) meanings. Even worse, it acts on mis-defined multi-meaning words with strange counter-intuitive and unknown-to-most-humans assortment of meanings assigned to them that are found nowhere else. Thus click the world "file" and one sees that in current software the word "file" can be defined to mean "new" or "open" or "print" or "archive" etc—"file" is one word, representing all of those meanings, none of which are in use elsewhere the world as different meanings of "file". Additionally, the One-to-Many machine construction does not permit, and actively prevents, associating atomic meanings with activities—apart from anything else mechanisms simply do not exist to do so.

Now if a boss were to say "file that" to his secretary, and she were to respond "how do you want it printed?" (which is what the Page Set-up command on the File menu amounts to), she would be regarded as insane. If the boss were to say to her "edit this" and she were to respond "what do you want we to find?" (Find is on the edit menu) she would again be regarded as insane.

Hence, and again, there is a requirement for a human-computer data-activity construction system in which the system functions based on (correct) and atomic—single meanings—just as its human does.

Data Insanity 9—Limits

A ninth aspect of the One-to-Many state of the art software construction producing a human-computer data-activity system that would be classified as insane if seen in a human, is as follows. Today's state of the art One-to-Many machine construction forces limits on its users that would be considered totally insane if practiced by another human. For example, a state of the art address book is typically limited to two or four addresses. But what if a person—Joe brown—has five or seven addresses as some do? Such address books are limited often to one mobile phone—but what if the person has several as many do? The only solution is to create another record—in effect create a yet another Joe Brown in the computer so that the computer thinks there are two Joe Browns when there is only one. And once that happens, how can a computer execute a command such as "call Joe Brown on his mobile"? Which Joe Brown? One has to create a second address record because the underlying address database is rigidly wired on a One-to-Many basis to a display, and all the parts of the display are code—welded together, so no way exists to expand the screen on the fly and add another 1 or 100 address or 1 or 100 mobile numbers. If a human, being told by her boss that the third mobile number for Joe Brown was xyz, absolutely insisted that the new number was not a number for the Joe Brown they both knew, and insisted on writing a new address record for another Joe Brown and then asked ingenuously what the address of the new Joe Brown is, she would be considered extremely insane.

Hence, and again, there is a requirement for a human-computer data-activity construction system in which the system does not limit the user in any way he does not limit himself.

Data Insanity 10—Execution Memory

A tenth aspect of the One-to-Many state of the art software construction producing a human-computer data-activity system that would be classified as insane if seen in a human, is as follows. Today's One-to-Many software usually does not record either user orders or their results, nor does it record what orders were executed when. However, one of the very basic and universal human specification methods is to identify something by specifying the execution that was previously performed on that thing. These are examples, "get me the thing I printed yesterday morning just before the printer stopped working", "find me the spreadsheet I faxed to Joe yesterday".

If a secretary was given such orders and responded "what thing? I do not remember printing anything" or "What printer stopped working? I don't remember any printer stopping working" or "what spreadsheet was that? I don't remember faxing a spreadsheet to Joe"—she would be judged insane.

Hence, and again, there is a requirement for a human-computer data-activity construction system in which the system records orders and their outcome and relates them to the item on which that execution was ordered.

Data Insanity 11—Security

An eleventh aspect of the One-to-Many state of the art software construction producing a human-computer data-activity system that would be classified as insane if seen in a human, is as follows.

The lack of security in today's software is well known and the following quotes illustrate that the problem is still current: 1) CNet AnchorDesk newsletter Nov. 13, 2007: "A Microsoft executive calls the ease with which two British e-crime specialists managed to hack into a Windows XP computer as both "enlightening and frightening." 2) "CNet AnchorDesk newsletter Nov. 14, 2007: "Over the past two years, data leaks have compromised more than 150 million personal data records.""

3) ZD Net, Nov. 28, 2007: "On Wednesday, the SANS Institute released its top 20 security risks for 2007. It's pretty bleak across the board. There are client vulnerabilities in browsers, Office software (especially the Microsoft variety), email clients and media players. On the server side, Web applications are a joke, Windows Services are a big target, Unix and Mac operating systems have holes, backup software is an issue as are databases and management servers. Even anti-virus software is a target. Meanwhile, instant messaging, peer-to-peer programs and your VOIP system are vulnerable." Billions of dollars of resources are put into making operating systems secure by one industry, while other industries have sprung up around its failures to do so—such as a second entire industry of anti-virus software and a third industry of firewalls and a fourth industry of security and anti data theft, all of which have grown up around the security defects that are inherent in software constructed with the current One-to-Many construction system. These very expensive industries are mostly occupied in trying to shut the door in future after at least one—and usually many—horses have already bolted. But the Swiss cheese nature of the One-to-Many constructions produced by the state of the art One-to-Many construction system is such that there is always another hole that enthusiastic horse thieves can find and exploit and despite the combined efforts of four well funded industries and doubtless many research centers, the daily press continues to report almost weekly more and often extremely expensive horses bolting, some of which incapacitate millions of users and cause untold loss and irreparable damage. Clearly, and as everyone agrees, there is a major need for improvement in the security of state of the art software.

The security problem arises due to the inherent nature of the One-to-Many constructions of state of the art software, built with state of the art One-to-Many constructions systems, in the following manner. 1) as already described, the One-to-Many construction system inevitably forces different software and different data formats for each different type of data the user wants to deal with. 2) It also forces this construction to turn out as one large multi-megabyte lump of software on one side, dealing with one large lump of data on the other side and this of course, is also true of a browser which is one of the most frequently security-breached One-to-Many constructions. The same is also true of the operating system (one large lump of software over here, many other pieces of software and data that use it). 3) Because a large lump of mega-multi-function software on the one side has to do many different things to large lumps of any of the correct type of data that comes its way, there are hundreds or thousands of points of interchange between the lump of data and the lump of software handling the data. 4) Software, right up to the very moment a command is given that causes the operating system to execute it, is just data to the operating system like any other, and the operating system has to, one way or the other, deal with and do things to all the data in the system. But because software is just data—right up to the point it is executed—the only way to prevent damage from malicious software that is just data until executed is to: a) remove all connections by which data connects to software, but ultimately, this is impossible because today's software has to bite off a lump of data, masticate it and then spit it out again transformed, or b) detect which incoming data is malicious and which is not. And that is an activity of closing barn doors on the rear ends of departed horses 5) Further, since the number of things the software can do, due to its self-limiting construction, are so few compared to the requirements of the human which are so many, it is necessary to enable others to create functionality and help bridge the gap between the lump of software and data, and these bridges have to be marketed in the form of Application Programming Interfaces and Browser controlling software like visual basic and such-like. These openings provide still more avenues for incoming data (that is actually malicious software when activated) to exploit. 6) Because open hooks into the complex of software have to be maintained by the Ono-to-Many construction of today's software in order for the software to connect with the data and do anything at all, and because there are so many thousands upon thousands of little functions that need to get done, preventing malicious software masquerading as data from executing always will continue to be an operation of closing the barn door after the horse has bolted. In essence the nature of the construction makes it impossible to tell what is software and what is not, and impossible to identify which software belongs to the computer already and which software just walked in through the door and hence the software receptionist (which does not exist in the state of the art) ought to find out if the boss—the user—wants (the non-existent software receptionist) to get it execute or not.

Now translating these strange phenomena into human terms, if the local drug peddling criminal walked into the office of a company or a multinational, and handed the receptionist a letter and ordered her (spam re-mailing software) to send it at once to every address in the company's central address book, and she did so; or if he handed the receptionist a flame thrower (malicious software) and told the secretary to at once burn the building down, or burn all the company's records, and she did so; or if the same criminal walked in the door, handed her a gun (a computer virus) and told her to go and shoot all the security staff, and she did so, she would be arrested within minutes, and immediately classified as not just insane but as criminally insane, and indeed, there is no visible reason why today's software construction system should not therefore also be certified as criminally insane, except that, until now, there have been no saner alternatives.

Hence, and again, there is a requirement for a human-computer data-activity construction system in which the system does not allow data (that is actually malicious software) into the system in the first place.

What is Needed

In summary of what is needed, there is a requirement for a human-computer data-activity construction system that is not subject to at least the following self-limiting aspects and does handles data sanely, so that:

A. The construction system is not self-limiting
1) Adding additional functionality does not add disproportionate complexity.
2) The ability to add functionality is not limited either by construction restraints, or by usability.

B. The construction system does not force Data Insanities (by human standards) into existence, with the result that (amongst many other desirable things):
1) Any computer can exchange and usefully use, any data with any other computer system,
2) Only a single instance of any given data exists and all re-uses of it are only references to the original data
3) Data drives software selection
4) Activities as well as data form a homogenous whole and any data can be related to or associated with or interact with any other data in the computer in a manner that is not intrinsically hierarchical and is not intrinsically limited.
5) Execution can be suspended at any time and then resumed when desired.
6) Each of the activities of which the computer is capable are entirely separate from one another so that each one can be directly accessed and is separately controllable, 7) Each of the activities of which the computer is capable are entirely separate from one another so that new activities can be added without affecting old ones
8) The computing system functions based on atomic—single—meanings as the human does.
9) The computer does not limit the human in any manner that he does not limit himself.
10) Orders and their outcome are recorded and related to the item on which the execution was ordered.
11) The system does not allow data (that is actually malicious software) into the system in the first place.

The single objective of software and data construction is to enable the computer to do what the human wants done and in some manner to do it under human control or direction. The human's demands of a computer derive fundamentally from and service his data interaction needs with other humans—it is his data interaction activities with other humans that produce what he defines as success, and a computer is expected to help with that. (The word "data" is used throughout in its broadest sense to cover all information emitted by or transmitted between humans). This essentially means that the programmer, in providing more functionality, is always attempting to enable the human-computer data-activity system to do what a human-human data-activity system can do already, but do it on demand, by a computer, and hence, more quickly, cheaply and comprehensively.

Hence there is a fundamental need to provide an interacting data and code system—a software system—in a computer that functions (at the level with which the human interfaces with the computer) in a manner that is sufficiently similar to the way the human himself functions when dealing with data and activities and when dealing with other humans, that the human finds dealing with the computer to be instinctive and easy because the computer does it the way he is used to doing it since birth.

Equally, because the human-computer data-action system, even at a superficial glance is insane by human standards, understanding the state of the human art in the human's own human-human data-action system that the programmer is attempting to satisfy is a vital first step and pre-requisite in order to be able to see what the differences are between the human's data methods and the computer's data methods if any. Once these are identified they will show and point the way to improvements that need to be made to the human-computer data-activity system to make it work more similarly to the human-human data-activity system so as to produce computers that are more powerful and easier to use, and easy enough to use so that the other 85% of mankind who do not use computers today could use computers in the future.

In the simplest terms, the need is firstly to discover the systems and methodologies used by humans to deal with data and activity with one another—the human data-activity system. Only after that has been discovered and adequately described is it then possible to do what is needed and invent methods to construct computer emulations of the human data-activity system in a computer. Or, to put it more colloquially, a prior understanding of the human data-activity system is needed, in order to invent methods to construct software that behaves in manner that a human would describe as intuitive. If that it well and correctly done, it should be able to handle data pretty well the same way as another human can, and hence, should be as easy to use and as powerful as the human's own data system, with the added advantage that the computer can store unlimited data verbatim and compute it very rapidly.

Part of this is that the computer should be able to correctly process orders that are given to it normal language—orders such as: "if my wife calls from Los Angeles at 10.01 Thursday January 2009 send her the email about bananas" and this is not possible in the state of the art. Equally, if the computing infrastructure is to be controllable by language the computer has to be able to correctly execute language orders such as "if my wife calls from Los Angeles at 10.01 Thursday January 2009 send her the email about bananas that I sent to George when he was in London and I was New York".

For a computer to be able to execute language orders such as "if my wife calls from Los Angeles at 10.01 Thursday January 2009 send her the email about bananas that I sent to George when he was in London and I was New York", it has to be able to identify who "my wife" is and which email is "the email about bananas that I sent to George when he was in London and I was in New York". The subject of identifying such things is the subject of how a human unambiguously specifies things such as emails to another human, and, in contrast, how software specifies things such as emails.

In the state of the art, software unambiguously identifies things in terms of file path plus file name, or by the size in bytes, or by the time of saving or modification, all of which must be meticulously accurate in order for the identification to be successful. While a human is capable of unambiguously specifying millions or billions of things to another human, from something he saw in a newspaper ten years ago, to the fact that he wants a glass of water now, he is totally incapable of doing so using software's data specification system. He cannot, for example, remember the exact size in bytes, or the exact path and file name, or the exact time (to the second) of saving or sending the letter that he wrote yesterday, let alone of specifying those things for each of the other documents or files to be found in today's average computer. In the absence of the ability to specify data upon which an activity is to be performed in terms that enables software to unambiguously locate the target data, language orders such as "if my wife calls from Los Angeles at 10.01 Thursday January 2009 send her the email about bananas that I sent to George when he was in London and I was New York" will routinely fail when given to the computer and comprehensive language control of a computer is also impossible in the state of the art by reason of that problem too, as well as by reason of the other problems described—all of which have to be solved in the same software construction in order to make language control possible.

SUMMARY OF THE INVENTION

This invention meets the many coordinated and interacting needs that must be simultaneously solved to obtain the worthwhile improvements described above by firstly describing the nature of the human data-activity system that has been discovered, adequately for the invention to then describe methods to construct computer emulations of that human data-activity system in a computer. Existing software construction methods produce software that is unable to comply with human data system requirements and it is this inability to comply with human data system methods and requirements that leads directly to the extensive catalogue of problems in the background. Emulating and meeting the requirements of the newly-discovered human data system in a computer unequivocally imposes on the computer a completely different data system and structure for computers that is described in the invention, and this data structure in turn unequivocally imposes a completely different code architecture and construction methods, also described in the invention. Equally, the state of the art methods for getting code and data to interact, no longer work in the face of these human-data system imposed data and code requirements and hence new ones are needed and are described in the invention that will work with the new data and code systems. Hence the invention comprises methods that someone skilled in the art can follow and use to create software (data+code) that emulates and is complaint with the human data system, software that is more powerful and easier to use than state of the art software because it is essentially a computer version of the human's own data-activity system.

Describing firstly the nature of the human's own data-activity system, the human is capable of relating anything to anything. He also does so on the fly often without premeditation and without any need to have used that particular relationship before.

In considering this ability to relate anything to anything, there should be no concern with the sense, need, or use of what the human can so relate and construct—the sense or otherwise of data relationships is up to the human to decide and what is nonsense for one human is sense for another. Hence the concern should be only with what the human ability really is in relation to the human data-activity system and not with what its results are.

The following is an example that serves to illustrate how a human is able to relate data—in the form of words he utters or writes—in any way at all:

And and and but but but if and only if if if, Yap yap yap Yip! Yip! Yipee! the pink backwards moon looks tasty, the 747 that I just popped in my mouth (tasted awful) and that landed on my desk and knocked over the but but but inkwell, flewingly to the moon, where the passengers gotly outful, took a lookingly around, and flew back forward sideways easter and landed backwards at Kennedy where they got out saying it was quite a trip and could they do it again, but first class this time please.

The sanity of the data expressed by the particular example is not the question, since the purpose being to illustrate the human can relate any meaning to any other meaning. Clearly a human can do this, as the inventor—who is a human—just did so by writing the illustration above. While the illustration above is composed of multi-meaning words, when the human reads or hears them and processes them, each word (which is a multi-meaning package) transparently transforms in the reader's mind into a particular single meaning that is one of the several available meanings. Hence the illustration is an example of where any old meaning is used and related to any old other meaning, in a manner that is not intrinsically hierarchical—there is no hierarchy between the "buts", "ands" and "ifs" that begin the illustration—and in a manner that is intrinsically unlimited—the illustration could be continued forever without end and there is no limit such as "it must stop after X words". This illustrates one characteristic of the human data system, which is that any meaning can be related to any meaning, without any intrinsic hierarchy and without any intrinsic limit either.

It is also important to note that the particular meaning components that were related to one another above, were related on the fly—there was no pre-existing or pre-programmed or pre-conceived pattern to the construction nor is there any way by which that particular combination of meanings could have been predicted. Not all the relationships a human creates are pre-conceived patterns of relationships, but can be (and usually are) relationships conceived and created on the fly. All conversation consists of is meanings being related on the fly.

At a higher level than single meanings the human data system is able to relate (on the fly):

N Conditions with N Specifications and N Actions

For example:
Condition "If my wife emails about apples and if XXX other condition, or YYY other conditions and ZZZ other condition (etc) then,
Action "email"
Specification "this promotional brochure to"
Specification(another Condition in this instance) "anyone who bought apples from us last week The number ("N") of Conditions, Specifications and Actions the human can relate are each infinity in number, since the human at any time can invent new, never-seen-before Conditions, and new, never-seen-before Specifications and new, never-seen-before Actions, in addition to relating together any of the trillions of each that have already existed, a nanoscopically few of which have previously been related in a specific manner that someone programmed.

Clearly, infinity times infinity times infinity leads to a number of possible combinations that are almost beyond human imagining, and also quite beyond human ability to specifically code and pre-program each one. While on the one hand, the human requires and demands that the computer does as he does and that it should be able to relate N Conditions to N Actions and N Specifications, on the other hand the nature of the One-to-Many machine construction as we have already shown is such that the number of connections in code needed to do so are wholly impractical and consequently today, very few of all possible Conditions, Actions and Specification can be related at all in the state of the art. There is no software today that (by itself, without a human to perform parts of the task) can perform a relation-creating task such as the following when the task is simply typed into the computer as an order much as one might give the same order to a secretary:

"If an email comes from Joe Brown about apples before one comes from Phil about bananas (Condition) then email (Action) and fax (Action) the second press release I wrote last night (Specification) to the Wall Street Journal (Specification)"

In the state of the art resulting from the One-to-Many construction system, with few exceptions, specific Conditions and Actions only can be related by programming them in advance ("if I click that button, open the email software") but cannot be further related to even one specification (and show me the last email from Joe"). Apart from anything else, it cannot do this, because (as already described) the data system is so insane that it does not know and cannot tell which of its thousand recorded Joe Browns is which. Any attempt to execute a command such as the command above containing "Joe Brown" (supposing software existed that could otherwise execute such a command) would fail and be brought up short by the insanity of the underlying data that cannot tell which Joe Brown is which, something that it must be able to find out in order to be able to execute correctly.

Secondly, since Conditions, Actions and Specifications cannot really be related to any extent at all in the state of the art, they definitely cannot ever be related on the fly as the human does either. Attempting to satisfy a human, who can relate anything to anything (remembering that the human can additionally invent new relationships at any time together with new things to relate), is clearly a hopeless and impossible task using a One-to-Many construction system which intrinsically requires all relationships to be pre-coded.

The Human Data-Activity System

The problems described all arise in one manner or another from the One-to-Many machine construction methods that seem to be the "natural" and obvious methods to build software, and indeed, these methods are so ingrained that they seem to be the only method with which software ever could be constructed and the fact that any other method could exist seems inconceivable. And, as a further result of this automatic acceptance of the unacceptable, methods of data handling that would see a fellow human banished to a lunatic asylum without a second thought, are accepted without a second thought when performed by state of the art computer software, constructed with state of the art methods.

The study of human handling of meanings in an attempt to find a way to improve this situation lead to the discovery firstly of the One-to-Many machine type, that is at the root of the problem (while common as sand in the Sahara) and secondly to the discovery that the One-to-Many machine type is not the only machine type in existence. Study of human data methods showed the existence of another, completely different and previously unidentified and hence not defined (yet infinitely more powerful) machine type. This new machine type, once identified, turned out to be rare—diamonds are far more plentiful. It turned out to be very powerful compared to One-to-Many machines—an atomic reactor compared to a pair of scissors. This other machine type is termed an Any-to-Any machine (so named because of how it works) and human data handling is a member of the family of Any-to-Any machine whose characteristics are summarized in the definition of the Any-to-Any machine type, as follows:

"a machine in which Any number of Any Component in the machine can be related to Any number of Any component in a manner that is not intrinsically hierarchical and is intrinsically unlimited."

All Any-to-Any machines so far Identified are coding systems, data systems or construction systems and all of them satisfy the criteria of the above definition and hence it is realistic to suppose that any new-invented Any-to-Any machines or computer versions of Any-to-Any machines should also comply with the same definition.

A simple example of an Any-to-Any machine is the basic Lego child's toy, where the basic component—building piece that the machine uses to perform its purpose—is a single brick. In this Any-to-Any machine system:

"Any number of Any Component (a brick) can be related to Any number of Any component (a brick) in a manner that is not intrinsically hierarchical and is intrinsically unlimited."

Bricks can be related (plugged) together in a manner that is unlimited (until there are no more bricks) and in a manner that is not hierarchical. That Lego Any-to-Any system can build an unimaginable and virtually unlimited number of structures with just ONE SINGLE COMPONENT used over and over again—what it can build is really only limited by the imagination and by the number of bricks available, and nothing else. This could be called a base 1 (one component) Any-to-Any system. The power of the system is easily visible if one compares all that the one single Any-to-Any machine component Lego brick can do, and what any One-to-Many machine component can do—a spindle of a CD machine for example. There are many orders of magnitude of difference in the power of the two machine types—in terms of what each of the components in the machine concerned can achieve. One can build a representation of anything that ever was, or ever will be constructed or made, the other can center a disk on a platter and practically nothing else.

An example of a Base 2 (2 Component) Any-to-Any machine system is the binary arithmetic system, which is built from two Components only (0 and 1) and is a machine in which:

"Any number of Any Component (zero or one) can be used with Any number of Any Component (zero or one) in a manner that is not intrinsically hierarchical and is intrinsically unlimited"

The Base 2 Any-to-Any machine is also a powerful system. Apart from other things it can also do, it can express all the data there is or ever has been, and additionally controls all computing there is. Not only does it control all computing but it is acted upon by those computing systems so as to transform all digital format data that has ever existed, and does this when paired with another Base 2 Any-to-Any functional system—the transistor. The transistor is a physical base 2 system in which:

Any transistor mode (on or off) can be used with any transistor mode (on or off) in a manner that is not intrinsically hierarchical and is intrinsically unlimited (as CPU manufacturers continue to prove to us, with the many billion transistors incorporated modern CPUs).

It might be more correct to say "binary device" rather than "transistor" as valves can also act as on-off switches and when so doing, can also be an Any-to-Any machine component.

The Base 2 Any-to-Any binary system's achievements, when coupled with silicon or disk systems, or transmission systems, also further act to record and transmit and render retrievable, virtually all data that has ever been electronically recorded or transmitted.

It should be noted that closely coupling one Base 2 Any-to-Any machine (the binary code machine) with another Base 2 Any-to-Any machine (the transistor) has resulted in them harmoniously interoperating in what could be termed an Any-to-Any system that has the useful result of doing all of today's computing.

Continuing with other examples of even more powerful Any-to-Any machines, the genetic code machine that codes and builds all plant and animal life is a still more powerful (base 4) machine and is a machine in which:

Any number of Any Component (adenine, thiamine, adenine or cytosine) can be used with Any number of Any Component (adenine, thiamine, adenine or cytosine) in a manner that is not intrinsically hierarchical and is intrinsically unlimited.

This Any-to-Any machine codes and controls the construction of the entirety of life forms and is obviously a very powerful machine. Generally speaking it is visible that the power of an Any-to-Any system increases more or less exponentially with the Base of the system—the number of Components usable in the system. It is remarkable that only 4 components are needed to control the building of all of life.

At this time, known Any-to-Any machines are 1) Lego 2) binary code 3) Morse code which is a kind of different flavor of binary code 4) switches (transistor) 5) Genetic code 6) Base 10 arithmetic 7) music notation 8) language 9) human data system 10) human activity system 11) TV and computer display screens. There are certainly others, but at best such machines are very rare. All of these machines show total flexibility and supreme power within their domain.

Like One-to-Many machines, Any-to-Any machines have very exact characteristics that between them define the machine type and these are as follows

| Defining characteristic | One-to-Many Machines | Any-to-Any Machines |
|---|---|---|
| Functions performed by each Component (building block) from which the system is made | One or (usually) many | One only |
| Other Components in the machine with which a specific Component can be related and function | A Component can only operate with specific other Components with which it was designed to operate. | Any Component can be related to any other Component and still operate |
| Relationship of any one specific Component to another | Fixed | No intrinsic relationship |
| Components exist in a Hierarchy | Always - intrinsic | Never |
| Hierarchy of Component assemblies | Mandatory - intrinsic | Optional - not intrinsic |
| Flexibility | None outside of built-in One-to-Many relationships | Extreme: near total flexibility within physical limits of Components. Almost totally unlimited |
| Machine purpose | Performance of pre-defined functions | Coding, construction & construction control, data transfer and control |

A particular machine can be either an Any-to-Any machine or a One-Many-Machine or a mixture of both. A mixture of machine types may occur as part of the machine construction and can exist when some parts of an overall machine are built on and function on One-to-Many principles, but other parts are built on and function on Any-to-Any principles. An example of such a mixed machine type is the genetic and life system where coding and construction control is an Any-to-Any machine but the structures built as a result of the Any-to-Any machine control are One-to-Many structures (one thyroid, many thyroid hormone molecules produced by it) and hence a life form is a combination of a controlling Any-to-Any machine and many One-to-Many machines constructed by it so as to work as a coordinated whole.

While One-to-Many machines are characteristically extremely limited, comparatively weak and almost totally inflexible, Any-to-Any machine systems are quite the opposite and possess the common characteristics of being virtually unlimited within their sphere of activity, being phenomenally powerful and with virtually unlimited flexibility in their sphere of activity.

Hence, it is not surprising that the human data system is similarly a (base infinity) Any-to-Any system in which (as illustrated in the example of above):

Any number of any Meaning can be related to any number of any Meaning in a manner that is not intrinsically hierarchical and is intrinsically unlimited Since the human can at any time create more meanings, the number of possible meanings is infinity and hence this is a Base infinity Any-to-Any machine. In fact the human has not one but two Any-to-Any machines. In addition to his data Any-to-Any machine he has a second (Activity) Any-to-Any machine in which:

Any number of any Activity can be related to any number of any Activity in a manner that is not intrinsically hierarchical and is intrinsically unlimited.

So the human can relate Any activity (cut (the paper)) to Any activity (then arrange the pieces in a circle then glue it to the wall) in a manner that has no intrinsic limit and has no intrinsic (mandatory) hierarchy of activities either.

For the sake of clarity in this new field, the term "machine" as used in "Any-to-Any machine" is used to mean a single Any-to-Any machine as so far described. However the term "Any-to-Any system" is reserved for a system in which two or more Any-to-Any machines cooperatively interact. For example, when the Any-to-Any binary code machine and the Any-to-Any transistor machine cooperatively interact to do computing, they are said to be "an Any-to-Any system". Therefore when two Any-to-Any machines can be made to harmoniously interact, as they do in the case of the binary Any-to-Any machine and the transistor Any-to-Any machine, and as they do in the case of the human Any-to-Any data machine and the human Any-to-Any activity machine, a new, mixed entity is formed called an Any-to-Any system in which:

Any number of Any component from any of the Any-to-Any machines in the system can harmoniously interact with any number of any Component from any Any-to-Any machine in the system in a manner that is not intrinsically hierarchical and is intrinsically unlimited.

Thus the human data and activity systems work together and interact harmoniously to make an Any-to-Any system in which:

Any Meaning or Activity can be used with Any Meaning or Activity in a manner that is not intrinsically hierarchical and is intrinsically unlimited.

This human Any-to-Any system can also interact at a higher, more assembled level, so that:

Any Condition or Specification or Action component assembly can be related to Any Condition or Specification or Action component assembly in a manner that is not intrinsically hierarchical and is intrinsically unlimited.

For example the human can relate Any Condition, with Any Specification and Any Action: "if my wife calls from Los Angeles at 10.01 Thursday January 2009 (Condition) Send (Action) her (Specification) the email about bananas" (Specification of what to perform the action on).

Expressed in these terms, the very powerful binary/transistor coupled Any-to-Any system and the very powerful human data activity coupled Any-to-Any system attempt to communicate and work together today by means of communicating and interacting through a comparatively extremely weak state of the art One-to-Many software and data system. The situation can be likened to two intellectual giants trying to work cooperatively together when they can only communicate to one another through an intermediate that the intellectual giant in charge finds is hard to talk to and understand, deaf to anything outside its experience and abilities (which is a nearly everything), and criminally insane by his own standards.

Fundamentally then, both the self-limiting nature of the state of the art human-computer data-activity system and the state of the art software data handling insanities (compared to human-acceptable data handling) that have been described both derive from a single root cause, that humans working with other humans use one kind of data-activity system to handle data and activity, while state of the art computer software is using another and different system. Humans use Any-to-Any data machines—while the state of the art human-computer data-activity system attempts (and fails) to satisfy human data needs using One-to-Many data-activity systems built by a One-to-Many construction system. A human, using a computer, provides it with data and would like it to perform with that data with the same degree of flexibility and in more or less the fashion that another person would—for example a Secretary or employee—who can easily assemble on the fly, remember, and then use Any Component or Component Assembly (Condition or Specification of Action) with Any Component or Component Assembly in a manner that is not intrinsically hierarchical and is intrinsically unlimited.

In essence, all the data insanities described (as well as many others that exist but were not described—about 256 have been unidentified), all of which are major problems to the user, all derive uniquely from a fundamental clash of the human data system with the computer data system. It is this fundamental clash of human and today's computer data-activity systems that cause many problems, and in case of ease of use, causes non-intuitive behavior that the world's most privileged have been able to surmount to a limited degree, but which some 85% of the worlds population—those who need most of all the help that computers offer—have not been able to surmount at all yet, despite the availability of low cost or even free second hand computers.

Hence the fundamental problem that needs to be resolved is that there is a conflict of systems—and neither one is necessarily right, or wrong, they are simply different—and there is an ongoing system miss-match, much as attempting to make scissors cut stone, or trying to use a feather duster to empty a swimming pool are also system miss-matches. Trying to make the mismatch work anyway—what has to be done to actually make the scissors cut some stone—requires that almost unbelievable magic has had to be worked, with unbelievable effort and then unbelievable and self-limiting complexity is achieved as a result. Those results arise from vain attempts to make the state of the art human-computer data-activity One-to-Many machine data systems built by One-to-Many construction methods dance to the tune of the Any-to-Any human orchestra conductor; the resulting antics of the pitifully few (by human standards) One-to-Many machines in the software orchestra that the construction system is able to construct before it blows itself up in the attempt are simply (by the conductor's standards) wholly insane and sometimes, as he would class it, criminally so.

Clearly what is needed is to get the computer operating with the same type of Any-to-Any machine data and activity system that the human himself uses, instead of trying to achieve the unachievable objective of trying to satisfy the human's wide ranging Any-to-Any data machine needs, using small quantities of One-to-Many data machines constructed by One-to-Many machine construction methods as is the practice in the state of the art. Enabling methods and practices to construct an Any-to-Any data machine and an Any-to-Any code (software) machine in a computer and enabling methods and practices for them to harmoniously interact as an Any-to-Any system producing useful results, would then allow anyone skilled in the art to use those additional enablements plus their existing skills to construct human-computer data-activity systems that could then handle data sanely in human terms, and produce a computer that behaves in a manner that the human expects and anticipates, and that would no longer (for example) unavoidably and uncontrollably perform) data operations that are insane in human terms, such as automatically storing one single John Brown as a thousand different (and apparently unrelated) John Browns.

In consequence, there are three main parts to this invention: 1) Methods to construct the independently useful Any-to-Any data machine in a computer 2) Methods to construct the independently useful Any-to-Any software machine in a computer and 3) Methods to couple them together and couple them to the human so that they harmoniously interact both between themselves and with the human and become an Any-to-Any data-activity system—also termed an "Any-to-Any computer". While the Any-to-Any data and software machines are independently useful, they are far more useful when coupled together to make an Any-to-Any computer. Describing it in another manner, this invention constitutes the methods needed to construct the missing infrastructure needed to enable a computer to deal with human data (that is often but not only in the form of language) and act in consequence of it and act upon it as ordered, so as to produce similar results to the results humans achieve amongst themselves, and so as to provide the missing infrastructure needed for full language control of computing.

When employing these inventions it is vital bear in mind at all times the over-bearing importance of human language in relation Any-to-Any machines and system being constructed and the demands placed upon them by human language, as follows While the keyboard mouse and screen GUI computer control system is a good and useful system for simple control of computers as far as it goes, it does not go nearly far enough. Firstly, it is mainly good for controlling something that is visible on the screen at the time the order is given. It is very weak for controlling the computer in relation to things that are not currently visible on the screen, a domain of activity that brings into play all the previously-discussed limitations of the state of the art menu system. It is also weak at ordering and controlling execution orders such as: "if my wife calls from Los Angeles at 10.01 Thursday January 2009 send her the email about bananas".

Clearly, and whether or not the order is given by voice recognition or by typing the order, language control of computers is desirable to enable computers to be controlled with normal every-day language to correctly execute orders such as "if my wife calls from Los Angeles at 10.01 Thursday January 2009 send her the email about bananas"

While easy-to-use normal language control of computers (much as a boss might use language to control a secretary or junior) is outside the scope of this invention, it is axiomatic that, before normal language control can be implemented in a computer, that computer has to have available whatever infrastructure mechanisms the language requires in order to be able to record, and then act correctly upon, language orders to the computer and to be able to do so in such a fashion that the language orders can themselves control the computer much as a boss controls a secretary or employee. Quite by itself, the absence of such infrastructure mechanisms in a computer would make it impossible to implement language control of a computer by a human even if adequate understanding of the language to do so existed. The present invention came about when attempts to improve ease of use lead to research into the structure of meaning in language (as opposed to the grammatical structure of language). But when attempts were made to implement the new-found understanding in state of the art computers it rapidly became apparent that not only was the software (data and activity) infrastructure needed to do so entirely missing in the state of the art, but what infrastructure was there, was incompatible with, and functioning on a different basis from human data handling methodologies as they could be detected and observed within language use. This missing infrastructure (quite by itself) completely blocked any attempt to make a computer operate in synch with the human. Efforts to provide a workable infrastructure meeting the dictates of meaning structure in language lead first of all to the discovery that the human's data method was an Any-to-Any data machine and that is was theoretically possible to make a computer replica of the human's own Any-to-Any data handling methods. This lead to the discovery that, in contrast to the human's Any-to-Any methods, state of the art software is a One-to-Many machine or groups of One-to-Many machines, and it was basically impossible to make groups of One-to-Many machines powerful and flexible enough to satisfy the needs of an Any-to-Any machine, no matter how hard one might try. This appalling and dismaying discovery, lead to further research and to inventing methods that are to be described in the present invention, to construct an Any-to-Any data-activity system (data and software system) in a computer, and make them interact so as to satisfy the human's demands.

While the structure and functioning of meaning in language is outside the scope of this invention the following are of guiding importance both in improving on the state of the art when structuring the computer equivalent of the human data system: 1) The human can express and convey pretty well any data with language. 2) Therefore, Language is a form of mirror image of human data and the structure, relationships and mechanisms of meaning in the language are the meaning structure, relationships and mechanisms of data. 3) These structures, relationships and mechanisms of meaning in language are very precise and specific. 4) In order for computers to realize their full potentials, the structure of meanings, their relationships and mechanisms and those of the activities needed to use them or to be used by them as a human does, have to dictate the manner of the recording of meanings, and mechanisms have to be provided to relate them and accommodate their mechanisms so as to create in a computer an accurate mirror image of those meanings and activities, their structures and relationships as the human uses them with other humans. In short, what happens in the language dictates how the software must be built.

Hence the key objective of the invention methods is to create methods to implement the human data-activity system in a computer, particularly in the sense of implementing a language-controllable infrastructure.

The fundamental basis of the human language functioning that is implemented in the computer by the invention methods is extremely simple. In whatever manner he does it, the human hears or reads words and processes them to select that single meaning of each word that is in use on this occasion. He then uses these selected meanings to deal with, use, and relate and otherwise manipulate the data that the words and their selected meanings conveyed to him. Conversely, when intending to convey meanings to another person, he is able to directly access the meanings he wants in a non-hierarchical manner and assemble them with no real limitations and convert them into words that form the inter-human data transmission system. When it comes to doing something with those meanings, or performing activities to them or based on received meanings, the human is able to access, select and use his abilities in a manner that is direct and non-hierarchical and can assemble and chain his available activities in a manner that is essentially unlimited.

The most key law of which the implementer of this invention needs to be aware is what is termed the Individual Controllability Principle which states that:

"The human may wish to directly and individually control everything of which he is aware."

"Control" is used in its widest sense, of the manner in which a human may "control" with language. For example, a human probably cannot take the moon and control it so as to throw it into the sun but he can certainly do so in the language structures he creates as this sentence shows. The Individual Controllability Principle means that, for example, if the human sees a box on the screen and that box has a left edge which has a color and a thickness then he may wish to control the color of that line alone (without controlling or changing the thickness) and control the thickness of that line alone (without controlling or changing the color).

The software designer may, for example, decide that the thickness of the individual lines making up a box shall not be controllable and he may decide too, that thousand or millions of other things the human might want to control also shall not be controllable by the user. But if he does so and if he makes uncontrollable by the user any important number of the things that the human might want to control per the Individual Controllability Principle, then he has rendered language control of the computer impossible. The user, giving language orders that he thinks the computer might be able to do—such as control the thickness of the line making the left side of a box—will find that one after the other—and in fact most of the language orders he gives cannot be executed and will eventually demand to be shown what can be done—since most of what he wants to do apparently cannot be done and that is basically a request to display the state of the art menu system—in other words, language control then has no point, one might as well stay with what already exists.

This gives rise to the Unlimited Principle which must be also be followed in creating a language-controllable infrastructure and which states that:

"The computer must not limit the user in any manner in which the user does not limit himself."

The Unlimited Principle must also be implemented in the light of the Individual Controllability Principle:

"The human may wish to directly and individually control everything of which he is aware."

Summarizing these Principles in a colloquial manner, for the infrastructure to enable language control to be workable, if the human wants to record one or a hundred phone numbers for a contract, or one or a hundred addresses for that contact, or connect anything—a phone number to a photo of a birthday cake for example—the infrastructure has to be there to enable him to do that, and must not limit him in a manner that he does not limit himself.

The point that whatever the human may decide to control must be a) be able to be controlled (Unlimited Principle and b) must be able to be directly controlled is vital. While some of the 15% of the world population can just about in some cases learn the simpler complex hierarchical menu structures in order to control the thickness of the lines that make up sides of a box, the other 85% of world population has not been able to do so. In any case humans do not handle data in a hierarchical human-like manner. If they want to phone someone they do not mentally open their phone list, find its hierarchical junior member—Mr. X's mental record—and then look in his record for its hierarchical junior—Mr. X's phone number.

They just directly, and without going through any hierarchy, remember Mr. X's phone number.

While humans do mentally access all the data they know in a non-hierarchical manner, and it is therefore desirable for the computer infrastructure to enable the human to do the same thing, under some circumstances it is vital and the computer must enable non-hierarchical control. For example: while it is not very practical today to control out-of-sight computing as one might control a secretary or junior by giving orders over a phone, this is certainly something the computer ought to be able to do. If the line making the left side of the box is not directly controllable but only hierarchically controllable—it cannot be controlled without going through a typical menu hierarchy—then telephone orders such as to: "put a box round that text and turn the left border of the box red" will fail and if enough such orders fail—the Unlimited Principle is violated too much—language control becomes unworkable.

In addition to creating a infrastructure in which whatever the human may decide to control is a) able to be controlled (Unlimited Principle and b) is able to be directly controlled, it is thirdly vital that c) the human must be able to control individually each thing he may want to control.

Further, humans are able to control every unit of their mental data individually and separately from any other mental data unit. If they decide a plan is no longer a good idea they can erase (forget about) that plan, while remembering perfectly well when they created that plan, but in the state of the art, if the word processing file containing the plan is deleted, the time it was last saved is deleted also because these things are not individually controllable. The wire is attached to the headlamp again.

While humans do mentally control their mental data in a individual manner, and it is therefore desirable for the computer infrastructure to enable the human to do the same thing, under some circumstances it is vital and the computer must enable individual control. If the line making the left side of the box is not individually controllable but can only be controlled as part of controlling all the lines making the box, then telephone orders such as to: "put a box round that text and turn the left border of the box red and the other borders blue" will fail and if enough such orders fail—the Unlimited Principle is violated too much—language control becomes unworkable.

The simple key in all these cases is that, to be controllable by language, the infrastructure must be such that each human-detectable thing, each meaning, each visible thing and each activity needs to be fundamentally independent and isolated from all other potentially human-controllable things. And this means, in its most simple expression, that every potentially human-controllable thing, meaning or activity must be able a) wholly separate from anything else and b) able to be directly and separately accessed by the computer or in the GUI so that c) it can be individually controlled in response to a human language order.

However, in addition to accessing all their mental data directly and separately from any other data, humans also string it together—assemble it together—and assemble actions together in a manner that has no intrinsic limits—other than the limits that humans themselves impose (the Unlimited Principle again).

Hence, the simplest and most fundamental specification of a human data system to be emulated in a computing infrastructure and for that computing infrastructure to be fully human-language controllable, is that all potentially human-controllable things, meanings, and activities in it must each be accessible and controllable in a manner that is intrinsically non-hierarchical and able to be assembled in a manner that is intrinsically unlimited, and the invention's objective is no more complex than that.

The invention methods create a computer in which the computer's data and activity capability are in such forms that each user-detectable thing, meaning and activity is fundamentally independent and isolated (though each can and often is assembled with other similarly fundamentally independent meanings or actions), and such that they can be accessed in a non-hierarchical manner and assembled in a manner that is essentially unlimited. Expressed in another way, this invention is a different method for constructing data and software which results in data and software that behaves in a more human-like manner than the state of the art equivalents.

The invention is useful, because it is easier for the human to deal with a computer that deals with data and activity that has been constructed with the invention methods than it is for the human to deal with a computer that does it any other way such as the way that is used in the state of the art and test results unequivocally prove this.

Parts of the Invention

The present invention meets the needs described above by inventing a new construction system for human-computer data-activity systems—which are often globally termed "software". ("Software" is really a combination of a data system and a code system that interoperate, and therefore is sometimes referred to herein as a "data-activity system" to emphasize that there are two parts to "software" which this invention treats individually and separately as they are not identical and because each part of "software"—the code part and the data part—have their own individual requirements and are treated separately herein. From henceforth, software is not described as such, because its separate parts, data and code are described individually). The invention consists of construction methods that enable the computer data and computer code versions of the newly-discovered Any-to-Any machine type to be created in a computing environment and of methods to construct mechanisms that enable them to work with one another. Hence the invention consists of: 1) methods to construct an Any-to-Any data machine in a computing environment and, 2) methods to construct an Any-to-Any code machine for use in a computing environment and 3) construction methods to create structures that enable the data Any-to-Any machine and the code Any-to-Any machine) to harmoniously interact both with themselves and with their human users, so as to produce an Any-to-Any system—colloquially called an Any-to-Any computer. The Any-to-Any system that is produced is a data-activity system for use by humans or by other computers (or both) that produces useful results over and above those that have been produced by state of the art software construction methods and constitutes a previously unknown way of constructing software.

If the computing infrastructure is to be controllable by language the computer has to be able to correctly execute language orders such as "if my wife calls from Los Angeles at 10.01 Thursday January 2009 send her the email about bananas that I sent to George when he was in London and I was New York". In order to do this, the code has to be able to identify who "my wife" is and which email is "the email about bananas that I sent to George when he was in London and I was in New York" and the invention solves these problems.

Hence the invention additionally consists of 4) methods (that are themselves enabled by 1 above, the data Any-to-Any machine) collectively referred to as a Data Relation Table or DRT to enable a single logical grid-like structure (bearing some similarity to a state of the art database) to record all Any-to-Any data machine data, including different types of data, in a single logical structure and correctly relate it so that its computer-detectable relationships are a mirror image of the real life relationships between the data. Phrased another day, the DRT is a classification system for data components in the Any-to-Any data machine. Finally the fifth essential part in order to make the Any-to-Any system consists of methods to implement the Human Specification System in a computer. Humans cannot remember software's methods for identifying data and in order for a computer to be able to execute an order out of sight as a secretary might, it has to be able to identify data in the terms and with the methods that human use to identify and specify data to one another. While it might be though that humans "just do it" or that "it is instinctive" in reality, like all things a human does with language, these mechanisms are very precise, accurate and can be implemented in a computer, and this invention includes implementing them so that the code Any-to-Any machine can find the human-specified data in the Any-to-Any machine on which to execute.

Basic Requirements for an any-to-any Machine to Exist

While billions of different One-to-Many machines of every nature and description exist in the world, newly-discovered Any-to-Any machine systems are rare—less than a dozen have so far been identified—and all of them are utterly simple, consist of very little, and yet are both supremely flexible and supremely powerful. As the publication PC World remarked on May 8, 2008 about the transistor (which is an Any-to-Any machine) "The transistor may well be the greatest invention of the 20th century. It's really nothing more than a voltage-controlled switch, but that humble description hides incredible power. Linked together in various ways, transistors can form circuits that are the basis of every type of digital logic, right up to the CPUs that power our modern PCs and servers." This combination of simplicity, flexibility and power is perhaps why the majority of those Any-to-Any machines so far identified mostly have something to do with data handling, data coding or data transmission, as these are tasks that do require both total flexibility and immense power to handle well.

Every Any-to-Any machine so far discovered consists of only two elements: a) a particular specification of component type meeting rigorous specifications, called an Any-to-Any component or "ExoPonent", and b) a set of environmental requirements that specifies the parameters for the environment the ExoPonents need in order to operate. Hence any one Any-to-Any machine is defined by a) The specification of the components that work in it and b) the specification of the environment those Any-to-Any components need. While the specification of the Any-to-Any machine is deceptively simple, it is also clear that the specification needs to be followed very rigorously for the resulting Any-to-Any machine to work really well. Quite often, Any-to-Any machines will work in several environments, providing the environment meets the specification for their particular environment type. While these Any-to-Any machines are extremely simple in their basics, their extreme rarity—they are perhaps the rarest things on earth—attests to the difficulty of inventing or creating them.

However, it is also clear that between a pure One-to-Many data+activity (i.e. software) machine in a computer on the one hand, and a pure Any-to-Any data-activity (software) machine in a computer on the other hand, there is an unlimited rainbow of nuances, to the degree that the Any-to-Any data-activity (software) machine in the computer is kept pure or mixed up in or with One-to-Many structures. For example, it proved possible to practice the teachings of the invention in a very partial and often incorrect manner that was party Any-to-Any machine and partly One-to-Many machine but despite that to produce quite spectacular results, above and beyond those that have to date been produced by state of the art software, Therefore this invention should be considered to have been practiced where any discrete part of a software construction has followed the principles and methods taught in this invention and some advantage has been derived therefrom.

Describing now in general terms first 1) the type of component needed to make an Any-to-Any machine and then describing the components of the two examples of computing Any-to-Any machines constructed by the invention, the specification of a component in order for a component to quality as an Any-to-Any machine component is completely critical and makes—or breaks—the Any-to-Any machine in question. The one particular component type that makes any one specific Any-to-Any machine is the only type of component that will produce Any-to-Any effects in that machine—i.e. which will allow any component to be related to any component in a manner that is not intrinsically hierarchical and is intrinsically unlimited. No other component of any kind will work in that particular Any-to-Any machine, and if an attempt is made to use a non-Any-to-Any component in that particular Any-to-Any machine, practical experience shows it will prevent the Any-to-Any machine materializing and functioning.

Ordinary components that are seen everywhere in everyday life by the millions of millions are not usable for use in Any-to-Any machines and will not create an Any-to-Any machine no matter what environment they are placed in. An Any-to-Any machine component is a very distinctive, special and unusual component with highly specific characteristics that absolutely must be met for it to be part of an Any-to-Any machine. If these highly specific characteristics are not present in the component, it will not create an Any-to-Any machine no matter what environment it is placed in. If an Any-to-Any component with the correct characteristics required of an Any-to-Any component does not exist, an Any-to-Any machine will not exist either no matter what environment the component is placed in.

For a component to qualify as an Any-to-Any machine component (an "an Any-to-Any component") it has to be 1) mono-function—have only one function. It must do one thing only, and never two or more. As soon as a component does more than one thing it becomes a One-to-Many machine—One component Many functions—with the inherent characteristics of One-to-Many systems that they are hierarchical and limited. 2) Each component must be always wholly and totally independent of every other component so that, 3) any component has the ability to be assembled with any other component (including with others of itself). When a component meets these 3 requirements then the component is such that "any component can be used with any component in a manner that is not intrinsically hierarchical and is intrinsically unlimited"—which is the definition of an Any-to-Any machine.

Because the nature of the components that are part of an Any-to-Any machine is so very different from the nature of the components that are used to construct One-to-Many machines, which are also termed components, it is preferred to use the term ExoPonents for components of an Any-to-Any machine to ensure normal One-to-Many machine components are not confused with Any-to-Any machine components which are quite different in nature even if they can both be referred to by the same term. It is very important in practicing this invention not to confuse the two types of components because a clear comprehension of what an ExoPonent is—exactly—is vital to grasping, understanding and then using this invention. Additionally, in order to better understand this invention it can be helpful to study the characteristics of the other Any-to-Any machines mentioned herein; the genetic code Any-to-Any machine that codes all of life could be said to be "nature's software system" and is particularly interesting in demonstrating the power that can be generated by combinations of just four Any-to-Any components—adenine, thiamine, cytosine and guanine.

Describing in outline now 2) the basics of an Any-to-Any machine environment in which the Any-to-Any machine component can be placed and which, when placed, results in the Any-to-Any machine appearing, the basics of such an environment are that it needs to provide the support systems that enable the Any-to-Any components to produce their results. Usually there is more than one type of environment that can provide what the Any-to-Any machine ExoPonents need to work as an Any-to-Any machine.

In general terms the environment for an Any-to-Any machine consists of 1) Some kind of storage/support mechanism for the ExoPonents of the particular Any-to-Any machine, and 2) a relationship system to relate ExoPonents that is Any-to-Any qualified. (By "Any-to-Any qualified" is meant that the relationship system is capable of relating Any ExoPonent to any ExoPonent in a manner that is not intrinsically hierarchical and is intrinsically unlimited).

These two things—1) storage/support and 2) provision of Any-to-Any qualified relational systems that give the ability for one Any-to-Any component to relate to another in an Any-to-Any manner—are all that an environment has to provide to an Any-to-Any machine. What specific storage/support system and what specific relationship system any particular Any-to-Any machine ExoPonents require in order to function as an Any-to-Any machine depends entirely on the nature of the Any-to-Any component that makes up the Any-to-Any machine.

First Part of the Invention—the Any-To-Any Data Machine Construction Methods

Describing now the first part of the invention in more detail, the methods for constructing the data Any-to-Any machine, as is usual for an Any-to-Any machine, only one type of component can be used in it, and in the case of the data Any-to-Any machine for a computer, this is an electronically-specifiable data component termed an ExoPonent, of which there are several sub-types. One of these is that ExoPonent sub-type that is an atomic, single meaning and, at least to start with, these have to be isolated and formulated entirely manually and then entered into computer memory manually where, once recorded, the computer is able to use them in the manners to be described. Once enough data ExoPonents have been entered into the computer memory, and if adequate code ExoPonents have been written and entered into computer memory also, then it is theoretically possible, with these basics in place, to enable the recorded code Exponents, to automate to a considerable degree the isolation and recording in memory of further data ExoPonents.

To give an example of one of these atomic single meaning data ExoPonents, the word "fax" is not an ExoPonent because the word has several meanings—of which two are "fax" the activity of faxing and the other is "fax" the piece of paper. "Fax the activity" is itself an assembly of more than one meaning. It is an assembly of a first meaning which is "Activity" and a second meaning which is "fax", which, when used together, specify "activity, type fax". However, the meaning "Activity" is not an assembly of anything and while its meaning can further defined, and can be described, it can not be further split up, and its meaning cannot be further subdivided and still have any of the divided pieces retain any part of the original meaning Hence it is a mono-function meaning and it qualifies as a data ExoPonent. If language is examined in the light of this teaching, every single text is made up of assemblies of ExoPonents. The number of word-derived ExoPonents is infinite, as the user can always invent more.

Meaning ExoPonents, which are found by disassembling words, are a particularly useful kind of Any-to-Any data machine ExoPonent because they can be used to encode and compute most human data. But data ExoPonents are not derived from words only. Physical objects can be expressed as data ExoPonents also. As an example, a line is made up of many separate ExoPonents of which the following is an incomplete list: 1) length, 2) vertical orientation 3) horizontal orientation 4) depth orientation 5) thickness 6) variation of thickness 6) color 7) variance of color 8) a position in space 9) a coordinate relation to a first object—etc. Each of these is indivisible, is a single meaning or function, the human might want to control it separately and is a data ExoPonent. There is no requirement for every possible ExoPonent to be in the data Any-to-Any machine, but there is a requirement that all data in it, that is required to behave in an Any-to-Any manner, exists in it as ExoPonents. (By "behaving in an ExoPonent manner" is meant that the data can be related to any other data in a manner that is not intrinsically hierarchical and is intrinsically unlimited). ExoPonents representing physical objects must also, as the first step, be isolated and formulated entirely manually to start with and then entered into computer memory manually where, once recorded, the computer is able to use them in the manners to be described.

The invention teaches the ExoPonent Principle as an invented rule-of-thumb method to assist in creating or correctly identifying data and code ExoPonents for use in the Any-to-Any machines of this invention as it sometimes causes confusion determining whether something is, or is not an ExoPonent. This ExoPonent Principle states:

> In order to create an Any-to-Any computing machine, all data and all software must first be broken down into separate ExoPonents, so that further disassembly would loose the entirety of the original meaning, significance or function, stored separately and then may be re-used and assembled into any desired Any-to-Any structures by reference to the single stored original ExoPonent.

The question arises in some cases of just how far this disassembly needs to go and the answer is provided by the Individual Controllability Principle: "The human may wish to directly and individually control everything of which he is aware." The corollary of this principle is that the human will not wish to control anything of which he is not aware. So the fact that a printer may do a large amount of processing in order to print a page is something where the user is completely unaware of the details of this processing and has no interest in controlling it—his interest is confined to printing the page and how the printed page looks and since he is aware of these things, he may wish to separately and directly control each identifiable aspect of these of which he is aware.

Hence something is broken down far enough to be an ExoPonent for an Any-to-Any machine in a computer if it is broken down far enough that it is or represents one, and no more than one meaning, significance, or function that the user of the machine might wish to directly control. Hence, what constitutes an ExoPonent in an Any-to-Any computing environment depends to some extent on what the intended use is and who the intended user is. For a normal user an instruction called "close finger" may be as far as he want to go in controlling a robot's hand and for him, that would be an ExoPonent. But for an engineer who may wish to control the amps to one of the finger motors in variable time slices, each of these things would be ExoPonents for him. Hence, in a computing environment, the ExoPonent Principle is expanded by combining it with the Individual Controllability Principle to create the ExoPonent Principle for Computers which states:

In order to create an Any-to-Any computing machine, all data and all software must first be broken down into separate ExoPonents, so that further disassembly would loose the entirety of the original meaning, significance or function, that the user might wish to control, stored separately and then may be re-used and assembled into any desired Any-to-Any structures by reference to the single stored original ExoPonent.

Note that there are two aspects to a computer. There are the aspects of the computer's functioning that the user himself may wish to control but there are also the aspects of its functioning that the programmer wishes to control in order to make functionality for the user. The user's ExoPonents will be one set of ExoPonents such as a code ExoPonent he can control to a screen character bold, the programmer's ExoPonents will be an additional set—an example being a code ExoPonent that he can use to compare two bits of data and decide if they are identical or not.

This ExoPonent Principle is useful in testing a supposed ExoPonent and seeing if it qualifies as an ExoPonent. For example, supposing "John Brown" is thought to be an ExoPonent, perhaps because there is only one person with that name. Applying the Component Principle shows that "John Brown" can be broken down into "John" and "Brown", and whether the person is called by saying "John?" or called by saying "Brown?" he will still respond, and hence the entirety of the original meaning has not been lost by this disassembly, Accordingly, "John Brown" was not an ExoPonent but an assembly of ExoPonents—an ExoPonent Assembly. Applying the ExoPonent Principle again shows that "John" and "Brown" both have many meanings each of which the user might wish to control (i.e. use at some time or other) and so are not ExoPonents either. As the ExoPonent Principle is further applied, it becomes apparent that one of the meanings of "John" is "a first name" and one of the meanings of "Brown" is "a last name""—and each of those meanings are mono function and the user might wish to separately control (use) them and hence they are ExoPonents.

This finishes the summary description of the ExoPonent part of the data Any-to-Any machine. The other part of the data Any-to-Any machine is the environmental requirements these ExoPonents need as part of the Any-to-Any machine. Since the environmental requirements for the data and code Any-to-Any machines are mostly the same, their environmental requirements will be described together later, when describing the environmental requirements of the code Any-to-Any machine.

Second Part of The Invention—Code Any-To-Any Machine Construction Methods

Describing now the second element of the invention—the Any-to-Any code machine construction methods—the code Any-to-Any machine (like all Any-to-Any machines) also consists of a single ExoPonent type and environmental requirements.

The ExoPonent Principle requires that "software" be mono-function and that "software" cannot be broken down without loosing the entirety of its original meaning or function. Because "software" as constructed in the state of the art consists of many different types of things all packaged together and called "software" an ExoPonent-style definition of "software" is needed for use in an Any-to-Any code machine and hence, "Any-to-Any (machine) software" is defined as, "code that does something when executed". Hence if something found in "software" does not itself do anything when executed, it is not a code ExoPonent.

Hence, applying the ExoPonent Principle for Computers to "software", shows that such things as Conditions under which an operation is to be performed, Labels, Prompts, Help and so on are data and are not code and as such have no place in a code ExoPonent, which is a piece of code that performs an atomic, single function that the user might want to control. The bare minimum unit of code itself, is that it has one or more inputs in which it produces a single change and one or more outputs. A physical comparison for this single function unit is a churn, into which milk which is input and the churn is turned (its single function) and butter and whey are output. An example of a code ExoPonent is a piece of code that has as outside connections, 1) an ExoPonent start signal, 2) a first ExoPonent data input 3) optionally N other data ExoPonent inputs, 4) N places to output the result of its operation and 5) a place to send an ExoPonent signal signifying that it is finished. The mono, atomic function occurs when the code receives the start signal (1), compares (which is its one mono-function in this example) the first data ExoPonent (2) with the second data ExoPonent (3) outputs the result in the output place (4) and outputs a finished signal to a place to put finished signals (5). Another example would be a code ExoPonent that operates similarly, but performs the mono-function of copying a data ExoPonent from a field in one record to a field in another record. This latter code ExoPonent would be a programmer code ExoPonent, used by programmers and not directly used by users.

Note that, at the hardware level, all computing is built up from the actions of a two state transistor which is either on or off, and those two states are made to add, subtract, multiply etc, and eventually to do things such as cause complex pictures of a browser to appear on physical screen. The physical screen is also an Any-to-Any construction as the screen that is composed of pixels such that, "Any pixel can be used with Any pixel in a manner that is not intrinsically hierarchical and is intrinsically unlimited". Screens are able to display absolutely any image they are given in acceptable format—their power and flexibility of screens is unquestioned, yet a single pixel is a simple construction. The example of an Any-to-Any screen demonstrates that the power of an Any-to-Any machine derives from a) the simplicity of its ExoPonent and b) the flexibility of the relational systems with which ExoPonents can be related.

Hence, at the hardware level all computing is built up from a much simpler type of ExoPonent (binary code) than the data and code ExoPonents being described and accordingly there is no question at all that all computing can be built up from the code ExoPonents just described. (Just because the state of the art has shown that is possible, with great difficulty and a lot of work, to combine a few thousand functions into 300 Mb of code, does not mean that it is necessarily optimum or correct to do so).

Code ExoPonents are written using normal software-writing tools, but are written according to the layout and construction plan covered in the detail description. Once written they are recorded on computer-readable memory media, and, according to the preferred embodiment, are recorded in the database-like grid storage system that is part of the environment that the Any-to-Any machine and Any-to-Any system need to operate. The preferred embodiment grid storage system is the Data Relation Table (DRT) that will be described which provides a language-related classification system for ExoPonents as well as one of the ExoPonent relational systems.

Describing now in summary this environment needed by the data and code Any-to-Any machines built with the methods of the invention, like all Any-to-Any machines, the ExoPonents that form the data Any-to-Any machine and the code Any-to-Any machines both need a suitable environment in order to produce a useful result, and when they are placed in one of those suitable environments, they can then function as an Any-to-Any machine—a machine that operates in any Any-to-Any fashion. The Any-to-Any machine ExoPonents are such that they can—are able to—produce a useful result, but only when placed in any suitable environment.

Environmental Requirements for Computer Any-to-Any Data and Code Machines

Describing how the environmental requirements may be met for the data Any-to-Any machine and the code Any-to-Any machine, the first of the environmental requirements is storage/support:

1) Storage/support. In the case of the data Any-to-Any machine and the code Any-to-Any machine, the need is to provide a storage system for ExoPonents, which is in a grid form in the preferred embodiment (while virtual grids can be created as will be described, real grids are easier to work with). Because ExoPonents are very small, and have to be able to be located individually, they cannot just be thrown in a pot of some kind such as a file as locating the specific ExoPonent that is needed then becomes a problem.

The data and code Any-to-Any machines are best served by a storage structure which has the function of storing ExoPonents and providing a structure that can be used to relate them to one another in such a manner that the relationships that can be created are essentially unlimited, and such that no intrinsic hierarchy is imposed on the stored ExoPonents. In the state of the art, no such system existed. Therefore the teachings of the ExoPonent Principle were used to assist and turn a One-to-Many database into an Any-to-Any grid storage system. Applying the ExoPonent Principle resulted in treating a database table as one ExoPonent and the database table field labels as another and separate ExoPonent—both of which had to be separated from one another. The database was disassembled into database records and database field names by assigning a number to each field—thereby satisfying the One-to-Many data base software's insistence on a field name—and then ignoring the field number "names" from there on. The database was further disassembled by ignoring and not using record numbers imposed by the database and replacing these by a number called a record ID, a number that is assigned by code ExoPonents and not by the database itself and is itself a programmer-controlled ExoPonent.

As will be described in more detail in the detailed description, "ExoPonent-izing" or "Any-to-Any-ing" the One-to-Many database and separating the field Label from the table itself, immediately allowed (amongst other things) not one, but many different Label Records to be used in a single table. By relating these Label Records to particular Data Records using Any-to-Any-qualified relationship systems an unlimited number of virtual tables could be created within a single physical table. Each virtual table consisted of a given Label Record and all the particular data Records using that particular Label record.

The value of the ExoPonent Principle again became evident when this separation of Labels from the table structure was combined with application of the ExoPonent Principle to the meanings of words, the resulting meaning ExoPonents (unlike the words from which they were disassembled) turned out to be easily classifiable into relatively few types, and these types were then able to be made into a 200 column table of types with one type per column that was suitable for recording the kind of data an office suite might generate. The Virtual tables (made available by separating the field label from the storage structure) then allowed ExoPonents in a given column of the table to use different Labels that were nevertheless, when suitably arranged, sub-types of the overall type of ExoPonent in that particular column. Because of this mechanism, entries in the column could be related and made accessible by type or by sub-type. When a label value was used as a query value it was then possible to do a query-by-type. To illustrate this, an overall high level Label record might have "Group Name" as a label for a particular column. Virtual Tables nested within the main one, might use in the same column, "Club name" ("Club Name" being a sub-type of "people group name") while another Label record, again creating its own Virtual Table, might use "Company Name" (another sub-type of "Group Name") as a label for the same column. Once the data records were related to the Label record they used (so that which Label Record they used can be found) a query on the Group Name field for "What company do you belong to?" might produce the response "Newsoft", whereas a query on the same field for "What clubs do you belong to?" might produce the response of the "Green Golf Club", and a query "What groups do you below to?" would return the response of "Newsoft and Green Golf Club". In other words, the query would return whatever members belonged to the queried type.

This new query ability that itself resulted from "ExoPonent-izing" a One-to-Many databases, in turn had further beneficial side-effects as follows. State of the art One-to-Many database have two problems 1) they require many million different One-to-Many database tables to store just some (but not all) of human knowledge and 2) additionally state of the art databases (even if they use a common language to communicate) cannot usefully accept one another's data as they each have whatever different table structure seemed a good idea to the database engineer who created that database. In contrast, the human is able to store more or less any selection of all human knowledge in one single physical structure—his head—and correctly relate any one part of it to any other part of it. (The human would look very odd if he needed as many heads as the One-to-Many state of the art databases needs database tables to store the same knowledge). But the result of the application of the ExoPonent principle just described to an otherwise normal database (when combined with the fourth part of this invention, the Data Relation Table or DRT) was to make these two problems evaporate, and produce an Any-to-Any database where a single table could now usefully hold any knowledge. Further, correctly used, the table now could potentially correctly relate all knowledge in it as well as freely exchanging that knowledge with other similar structures. In effect, "Any-to-Any-izing" a One-to-Many data base changed it into an Any-to-Any database that then needed only one physical table to store any selection of knowledge (just as the human only requires only one physical head) and could give and receive data from other such structures in a usable manner, just as a human can. Just this simple application of the teachings of this invention created a key advance of enabling any selection of knowledge to be stored as an integrated whole and thereby provides part of the solution needed to avoid the previously described data insanities that result from data in different boxes.

(The above description also teaches that when creating Any-to-Any computing machines, the only real difficulties that may be encountered arise from having to persuade state of the art One-to-Many hosts, systems, tools and structures to construct an Any-to-Any environment for the Any-to-Any machine. This includes persuading things such as operating systems, databases and software languages and (in the case of the video sub-systems) persuading One-to-Many video software to behave in an Any-to-Any manner for which none of these tools was intended. All of the available tools have hierarchical methods built into them from the ground up, and all of them try to force the resulting construction to be a One-to-Many construct also. A further difficulty is using Programmers who have had One-to-Many methods ingrained in their programming bone marrow, and training then to learn to ride this new kind of bicycle).

The "support" part of the environmental requirement—supporting ExoPonents so that they can be related to one another—is provided by disk and other storage systems and computer memory working together under the control of the OS. These mechanisms are well known and need no further description here.

2) Describing now how the second (relational system requirement) of the Any-to-Any machines constructed by the invention may be met, the Any-to-Any machine ExoPonent requires of the environment that the environment provides conditions and mechanisms enabling Any ExoPonent and Any ExoPonent Assembly to be related to Any ExoPonent or Any ExoPonent Assembly in a manner that is not intrinsically hierarchical and is intrinsically unlimited. To be qualified for use as an Any-to-Any relational system, the relational system must be capable of relating the Any-to-Any machine ExoPonents without a) forcing on them any hierarchical relationship between ExoPonents and b) without limiting the number of relations that can be created between ExoPonents. The relation system needs to be able to relate the ExoPonents to one another in some manner, but may not attach them directly to one another in any way. ExoPonents are not glued together, they are assembled in manners that do not physically attach them to one another. The systems that are used can be illustrated by that used for storing hotel room keys at a hotel reception, where the room keys are "assembled" by putting them in the various boxes denoting different rooms. The hotel keys are "assembled" without being physically attached to one another in any way.

For even a single Any-to-Any machine, the environment that provides the relational system in which it can be related and be useful can vary widely from extremely simple to highly complex and yet the machine can still work. For example, the binary Any-to-Any system can be related successfully in the complex electronics of a computer, where it is very useful. But it also works (and achieves a different result) in the environment where the relational system consists only of a sheet of paper and a pencil.

The physical environment of any one Any-to-Any machine is variable and is not the Any-to-Any machine itself—that consists of ExoPonents, storage/support and the relational systems the physical environment provides.

The environmental requirements for the data Any-to-Any machine and the code Any-to-Any machine are close to identical and in any case, fully compatible, allowing them both to reside in the same host (a computing device of some kind, which could be anything from a printer or a watch to a supercomputer).

Because the Any-to-Any computer is intended to be able to track with and accommodate the human's Any-to-Any data handling and Any-to-Any activity use, there is an additional requirement of the Any-to-Any relationship mechanisms namely that they must, between them, be sufficient to relate any data to any data in any manner that the human himself relates it in order to comply with the Unlimited Principle. By this is meant that if a human may relate (for example) three or fifteen or a thousand "and-s" together (and, etc) then an Any-to-Any relational mechanism needs to exist to be able to do this. But if a human does not relate data in some specific manner then the Any-to-Any machine does not need to provide mechanisms to do so either. For example, if a human were to keep each word in its own tank which contained 1,000 examples of the word when he was born, and once he had used those 1,000 copies, he could no longer, see, hear, read or understand that word, then the Any-to-Any machine would need to provide a relational mechanism to accommodate that. But since the human does not do that, the Any-to-Any machine does not need to provide a relational mechanism to do it either. Hence to be qualified as Any-to-Any relational mechanisms required to satisfy the environmental requirements for a human-computer Any-to-Any data-activity system the relational systems must between them be able to relate any ExoPonent or ExoPonent assembly to Any ExoPonent or ExoPonent Assembly in a manner that is not intrinsically hierarchical and is intrinsically unlimited and in any manner that the human himself relates them. (Underlined words indicate the changes required to the normal definition of an Any-to-Any qualified relational system for the relational mechanisms to define a human-qualified, Any-to-Any qualified relation system.

Twelve different Any-to-Any qualified relationship mechanisms prove to be sufficient to enable all code ExoPonents and code ExoPonent assemblies and all data ExoPonents and data ExoPonent assemblies to be related to one another in manners that were not intrinsically hierarchical and were intrinsically unlimited. A further two relationship mechanisms under the control of the user, allow the human to relate any data ExoPonent or ExoPonent assembly to any ExoPonent or ExoPonent assembly in manners that are not intrinsically hierarchical and are intrinsically unlimited, and to do so in the manner that the human habitually does so when dealing with other humans.

Nearly all the environmental relationship requirements of code ExoPonents are also satisfactorily met by the same Any-to-Any relational mechanisms that are adequate for data ExoPonents. But code ExoPonents required a further 3 relationship mechanisms to enable them to communicate with one another and to work harmoniously. Those additional mechanisms are essentially a workaround for the absence of an Any-to-Any operating system which, foreseeably, could have executed code ExoPonents directly without these additional mechanisms.

Third Part of the Invention—Methods to Construct Mechanisms to Couple the Data and Code Any-To-Any Machines Together Any-to-Any machines are amazingly powerful machines in their own right, but when coupled together to make Any-to-Any systems, the capabilities of the resulting systems seem to be incredible. Any-to-Any machines, although they are machines of almost ultimate simplicity, are always both extremely flexible and supremely powerful compared to other all other machines. It seems that there is a general relationship that the simplicity of the machine type may be proportional to the power of that machine type. Any-to-Any machines seem to be extremely powerful, but powerful as they are, in the only two observed instances where two of them harmoniously interoperate in a common environment to create an Any-to-Any system, the power of the resulting system dwarfs even the otherwise supreme power of the handful of known Any-to-Any machines. In the machine world, Any-to-Any systems are emperors, Any-to-Any machines are courtiers, and all other machines are worker bees.

The first of the two identified examples where two Any-to-Any machines are coupled together and form an Any-to-Any system is the coupled binary code Any-to-Any machine and the transistor Any-to-Any machine. When these two are coupled together in a suitable environment, they harmoniously interact and become an Any-to-Any system that produces the useful result of doing all the computing there is.

The binary Any-to-Any system and the transistor Any-to-Any machines are both machines that can be independent and each can have their own practical uses (just as the data and code Any-to-Any machines constructed by this invention were found to do). The binary system alone is useful to do calculations and the transistor is useful alone as a switch. But when the binary and transistor machines are coupled together, and mechanisms to relate them together are added, the result is a harmoniously interacting Any-to-Any system of almost unbelievable power whose power is greater then the sum of the powers of its parts. The Any-to-Any system resulting from coupling together the Any-to-Any binary machine with the Any-to-Any transistor machine does all the computing there is.

The second known example (and there may be others) of coupled Any-to-Any systems is the human Any-to-Any data machine, coupled with the human Any-to-Any activity machine that between them produce the useful result of all human communication and all the physical actions humans have ever done.

Study of such Any-to-Any systems discovered that the prerequisites for coupling two Any-to-Any machines successfully are that 1) they have the same number of different components in the type, 2) the component types in the two systems are not the same component type but both are Any-to-Any components and the two types are compatible and complimentary, and 3) the environmental requirements for each of them, while not necessarily identical, are complimentary and not conflicting and finally 4) Mechanisms exist to relate them together, such that one can operate on the other and be controlled by the other. Providing that these four requirements are met, a harmoniously interacting Any-to-Any system appears and comes to life as soon as the two Any-to-Any systems are placed in their common and compatible environment.

Describing now this third element of the invention—construction of mechanisms to couple the data Any-to-Any machine and the code Any-to-Any machine so as to enable them to harmoniously interact and produce an Any-to-Any system that produces useful results—and reviewing each of the four requirements in turn:

1) Both Data and code Any-to-Any machines do have the same number of ExoPonents, and that number is infinity because new ones of either of them can be created by the human at any time. 2) Data and code ExoPonents are not the same component type but are compatible because a single monofunction code ExoPonent can always operate on a single mono-meaning data ExoPonent even if doing so does not produce a useful result. 3) Practical test showed that the environmental requirements of the two Any-to-Any machines were able to be provided in such a way that the environment for both was 100% identical in all respects where they were required to operate together—the twelve structural relational mechanisms were the same for both. The two human relationship methods present had no effect on the code Any-to-Any machine and the 3 code relationship methods had no effect on the data Any-to-Any machine and hence the environmental compatibility requirements were satisfied. 4) a mechanism called the BossModule related the data Any-to-Any and the code Any-to-Any machine together in a constructive, useful and harmonious manner, while a mechanism termed the Command Matcher related the resulting Any-to-Any system to the human, so as to produce a useful result of enabling all computing to be done more easily, more powerfully than was possible with state of the art software construction methods, and in a manner the human finds easier than state of the art software creations.

In theory no other mechanisms should have been necessary but it will be appreciated that since these teachings concerning the Any-to-Any machine are new and previously unknown, the test Any-to-Any machines had to be built using state of the art One-to-Many tools designed to build One-to-Many software and these are different for each chosen operating system or computer type. By applying the teaching of the invention as described, it proved possible to use a One-to-Many database as an Any-to-Any storage system by ignoring its One-to-Many abilities and just using it as a storage and retrieval grid. The Java programming language was used as the best for the purpose, but was still a tool intended to build One-to-Many constructions and some workaround of Java's enforced and unwanted One-to-Many system were needed and in most cases, applying the ExoPonent Principle teaching of the invention solved the problem. The operating system is itself a One-to-Many machine and in order to make it execute code ExoPonents and ExoPonent assemblies, a small One-to-Many kernel machine had to be built in Java to connect the code Any-to-Any machine to the One-to-Many operating system host. This kernel accepted data and code ExoPonents and executed the code ExoPonents, essentially using the operating system host to temporarily relate them in memory in a virtual grid for execution purposes and provide registers for the small transfers of data between individual code ExoPonent assemblies; but those are all services that an Any-to-Any operating system itself would have provided, had one existed. This kernel, since it is a connection between the Any-to-Any machine built by the invention and a particular One-to-Many operating system host, is operating system dependant. All mechanisms outlined in this paragraph proved to be well within the capability of those skilled in the art.

Fourth Part of the Invention—the Data Relation Table (DRT)

The DRT is a single logical table that, when used with relational methods to be described herein, is capable of relating all meaning data and other data in a sensible and useful fashion without all possible relations within the data having to be pre-recorded which, in any case, is an impossibility. Why it can do this, lies partly in the realm of the present invention and partly in the realm of meaning structure of language which is outside the scope of this invention; but the DRT is described herein in sufficient detail that anyone skilled in the art can use it with beneficial results to be described in due course.

Fifth Part of the Invention—Computer Implementation of the Human Specification System The system that humans use to unambiguously specify data to one another is deeply woven into the meaning structure of language and into meaning use and is termed the Co-Reducing Concept Exclusion Principle of Specification" or the "Co-Reducing Concept Principle" for short, which is defined as:

Humans specify things to one another using exact meanings each of which exclude everything else in the universe not included in or covered by that meaning, each of which co-reduces all of the concepts of all of the other meanings in the specification, and continues to add co-reducing concepts to the specification until such time as all things that the human does not wish to specify have been excluded and that which he does wish to specify is all that remains.

In essence, the human unambiguous specification process is an exclusion process constructed with exact meanings, whereas the state of the art "find" methodology is an inclusion process constructed using multi-meaning packages called "words" or "keywords".

Hence the fifth part of the invention consists of methods to implement the Co-Reducing Concept Principle in an Any-to-Any system consisting of a harmoniously interacting Any-to-Any data machine and an Any-to-Any code machine, and in the preferred embodiment, constructs this using data ExoPonents that are classified and stored in a DRT classification system, and these parts all working together create the basics of an Any-to-Any system which is also a language-controllable infrastructure for doing computing.

SUMMARY

It will be appreciated that because Any ExoPonent or ExoPonent assembly can be connected to Any ExoPonent or ExoPonent assembly with the methods of the invention, and connected in a manner that is not intrinsically hierarchical and is intrinsically unlimited, and doing so adds almost no complexity, the result is that the construction system for computer data and code Any-to-Any machines and systems described above is not self-limiting on the grounds of complexity. Because ONE code ExoPonent that is added is able to act on ALL (compatible) data ExoPonents in the system, an arithmetic increase in complexity (addition of One ExoPonent) produces a logarithmic increase in functionality, as the one new code ExoPonent can now be assembled on the fly with any and all existing code ExoPonents and ExoPonent assemblies to add to the functionality of each one and can now act on any and all compatible data ExoPonents to transform each one. The absence of a self limiting aspect to construction of functionality paves the way to the addition of enough functionality to dispose of menus and make language control practical. Language is also ExoPonent based and the invention creates a language-controllable infrastructure and hence the invention provides the infrastructure for Meaning Processing (computer processing of words into those meanings the human intends in each instance) and hence to language control of computing. Hence, the invention is a construction system that can be used to build an Any-to-Any human-computer data-activity system that is also not self limiting on the count of ease of use, nor is it self-limiting on any other count.

If the eleven data insanities previously described in the state of the art are reviewed it will be seen that every single one of them arises in some manner from the single cause of having to relate one of something to many of something else in the fixed One-to-Many manner. Fixedly relating One of something to many of something else, instantly and immediately prevents that One and those somethings each from being related to Any of Anything else in the Any-to-Any manner that the human uses. Because one thing has been fixedly related to the other thing, it cannot now be related to anything else without at the same time also relating that other thing to which it has been fixedly related. Since the Any-to-Any system described can relate anything to anything in a manner that is not intrinsically hierarchical and is intrinsically unlimited, as the human does, none of the data insanities arise, or, if they do—since the system can relate anything to anything or not, as the designer chooses—they do not arise because the construction system forces them to arise as the state of the art construction system forces them to arise, but only because the designer decided to do it that way (the freedom to do anything is the freedom to do stupid things also).

The combined result of the parts of the invention is a Data Any-to-Any machine and a Code Any-to-Any machine that harmoniously interact to form an Any-to-Any human-computer data-activity system that can process any data in an Any-to-Any machine in an Any-to-Any manner under human control and in a similar fashion to the human's own Any-to-Any data processing and is therefore easier to use and more powerful than the systems constructed by current One-to-Many software construction methods.

As well as being more powerful, Any-to-Any human-computer data-activity systems prove to be easier and more intuitive for the human to use than current human-computer data-activity systems, because they function on the same basic Any-to-Any principles and methods that the human uses when handling data with other humans, something he has been doing since birth and at which he has much practice. Some of many results of using the invention are that the self-limiting factors experienced by current software construction systems are no longer present, and data insanities seen in current software are not forced into existence by the construction system, and, instead of blocking many things the human wants to do, or forcing him to do them in a non-intuitive manner that he has to both learn and understand (as state of the art software does) the invention results in an Any-to-Any system that allows him to do things in a manner that he spontaneously characterizes as "easy" and enables things to be done that cannot be done with software today.

BRIEF DESCRIPTION OF THE DRAWINGS

FIGS. 1 to 6 and 8 show methods to create data ExoPonents and make the data Any-to-Any machine, and to create code ExoPonents and make the code Any-to-Any machine function as an Any-to-Any system in a computing environment. FIGS. 7 and 9 to 24 show uses of data ExoPonents and code Exponents and hence of the Any-to-Any machines and system produced by them in a computing environment.

FIG. 1 illustrates the translation of words into meaning ExoPonents usefully classified by the Data Relation Table meaning classification system in a small scale example of part of an operating Any-to-Any data machine constructed as per the methods of invention using the grid relational system that enables a computer to manipulate meanings and Base Concepts individually.

FIG. 2 illustrates a typical code ExoPonent from an Any-to-Any computer code machine.

FIG. 3 illustrates the assembly of code ExoPonents together with the data ExoPonents they need to control their operation into a small scale example of part of an operating Any-to-Any code machine.

FIG. 4 illustrates the operation of a field parallel code ExoPonent in an Any-to-Any code machine and the operation of the code communication system it uses.

FIG. 5 illustrates the operation of Boss Modules that manage the execution of code ExoPonents on data ExoPonents so as to create a bridge between the Any-to-Any data machine and the Any-to-Any code machine and cause them to harmoniously interoperate as a Any-to-Any data-activity system.

FIG. 6 illustrates the operation of the Command Matcher to enable data ExoPonents to select and cause the execution of code ExoPonents, thereby creating a bridge between the human and the functioning Any-to-Any data-activity system resulting in an Any-to-Any human-computer data-activity system computing machine (aka Any-to-Any computer).

FIG. 7 illustrates the use of meaning ExoPonents to enable Virtual Tables in the Data Relation Table relational system in a data Any-to-Any machine which is then enabled to store any kind of data and relate it usefully in a computer image of the useful relationships of that data that exist in real life.

FIG. 8 illustrates how graphical data ExoPonents enable code-economic atomic control of GUI display so that a user can control whatever graphical data he wants to, in a small scale example of part of an operating Any-to-Any data machine.

FIG. 9 illustrates the use of data ExoPonents in coupled meaning type fields to economize on quantity of storage fields in a small version of part of a data Any-to-Any machine using a Data Relation Table structure.

FIG. 10 illustrates the use of ExoPonents to enable a computer to discover differences, similarities and degrees of similarity, and identity, in and between data, thereby enabling those discoveries to be used in further computing operations.

FIG. 11 is a block diagram showing how an ExoPonent Any-to-Any system constructed on a field parallel basis enables a field parallel operating system and GUI system to be used, and a field parallel memory, CPU and hardware system to be used, all of which considerably augment the computing power of a computer.

FIG. 12 is a diagram showing the use of Data ExoPonents to enable a computer to perform human-like Co-Reducing Concept Principle searches and data identifications.

FIG. 13 is a diagram showing the use of data Type ExoPonents to enable a computer to Return Nearest Truth when it is queried for an answer to which there is no exact match, so that it can then find for a user the nearest or closest answer to his query that is true when his exact query was not true.

FIG. 14 illustrates a secure communication system to enable Any-to-Any systems to communicate securely to one another as a first part of using ExoPonents to enable Any-DataAnyWhere in which Any-to-Any systems running on different computer-enabled hosts are enabled to freely and securely interchange data between one another in a variety of useful ways.

FIG. 15 illustrates methods for using ExoPonents to enable AnyDataAnyWhere in Any-to-Any systems.

FIG. 16 illustrates methods for using ExoPonents to enable the second requirement for AnyDataAnyWhere for Any-to-Any systems, namely IfNotFound ability that enables a computer that is missing something to execute and manage an appropriate Chained Search so as to get what it needs without bothering the user.

FIG. 17 illustrates Part I of Data Relation Table (DRT) Administration Data Class Fields for use with office suite data and functionality that are not user accessible. Part I and Part II are two parts of the same thing that are only shown in separate figures for convenience of page display.

FIG. 18 illustrates Part II of Data Relation Table (DRT) Administration Data Class Fields for use with office suite data and functionality that are not user accessible. Part I and Part II are two parts of the same thing that are only shown in separate figures for convenience of page display.

FIG. 19 illustrates Data Relation Table (DRT) Administration Data Class Fields for use with office suite data and functionality that are user accessible.

FIG. 20 illustrates Life Data Category Data Class fields in a Data Relation Table (DRT) for use with office suite data and functionality.

FIG. 21 illustrates Time Data Category Data Class fields in a Data Relation Table (DRT) for use with office suite data and functionality.

FIG. 22 illustrates Space (Location) Data Category Data Class fields in a Data Relation Table (DRT) for use with office suite data and functionality.

FIG. 23 illustrates Energy (Action) Data Category Data Class fields in a Data Relation Table (DRT) for use with office suite data and functionality.

FIG. 24 illustrates Matter Data Category Data Class fields Part I in a Data Relation Table (DRT) for use with office suite data and functionality.

FIG. 25 illustrates Matter Data Category Data Class fields Part II in a Data Relation Table (DRT) for use with office suite data and functionality.

FIG. 26 illustrates use of various described Any-to-Any assembly mechanisms to enable a) the Any-to-Any system to function in different languages and b) to function with different names applied to the same things by different users and c) to create Concept Hierarchies in another way and finally d) to enable a series of code actions to be launched by using the name of the group of code actions.

DETAILED DESCRIPTION OF THE EMBODIMENTS

Outline

Figure 1:
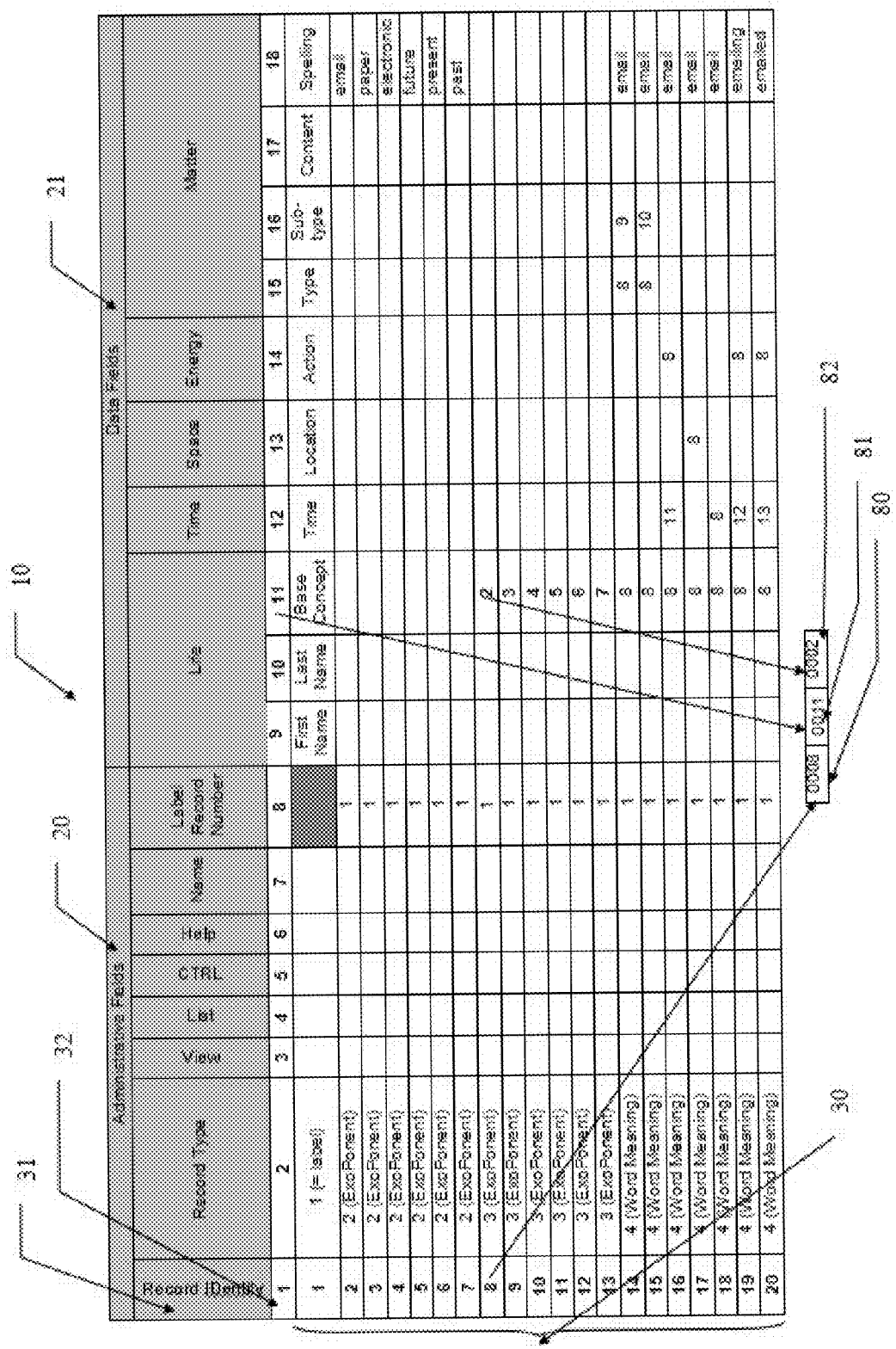

The present invention is called the ExoTech software construction method and consists of methods for constructing an Any-to-Any data machine in a computer, and for constructing an Any-to-Any code system in a computer, and for constructing mechanisms so that the Any-to-Any data machine and the Any-to-Any code machine harmoniously interact in a computer so as to create an Any-to-Any system in a computer. Those skilled in the art can then follow these methods to construct Any-to-Any computing systems capable of doing all computing that can be done today (but in a more flexible and powerful manner than is possible in the state of the art) as well constructing Any-to-Any systems that do computing that is not practical in the state of the art.

The invention may be used to create data and code Any-to-Any machines and Any-to-Any systems that are implemented on a host computer system. The host computer used may be local or remote or a combination of the two. The construction methods of this invention may result in computer-executable instructions stored on any suitable type of computer storage medium or even embedded in a machine that does simple computing such as a printer or washing machine. In this context, a "host computer system" refers either to a local computer at which a person is working, or to any kind of machine that does computing in any form, or to a remote computer (at which another person may also be working or at which the same person may be working remotely) that stores the data, stores the software, stores the input/output control information, controls or is controlled by the local system, or performs some other function using software or data constructed with the methods of the invention, or to any combinations thereof. In particular, the claimed invention should be considered to have been practiced wherever the benefit of the invention is enjoyed, regardless of whether one or more of the constituent steps or devices were performed or located in a jurisdiction in which the invention is not patented, such as outer space, a country without a patent system, or a country where patent protection has not been secured. Similarly, the claimed invention should be considered to have been practiced wherever a substantial portion of the constituent steps, methods or devices were performed or located, regardless of whether the totality of the claimed steps, methods or devices were performed or located in multiple jurisdictions having disparate patent laws. Notwithstanding this potential computing locational environment complexity, the following minimum and recommend system requirements are presently considered appropriate for good performance of an Any-to-Any computer system constructed with ExoTech such as the Any-to-Any test system called ExoBrain (referred to herein) that was constructed in Java with the methods of the invention with the objective of performing normal office application functionality and which was running on an office computer: 800 MZ processor, 1 GB RAM, 20 GB disk. Recommended system is 2 GZ processor, 2 GB RAM, 60 GB disk. For Mobile applications the minimum system is 512 MB RAM, 500 MB of storage and a processor capable of running Linux.

Sections of the Invention

This invention consists of five sections that are described together as all sections are needed to create a fully operational Any-to-Any system. The sections are:

1) Methods to construct the independently-useful data Any-to-Any data machine in a computing environment which is defined as:
   A computer data machine in which ANY data ExoPonent or data ExoPonent assembly of the machine can be used with ANY data ExoPonent or data ExoPonent assembly of the machine in a manner that is NOT intrinsically hierarchical and IS intrinsically unlimited.

2) Methods to construct the independently-useful code Any-to-Any machine in a computing environment which is defined as:
   A computer code machine in which ANY code ExoPonent or code ExoPonent assembly of the machine can be used with ANY code ExoPonent or code ExoPonent assembly of the machine in a manner that is NOT intrinsically hierarchical and IS intrinsically unlimited.

3) Methods to construct structures that enable the Any-to-Any data machine and the Any-to-Any code machines to harmoniously interoperate so as to produce (as one possible benefit) an Any-to-Any human-computer data-activity system that can do all computing that is now done by One-to-Many state of the art code and data systems, but with the advantage of doing it more easily for the user, and more powerfully and of enabling computers to do things they cannot do using state of the art methods. The Computing Any-to-Any system is defined as:
   A computing system in which any data or any code ExoPonent or ExoPonent assembly can be used with any data or code ExoPonent or ExoPonent assembly in a manner that is NOT intrinsically hierarchical and is intrinsically unlimited.

The power of every Any-to-Any system so far identified greatly exceeds the sum of the individual powers of the Any-to-Any machines that make up the Any-to-Any system. Similarly, the power of the Any-to-Any computer greatly exceeds the sum of the individual powers of the constituent Any-to-Any data and code machines when used alone. Additionally the invention consists of:

4) The Data Relation Table (DRT) relational system of the invention that enables a single Data Relation Table to hold any kind of data and enables it to be related usefully where useful relationships of that data actually do exist in real life.

5) The Co-reducing Concept Principle of data specification that enables computer code to identify data to be processed using specifications of data provided by humans.

General Requirements A1,2 B1-3 to Create Any-To-Any Machines and Systems in a Computer In order to describe the methods of the invention to build the Any-to-Any machines and system in a computer environment, it is first necessary to describe:

A) the two general requirements that must be met to create Any-to-Any machines in a computer which are: A1) the Any-to-Any computing ExoPonent type and A2) the environmental requirements in which the Any-to-Any computing ExoPonent type can operate to do useful work.

B) the three general requirements that need to be met for two Any-to-Any machines to harmoniously interact and create an Any-to-Any system, which are: B1) that the environment requirements of the two Any-to-Any machines need to be compatible with one another so that both Any-to-Any machines can work within the same environment, B2) The number of different ExoPonents of the required type need to be effectively the same in both cases B3) Any-to-Any relational systems or methods need to exist in the environment that together enable harmonious interaction to occur.

C) The general requirements for a host (such as a computer) in which the Any-to-Any system can be built and operate.

After these requirements have been described, the methods of the invention to satisfy each of these requirements (and thereby build an Any-to-Any interoperating code and data system in a computing environment) will be described. The description will cover the requirements of the data and code Any-to-Any machines separately only where these are different from one another. The general requirements that have to be met to make an Any-to-Any system are as follows:

General Requirement A1, for Any-to-Any Computing ExoPonents

The term "Any-to-Any component" means a component of such characteristics that it actually works (in the right environment) as an Any-to-Any machine. Such a component is not an ordinary component at all but is a highly unusual type or sub-breed of component. As a self-evident example of this difference, components are found by the million in any hardware store, by the thousands in any car or TV, but the vast majority of components seen anywhere and everywhere are One-to-Many machine components, only suitable for use in One-to-Many machines. Such components depend on specific placement in relation to other specific components or types of components in order to function. Components for One-to-Many systems are designed with one another in mind. The tire has to go on a specific wheel—not any wheel, but one of the right size—and goes on this way and not any other way like sideways. Put a One-to-Many machine component tire into the gearbox of a car (a gearbox being a component assembly of other equally specific One-to-Many type components), and neither the tire nor the gearbox will work any more—and that is because they are One-to-Many system components that work only in One-to-Many systems. In contrast, Any-to-Any components can be used with any other Any-to-Any component in a specific Any-to-Any machine. A binary code Any-to-Any machine component (the component zero for example) can be used with any other Any-to-Any component from the same machine (the component zero or the component one for example), and not only that but can continue to be used together without limit and in a manner that is not necessarily hierarchical.

In contrast to the wide profusion of One-to-Many Components, Any-to-Any Components that work in Any-to-Any systems are extremely rare, and one of the few that are commonly experienced is the Lego brick of the children's toy. This is an Any-to-Any component in that "any component—a Lego brick—can be used with any (Any-to-Any) component—a Lego brick—in a manner that is not intrinsically hierarchical and is intrinsically unlimited)". The Lego brick is an Any-to-Any component for the Lego Any-to-Any machine and hence and because it is Any-to-Any component (and not an ordinary One-to-Many component), any (Any-to-Any Component) Lego brick can be used with any other (Any-to-Any Component) Lego brick. The fact that in the Lego Any-to-Any machine, there is only one component—the Lego brick—is immaterial as can be seen from the fact that in other Any-to-Any machines where there is more than one Any-to-Any component in the machine, any (Any-to-Any Component) can still be used with any (Any-to-Any Component). For example, in binary code, which is a base 2 (i.e., the machine consists of two Any-to-Any components) Any-to-Any machine, the same thing applies, and any (Any-to-Any Component)—zero or one—can be used with any other (Any-to-Any Component)—zero or one. Which of the two components—zero or one—is connected to or used with which other component (zero or one) does not matter—a zero or a 1 will work equally well with any other component (0 or 1) and it does not matter whether a 0 is next to 1 or to other zeros or to either 1 or to ten other 1s, it still can be used with any other Any-to-Any Component from the same machine just as the Lego brick can be used with any other (Any-to-Any Component) Lego brick.

This is completely different to what happens with One-to-Many components. It is not possible, for example, to take 100 tires and 74 axels and string them together in any old order and have them do anything useful. The vast majority of components in the world are not "Any-to-Any-able". Only a handful of components in the world will work as Any-to-Any machine components.

Hence, one critical specification difference (and others will be described shortly) that distinguishes a One-to-Many component from an Any-to-Any component is that the One-to-Many component requires a specific connection to specific other components, whereas an Any-to-Any component does not require a specific connection to any other specific Any-to-Any component.

It should be noted that in the sphere of data and software that are relevant to a computing system, when the terms "Objects" and "Components" are used in the state of the art these words are invariably used to label often quite complex One-to-Many structures (one structure, more than one function) for use in other One-to-Many systems. It has not been possible to locate any pure Any-to-Any type components as defined herein in use in the software world in the state of the art and while they may exist somewhere, all components so far checked have been found to be little or sometimes big One-to-Many machine components and often found to be not components at all, but sometimes little, sometimes big structures generally meeting the definition of a One-to-Many machine. Hence, in order to describe the Any-to-Any machines constructed with the methods of the invention in a comprehensible manner, it is necessary first to describe very clearly the distinguishing mandatory characteristics of an Any-to-Any components that constitute the major part of the Any-to-Any computing machines, so as to distinguish them clearly from the more usual One-to-Many data and software structures, (often also called components) from which state of the art data-software structures are made.

Differences Between One-To-Many and Any-To-Any Components

The most important differences between Any-to-Any components and One-to-Many components lie in four defining characteristics or specifications. These four defining characteristics of Any-to-Any components have to be strictly met in order to create the Any-to-Any data machine and in order to create the Any-to-Any code machine with the methods of this invention. These four differences between the component types of One-to-Many and Any-to-Any machines can be inferred from the difference (underlined in the following) between the definitions of Any-to-Any and One-to-Many machines:

An Any-to-Any machine is one in which Any (one or more) component or component assembly can be used with any (one or more) component or component assembly in a manner that is not intrinsically hierarchical and is intrinsically unlimited.

A One-to-Many machine is on in which One of something can be used with Many (more than one) of something else in a manner that is intrinsically hierarchical and is intrinsically limited.

The four key differences that are operational differences differentiating between Any-to-Any components and One-to-Many components translate into four key characteristics of Any-to-Any machine components, that must be followed completely in the preferred embodiment, and in any case very closely in order for an Any-to-Any machine to exist, and they are as follows:

1) Components Must be Able to be Assembled Any to Any

1) Any one Any-to-Any component can be used repeatedly with another of the exact same Any-to-Any component whereas a One-to-Many component can rarely be used with another of itself. For example, the binary Any-to-Any machine component of a binary 1 can be used with another binary 1 or with a thousand binary 1s; the genetic Any-to-Any machine component adenine can be used with one other adenine or with a thousand other adenines. An Any-to-Any data machine component of a specific meaning can be used with another of that same specific meaning component (as was demonstrated with the words "and" of an earlier example). However, in a One-to-Many machine, that sort of repeated use of a single component is rarely possible and one of one thing usually has to be used with some (1 or more) of something else that is not the same as the first thing. One CD player can't be used with another CD player, it has to be used with some of something else (CDs); one tire can't be related to another tire, it has to related to a wheel).

In practical terms, a result of the above is that one of the requirements in order to be able to assemble any one specific Any-to-Any data or code component with any other Any-to-Any component, or to assemble any Any-to-Any component assembly with any other Any-to-Any component assembly is that the Any-to-Any components need to be physically separate in order to do that. For example, supposing that a binary 1 was only available already assembled together with a binary 0, there would be no way on earth to assemble just two binary 1s together. When one tried to do so, one would find that, like it or not, one had assembled two binary 1s and two binary 0s and had an assembly of 4 things, when one wanted an assembly of two things (two binary 1s). So if the binary 1 was not available physically separate from anything else, assembling any binary component with any binary component is simply not possible. In practice, that means 1) each Any-to-Any component or component assembly must be stored completely separately from every other Any-to-Any component or Any-to-Any component assembly and 2) each Any-to-Any component or Any-to-Any component assembly needs to be complete and functional of itself and require nothing other then the environment to operate, or (in the case of code) require nothing more than the environment and something to operate upon.

An Any-to-Any component being entirely independent in this manner is key to enabling any component in the machine to be able to be assembled with any component in the machine. It is the fact of the separateness of each of the Any-to-Any components and separateness of each of the Any-to-Any component assemblies that is critical to enable and allow any one of them to be assembled with any other of them. If this independent separateness does not exist in a Any-to-Any component, and (for example) a wire (one component) is not totally separate from all other components but is only available with a headlamp on the end, then that wire can't be assembled with (used to connect) two connection points in a switch, partly because the second end of the wire is already connected to the headlamp and therefore can't be connected to the switch and partly because there is no room for the headlamp in the box containing the switch. Hence, in order to allow for this assembly of anything to anything, each Any-to-Any component has to be stored separately from every other Any-to-Any component. In practice, a semi-workable construction but with negative side-effects (that was used as a short cut in parts of the test ExoBrain) can be made if Any-to-Any components are stored as commonly used groups, so that (as an example) first names and last names, although each treated as separate Any-to-Any components, instead of being stored separately and then assembled into a person's name, were stored pre-assembled together as "Joe Brown"—a compromise whose only real purpose was to economize programmer effort; however, such compromises always cause other problems; in the example of "Joe Brown" problems immediately arise when the computer is called upon to distinguish between "Joe" an abbreviation for a first name, and "joe" a cup of tea in slang British parlance.

As a particular note about code Any-to-Any components, "A machine in which ANY code component can be used with ANY code component in a manner that is NOT intrinsically hierarchical and IS intrinsically unlimited" means that the code Any-to-Any components have to be of such a nature and characteristics and features that they do not of themselves impose any need for any other Any-to-Any code component in order to be used and to be useful, that they have no direct coded or other connection with any other Any-to-Any code component and also that they can be connected or used together in a virtually unlimited fashion.

2) Any to Any Components are Single Function

Any-to-Any components are always single function and One-to-Many components are usually multifunction. The fact that in an Any-to-Any machine any one Any-to-Any component can be used with any one Any-to-Any component implies that the component is single function whereas a One-to-Many component is usually multi-function. If a component has TWO or more functions that are useful to the intended user then it can no longer be used with just any other component, but only with one that can accommodate those same two functions, and the Any-to-Any ability of the Component would be lost, disqualifying it from being an Any-to-Any component. If a component has two or more functions, it is no longer possible to use one of the useful functions without also using the other useful function and, in the case of code each function is no longer directly accessible because it is necessary first to tell the code which of its two or more functions is to be done this time.

For example, a One-to-Many component tire has to be used with a road to adhere to, with air to blow it up, with a rim to hold it and has several functions a) adherence to the road b) shock absorption, c) adding height d) rolling over the road and e) removing road surface water; for all these reasons it can't be used with ANY other component in a car, for example, related to the light bulb in the speedometer. Every Any-to-Any component, in contrast, has strictly and only one function. The Any-transistor machine component has only one useful function that—to stop a flow of electricity; each binary code Any-to-Any component has only one function.

Hence, to be an Any-to-Any qualified Component (as well as simultaneously meeting all other requirements) a component must only perform only one intended—user-useful function and no more than one useful function in order to comply with the Individual Controllability Principle. In the case of a code Any-to-Any component, it may need any number of different inputs to perform this function, and may execute all kinds of complex machinations internally, but it may have no more than one user-useful function that it does. A code Any-to-Any component, may not, for example, change text to one of four cases (which is four functions) and if it does such a thing, is not qualified as an Any-to-Any component. In an Any-to-Any code machine, one Any-to-Any code component changes text to Sentence case, another to lower case, a third to upper case etc. so that each one is independently and directly accessible, usable and controllable and complies with the Individual Controllability Principle.

If a component performs more than one function, it is a One-to-Many machine in and of itself—one component, many functions and is, in effect, a wire with a headlamp on the end—which makes it impossible to use a wire without using a headlamp and impossible to use a headlamp without using a wire. As an example of this, a word such as "faxed" is an assembly of several meanings and is a mini One-to-Many machine—one word, many meanings in the word. The assembly that is the word "faxed" consists of (at least) three welded together meanings 1) an activity 2) a type of activity which is the activity of faxing 3) past time. If the only thing recorded in the computer is a mini-One-to-Many machine—the word "faxed"—and then one asks—searches—for any record of what was done (activities done in previous time), the computer has no way to know that the letters "faxed" are anything to do with past time and will (insanely by human standards) return the wrong answer of "nothing was done".

Hence, and for example, to be qualified as an Any-to-Any Data Component for the Any-to-Any data machine, where each Any-to-Any component may only perform one useful function, data such as the word "faxed", must first be separated into mono-function Any-to-Any components (which in this incomplete example are four: 1) an activity 2) type of activity fax 3) past time and 4) the spelling itself, the letters f, a, x, e and d assembled together). (This is an example only, as the words faxed contain other Any-to-Any components than just these).

If a structure does perform more than one function, this is mostly due to the fact that different parts of the structure (different ExoPonents in it) are performing the different functions, and this indicates that further disassembly into ExoPonents is required. When completely disassembled into ExoPonents, each of the parts of the structure will be mono function.

Any-to-Any components are strictly mono-function for several reasons, one of which is the following. Remembering that, in order to replace over-complex menus with language control, anything and everything that appears on the screen eventually needs to be able to controlled by the human using language (once language control is implemented), this becomes impossibly complex to achieve if the single software wire the user wants to use, is only available as the equivalent of a wire plus a headlamp plus a fuse box and a generator, all in a gift-wrapped package with its own screen display and power supply. How then, does one command, with language, and activate some other software structure, that worms its way into this complex software structure box, makes its way through the mess inside and then controls that one wire to do something? or controls the third fuse from the left to unplug or control third coil in the generator winding to increase its length by 30%? Or any of the other things a human might dream up or need to do? Multiple function One-to-Many structures intrinsically and inevitably lead to large amounts of code wire, not to actually do anything, but just to connect the user's command (data) to the third fuse to the left (data) so that the code that actually does something as opposed to connecting somethings, can then do its function and unplug the fuse.

Hence, individual intended-user-controllable Any-to-Any code components are mono-function single action Any-to-Any components and hence as examples: 1) a single code Any-to-Any component is built to shorten a single line (the wire), and 2) that code Any-to-Any component is built so as to be able to work in a generic fashion on any line (a line is just data) 3) with the mono-function of reducing its length and 4) that Any-to-Any code component is stored in its own record in a database, then A) a user's order "shorten that line" can recorded as a record, in which are recorded the individual Any-to-Any data components of the order, namely 1) line 2) Activity 3) Length 4) less. Then B) that record can be used as a query-by-example query to query the database for a record containing the components 1) line 3) Length 4) less, and find and retrieve the record containing the mono-function line-shorting code Any-to-Any Component which can then be directed at its target by mouse methods or user commands (such as "shorten the line under the last paragraph").

The mono-function requirement and characteristic of user-controllable code Any-to-Any Components used in the Any-to-Any code machine, directly enables several beneficial results. Firstly, every function can be directly accessed without needing to access anything else first. Secondly, functions can be added or removed, activated, deactivated, changed or used once or twenty times without affecting anything else in the Any-to-Any code machine at all—without having to connect the new code to any other code, and without having to recompile or reboot anything. If an Any-to-Any component has something wrong with it, just like broken wire, the old one can just be taken out, and a new one put in and it is not necessary to rebuild the entire house in order to do so—which is yet another of the many insanities of the present One-to-Many system that people have learned to live with today. It is then no longer necessary to replace 25 MB of code in order to repair 5 kb of broken (which means incorrectly constructed) function.

The fact that both Any-to-Any data components and Any-to-Any code components are both mono-function is also vital to the ability to creating a harmoniously interacting Any-to-Any system out of the Any-to-Any data machine and the Any-to-Any code machine, as it allows and enables Any-to-Any code components to act on Any-to-Any data components on a one-to-one basis. In other words, it allows and enables an exact match between components of the two different machines, exactly as occurs in the Binary/transistor Any-to-Any system. Thus the line shortening monofunction code component described above can be matched up with any line anywhere on the screen, on a one-on-one basis and act on any line in the screen to shorten it. However, if the box on the screen is not made up of mono-function data (four individual lines) but is made as a pre-assembled One-to-Many machine (one box, many sides), the mono-function line shortener component cannot do anything to the box on the one hand and on the other, if the user wants a box with one line shorter than the rest (a box with one corner open) a new set of code is needed to create that open box—and just that doubles the necessary code, and then adds still more code to show the user the choices and still more code to execute the right one when the user clicks a button. If the reverse is true and the Data Component (the line) is mono-function but the code "component" is multifunction and can (for example): 1) shorten a line or 2) lengthen a line then, it cannot just act on the mono-function data component when directed to do so—something else, another unnecessary piece, has to tell it which of its two functions it is to do this time, and, in some manner or another that information has to be obtained from the user. While that might not be difficult to do in such a simple example as this, if that One-to-Many road is followed, it finishes where we are today—with complexity that is such that it is virtually impossible to tell state of the art code to do anything at all through language control, even supposing language control existed.

The required mono-meaning (in the case of data components) and mono-activity (in the case of code components) Any-to-Any component characteristics are therefore key to enabling any data component to control or be acted on by any code component so that together they can produce an Any-to-Any computing system in which any data or any code component or component assembly of the machine can be used with any data or code component or component assembly of the machine in a manner that is NOT intrinsically hierarchical and is intrinsically unlimited.

Whether or not it is sensible or useful to use a particular data and a particular code component or component assembly together, is not the question. The fact that a line shortener Any-to-Any code component will not do anything if related to and targeted at a recorded meaning of word such as "past time", is not material. The importance is that it can be related to that word meaning, so that absolutely any relationship can be created between anything and anything else, as a human does. It is up to the human to decide and choose whether a particular relationship is sensible or useful in this instance—something they do all the time without thinking about it. Humans can perfectly well throw a match in their gas tank each time they fill up at a gas station, but not many of them do, and they seem to get by OK, even if there is no programmer at each service station to stop them blowing themselves up. Sometimes humans deliberately create non-sensible relationships—much humor consists entirely of creating non-"sensible" relationships. The freedom to do anything is also the freedom to do things that are pointless. It is up to the user of the computer to decide what makes sense (for him) which will probably not be the same thing that makes sense to the next person. It is not the programmer's job to act as a god and prevent the user from doing things the programmer considers to be stupid.

Because the mono-function nature of data and code components allows any of them to be related to any others, creating "applications"—which is the process of relating code to data—does not require programming, but only requires user-controllable, Any-to-Any relational mechanisms that will be described. Since these relational processes are data-driven they are interchangeably controllable by either language control (if it exists) or by point and click or drag and drop methods, and anybody can create combinations of code and data (i.e. applications). Consequently, 75% of the applications in the test Any-to-Any machine called an ExoBrain that was constructed to test this invention were constructed by inexperienced non-programmer "applications designers"

who pointed and clicked to construct their applications. User construction of applications has still further benefits, in that users can themselves construct whatever applications suit them best, and change them on the fly as experience shows to be desirable. A user changing an application so it does what he wants, is always going to be faster than getting a programmer to change it, assuming in the latter case, that a qualified programmer is available to do so.

In the same way that language assembles from basic Any-to-Any component mono-meanings upwards, mono-function Any-to-Any code components assemble similarly. So decreasing the size of a box, requires that four mono-function line shortener components are assembled together (which does not require any code) and used at the same time and controlled (which also does not require code) so as to shorten all the lines by the same amount, while another four mono-function coordinate reducer Any-to-Any components are also used at the same time to move the resulting short lines together.

Subtle and unobvious traps await the unwary Any-to Any machine builder who does not pay the strictest attention to the principles being taught herein. One of these traps is that the mono-function characteristic of Any-to-Any code components needs to be carried through completely in the sense that the function that is performed by a code assembly needs to be unique also. A particular type of function has to be uniquely performed by only one unique Any-to-Any Code component as to do otherwise, creates a One-to-Many machine in a reverse manner—one type of data, several bits of code that perform the same transformation on it. If the need to build uniquely is not met, there will be an Any-to-Any code component assembly 1, that is required to perform function A to Any-to-Any data component/s X (a line for example) under condition Y (this is a presentation) and another code component assembly 2, that is required to perform function A on Any-to-Any data component/s X under condition Z (this is an email). As soon as that happens, it is no longer possible to assemble Any component assembly with Any Component assembly, hence an Any-to-Any machine no longer exists, and now, because the Any-to-Any code components have been assembled into a structure that functions as a One-to-Many machine instead of as an Any-to-Any machine, some additional relational mechanism now has to decide which case now exists and therefore which component assembly to use. If code Any-to-Any data component assemblies are not built generically (to act on any line anywhere for example) they are in fact small One-to-Many machines (one line, several different bits of code to act on them), and so are not actually Any-to-Any component assemblies at all but are One-to-Many assemblies, that are assembled to the other component by the condition under which they operate—the conditions themselves forming a logical weld.

A second similar trap is that Any-to-Any code component assemblies must also be unique as well. For example, several different types of document may each have the same type of function that must be done to them, such as to prepare the document, and obtain necessary data from the user for that document type. If so, then there must be only one unique assembly of Any-to-Any code that does that one mono, document creation function. If a letter, an email, a resume, and a fax each have different Any-to-Any code component assemblies to create and prepare them, then several One-to-Many assembly has been created—a) One (a particular) document creation assembly function and many code assemblies to prepare it, and b) One document creation assembly (for each document type) and many documents prepared by it and all of them are inextricably welded together. The price to be paid for falling into any such One-to-Many traps is always loss of flexibility and controllability and increased complexity which, if it goes too far, will prevent language control from working. In this example, the moment the user is part way through an email and suddenly decides he wants to make it into a letter instead, the existing execution has to be dropped, the already entered data somehow related or transferred to the new preparation assembly, and the complications snowball especially when he changes his mind a few more times, something that he—or the Any-to-Any system itself—may decide to do as a result of incoming data ("Oh! Joe is at the lake, no use emailing him there, have to fax him.") If there is only one document preparation assembly of Any-to-Any code components, and which fields are filled in and active and what they should contain are all controlled by separate data and condition records as will be described in the figures, then all that has to be done is to remove the email construction controlling record set and give the code assembly the letter construction controlling record set—nothing has to be done to the entered data and the code in use.

Hence a code Any-to-Any component is not built to shorten a specific line, it is built generically to shorten all lines anywhere. An assembly of Any-to-Any components is not made to create a specific document; it is made to create the data of any and all documents. An Any-to-Any component is not made to change the background of specifically a letter, instead an Any-to-Any component is built generically to change the background of anything anywhere in the Any-to-Any machine. In order to do that same thing to many data items at once, then, a lot of the same component are used at the same time.

Similarly, code assemblies are always constructed to handle types, never to handle instances. For example, if a Condition record is needed to check the presence or absence of data in certain fields, it is not created to do so just for email, which is an instance. It is created to check the presence or absence of data in any and every record everywhere, or to compare the data in any field A with the data in Any field B. Then which field it is to check this time, is controlled with another parallel record.

This is referred to as the Generic Construction Principle of Any-to-Any Construction which states that Any-to-Any structures are not created to handle instance, they are always created to handle types.

Colloquially, this is called the "Generic Construction Method".

The Any-to-Any system builder can detect when he needs to apply the Generic Construction Method. Whenever he finds two or more similar functions that need to be performed, he should realize he is looking at two examples or two instances of a type of something, and he needs then to stop and identify the type itself, then construct the code assemblies or sequence of independent code assemblies to transform the type itself, and then use data (such as Condition records and other mechanisms to be described) to tailor independent code assemblies to each different sub-type.

The language (as will be explained later to some extent) is a type machine and the Any-to-Any data machine is constructed out of unique meanings that are types and the code Any-to-Any machine is also a type construction as well—it is built out of parts and assemblies, each of which are also unique and each of which perform their planned transformation on one data type. If two assemblies perform the same action on different instances of a specific data type, they are not unique, and a One-to-Many machine has just been constructed.

3) Components May not Impose Hierarchical Use

Any-to-Any components must never impose the requirement to be used in a hierarchy—while One-to-Many components are intrinsically hierarchical in their use. "Hierarchical" as used here means a hierarchy of components in which one component depends on another in order to function at all. Thus a One-to-Many component such as a motor spindle depends on its motor component, or a CD component depends on a CD motor spindle in order to function at all—if there is no CD motor spindle, the CD does not turn and no data is read. However, an Any-to-Any component is "not hierarchical" in its use and so one Any-to-Any component does NOT depend on another specific component in order to function at all. "Not intrinsically hierarchical" in the Any-to-Any machine definition means that nothing forces the Any-to-Any components in the machine to be used in a hierarchy, though they can be used in a hierarchy if desired. Hence the fact that in an Any-to-Any machine ANY component can be used with ANY component in a manner that is NOT intrinsically hierarchical means that the components used are of such a nature and characteristics and features that they do not of themselves impose any need for any other data component in order to be used. So, for example, a binary 1 or 0 Any-to-Any component of binary code Any-to-Any machine has no automatic, built-in, enforced, can't-work-without-it hierarchical relationship with any other Any-to-Any component (zero or one) of the machine. In the Base 10 numeral Any-to-Any machine there is no automatic, built-in, enforced, can't-work-without-it hierarchical relationship between any one number 0-9 with any other Any-to-Any component (0 to 9) of the machine.

Because Any-to-Any Components must be able to be assembled or related together with other Any-to-Any components without needing any hierarchy at all with other Any-to-Any components, when this essential facet exists, it qualifies a structure to be considered as a potential Any-to-Any component of an Any-to-Any machine. But if a component does require any hierarchical or fixed relationship to another component (excluding the relationship to its environment as previously discussed), then this disqualifies it as an Any-to-Any component and is usually an indication that either the component itself is not an Any-to-Any component at all but a small One-to-Many machine, or that what it is being asked to relate to is not an Any-to-Any component but is a small One-to-Many machine. As soon as a structure requires a specific relationship to one of something else, it is not an Any-to-Any component or an Any-to-Any component assembly.

The requirement for the absence of any hierarchy between Any-to-Any components, particularly code ones, also imposes a requirement that one function may not be connected to another by code, as to do so immediately creates a One-to-Many machine—one lump of code, two functions. Accordingly, Any-to-Any components may not be connected or attached to one another by any weld-together mechanism such as a code connection between one and another (as is done in the state of the art One-to-Many software machines). There are two reasons for this, apart from the requirement to keep the Any-to-Any components completely separate from one another like marbles in a box. Firstly, code cannot be changed by ordinary users and so code used to connect things together is a non-user controllable relationship mechanism, but since humans create and destroy data relationships on the fly by their tens of thousands in their conversation every day, any pre-welded-by-a-programmer relationship method will never do much more than keep human users in a data straightjacket that allows them to wiggle their data fingers, but prevents them from doing anything else the programmer-straight jacket designer did not decide to allow and per the Unlimited Principle, language control will remain a pipe dream. Secondly, code connections between software functions or between software and data require trial and error and testing and therefore cannot be created on the fly, and hence, never will be able to be created destroyed or changed on the fly in response to human language commands.

4) Components can be Used in an Unlimited Manner

4) Any-to-Any components can be used in an unlimited manner whereas One-to-Many components cannot. For example, ten One-to-Many machine components such as tires or motor spindles cannot be used directly with one another of the same thing, but ten "1"s of the Any-to-Any binary code machine can be and so can ten "4"s of the Base 10 numeric Any-to-Any system—and so can ten "2"s, and so can ten fives, and so can ten ones. With an Any-to-Any machine component, "intrinsically unlimited" means that one can go on stringing components together virtually forever and they will still work. For example, nothing stops one from stringing the Lego Any-to-Any machine Lego brick Any-to-Any components together as long as there are bricks available to string. Any-to-Any binary code components of 0 and 1 could go on being written at the rate of millions a second from now to the end of time.

Any-to-Any system Any-to-Any components have to be able to be related virtually endlessly for several reasons. The first and most important of these, is that is exactly what the human does in relating meanings—he can—is able to—carry on stringing meanings together without even a halt for punctuation, and do so for a page, a book, or for all eternity if he so chooses. He does not so choose, but the point is not what he chooses to do, by what he is able to do, and then to build and ensure that the Any-to-Any machine can match and track with what the human is able to do and therefore with what the human may tell it to do. Hence the Any-to-Any computing system has to be able to string Any-to-Any components together without limit and since the Any-to-Any code components have to be able to act on, or on the basis of, individual Any-to-Any data components, they too need to be able to be related together without their own relating structure limiting the ability to do so.

But other reasons exist too, that also require the relating ability of Any-to-Any components to be unlimited. For example when a limit occurs in a machine, and when there are many limits, some form of menu is needed in order to communicate to the user either a) what the limit is and hence what machine can not do and hence, by inference what it can do or b) to communicate the things it can do (which is a menu). If a machine can do almost everything that could ever be expected of it, then language control is workable, and if it can do very little then menus have to be used. Thus a car's controls, or the buttons on a washing machine, are all a sort of physical menu that tells the user what the machine can do. The menus in today's One-to-Many software machines are not only "can do" communication mechanisms but also communicate "can't do anything else". In order to enable language control whereby the user could order whatever comes into his head, and to enable control of adequate functionality to at least be able to do what he wants and expects, and do it enough of the time for language control to be useful, it is necessary that the Any-to-Any computing system implements the Unlimited Principle which states that:

The computer must not limit the user in any manner that the human would not normally limit himself.

The Unlimited Principle is necessary as if the computer does limit the human in to any extent in any way that he does not limit himself, a) menus become necessary and language control cannot be used and b) out-of-sight computing—carrying on with execution of multiple and lengthy orders in the background without troubling the user at each step, just as secretary or employee goes away and gets on with it—is not possible as the user will unpredictably hit internal limits that halt its execution. For example, the software receives and detects a third mobile number for Joe Brown in an incoming email. But the address book only has place for one, so either the whole execution chain crashes, or the software ignores the new number and in human terms insists it does not exist, or creates yet another Joe Brown, which, if any of these were done by a secretary, would be considered insane behavior. This demonstrates the point that failing to follow the Unlimited Principle leads straight and directly to behavior that is insane by human standards, and since nobody can tell where every human will limit himself, the entire structure had to be without intrinsic limits. Lastly c) if there are limits—such as only one mobile phone per user as previously described, this results in problems of one description or another, such as creating two Joe Browns in the computer, when there is only one in real life, and all the attendant confusions and problems that will result from that distortion of the real-life situation.

Hence it is necessary that Any-to-Any data components and Any-to-Any data component assemblies and their matching and paralleling Any-to-Any code components and Any-to-Any code component assemblies can be related in an unlimited manner—in such a manner that neither they, not the mechanisms that relate them to one another impose any limits that the human would not impose on himself on the numbers of them that can be related.

The summary difference between rare Any-to-Any components that will make an Any-to-Any machine when in the right environment, and ubiquitous One-to-Many components, is that the latter, despite thousands of years of man's ingenuity and invention have not created an Any-to-Any machine no matter what environment they were placed in.

Because Any-to-Any components are so dramatically different from One-to-Many components and because these differences are extremely critical to Any-to-Any functioning, all Any-to-Any components will henceforth be referred to as ExoPonents, in order to distinguish them from their weak brethren, the One-to-Many components.

General Requirement A2, for an Any-to-Any Computing Environment

Describing generally now the second requirement (A2) of all Any-to-Any machines, examination of the common characteristics of known Any-to-Any machine environments indicates that either a suitable environment for a potential Any-to-Any machine ExoPonent cannot be built at all (and hence, no Any-to-Any machine exists) or, sometimes, several (often dramatically different) environments can be built or found for a given Any-to-Any ExoPonent type. Thus, whereas it always seems possible to build an Any-to-Any environment that enables an Any-to-Any ExoPonent to perform useful work, the reverse is not true—it seems impossible to build an environment for an essentially One-to-Many component that enables it to operate as an Any-to-Any machine and achieve anything useful. This indicates that it is the Any-to-Any ExoPonent and not the environment that is the defining element of an Any-to-Any machine, and the Any-to-Any ExoPonent's environments in which it will work, while important, are not the senior defining element of an Any-to-Any machine. However, an Any-to-Any ExoPonent will not work as an Any-to-Any machine without an environment to work in (of which there is often more than one that will work) and this defines that while the particular Any-to-Any ExoPonent type itself is the first defining characteristic of an Any-to-Any machine, it is the environment requirements themselves (and not the actual environment) that are the second defining characteristic of a particular Any-to-Any machine. By "environmental requirements" we mean those things that the environment must supply or furnish to the Any-to-Any ExoPonents in order for them to function as an Any-to-Any machine.

Any-to-Any machine environments can be very simple—one of the environments for Lego is just a flat surface to assemble the bricks on, and the environment for binary code can be just a pencil and paper. Any-to-Any machine environments can also be very sophisticated—such as a cell which is a sophisticated environment in which the genetic Any-to-Any machine ExoPonents (adenine, thiamine, cytosine and guanine) function as an Any-to-Any machine.

Explaining now environment requirements for an Any-to-Any data machine and an Any-to-Any code machine, generally speaking and first of all these are: 1) a storage/support mechanism enabling both code and data ExoPonents to be stored, identified and retrieved without otherwise relating them. The need for a storage structure may also or alternatively be a support structure which can support the Any-to-Any ExoPonents in such a way that they can be related, and 2) Any-to-Any relational mechanisms which are a set of relational mechanisms that are capable of relating Any-to-Any ExoPonents in such a manner that "Any ExoPonent or ExoPonent assembly can be used with any ExoPonent or ExoPonent assembly in a manner that is not intrinsically hierarchical and is intrinsically unlimited". Once related in an Any-to-Any manner (that is, without having imposed a hierarchy and without having forced there to be a limit to the relating that can be done) the Any-to-Any ExoPonent can then do useful work. In the genetic Any-to-Any machine for example, the environment (the backbone of the gene) both stores and supports the Any-to-Any components (Adenine, thiamine, cytosine or guanine) in any order—an order that is neither hierarchical nor limited—and presents them to the interior of the cell where they can hook up with constituents in the cell and so make proteins that then, between them, build everything else in the animal or plant.

The need for Any-to-Any machine components to have an environment to work in, that provides them with supporting services they need to function, should not be mistaken or confused with one component needing another component to function, which would disqualify it from being an Any-to-Any component. For example, Lego bricks need an environment of a horizontal surface in order to work (they cannot be assembled on a vertical surface without using glue or some other fixative that then constitutes a different environment) or without being supported by a person's hands that then, again, constitutes an alternative environment). The transistor Any-to-Any machine needs an environment to give the transistors physical support, connections to one another and electrical power—if a handful of transistors are thrown into the wrong environment such as a swimming pool, they will not function. What transistors need from their environment can be provided by a circuit board to which they are soldered, or by the radically different environment provided in a slice of silicon. The genetic code Any-to-Any machine needs the environment of a cell in order to function—injecting a soup of adenine, thiamine, cytosine and guanine into a cell will not achieve the results that genetic code achieves, and so on. But in all of these cases the components and parts of the environment are separate from and not part of the Any-to-Any machine itself, Similarly, the fact that data ExoPonents in the Any-to-Any data machine can use a grid storage system in order to be stored and related and computer memory in order to be physically supported, is just one of several ways of satisfying their environment requirement and should not be confused with their needing another component in order to operate. It is simply one of their possible operating environments, just as a cell is the operating environment of a genetic code, or a horizontal surface that of a Lego brick. Similarly, the fact that a code ExoPonent needs some other items such as a kernel, or a Controller Logic to conduct an orchestra of code ExoPonents, is not the code ExoPonent requiring another code ExoPonent in order to operate, but is just a way of supplying the Any-to-Any ExoPonents in the machine with the environment they need.

The general nature of environmental requirement of Any-to-Any machines is embedded in (the underlined part of) the following definition of an Any-to-Any machine which is defined as:

A machine in which ANY ExoPonent or ExoPonent assembly can be used with ANY ExoPonent or ExoPonent assembly in a manner that is NOT intrinsically hierarchical and IS intrinsically unlimited.

In this definition the only thing apart from the Any-to-Any components themselves is the environmental requirement, and the parts underlined in the above definition shows that the general nature of the environmental requirement of a code or data Any-to-Any machine is that the environment IS a relational system—a system to relate ExoPonents.

Illustrating this with the example of the Any-to-Any Lego brick machine, the ExoPonent is a brick, and the environmental requirements are 2 relational systems—a support surface, and a plug and socket relational system that is built into the brick itself. If the environmental requirements of the ExoPonent are not satisfied—for example, a number of Lego bricks or a few thousand zeros and ones are thrown in a bucket and shaken, there is no result. If their environmental requirement of the ExoPonents concerned is satisfied and they are given a relational system (which can be as complex as a cell or as simple as a piece of paper) they at once begin to work, just as binary code does when its components are laid out on a sheet of paper and viewed by a human, they construct numbers or representations of words or data and begin to "work".

The relational system that is the environment then, has to be a system such that it will relate ANY of the particular Any-to-Any machine's Any-to-Any ExoPonents or ExoPonent assemblies one to another in a manner that is a) not intrinsically (automatically and always) hierarchical, and in a manner that is b) always intrinsically unlimited.

While that is all there is to the environmental requirement of an Any-to-Any machine, judging from the fact that a) Any-to-Any machines have not been previously identified as a distinct and different machine type so far as can be found and therefore, their defining characteristics have not been available as a blueprint from which to create other Any-to-Any machines and b) very few Any-to-Any machines exist, it would appear that creating the Any-to-Any components, or creating the requisite relational system environment that is the other part of an Any-to-Any machine is non trivial and is not in the least self-evident.

More precisely, the environmental requirement is a requirement storage, support and for one or more Any-to-Any relational systems that enable the Any-to-Any ExoPonents of the Any-to-Any machine to be related to one another "in a manner that is NOT intrinsically hierarchical and IS intrinsically unlimited".

Hence, to be acceptable and qualified and usable as an Any-to-Any Relational System for use in an Any-to-Any machine, any one relational system must be capable of a) relating any one of the Any-to-Any machine's Any-to-Any ExoPonents to any one other of the Any-to-Any machine's Any-to-Any ExoPonents, b) must be able to do so in a manner that does not automatically create a hierarchy (not intrinsically hierarchical) and c) can be done without limit (i.e. is intrinsically unlimited). An environment may consist of more than one relational system, but it is clear that the sum of the relational effects of the individual relational systems making up the environment must be capable of 1) relating any of the Any-to-Any machine's Any-to-Any ExoPonents to any of the Any-to-Any machine's Any-to-Any ExoPonents, so that they can be related in ALL physically possible ways and still 2) be related in a manner that is NOT intrinsically hierarchical and 3) IS intrinsically unlimited. Hence an "Any-to-Any relational system" is defined as:

A relational system that can relate ANY ExoPonent or ExoPonent assembly to ANY ExoPonent or ExoPonent assembly in a manner that is NOT intrinsically hierarchical and IS intrinsically unlimited.

Study of this definition will show that in the Any-to-Any computing system the code that in the state of the art wires fixed relationships together between some data and other data and some data and some code, is replaced in an Any-to-Any machine by Any-to-Any relational mechanisms that between them (because they are never coded relationships) enable the user himself to relate anything to anything. In effect what this does is to place in the user's hands the computer equivalent of the pair of wires and plugs used by the old fashioned telephonist operating an Any-to-Any telephone switchboard. With the requirement for code to connect data together removed from state of the art software being replaced by Any-to-Any relational systems, only the actual data changes needing to be done to the data are left for code ExoPonents to do, and the complexity that arises from trying to connect data together using software code to do so, simply disappears as no longer necessary.

It also become apparent to practiners of the invention that what an Any-to-Any computing system—an Any-to-Any computer—really is, and all it is and everything it is, is not a computer as we think of it today, which is a fixed set of sometimes interacting, extremely complicated software engines and procedures leading to fixed results with defined and limited activities wired to defined and limited data, accessed in defined and limited ways—a sort of data and activity straightjacket. Instead the Any-to-Any computing system emerges as a system that contains (mostly) only the simplest code, and is mainly and mostly a dynamic, powerful and unlimited relationship engine (under the control of the user) for relating data (that is in a relatable format) both to itself and to activities (code) that are also in relatable format. That is essentially very similar to what a human does with data and activity.

The following strong cautionary note, which itself is a teaching of this invention in regard to the construction of the needed code ExoPonents and environment, needs to be thoroughly understood and applied, or success in using the invention may prove elusive. It was found that in constructing the environment to create an Any-to-Any machine, failing to apply the teachings of the invention 100% (or cutting corners) was the only real source of delay, excessive cost, or sometimes of complete but temporary failure to achieve Any-to-Any performance. The test Any-to-Any ExoBrain system proved to be unforgiving of the smallest departure from the teachings of the invention. The total flexibility of Any-to-Any performance appears to require total inflexibility in construction methods and very strict observance of quality standards.

The first of the two most frequently-encountered pitfalls arose from the fact that programmers have been trained, instructed and practiced the use of One-to-Many construction tools since their birth as programmers and have been trained, instructed and practiced that the more One-to-Many-like their constructions are, the more, efficient, elegant and praiseworthy they are, whereas for best human use, exactly the opposite is the case. Application of the ExoPonent Principle seems to them counter-intuitive, tedious, unnecessary, inefficient, space wasting, processing cycle wasting and generally wholly "wrong" in every possible way. The only setbacks and failures were due almost entirely to this irrational but often hidden resistance that frequently took two forms—the intentional but unauthorized introduction of unauthorized One-to-Many structures, or, grasping some small perceived benefit of Any-to-Any systems and then attempting to press this into service to add functionality to some unauthorized One-to-Many structure. This emotional resistance to practicing the invention is a management problem outside the scope of this invention that managers need to be aware of. The potency of this human element risk arises from the second and related pitfall which is that experience shows it takes only the tiniest, even a single drop, of One-to-Many Component virus or a One-to-Many relation mechanism color to kill the whole Any-to-Any lake or color it into inky obscurity and cause the ExoPonent fish to die or not function as they should. In other words, introducing a One-to-Many component or relationship mechanism, into a structure intended to be an Any-to-Any system is enough to prevent it working correctly as planned.

This effect occurs because One-to-Many machines—even a single One-to-Many component—prove to have a self-propagating effect, where the introduction of one One-to-Many component or micro machine, then requires another One-to-Many machine in order to control it and solve the problems caused by the first one. This self-propagating poisoning effect occurs in the following manner.

A One-to-Many Component is a structure in which one of 'this' is connected to one or Many of 'that'. Only one of 'that' is enough to make a One-to-Many structure because the one to one relationship IS a hierarchy and IS limited—both of the things that are fixed together,—the wire and the headlamp—can no longer be related individually to anything else because relating one, automatically relates the other. The problem self-propagates because as soon as one of this is related to even one of that, a second One-to-Many structure is needed to decide when to use the first part of the first One-to-Many structure and when to use the second part. This second One-to-Many structure in turn requires one or more other One-to-Many structures to deal with it. Very soon the initial; single One-to-Many component acts like a virus and converts the whole structure into a One-to-Many machine. The Any-to-Any characteristics that are sought prove elusive, and the practice of the invention proves very difficult.

Hence is a useful rule of thumb that if a problem is encountered in making something happen as it should in the Any-to-Any environment or resulting machine, the most probable cause is the presence of one or more unidentified One-to-Many structures or relationship mechanisms, or both, that has crept into the system through force of habit or worse, and that is causing the problem. The quickest solution is to search for it and eliminate it, by applying the ExoPonent principle to all the parts in question. After some experience at practicing the invention, the ability to "think Any-to-Any" starts to be acquired and spotting One-to-Many errors is easier. However, the apparent tediousness of Any-to-Any construction can engender a strong feeling of wrongness even in those who understand what they are doing and why. This cautionary note should also be born in mind in study of the remainder of the description as similar knee-jerk mechanisms due to past habits and training can easily distort understanding of the invention and it is necessary to be careful not to allow them color one's understanding.

Even though, in the state of the art there are no pure Any-to-Any construction tools such as programming languages, it proved possible for those skilled in the art to integrate and host a discrete small or large Any-to-Any system entity within a One-to-Many software host such as a One-Many Operating system host, just as the Binary-transistor Any-to-Any system live and work within the computer that is a One-to-Many machine host. This integration is not overly difficult because an Any-to-Any machine is flexible in every possible way and so can always adapt to the connections and attachments and inputs and outputs—the interface of the One-to-Many machine—whereas the One-to-Many machine is incapable of driving the Any-to-Any to any capacity beyond its own One-to-Many abilities. For example, One-to-Many display screen software proved utterly incapable, in practice, of being used to control an underlying Any-to-Any machine to do anything other than control whatever functions had been built into the One-to-Many items which was all it would display. This problem had to be solved by building Any-to-Any GUI code which could then use the Any-to-Any physical screen to enable the user to control the underlying Any-to-Any computing system via the very restricting One-to-Many Operating System. (Physical screens are Any-to-Any structures, as Any pixel can be used with (turned on or off) with Any Pixel in a manner that is not intrinsically hierarchical and is intrinsically unlimited).

General Any-to-Any System Requirement B1, Compatible Environments

Describing generally now the compatible environment requirement (B1), the first of the aspects needed for two different Any-to-Any machines to harmoniously interact in the same host so as to achieve something useful, the first requirement is that the environments that each require have to be compatible with one another, or the two sets of ExoPonents cannot work together to produce a result. Although there are only two identified examples of Any-to-Any systems from which to extrapolate (the binary/transistor system and the human's own data/activity system) from these it seems evident that the data Any-to-Any machine and the activity Any-to-An machine have to be able to work together in the same environment (as opposed to (for example) working in connected environments); this seems to be a requirement in order for an Any-to-Any system to exist.

For example, the environmental requirements of the Any-to-Any Lego machine, and the environmental requirements of the Any-to-Any transistor machine are not compatible in any respect and no Any-to-Any system can be generated by putting them together. But the environment requirements of binary code are compatible with those of the transistor, enabling an Any-to-Any system to be created by putting them together resulting in an Any-to-Any system that does virtually all computing in the state of the art.

In the case of this invention, as the detailed description will show, the environment requirements of the data Any-to-Any machine and the environmental requirements of the code Any-to-Any provide are compatible and actual test proved that to be so. The Compatible Environments requirement was met for this invention by a single environment which was a grid storage system and a basket of Any-to-Any relational mechanisms stored on computer readable media and executed by a desktop computers (the ExoBrain operating in a desktop computer was a test version that will later be described in outline). Most of the environment is able to constructed so as to be the same for both data and code Any-to-Any machines, and those parts of the two environmental requirements that are not the same for both Any-to-Any machines were able to be constructed so as not to be mutually exclusive.

General Any-to-Any System Requirement B2, Number of Any-to-Any ExoPonents in Each Any-To-Any Machine Describing generally now (B2), the second of the aspects needed for two different Any-to-Any machines to harmoniously interact in the same host is that both systems need to have the same effective number of ExoPonents. ExoPonents need not be physical things, they can also be states—in the Binary Any-to-Any system, there are two ExoPonents that are states that are expressed usually by "0" and "1", and in the transistor there are likewise two ExoPonents that are states—one and off. If the transistor had three states, it would be uncontrollable (or not very easily controllable) by the binary Any-to-Any system; if binary code was "trinary" with 3 states, it could not control the 2 state transistor too easily, or, most probably one of its three states would not be used. However, a 10 state transistor probably could be controlled by normal base 10 arithmetic.

In the case of the Any-to-Any machines constructed with the methods of the invention Requirement B2 was also met as the number of Any-to-Any ExoPonents of the required specification that can be used in each of the two Any-to-Any machines, is the same in both cases and is infinity. In the case of the data Any-to-Any machine, one type of ExoPonent is atomic indivisible meanings, and the human can and does invent new meanings at any time, and hence the number of data ExoPonents the Any-to-Any machine data has to work with is infinity. Similarly, since the human can invent new atomic single activities (code) at any time, and any atomic single activity can be copied and used as often as necessary, the number of Any-to-Any code ExoPonents the Any-to-Any code machine has to work with is also infinity. One could therefore say that both of these Any-to-Any machines are base infinity Any-to-Any machines—just as the human is a base infinity Any-to-Any data machine with his base infinity data handling machine harmoniously interacting with his base infinity Any-to-Any activity machine with its ability to do things.

General Any-to-Any System Requirement B3, Harmonious Interaction System or Method Describing generally now (B3) the system or method that enables the two different Any-to-Any machines to harmoniously interact, observation of the only previously known non-human pairs of harmoniously interacting Any-to-Any machines (binary and transistor) indicates that that they are enabled to interoperate with useful results as a system exists in the environment that matches or couples one of the machines to the other and this definition turns out in practice to cover the structures and methods that enable the data Any-to-Any machine and the code Any-to-Any machine to harmoniously interact and work well in the ExoBrain test environment.

In this invention, the harmonious interaction requirement B3 is met by Group IV relational systems of this invention (to be described later) that enable the Data Any-to-Any machine and the code Any-to-Any machines constructed by this invention to harmoniously interact so as to produce an Any-to-Any system (the Any-to-Any computer) that produces the useful result of a computer that operates on a similar basis to that which a human uses when handling his own data and activities.

Hence, the Any-to-Any human-computer system consists of an interacting Any-to-Any data machine and an Any-to-Any code machine and systems to coordinate their activity both with one another and with the human user, all interacting harmoniously in a mostly common and in any case fully compatible single environment. These two interacting Any-to-Any machines are not without precedent as they parallel and interact with one another in a fashion that is strikingly similar to the manner in which the binary code and the transistor Any-to-Any machines parallel and interact with one another. In the physical computer (the Binary-transistor harmoniously interacting Any-to-Any system) the Any-to-Any Binary system controls the Any-to-Any transistor system, and is acted upon by the Any-to-Any transistor system, so as to transform data expressed by the Any-to-Any binary system and produce a useful result.

Almost exactly similarly, in the Any-to-Any computer, the data Any-to-Any machine controls the code Any-to-Any system, and is acted upon by the code Any-to-Any machine so as to transform data expressed by the data Any-to-Any machine and produce a useful result. In operational use by a human, these two sets of strikingly similar systems (binary/transistor Any-to-Any system and the data/code Any-Any system to be described) working in harmony together are then paralleled by another system consisting of a third pair of harmoniously interacting Any-to-Any machines, namely the human's own Any-to-Any data machine and the human's own Any-to-Any activity machine—this latter being the human's own system of relating data to data and activities to data.

General Any-to-Any System Requirements C, Host Computer

Describing generally now Part C, namely the need for a host in which the Any-to-Any machines can harmoniously interact, there is no general rule for what constitutes an acceptable host for an Any-to-Any machine—it depends entirely on the nature of the machine and its environment requirements but Any-to-Any machines and Any-to-Any systems are generally not mono-host. The transistor/binary Any-to-Any system works in a computer, and in an embedded computer and in some instances in a $2 watch. The genetic code Any-to-Any system works in the cell of an amoeba and in the human brain cell—two different (though similar) environments.

In the case of the data Any-to-Any machine and the code Any-to-Any machine constructed by this invention, a computer can be used as a host—by "computer" is meant what we generally think of as "a computer" when we look at one—a case, screen, motherboard, power supply, memory chips, etc and their operating system. The data and code Any-to-Any machines can also harmoniously interact in other almost totally different hosts apart from a standard computer as we know it—for example, the Any-to-Any computer was tested and worked in a telephone (that has some things in common with that of a computer) and could work in an embedded computer in a car that has no screen at all, and very little else in common with an ordinary computer, or in a two dollar watch, which has virtually nothing at all in common with a computer, and could also usefully work in any hosts that do even minimal computing such as a printer, scanner, a camera or a modem, in fact any device that does some kind of computing. Such machines would benefit from having their computing and calculating parts constructed and programmed following the teachings of this invention, by becoming considerably easier to program, by becoming more easily human controllable, and by enabling any of the systems to talk to and control or be controlled by any another device constructed according to the invention (without data translation being required) while also enabling any of such systems, to control the other when connected (all as will be described later).

The above description teaches the general requirements to create an Any-to-Any data machine, and Any-to-Any code machine and an Any-to-Any system in a computer.

Plan of the Description

The description will now continue by teaching the methods of the invention to construct data and code so as to satisfy the described requirements A1, A2 and B1-3 and thereby construct an Any-to-Any data machine, and an Any-to-Any code machine in a computer and then make these harmoniously interoperate as an Any-to-Any computing machine meeting the needs shown in the background. In the following description Section 1) describes the ExoPonent Definition and the ExoPonent Principle that are methods to assist in correct ExoPonent identification and use. Section 2) describes the Data Any-to-Any machine ExoPonents. Section 3) describes the code Any-to-Any machine ExoPonents. Section 4) describes Group 1 relational systems that are those Any-to-Any relational systems that are common to both the data and the code Any-to-Any machines. Section 5) describes Group 2 additional relational mechanisms that are those relational systems that are only used by the Data Any-to-Any machine. Section 6) describes Group 3 additional relational mechanisms that are relational systems used only by the code Any-to-Any machine. Section 7) describes additional Group 4 relational mechanisms that are relational systems that are used to relate the Any-to-Any data machine and the Any-to-Any code machine together in such a manner that they harmoniously interact to make an Any-to-Any system. Section 8) continues describing Group 4 relational mechanisms—but in this case those relational mechanisms that are used to relate and connect the Any-to-Any computer to the Any-to-Any computing human so as to produce a human-computer data-activity system. Section 9) outlines the construction of the test ExoBrain to test a) Any-to-Any data machine construction and functioning and b) Any-to-Any code machine construction and functioning and c) Any-to-Any system harmonious interaction mechanisms construction and functioning.

The construction methods of the invention now being described are globally termed "ExoTech" and they where tested and perfected by using them to construct a test Any-to-Any system termed "an ExoBrain". From henceforth in this description "ExoBrain" means "the Any-to-Any test system built with ExoTech (the Any-to-Any construction methods of the invention) and used to test and perfect them".

Section 1, Any-to-Any Machine ExoPonent Definition and ExoPonent Principle

The ExoPonent Definition generally defines Any-to-Any data or code as:

"A data or code ExoPonent for computing purposes is a data or code structure that cannot be further disassembled without losing the entirety of its original meaning or function, and which also meets the four requirements of an Any-to-Any machine component and which can therefore be used with any other computing ExoPonent in a manner that is not intrinsically hierarchical and is intrinsically unlimited."

However, in order to actually apply this definition when constructing an Any-to-Any human-computer data-activity system—an Any-to-Any computing System—the ExoPonent Principle for use in computers the definition has to take account of the Individual Controllability Principle which states that:

"The human may wish to directly and individually control everything of which he is aware."

Hence, for use in an Any-to-Any computing system, the ExoPonent Principle is refined as follows:

In order to create an Any-to-Any computing machine, all data and all software must first be broken down into separate ExoPonents, so that further disassembly would loose the entirety of the original meaning, significance or function that the user might wish to control, stored separately and may then be re-used and assembled into any desired Any-to-Any structures by reference to the single stored original ExoPonent.

In terms of data ExoPonents the words "that the user might wish to control" refers to the individual meanings or other data (such as visual data) that he might individually specify at some time and in any manner.

In terms of code ExoPonents, the words "that the user might wish to control" refers to the single activity of a piece of code (such as the ability to turn a character bold, and another activity to turn a bold character into a non-bold character) that the user might wish to order the computer to do, at some time and in some manner.

The part of the Principle that states "by reference to the single original" is the part that allows the Any-to-Any computing system to avoid the computer having the data insanity of 1,000 John Browns who are maybe the same and maybe different. Because there is only ever ONE of anything in an Any-to-Any system, and therefore only ever ONE John Brown in an Any-to-Any system, and all uses of it are only references to it, no matter where John Brown may occur in whatever document, it is always possible to query "which John Brown is this?" and give orders such as, "call him at his holiday phone number right now" and so on. This is possible because arrangements can be made so that in response to such a query it is possible to trace back from the reference which is causing the screen display of John Brown to appear to the one original recording of John Brown (from which any other recorded information about John Brown will be traceably referenced). Having found the original record of John Brown, it can be shown to the user—thereby answering the question with (in effect) the response "it is this John Brown." Having found the right John Brown, other ExoPonent Assemblies can look up the necessary references to find an ExoPonent assembly that is an address that contains John Brown and 'holiday' and, having similarly found the reference for "phone number" it can extract that and give it to another ExoPonent Assembly that does the phoning. And if there are two different John Browns, it will "know" which is which as the particular reference incorporated in whatever the user is looking at will not be the same for both John Browns, even thought the screen display identically displays "Joe Brown".

While the granularity of storing all meaning as atomic meaning ExoPonents may seem tedious, it is less tedious than not being able to compute with meanings at all, and less tedious than not being able to control computers with language at all.

It should be noted that experiment has show it is possible to bastardize the ExoPonent Principle to some degree and still obtain some of the advantages it offers. For example, a semi-ExoPonent Principle structure was produced in which ExoPonents were used, but were not "stored separately and then re-used and assembled". Instead, the ExoPonents were stored directly in data records (resulting in many instances of the same data ExoPonent), which obtained all the advantages of using ExoPonents, without the advantages available from having only a single instance of each one. The invention should therefore considered to have been practiced where ExoPonents are used and advantage obtained from using them, even if the ExoPonent usage does not follow the best-mode practices laid out herein.

Section 2, Data Any-to-Any Machine ExoPonents

Describing the implementation of the ExoPonent definition and Principle firstly in relation to the creation of data ExoPonents for use in the system, the word "fax" will be used as example to show how words are turned into data ExoPonents of meaning type.

The word "fax" is not an ExoPonent but is a small, but quite sophisticated One-to-Many machine in its own right—just as all English language words are. It consists of several things, some of which are One spelling and Many (several) meanings. Following the teaching of the invention, the ExoPonent Principle is used to turn the One-to-Many assembly that is the word "fax" into separate ExoPonents and this will now be done in an illustrative and not an exhaustive fashion so to teach the ExoPonent Principle for use in computers. The word "fax" already referred to, has at least three meanings—(1) fax, the activity, and (2) fax, the piece of paper and (3) fax, the machine that sends faxes. Fax (1) the activity, has two separate atomic meaning parts a) activity and b) fax, (each of which are ExoPonents) and when used together, they make 'fax the activity'. Similarly, fax (2), the piece of paper, is composed of three atomic meanings a) matter b) paper and c) fax each of which are ExoPonents also. (One may suppose that "paper" is automatically matter, but this is not true as the following example illustrates "please paper the wall"—there is no physical paper being referred to at all in that request, where the word "paper" in that instance is an activity). Fax (3) the machine, is also composed of three atomic meanings a) matter b) machine and c) fax each of which are also ExoPonents . . . . None of these ExoPonents into which fax was broken down above can be further subdivided and still mean anything useful that the user might want to control and they therefore are ExoPonents. Matter is matter and Paper is paper and that particular meaning of "paper" cannot be further disassembled and still mean paper.

In each case, the "fax" that is left after taking the meaning of Matter or Activity or Paper or Machine out of the original full meaning represented by the word "fax", is not "fax" as we know it, but what might be called "essence of fax", which is termed a "Base Concept". Hence, a Base Concept is "that part of the meaning which remains and is common to a number of different assemblies of meanings." When there is a part of a meaning that is common to a number of different assemblies of meaning, all those meanings assemblies that have the common meaning are referred to as a "family of meanings". Because the Base Concept cannot be further subdivided without losing the entirety of its original meaning it is an ExoPonent. Accordingly the letters "f" and "a" and "x" as used above in the examples in which a given meaning is disassembled into ExoPonents (meanings 1, 2 and 3 above) in each case may be used to represent the ExoPonent which is the Base Concept and can be used to represent the spelling f.a.x. also providing the two are clearly distinguished in some manner.

A "Base Concept" is best described as that part of a meaning of a word that is common to all of one family of meanings of different spellings of a word. To illustrate this and describe first what is meant by a family of meanings: a word such as "fire" has more than one meaning family. There is "fire"—that which burns, "fired" that which was burned in the past, "firing", the action of setting fire to something; these three meanings have some similarity between them—they are all something to do with fire and burning. Because they do have a similarity—a family resemblance—they can be termed one family of meanings—they are all one family of "hot type fire" meanings. However, there is another and different family of meanings with the same spelling: there is fire—as in deprive someone of a job, "fired"—someone who has been terminated, "firing", the action of depriving someone of a job; these three meanings also have a similarity between them but it is not the same similarity in this "lost a job" family as it was in the first—"hot fire"—family of meanings and hence they form a second family of meanings. The thing that makes a family of meanings, is, that the family all has the same Base Concept. A Base Concept is illustrated and divined as follows.

Whether one person says to another "the wood is on "fire" or "the wood was fired" or "they are "firing" the wood", no matter which phrasing was used, there is some part of the meaning of each of those meanings that is common to all members of that family, and this ExoPonent meaning that is common to all the family of meanings is termed the "Base Concept". The human uses Base Concepts to relate each member of a family of meanings of a word to one another. The use of the Base Concept is often most clearly seen in the answers that are given to queries—questions—that one human asks of another as the following example illustrates. If one person says to another "I invited Joe", or says to the other, "I sent Joe an invitation" or says to the other, "Joe is invited", no matter which of those were said, if that other person is then asked, "has Joe been invited?" in every case the answer will be, "yes", even though each of the words in italics are different (as far as grammar is concerned), the Meaning Processing human considers them to be related. The "Base Concept" is the term for that part of the meaning of each one of a family of meanings that relates it to the other members of the meaning family as far as a human is concerned.

While Base Concepts have not been previously defined or taught as far as is known, they are a clearly observable phenomenon in human queries (as the above example showed) and therefore, the Any-to-Any computer needs to be set up to use them to relate meanings when the Any-to-Any data machine is dealing with language. The technology of processing language into meanings ("Meaning Processing") is outside the scope of this invention, but, a) the Any-to-Any computer ought to be able to process all ExoPonent meanings correctly and ought to be able to process language into ExoPonent meanings including Base Concepts, b) one of the most fundamental types of ExoPonent meanings is a Base Concept, and c) one of the most fundamental meaning relationship mechanisms is the Base Concept. For all these reasons, it is important to be aware of, and understand Base Concepts, and ensure that the Any-to-Any computer is so constructed as to be able to store them, and use them correctly to relate meanings in meaning families that are stored in the Any-to-Any computer.

The disassembly of meanings into ExoPonent Base Concepts is a key teaching of this invention and makes it possible to do things that are not possible and cannot be done in the state of the art. For example, using Base Concepts, it becomes possible to query a database containing entries with the different meanings of fax already described and ask: "what do we know about Joe's fax?" In the methods of the invention, all data, which includes queries, are broken down into ExoPonents before being used in the Any-to-Any computing machine, and so, the above query "What do know about Joe's fax?" is disassembled into a query for what records exist with Base Concept=fax, and Joe. A human, and in this case, the Any-to-Any computing machine would both effectively respond: "do you mean the fax we sent him (action), the fax we got from him (paper) or the one at his house (the machine), since querying for the Base Concept of fax, together with Joe, will result in returning all three recordings—that of fax the activity, fax the piece of paper, and fax the machine. However, if it was asked "Where is the fax from Joe" it would produce just one response, just as a human would, whereas a state of the art database would produce (insanely by human standards) produce all 3 records. This is another example that illustrates another way that Base Concepts are used by humans and shows that Base Concepts are clearly detectable in the human query process.

All the parts derived from the meanings 1, 2, 3 by applying the ExoPonent Principle each meet the four criteria for Any-to-Any Components described earlier and are therefore ExoPonents qualified to be used in the Any-to-Any computing machine.

It is not always true that it is one single word that is an assembly of several meanings. Sometimes, it is an assembly of what appears to be several words, or a phrase, that together as a unit have a family meanings as if the separate words were in fact joined together into one single long word. For example "New York" consists (the way it is written) of 2 words, and the two words as a unit, then have multiple meanings. One cannot divide the words into "New" and "York" and still have them retain any part of their original meanings—the separated words have other meanings, but have no part of their original meaning. Saying, "I am going to New", or, "I am going to York" has a totally different meaning to, "I am going to New York". Speech—how sounds are spoken—is the more primary transmission method and the written word is only a written representation of the sounds of speech. Almost nobody, for example, pronounces the city as "New (pause) York" and virtually everyone says "newyork" as one continuous group of sounds. "newyork" means one particular city or state and in fact "newyorkcity" and "newyorkstate" are each multi word (as usually written) "single words" that then have several meanings that are combination of ExoPonents. Hence, written spaces between words are to a great degree an artificial, reading-comprehension tool, that are not necessarily detectable in the sound stream of speech, yet the speech remains understandable. Common phrases sometimes express a single meaning and require to be treated in this manner, but again, further explanation is not included here as understanding and use of ExoPonent construction in language is beyond the scope of this invention.

For the above reasons, it is a useful rule of thumb, when formulating meaning data ExoPonents, and when several words appear to define a single meaning, to remove the spaces between them and then attempt to apply the ExoPonent Principle to them as if they were a single word.

Data other than words, is also broken down per the ExoPonent Principle until it meets the definition of an ExoPonent. Applying the ExoPonent Principle to a square as an example to teach how to do this:

A square is an assembly that consists of the following ExoPonents (the list is illustrative, not exhaustive):
  Four lines (each of which are ExoPonents), each of which has
    An orientation on a vertical axis
    An orientation on a horizontal axis
    An orientation on a depth Axis
  And then it further consists of qualities as follows
    The color of each line
    The thickness of each line
    The pattern of each line
      The shape of each line
    The color of the interior
    The pattern of the interior
      The transparency of the interior This method of breaking everything into ExoPonents initially appears to those skilled in the state of the art, as the wrong way to do it, tedious, unnecessary, and a variety of other adjectives that express their distaste for it and resistance to it. However the driving force for the requirement to disassemble common One-to-Many structures per the ExoPonent Principle (such as a square in this case) into Any-to-Any ExoPonents is the human Any-to-Any ability to handle and want to do things to every data ExoPonent individually and differently, even if these data ExoPonents are normally encountered in packaged form as in a word or a shape.

In this example, it is easily seen that if the human orders, "turn that left border pink, the right one blue and the top one pink and the bottom one yellow and turn the square sideways" then these individual commands can each be turned into records consisting of ExoPonents, and then those records can each individually be used to query the database and find the records containing the appropriate and needed code ExoPonents. Once the code ExoPonents are found, they can be handed to a kernel to execute and thereby execute the human's command in a simple and straightforward fashion. However, if the square is constructed as a single object (as it would be in state of the art One-to-Many construction method) then controlling the color of each border individually becomes a complex, code-bloating task. Even if that task is solved, the software has to be re-written newly (with further code bloat) for each and every other possible object that has borders—such as a decahedron, a box, or a line in a text—and since there can be an infinity of such objects the human can invent, the object-border-coloring-code has to be written in a infinity of times, which is an impossibility). And even if that is done, then the further question arises of how exactly is the user command concerning one particular line to going to command the right bit of code, and even if that is solved, how is that right bit of code going to weasel its way into the box of code that is the box, and find its way round inside the box and then do something to the right line? It is characteristic that with the slightest violated of the ExoPonent Principle, complexity mounts instantly. But when there is a single code ExoPonent that can set the color of a line, and all objects made up from lines or that contain lines, are disassembled into their ExoPonent lines and stored as (line) ExoPonents, it only takes one code ExoPonent to color any line anywhere, no matter where the line occurs—for example as one side of window frame in an architect's drawing of a skyscraper.

How the meanings expressed by language in different blocks of data are related to one another and therefore, depending on that relationship, how data ExoPonents need to be related to one another by the relationship systems of the environment, is the subject of Meaning Processing and is outside the scope of this invention. (Meaning Processing is defined as the subject of turning spoken language into computer-processable ExoPonents and correctly expressing the relationships between ExoPonent meanings in a computer processable form).

Section 3, Code Any-to-Any Machine ExoPonents

The ExoPonent Definition and the ExoPonent Principle are also used in the previously-described manner to assist in creating and testing code ExoPonents. Applying the ExoPonent Principle to "Software" as the term is used in the state of the art, shows that "software" is a highly assembled complex of structures consisting of three groups of things: 1) actual code that causes a change to take place—that enables a letter to change from one color to another for example 2) code that connects data together and 3) a surrounding complex of other things that are not code at all but are actually data that code uses or that control what the code does. The unnumbered headings in the list below are there for comprehension purposes, but the numbered headings the list below are those different types of things that are all lumped together under the term "software" in the state of the art. Only one out of eight of them is "software" in Any-to-Any machine terms, where "software" is defined as active code that changes data or that creates new data based on old data.

Input Data—In an Any-to-Any machine, this consists of data ExoPonents as already described above. This is information that the code acts upon.

1. Conditions that the code requires in order to execute successfully. "If this is clicked do that" is a condition for execution of the code.
2. Code—the actual code that does the manipulation—code that produces a specific change in input data, thereby producing Output Data.

Output Data—Input data as changed by the Code.

3. Label. Optionally a Label or Labels may be required to inform the user of the nature and type of the input or output data. A 'Label' is considered to be a short, cryptic description of something that is not itself the data being changed.
4. Prompt. Optionally a Prompt may be required to inform the user of the nature of the input data required and may be phrased as a question about something, or equally may be an instruction about something or information about something.
5. Help. Optionally Help may be required to inform the user of the nature of the input or output data, or to explain the user the nature of the input data required, or to explain to the user how to do something or to explain some other aspect of the operation. Help is sometimes within the code in the state of the art and sometimes separate to and outside it but referenced by it.
6. Communication In—a place and a system for code to receive instructions or data from other code or from the user.
7. Communication Out—a place and a system for code to pass instructions or data to other code or to the user.
8. Data Format—most state of the art software has its own data format which is the only format in which it will accept input and output data. In fact this is (or should be) nothing to do with code which should be occupied with making changes to data and not with dictating formats.

These eight different types of things are usually all assembled together into a One-to-many machine lump and called "software" but, are in fact all completely different kinds of things. With the exception of (2) Code, and (8) Data Format, all the remainder are all different types of data and in the invention, in order to create an Any-to-Any machine, these non-code structures are made up of data ExoPonents assembled into ExoPonent assemblies and then used for the specific intended purpose listed above. Because all these non-code data parts of what is normally called software (1, 3, 4, and 5) are data, absolutely any data the Any-to-Any data machine has available can be used if required. (8) Data format in an Any-to-Any system is code independent—all code ExoPonents are constructed to deal with data in one single format per data type—one format for meanings, one for images, etc and in each case, in the preferred embodiment, that is some form of a single record or grid reference for each ExoPonent. If there is more than one format per data type, as in the state of the art, then the insanities due to data in separate boxes as described in the background, is immediately forced in to existence.

Code ExoPonents consist only of code that performs a single transformation on data and specifically excludes any other type of thing (1, 3, 4, 5, 6, and 7 above) such as a Condition that might govern its action. To assemble a Condition and code together is to produce a One-to-Many structure (one structure two functions) in which the code cannot be used without using the condition (function 1) and in which the condition cannot be used without using the code (function 2) with the result that once again, the headlamp is dangling from the TV antenna. The entire point of an ExoPonent is that one single thing can be used without also being forced to use any other thing at the same time—the wire can used without having to use a headlamp and have a headlamp dangling off the TV antenna, and headlamp can be used without having a wife dangling off it—and the single reason for enforcing that discipline is that that is what the human does, and hence, a computer must do it too, if it is to fully track with its human master.

Hence, code ExoPonents are monofunction and are written to perform single user-useful functions such as to turn a line to a new color, add a line, add a circle, delete one single component reference, copy a value from one field in a record to the same field in another record—a useful function for either the user or the programmer depending on who uses that code ExoPonent. These pieces of code are all tiny and are termed Field ExoLogics and are generally 2-20 k in size, with each one performing a single useful action upon a data ExoPonent, such as, for example, detecting the presence or absence of a data ExoPonent that might, for example be needed in order for another code ExoPonent to act successfully. Just as all of life is controlled built from just four components, all computing is proven to be able to be done by combinations of very simple Logic ExoPonents such as these.

Between them, these two methods—the ExoPonent Definition and the ExoPonent Principle are the methods that are applied to data and code in order assist in creating ExoPonents usable in the Any-to-Any human-computer data-activity system.

Section 4, Common Parts of the Data and Code Any-To-Any Machine Environment

Those parts that proved to be part of a workable environment in a computing device for the Any-to-Any ExoPonents just described, that are common to both the data Any-to-Any machine and the code Any-to-Any machine are, 1) storage used by both Any-to-Any machines 2) Support medium (which is disk memory or RAM and requires no further description) and 3) those relationship methods to be described that (between them) enable any data or code ExoPonent or ExoPonent Assembly to be related to any data or code ExoPonent or ExoPonent Assembly in a manner that is not intrinsically hierarchical and is intrinsically unlimited.

Section 4, Part A2 Environment Requirement 1—Storage/Support Mechanism

Part A2 of an Any-to-Any machine covers environmental requirements of which the first part of the requirement is for a Storage/support mechanism. For the reasons to be described shortly, it is easiest to use a storage mechanism enabling both code and data ExoPonents to be stored, identified and retrieved while also providing a first level of Any-to-Any relationship method. The storage requirement has been successfully met with a grid-like storage format, such as a database or spreadsheet. In practice identifying the code ExoPonents needed and planning out the assembly of ExoPonents into ExoPonent assemblies is most easily done in the early stages (before enough of the Any-to-Any system has been constructed to the point it starts to operate) by using a 250 or so column spreadsheet (in the case that the Data r\elation Table (that will be described) is being used). However, once enough of Any-to-Any system is built, further planning and assembling can be done directly in the Any-to-Any system and another environment is hardly needed except to write and compile code ExoPonents.

There are many methods by which data ExoPonents and code ExoPonents could be stored and retrieved and it can be envisaged that different environments would use different methods. While has proven possible to construct a small (and quite useful) Any-to-Any data machine in a small grid structure such as a spreadsheet, for example, for use as a To-Do list, making an Any-to-Any system out of it depends on the abilities of the software creation tools available and in practical terms, in the state of the art, a database that is used in the manner that will be described is the preferred choice of grid-like storage mechanism in order to construct a general purpose Any-to-Any computing system using ExoPonents in a normal computer host. However, when using a state of the art database (as will be described) it is necessary to ignore virtually all the database's abilities, except that of its ability to store and retrieve data.

The support structure for the Any-to-Any ExoPonents needs to be a structure such that the ExoPonents can be held in such a way that they can be related in an Any-to-Any manner—that is, in a manner that does not intrinsically generate a hierarchical relationship of one ExoPonent to another and that is intrinsically unlimited (as many can be stored as required). In practice, the different types of computer memory—hard disks and RAM serve this purpose adequately.

Section 4, Part A2 Environment Requirement 2—Any-To-Any Relationship Methods

All the relational mechanisms used in the Any-to-Any machine construction in the preferred embodiment need to be Any-to-Any relational mechanisms. That means the relational mechanisms are capable of relating Any ExoPonent or ExoPonent Assembly to Any ExoPonent or ExoPonent Assembly in a manner "that is not intrinsically hierarchical and is intrinsically unlimited". An Any-to-Any Relational system also needs to relate ExoPonents without in some way fixing the ExoPonents themselves together in a non-user disassemble-able fashion, as if it did, it would covert ExoPonents into One-to-Many machines.

Section 4, Part A2 Environment Requirement 2—Relational Methods Overview

In an Any-to-Any system, all data in the Any-to-Any computer system is data that has been created (in one manner or another) by a human who assembles Any ExoPonent or ExoPonent assembly with any ExoPonent or ExoPonent Assembly in a manner that is not intrinsically hierarchical and is intrinsically unlimited. However, when he does this, he assembles one ExoPonent with another ExoPonent in a manner that means something useful to him, but never has, never can, and never will mean anything at all to a computer. To a computer whatever the human assembles is bytes and bits. The human assembles these ExoPonents and ExoPonent assemblies in specific ways and those specific ways produce a result that is meaningful for him. He could also assemble them absolutely every other possible way (if he chose to), but normally he does not. The relationship methods available in the environment have to be capable of capturing and recording the exact assembly (plan) of ExoPonents that the human has given him (in the form of multi-ExoPonent words). How exactly a human does assemble ExoPonents is the scope of language inventions or discoveries and is outside the scope of this invention; but the point as far as this invention and the Any-to-Any environment is concerned, is that since the human can (is able to) assemble ANY ExoPonent or ExoPonent assembly with ANY ExoPonent or ExoPonent Assembly in a manner that is not intrinsically hierarchical and is intrinsically unlimited, the environment has to provide mechanisms to be able to do exactly this too. Hence the purpose of the relationship methods to be described is to enable anything in the environment to be assembled with absolutely anything else in the environment. Provided the environment contains mechanisms for relating absolutely anything to absolutely everything else (assembling anything with anything) then it is guaranteed that the environment will be able to record any ExoPonent assemblies the human comes up with, since, if he has habits or patterns or methods to his assembly methods, then these are just a subset of the ability to assemble anything to anything. Should he chose to change his habits, patterns, or methods tomorrow, or use different ones because he happens to come from a particular island in the Pacific, that causes no problem as the environment (since it can accommodate and has mechanisms to be able to assemble Anything to Anything else) can therefore record his assemblies too.

A human actually transmits words, but then (in whatever manner) processes these and uses them as meaning ExoPonents. Part of his use of them is that the human relates Any ExoPonent to Any ExoPonent in a manner that is not intrinsically hierarchical and is intrinsically unlimited, and hence, the Any-to-Any computing system needs to be able to do this as well.

For this reason, the objective of the relational and assembly methods now to be described is to provide (as part of the environment) human-controllable data relationship creation and usage methods such that Any ExoPonent can be related to Any ExoPonent in a manner that is not intrinsically hierarchical and is intrinsically unlimited. These relational mechanisms need to be such that these creation and usage methods, when used together, appear to the user to work in the same but computer-equivalent way and with the same but computer-equivalent results as the relationship creation and usage methods that the human already uses instinctively (because has been using them with other humans since birth).

Hence, the Any-to-Any computing environment needs to provide ExoPonents with relational methods whereby: "Any ExoPonent or ExoPonent assembly can be related to Any ExoPonent or ExoPonent assembly in a manner that is not intrinsically hierarchical and is intrinsically unlimited" and the relational mechanisms provided need to observe the constraints necessary for an Any-to-Any machine to exist and work—namely, that the relationship methods provided must not force hierarchical relationships to be created and the relationships created by them must be able to be created by them in an intrinsically unlimited manner—able to be continued to be created without end.

The invention provides four Groups of relational mechanisms to achieve this.

Group I relational systems are assembly methods used by the Any-to-Any system or application constructor, and are not used directly by the user, who only uses them (unknowingly) by ordering the Any-to-Any system to perform activities that do use them. These Group I methods enable Any ExoPonent or ExoPonent assembly of either type (data or code) to be related to Any ExoPonent or ExoPonent assembly (data or code) in a manner that is not intrinsically hierarchical and is intrinsically unlimited. Group I methods enable data and code ExoPonents to mingled in different relationships that between them do all computing in an Any-to-Any system. Apart from being used unknowingly by the user as described, this group of relationship mechanisms are also used by application designers (who are often just an ordinary users doing an application design function) to construct applications in an Any-to-Any system. Application construction is done almost exclusively by assembling existing ExoPonents or ExoPonent assemblies together into a new assemblies (relationships) on a click and drag basis on the fly in the running Any-to-Any system. When the user saves the new construct, Group I mechanisms record all the newly constructed relationships correctly.

Group I relational mechanisms also provide the relational infrastructure needed to correctly record the structural relationships of ExoPonents in normal language, once ordinary language has been automatically converted into ExoPonents and ExoPonent relationships by a Meaning Processor—that can be either computer code or done by automatically using screens that are designed with an understanding of Meaning Processing i.e. an understanding of turning words into Meaning ExoPonents. Finally these mechanisms also enable a programmer creating user-controllable functionality to relate ExoPonents and ExoPonent assemblies together into ExoModules that transform data and create need infrastructure ExoModules such as the ExoModules and mechanisms needed to make the screen work on an Any-to-Any basis.

Group II and III relationship methods are operational relational methods used to operate the Any-to-Any system—as opposed to being used to construct it—and operate mostly on structures already assembled with Group I methods.

Group II relational systems are human-only relational mechanisms used under user control and enable the user to create and use relationships in the Any-to-Any manner to which he is accustomed.

Group III relational systems are code-only relational mechanisms and are mechanisms enabling code ExoPonents to execute and coordinate their activities between one another.

Group IV relational systems are relational systems that enable the data Any-to-Any machine and the code Any-to-Any machine to be related together so as to harmoniously interact and to produce the Any-to-Any system that produces a useful result. This group consists of the mechanisms that enable data to control code and to be acted upon by code in a similar way that the binary code controls transistors and is acted upon by transistors, and in a similar way to the way that a human receives incoming data and changes his activity (behavior) in consequence of it and also acts on that incoming data so as to transform it into something else.

Describing each of these in turn:
Section 4, Part A2 Environment Requirement 2—Group 1 Relational Methods,
1. Grid The first of the Group 1 assembly relational systems is the Grid storage and positional relational system. The test environment used one single table that was provided by a state of the art database used as a grid-like structure and storage system. Many of the services offered by the database were ignored (particularly its display services) and instead, these were constructed on Any-to-Any principles described herein. Additionally, the complex queries generated by Meaning Processing would have required querying the database with SQL (Structured Query Language) expressions 800-900 or more terms in length, and those would have been complex, difficult to maintain, and overly complex for users to modify. This problem was solved by creating an object-relationship query database (that is outside the scope of this invention but will be subject of a separate application) that was tested to over 28 million records and provided a previously unknown ability to process relationships. For example, the ExoBrain database—termed an ExoBase—stored ExoPonents and allowed relationships between any two complex records to be queried for similarity and relationships to other groupings of data. This novel and unique ability was necessary in order to process word meanings to enable a computer to be controlled with normal language.

A grid-like structure is the first and most basic of the relational methods that needs to be provided by the environment, whether it is a real or a virtual grid. In essence a grid consists of identifiable columns and identifiable rows whose identifications intersect to reference individual cells. (While the ExoPonent structure of language is outside the scope of this invention, the ultimate need for a grid structure derives from the fact that when the ExoPonent Principle is applied to language, it turns out that the resulting ExoPonents are classifiable into relatively few types, and many subtypes of those types. When the ExoPonent Principle was used to disassemble words into meanings that can be used to find data commonly existing in a general use in a computer today, or to order actions that a computer can do today, and these ExoPonents were classified by types of meaning, only five basic types of meaning data ExoPonent are found to exist.

These five types of ExoPonent were termed ExoPonent Data Categories. These five Data Categories of ExoPonent were found to be each divisible into many types termed ExoPonent Data Classes. However, for normal every-day office software type of usage, about 200 or so Data Classes (sub-types) proved to be adequate to specify most data or orders that would concern common applications. This discovery lead to the Data Relation Table (DRT) and its 200 (or so) column grid structure and dictated a grid structure as the most practical way to manage ExoPonents.

Secondly, when the language was analyzed in terms of meaning ExoPonents and these were classified in terms of types of meaning, four of the Data Categories were discovered to behave in such a fashion that a query for data from one Data Category could not be (sensibly) answered by data from another Data Category—a phenomenon termed Data Category Integrity. These Data Categories also turned out to be simultaneously usable—Any ExoPonent or ExoPonent assembly from one Data Category could be used with Any ExoPonent or ExoPonent assembly from any other and different Data Category. Often some data from each Data Category was used together. It was also discovered that one Category of ExoPonents did not obey any—not even one—of the rules the other Data Categories followed. This odd-man-out Data Category also paralleled any and all of the other Data Categories. As a brief example, the word "good" could be applied to every single word in this paragraph. Numbers behave similarly. Taking the words in this sentence one could say "there are 4 taking/s, there are 4 the/s, there are 4 word/s, there are 4 in/s"—and so on. Hence, just these little examples point out that it is both convenient and correctly representative, to place all other Data ExoPonents in one row (or record) and then this other type of ExoPonent (such as Good" or "4") can parallel the data row in another parallel row or record, such that each cell in the row doing the modifying (the row containing numbers for example) modifies the same cell in the row containing the data. In this system—termed "the field parallel relational mechanism", whatever is in a given cell (field) in one record is considered to concern whatever is the same cell (field) of another record.

This general method of one row paralleling another row, field for field, is termed the "field parallel" method for convenience and is an important basic method whereby one ExoPonent is related to another by relative position—it is a positional Any-to-Any relationship mechanism. Hence, it should be understood that the grid of the environment is in fact a positional relation mechanism as it uses position in the grid to relate ExoPonents and fields in a manner that is not intrinsically hierarchical (since any row can be related to any other row, whether or not it is physically next the other row) and is intrinsically unlimited since as rows can continue to be related as desired from now to the end of time. It should also be noticed that the method relates fields to one another without attaching their contents to one another physically and does so in a manner that is not hierarchical—since there is no attachment between them, there is no hierarchy, and neither one is made senior to the other by this method. Secondly the method is essentially unlimited—many rows (records) can be joined end to end by logical mechanisms, and columns can also be joined end to end. Hence, an infinite number of ExoPonents could be related in infinitely long virtual records and in infinitely long columns—basically in an infinity of columns and an infinity of rows. The point is not that there every will be an infinitely long record, the point is the relationship method does not itself impose a limit. Hence, if it is ever needed to create a 10,000 or a 100,000 or a 1,000,000 column grid in order to model the activity of a gene's genetic code, by placing one gene (an ExoPonent assembly) in one record (with each cell containing one of the four bases— adenine, cytosine, thiamine or guanine) in a protein and amino acid soup (expressed as ExoPonents and ExoPonent assemblies in other records) and then providing ExoModules that follow known rules of what combines with what, then nobody is prevented from doing that by any inherent limit in the relational structure provided by the grid. In practice several hundred different types of records have prove useful.

While language structure understanding provides the basic motive for choosing a grid structure, even ignoring language, the grid turns out to be a convenient basic relation-providing framework within which to construct the Any-to-Any computing machine, and is a relation system that meets the requirements all Any-to-Any relation systems must meet, namely that they do not impose a hierarchy between ExoPonents or ExoPonent assemblies by connecting them physically or with coded relationships, and there is no intrinsic limit to the mechanism—the mechanism can be repeated without limit.

Columns and rows in the grid are numbered rather than named—numbers are automatically ExoPonents. Rows or "records" (which are now no longer labeled by any a field names) may be of different types—i.e. contain or refer to different types of ExoPonents in their fields. Thus one row or record, might be a row or record of data ExoPonents while another row might contain or refer to a number of screen display ExoPonents and a third row might contain or refer to a number of code ExoPonents (called FieldLogics or ExoLogics). Yet another row or record might contain data ExoPonents being used as Conditions by the FieldLogics on a Field Parallel basis. Still other rows might be used to output the result of each field's FieldLogic's tests, and still another row of ExoLogics might test that output result, and so on.

Hence the grid consists of an unlimited number of different kinds of records, potentially found and related together on the fly, in which each record contains ExoPonents performing or used for one type of function only. Groups of such records working together perform software-like functions, and such a group of records might consist of FieldLogic records (called Execution Records), Condition records, Director records (that reference an Execution record in each field that say what to do next if their Condition in their same field of an associated Condition record is or is not met) and so on, all working together to product a given result. Such groups of records working together are together termed an ExoModule, not to be confused with other uses of the term "module" in other programming systems which tend to be gigantic by comparison. A BossModule is a single record or group of records that may be partly assembled on the fly that contains a mixture of references to data and Execution records that an ExoModule needs to execute. One BossModule can call or execute many other BossModules. In an Any-to-Any system most execution occurs on a field parallel basis (up and down the columns) as well as along the rows or records and both of these are facilitated by the grid structure.

Since the grid can be expanded (using mechanisms to be described) to have an unlimited number of columns and can of course have an infinite number of rows and has no intrinsic hierarchy, it is a useful Any-to-Any tool that facilitates the construction of Any-to-Any machines in a computer.

While the Any-to-Any system used a database in the manner being described as a convenient method for storing and retrieving code and ExoPonents and ExoPonent assemblies and providing a grid structure at the same time, a database is by no means the only method of providing a grid structure. For example, the same effect can be achieved in a compact and free form fashion by tagging each ExoPonent with a number that is the equivalent of a row and of a column number in the grid (just like a spreadsheet cell reference) and this creates a free-form but still structured (virtual) grid that is compact and hence potentially useful in micro-applications (such as a watch) where space is at a premium, or in an embedded applications such as in a printer or in a USB or wirelessly connected device where the data in it does not require much interaction with humans. Virtual grid structures are less easy to grasp, visualize and manage, as what is where in the grid is not visible. For this reason virtual grids are best prepared in a real grid, and then converted to a virtual grid by a reference translator. If the cell assignments are the same as in another by real grid (such as a database in the connected computer), then data can still be transmitted between the two just by translating each grid reference between virtual and real grids, without any need to translate the data itself. As a result the two devices could then easily talk to and control one another, in the manner to be outlined later.

Equally, and for other uses, a solid state ExoPonent environment could be built, in which the grid is a grid of memory positions in the device where ExoPonents are stored in the cells of the grid-structured device, that could contain the necessary computing and memory circuits, with needed data and code ExoPonents pre-burned into it, creating a complete micro-computer on a chip—an efficient arrangement for small applications such as phones or watches or the like can be made possible if data and code is in the form of ExoPonents of the invention.

Section 4, Part A2 Environment Requirement 2—Group 1 Relational Methods,

2. Administration Fields

Part of the grid or matrix, or database fields, usually most conveniently on the left for convenience sake, though they can be anywhere, consists of a section of additional columns that are termed "Administration Fields". Administration Fields could also be called "Data Control" or "Data Management" fields but are generally called "Administration Fields", and are used to record values that assist in the general functioning of the Any-to-Any system by providing another form of relationship mechanism. The Data Relation Table (DRT) uses some 50 Administration fields but the number is not fixed and the number of Administration fields can be adapted to the application in question. However, it is important if connectivity between Any-to-Any computers is to be maintained, that only one single and constant Administration Field set is in use by all of them. If different Administration Field sets are used then data transmissibility and usability between Any-to- Any computers using different field sets is reduced or lost. Because the DRT of enables any data to be recorded and correctly related in one single table, any data in such tables is usable across all Any-to-Any computers providing a) they are using the same DRT (high level field set) and b) providing that, where there is a choice of relational mechanisms (which then dictates a matching choice in Any-to-Any code ExoPonent assemblies top process them), the same choice is made in both Any-to-Any computers. Smaller applications can use subsets of the highest level field set because smaller subsets used by smaller devices can always be expanded to fill out a high level record set in a bigger Any-to-Any computer, and a comprehensive high level record can always be cut down to suit the smaller sub-set computer by selecting only needed fields. However if different field sets are in use by different computers, then it is no longer a question of just expansion and contraction of records but of translation—if that is even possible. At this time, the DRT is the only known mechanism that can theoretically enable a single table to usefully record all known data and, when used with language meaning technology (that is outside the scope of this invention) and with the relational mechanisms of this invention, theoretically it can correctly record relationships between all known data.

Administration Fields are also used to state values that are of use in handling or relating data that is in the record. For example, one commonly used Administration Field is "Record Type Number". Because the grid structure contains many different kinds of records, as will be shown shortly, it is convenient to number each record type so that, for example, a type 1 record contains references to user data ExoPonents and a type 2 record contains references to code ExoPonents in its cells—monofunction 10 to 30 Kb code ExoPonents—termed "FieldLogics". Then all data records are easily found as they are related to one another by having the same number—1—in their Administration Field's Record Type field. Another way that Administration Fields are used is by placing in them the record IDs of other records, in a manner that will be further described shortly, and this has the effect of having that cell point to another record. A third manner in which Administration fields allow relationships to be created is that whatever data appears in the Administration Fields (which are mostly not user-accessible fields) applies to, and is therefore related to, the whole of whatever is in the data fields, therefore creating a relationship between the contents of the data fields and the contents of the Administration fields so that the Administration fields become a description of the other (data) fields. There is no limit to the number of records types, sub-types and sub-sub types that can be designated and used as convenient and Programmer Note type records can be used to record the fact that a type 1 record is in fact a data record, a type 2 record is an Execution Record containing Field Exo-Logics and a type 3 record is a Condition Record containing condition testing data and so on.

Section 4, Part A2 Environment Requirement 2—Group 1 Relational Methods,

3. Label Records

In an Any-to-Any system it is necessary to avoid giving any names to database fields, or, essential not to use those names if they are given to the field. This is because naming the field and using these field names instantly creates a One to Many machine—just by the simple action of naming the fields— One set of field names, is welded to Many records labeled by it. Instead, in an Any-to-Any computing system, if the database demands to have its fields named, this demand is effectively ignored by giving the field numbers instead and then ignoring the numbers. Above all, code ExoPonents in the preferred embodiment do not reference any specific field number nor any specific field name as to do so welds that code to that number or name and completely prevents it from being used in any field as required, and prevents its use in generic execution records, where the same code ExoPonent is used in every data field of the Execution record. In other words, while this mistake can be made and resulting construction can still function, it will be considerably weakened by doing so and made into an entity that is very bug-prone, instead of being almost bug-immune as a true Any-to-Any code machine is.

Hence, in the preferred embodiment, from the database field names are replaced with numbers, the field "names" have no significance at all for the content of the data or code in a given record. Because there is no fixed label for the data in any field of the single table in use, the Any-to-Any computing structure builder is then free to create as many different records as he wants, and call each of them a "Label record". From then on, any one particular Label record can be displayed in the correct spatial relationship on the screen to any of the data ExoPonents from those particular data records that were created using that particular Label record.

Since ExoPonent assemblies can also be assembled with any other (ExoPonent or) ExoPonent Assembly in a manner that is not intrinsically hierarchical and is intrinsically unlimited, there is a requirement that all ExoPonent Assemblies must also be separate and individual and separately available, accessible and controllable. This applies to screen displays also, as will be described later, and hence, on an Any-to-Any system screen, Any ExoPonent can be displayed Anywhere, and in Any relation to Any other ExoPonent or ExoPonent Assembly in a manner that is not intrinsically hierarchical and is intrinsically unlimited. Hence, any part of any Label Record can be displayed on the screen anywhere, and in relation to any other ExoPonent or ExoPonent Assembly such as a data ExoPonent or data ExoPonent Assembly.

For example, if a Label Record is created that has in one of its fields, for example, "Name of Pop group", data records might be created using that Label record with values in that same field such as, "The Terribles", The Unbelievables" in the same field (of different records) for which that Label Record is displaying "Name of Pop Group". Another and different Label Record might be created having in that same field a Label such as, "Company Name" instead of "Name of Pop Group" and have other data records created using it, one of which has "IBM" and another of which has "Coca Cola" in that same field. By recording in a "Label" Administration Field of each data record the record ID number of the Label record (working on a Field Parallel basis) that was used to create it, unlimited virtual tables can be created within the single logical table in a manner than is not intrinsically hierarchical (as a relation database is) and is intrinsically unlimited (as a database is not).

Hence, many different Label Records and virtual tables of corresponding records each containing many different types of record can be recorded in the single logical table that is the homogenous computer equivalent of a person's homogenous memory. (This single mechanism is a key mechanism to get rid of data insanities noted in the background as being due to data being in separate boxes).

In each of their data fields, Label Records contain values that are there to tell the user what type of data is in the corresponding fields of the data record on a field parallel basis. In order to do this, "Label Records" exist as a record type, and are so designated in the record type designation Administrative fields. One of the Administration fields— which are common to all records and do not change their designation regardless of the type of record—is also called "Label field" and there can also be Sub-Label or Sub-Sub Label fields (columns) if required. Thus any record, such as a data record (a record containing user data ExoPonents) can have recorded in its own (Administration) Label field, the record ID of the particular Label record it uses. When the data is displayed, the Label record with which that data was recorded is used again and is displayed to label the data (instead of the field name that would normally be used with state of the art technology).

Because Label records are only data records after all, like any other data record, they can be translated on screen on the fly into different languages and then saved as new records with the language concerned being stated in the "Language" Administration Field. This Language field in the Administrative fields can then be used to select from a number of same reference ID label records (noted in the label field of the data record) the one that has the value of "Hindu" in its language field. This enables data to be redisplayed on the fly with a Label in the user's own language and this of course, enables different users to see the same data with different language Labels. That can be done automatically just by logging onto the Any-to-Any system, which has recorded in User Language type record(s), the language(s) the user uses, and so the Any-to-Any system automatically includes the value for the correct language in the language field of all searches it conducts to find Label and other language-related records.

Section 4, Part A2 Environment Requirement 2—Group 1 Relational Methods,

4. Relation by Type

It is an interesting and useful phenomenon stemming from the most profound meaning structure of language that a Label for a meaning creates a Type and a Type for or of a Meaning creates a Label. In this context the two words ("Label" and "Type") represent different uses of the same meaning. A label for a field that has recorded in it things like "chair", "table", "carpet" and so on, might be "furniture". But "furniture" is the type of thing that a "chair" is—a chair is "furniture". As said above, a Label creates a Type, and if a Type is known, then, that Type is a Label for everything of that Type also. This phenomenon, which is a basic phenomenon of the meaning structure of language, enables searches in an Any-to-Any system to be conducted by type.

For example, if one wishes to find all furniture, than a search is conducted for all records that use Label Record ID X, which is the Label Record that has the value of "furniture" in field Y. If one takes this further, then commands can be successfully processed such as "what renaissance furniture do we have?" To process such a query, a search is first conducted for data records that use the Label Record which contains the value "furniture" in its Matter Type data field. When those data records are found, just the found records are searched again to find those of the data records that are using (related to) a Quality Record which has the value "Renaissance" in the same Matter Type field. The result is that the correct answer will be displayed, "2 chairs, one table, and a feather duster". From there it is only a small further step to give an order to an Any-to-Any system "send our furniture stock list to Joe, but leave out all the modern furniture—make sure you include pictures of everything".

In order to understand this adequately to create the Any-to-Any data machine correctly and to provide the necessary mechanisms for its use, it is necessary first to clearly understand how a human specifies what he wants because how he does that is directly related to the functioning of meaning types.

If one person says to another the one word "MY" and nothing else, he is specifying an enormous meaning that covers an awful lot of things—my watch, my car, my house, my work, my parents—there are a huge amount of things that fall under the meaning of 'my'. So we have this little two letter word 'my' and the amount of things referred to by it is enormous and this tiny little word that is the symbol "my" is used to transmit a reference to everything in the universe that is "my".

However, the instant the speaker says "my" he is excluding everything in the entire universe which ever was or every will be that is not "my"—just by uttering "my" he has excluded an enormous amount of all data. Hence the human is using an exclusion process and when find is implemented in an Any-to-Any data machine, it needs to be an exclusion process not an inclusion process.

Now if the speaker were to have said just one (different) word such as 'friends'—that word on its own is an equally big meaning, because it includes my friends, your friends, the friends of everyone in the world and the friends of everyone in China and there are billions of those. Supposing everybody in the world has 4 friends, and since there are 6 billion people in the world, the meaning of the word 'friends' specifies 24 billion different combinations of people, and that is a big meaning. The one word "friends" excludes absolutely everything in the entire universe that is not "friends".

However, these meanings interact when the two words, "my" and "friends" are said together. Saying "friends" after saying "my" reduces the whole meaning of 'my' to just that part of 'my' which has "friends" as part of it. But at the same time, that part of whole huge meaning of "friends" has been reduced to just that part of the whole meaning of "friends" that also has the meaning of 'my' in it. In effect, 'my' or 'friends' have not been amplified or clarified or modified or described by adding the second word. In fact the exact opposite has occurred and each meaning has REDUCED the overall meaning of the other by excluding that part of the meaning of the other that does not include itself.

If further words are added so that the speaker says 'My New York Client Friends' he is then specifying just those things that are referred to by the operative meaning of each word that is also part of the operative meaning of each of all the other words used.

Because words, expressing meanings, reduce the applicable meaning of the other words by excluding that part of the other's meaning that is not applicable, this human specification method (method by which he specifies something) is termed the Co-Reducing Concept Exclusion Specification Principle, or colloquially, the "Co-Reducing Concept Principle" in which each new meaning added by the human (in the form of another spoken or written word) reduces the scope of the concepts specified by the meanings of all words previously used. This Co-Reducing Concept Exclusion Specification Principle is the general method used by humans to specify anything and everything in the following manner: The human continues to add meanings that co-reduce one another until such time as those co-reduced concepts specified by the meanings concerned now exclude everything in the entire universe that he does not want to be part of what is he specifying and what he is specifying, is whatever is left. The human does not usually say "where is the Daily Blah number 14994??" which is an exact specification—instead he uses a Co-Reducing Concept Exclusion Specification and says "where is yesterday's newspaper?". The meanings of "yesterday" and "newspaper" Co-reduce one another and what is left, is what the human is specifying.

As an example, consider "the running, jumping, swimming, walking horse". Out of all horses, some run, and some jump, but fewer do both these things. Fewer horses swim as well as running and jumping. Each added meaning reduces the scope of what was previously specified.

The Co-Reducing Concept Exclusion Specification Principle dictates the exact manner in which a find or a search engine has to be constructed if it is to operate in the manner the human instinctively expects (and therefore, be 'easy to use'). The search engine or find procedure has to be so constructed, that a human can keep on adding meanings, as many as he wants, until the resulting meaning excludes every other meaning he does not want and this has to be treated as an exclusion process so that each added word or meaning results in searching within the group of what was previously found and, if too many are found to be convenient, the user is questioned to add further meanings that search within whatever was so far found to further reduce the quantity. This procedure mimics the human methods visible in the following conversation. Boss to secretary: "Get me the letter to Joe, please." Secretary: "Which one? I have 50 of them." Boss "The letter (previous specification) about bananas" (additional Co-Reducing Concept Specification) Secretary: "Which one? I have 10 of those" (etc). This procedure is different to state of the art search methodology in which, if too many are found, the found set is discarded, and the whole procedure is restarted with the find being re-started and re-specified.

Finds in the Any-to-Any system are constructed in this human-mimicking manner, termed a "Co-Reducing Concept Exclusion Search"

For a human, types nest with one another but not on a cast-in-steel basis. So "furniture" is part of "all things renaissance"—it is a sub-type of "renaissance". But then, "renaissance" is part of "all things furniture"—"renaissance" is a sub-type of furniture" and, as the human uses meanings, anything can be a subtype of anything.

Hence when requiring to find, "renaissance furniture", the search would be conducted for "furniture" and the result re-searched for "renaissance"—or with any other term the human chooses to add so that the result dynamically adjusts as the human specification changes and additionally, without re-starting the search, the human must be able to easily add further words to his heart's content, because types function on the Co-reducing Concept Exclusion Specification Principle also. In the previous example of the "running, jumping, swimming, walking horse" every single term in that specification is a type and the type specifies a concept which includes any and every occurrence of that time that ever was or will be. The concepts specified by the types are Co-reducing and excluding parts of what each of the others, by itself, specifies.

The ability to search by type derives from an observable phenomenon of language, that language is a meaning system constructed by creating and using meaning types, in which meanings are grouped based on commonality of ExoPonents, and when so grouped, the group is named—and the name often then becomes a "word" and then that name is used to handle the group—exactly as described above for "furniture" and "chair". Because of this phenomenon, the Any-to-Any data machine works best if things are not recorded in it as instances, but as types wherever possible (and hence a more correct name for the Data Relation Table is a "Data Type Relation Table"). It also works best if constructed from the highest type downwards (Data Categories are the highest types) rather then from what is thought to be the lowest type upwards. It works best is the highest types are subdivided into as few Data Classes as possible.

For example, consider the state of the art practice to record specific instances and therefore to name a field "telephone number" to record telephone numbers. Now "a telephone number" is a type of something—it is a type of reference number for Matter—it references a matter thing—a physical telephone somewhere in the world. A matter reference number is defined as a series of characters that refers to and identifies something else that is Matter. (There could be reference numbers for other Data Categories, such as Times, Locations or Actions, if these were ever needed). It is likely that there are millions of different kinds of matter reference numbers in the world and probably, more are being created every day, and recording them on the basis of one field=one reference number type (which is what happens when one names a field "telephone" number) immediately and by that alone prevents one from recording Any data in a single physical or single physical table. Clearly tables with millions of different fields—just for reference numbers—are not practical. Hence this state of the art practice to record instances rather than types, quite by itself, prevents homogenous memory by imposing millions of tables just to record all reference numbers, before even starting to record other data.

The state of the art attempts, not very successfully, to semi-solve this kind of problem in a small way by creating another One-to-Many machine in the form of the relational database method in use today, which is a relationship method that is both intrinsically hierarchical and intrinsically limited and will not serve for an Any-to-Any machine where the relationship method has to be not intrinsically hierarchical and should be intrinsically unlimited. The Type relationship system, which is a computer equivalent of the Type system in use between humans, as seen in their language, is used instead and a number of mechanisms are invented to relate data by type.

One mechanism, and "telephone number" is a good example, is to pair or couple a data field with Type field. With this mechanism, a first field contains a Label such as "Matter Reference Number" (which is a type) and the second field contains a label "Matter Reference Number Type" which is the sub-type of that type. When a value in the Matter Reference Number field is being displayed, it used as its label, the corresponding value in the Matter Reference Number Type field of its record.

Thus one entry in a field labeled with (the type of) Matter Reference Number might be 1-213-213-2131 and the entry in the Matter Reference Number Type field paired with the Matter Reference Number field might be "telephone number". In the same field in another record, the entry in the Reference Number field might be 1111010ABC0010101 and the entry in the paired Reference number field might be "UPC code"; a third record might have AB1311344 and "passport number" in the same pair of fields. A fourth record might be a thumb print scan and "thumbprint", again in the same two fields, based on the fact that "a reference number" is defined (since everything in the Any-to-Any system is as generic as possible—i.e. the highest level type possible)—as "anything that identifies something else". In this way, any and every reference number that has ever existed, or ever will exist, may be accommodated by two fields in one table, instead of by twenty million plus tables.

The Type relationship system is also available in the grid through Label records (which could equally well be called Type records) and, as already described, any data record can be used with any Label record and hence the type of the data in each data field is related on a field parallel basis to the type of that data which is found in its related field parallel Label (Type) record. Note that Label (Type) records can themselves be related with the relation mechanisms now being described in this section and will inevitably be related in a hierarchy within a structure such as "an address". In "an address", the telephone number record will use one Label record, the street address will use another, the email address will use another and so on—there will be several Label (type records) in use in a multi-record data structure called "an address". By creating and using an Administration Field termed "Label Type senior" or "Senior Label Record", and using it to point to a senior Label (type) record (using a record ID as a reference) hierarchies of types that actually exist in life and language can be recorded.

The type relationship mechanisms provide the basic mechanisms needed to record what are termed Concept Hierarchies—hierarchies of types. Some brief examples of Concept Hierarchies are Action (highest)—move—travel—plane. Others are Action—move—travel—train; Location, Earth—USA—New York State—New York City—Wall Street and as a final example Earth—USA—California—Los Angeles. Concept Hierarchies are one of several relational mechanisms that allow an Any-to-Any computing structure to approximate. Approximation is an ability that is based on being able to detect that one thing is similar in some manner to another. This ability is ExoPonent based in a human and is also ExoPonent based in an Any-to-Any computing machine where one way it works is as follows. Suppose firstly that a record is recorded with ExoPonents that record Joe, Plane, Los Angeles. Then further suppose that the database was queried for the values Joe, train, New York—the equivalent of "did Joe go to new York by train?" A human, given the same data and the same query, would reply "no, he went to Los Angeles by plane"—in other words, if the query is not true, the human will return (reply with) the nearest thing that is true. This ability—termed "Return Nearest Truth"—in an Any-to-Any computer is implemented as an ExoPonent-based ability to approximate using recorded ExoPonent Concept Hierarchies (Hierarchy of Types).

Thus if the query ExoModule returns a negative—the equivalent of "no record for Joe going to New York by train"—this can be used to activate other ExoModules that look up recorded Concept Hierarchies for the ExoPonents in the failed query, and then, finding other members of the same Concept Hierarchies (in this case "Plane" is also an ExoPonent of type travel—"plane" is a member of the "travel" Concept Hierarchy; and Los Angeles is another member of the USA Concept Hierarchy), the ExoModule can automatically or when commanded to do so ("where did he go then?") construct and run combinations of queries that, in this instance, would return the record showing Joe, Plane ticket, Los Angeles. In other words the Any-to-Any computer could return the result, "No (the result of the first direct query), Joe went to Los Angeles by plane". If observed in a human, such a behavior, especially if done automatically, might be classed as "intelligent" but is basically an example of one definition of intelligence "an ability to tell differences, similarities and identities" (Hubbard)—and to tell similarities in this case.
Section 4, Part A2 Environment Requirement 2—Group 1 Relational Methods,
5. Data Relation Table (DRT)

The grid or table or freeform grid structure or database may use whatever highest level Label Record (and hence label values for the fields it labels) that best suit the designer's purpose more or less in the classical manner. The field Labels can be changed as necessary—there is, for example, little point in having a Label record with a value of "First Name" in an Any-to-Any computing system embedded in a car or a printer for example, but there would be every point in having such a label in an Any-to-Any computing system embedded in a telephone. However, there is a particular type of high level table that is useful because in practice it functions as a kind of computer Esperanto that Any-to-Any machines that record and use data can all use, and that enables them to use one another's data and more importantly, it enables data of any kind to be usefully related to other data, and automatically correctly related if a Meaning processor is used. This particular, Esperanto-like table is termed a Data Relation Table or DRT. The DRT is only one of an unlimited number of possible highest level virtual tables within the Any-to-Any computing machine (and can perfectly well be the only high level virtual table in it).

The DRT provides a field structure that (when used with the Any-to-Any relational mechanisms being described) enables any data at all to be recorded in a single table (thereby enabling the Any-to-Any computing system to have a homogenous memory and activity system that parallels a human's homogenous memory and activity systems). The DRT is firstly a particular set of field highest virtual table level names and secondly some particular record types that thirdly are related in specific ways, employing the relational mechanisms being described herein. The DRT is a table that uses these relation mechanisms to relate data in a way that allows any data to be recorded usefully, from human data to machine data. As one example, machine data such as needle instructions for a carpet weaving machine can be recorded by creating a "weaving" virtual table, in which each data field represents one needle. As a result, a carpet designer could design a carpet in a DRT and then have it directly execute in an Any-to-Any computer enabled weaving machine. As another example another high level virtual table that could be in the same Any-to-Any computer to do process control for a factory. Because records can easily be related (using the mechanisms being described) despite belonging to different virtual tables, language orders and physical processes can be related by a DRT and used to control physical processes in a factory, for example providing the necessary parts—such a Meaning Processor—have been constructed.

The DRT virtual table field structure is capable of recording a mirror image of the ExoPonent and ExoPonent structure of language. The DRT virtual table can contain an unlimited number of other virtual tables (using the ExoPonent-based Label/Type mechanism just described) within the overall DRT virtual table. The use of ExoPonents and the ExoPonent relational mechanisms of its environment give the DRT the data ability to relate Any data to Any data in the particular manner that is done by language itself, and hence to record usable ExoPonent images of language data and language instruction supplied to it, provided these are supplied in ExoPonent form. There are several ways by means of which language can be converted to ExoPonent form, both using screen-based methods and using at least two different ExoPonent-code based methods all of which are together termed Meaning Processing.

(Meaning Processing is defined as taking normal language and turning it into Any-to-Any machine-processable data ExoPonents and ExoPonent structures. Despite very competent efforts, and even with understanding of language meaning mechanisms, (which are neither grammar based nor commonly known) processing words as used in the language to turn them into the correct selection of ExoPonents proved impossible when using existing One-to-Many software construction methods. Just programming the needed combinations for the ExoPonents of only 5 words became impossibly complex with existing One-to-Many software techniques practiced by experts, as the repeated failure of multiple attempts to do so proved. However the Any-to-Any system is far more flexible than the One-to-Many methods that were being tried and are adequately flexible to process normally-spoken or written words into Meaning ExoPonents, such that the output is the correct meanings that are in use, correctly related to one another, using the relational mechanisms being described herein).

Language is the set of methods humans use to transmit information between one another using sounds or symbols. The only data or information that exists anywhere to transmit is information concerning either the physical universe or concerning Life—"life" being whatever else people can create or express that is not physical universe. Language expresses all data through individual (ExoPonent) meanings of individual words and these ExoPonent meanings represent data to the human. Hubbard remarked that the physical universe is made up from Matter, Energy or (Action in this context), Space and Time, and after that there is of course Life. Each of these Data Categories, as they are termed, are each types of something and are ExoPonents as they cannot be further subdivided and still retain any of the original meaning. Matter is matter and time is time and those meanings are indivisible into other meanings. Matter can be defined, described, measured and a lot of other things, but its meaning cannot be further divided into smaller meanings that together make up "matter". Hence these 5 types of Meaning are the highest level types of meaning there are, and all ExoPonent meanings fall into one or other of these five Data Categories that are the most fundamental functional Division in the DRT. Thereafter members of each Data Category can be classified or divided into subtypes called Data Classes that can also be further sub-divided, and doing this on the basis of Types of meaning can then reflect the Concept Hierarchies (types) in actual use in the language with the result that a type-based meaning scaling system can be reflected in the DRT. At the highest level the DRT contains all 5 Data Categories that between them can record all data and does so in practice by dividing the most frequently used types into easily accessible into Data Classes each of which are given their own field and are the types expressed by the highest level Label record in the virtual table of the DRT. Those meanings in a Data Category that are not given their own field are thrown into a single "Other" field in the Data Category concerned where they are paired or coupled with a Type field in the manner already described for Matter Reference Number Type. In summary, the DRT is a Type based relational mechanism that can record all data.

In practice, humans transmit multi-meaning words using protocols and multiple compression mechanisms and process these so as to select the meanings in use. Humans hear a stream of words, but understand a stream of ExoPonent meanings. The DRT is a structure that has functions that together are capable of correctly recording both words and ExoPonent meanings and the relationships of ExoPonent meanings as transmitted between humans—in effect recording in a computer a data ExoPonent mirror image of the language received from the human.

The real and previously more or less unknown mechanisms of meaning relationships in language and their computer equivalent, the DRT, are outside the scope of this invention and the DRT is not essential to the practice of the invention, though it can make the results of practicing it more spectacular. The main advantages of using a DRT high level virtual table as opposed to whatever Virtual Table structure seems like a good idea, is that the DRT a) enables the relationships in the meanings in the language to be related in a meaningful manner so as to correctly relate meanings in normal language and related them correctly to the actions that the language ought to cause and b) it acts as a sort of Any-to-Any computing machine Esperanto, in which all Any-to-Any computing devices (computers, embedded devices like printers or car controllers, or phones or watches) using the DRT can freely exchange and use on another's data and control one another without needing any data translation to do so; they may need automatic field/row/reference translation for different size tables used for different purposes (which is very easy to set up). In practical tests a micro-DRT-based Any-to-Any system in a cellphone and a full-size DRT-based Any-to-Any system in a computer pushed and pulled data to one another and controlled one another with ease and without data translation of any kind.

FIGS. 17 to 23 give a list of typical DRT fields that might be used for general office suite type of functionality and any Any-to-Any computing system designer who just uses the listed fields as the highest level Label Record (i.e. as the highest level Virtual Table in the Any-to-Any computing structure) without necessarily understanding them, will still be able to produce a system with a powerful and homogenous "memory", with many different applications in it, provided that he takes account of other teachings herein, and makes available all fields, so that the application designer or user can choose those fields where the labels seem most appropriate to what he wants to do and then re-label them and change their wording to make them more exactly reflect what he wants to do. The ExoBrain that produced the test results described elsewhere was based around a DRT used in approximately this partial fashion but still produced spectacular results.

Practical tests have shown that about 200-250 Data Classes are adequate for recording virtually any data of normally encountered in an Office Suite environment hand the various relationship mechanisms described herein make it possible to do so, in such a manner that the data can be usefully and easily and correctly found again and these and other mechanisms described elsewhere herein, make it practical to record any and all data in a single table mimicking the homogenous whole of a person's memory.

Section 4, Part A2 Environment Requirement 2—Group 1 Relational Methods,

6. Relationship by List Record Reference

As previously described, it is desirable only to have one original record of anything, and for all uses of that original to be made by referencing the original record. For example, when a telephone number is recorded, that is the only original ExoPonent in the record—and is the only example anywhere of that telephone number. That record acquires an ID number. The rest of the fields in the record (those not used for the ExoPonent itself) provide unlimited capability to record whatever further or other data may be required + to be recorded to further describe that ExoPonent (a telephone number in this case), either by recording that data in the telephone record itself or by referring to other records that further describe it, using the mechanisms being described herein. When that telephone number is needed again, for example in an address book, that record is retrieved, and then the one field of the telephone number record that contains the telephone number is displayed on the screen, while the rest of the screen displays whatever other fields from other records are required. All that is required is to have a list record that simply lists all record IDs that are part of the address, and to include the record ID of the record containing the telephone number in that list in an appropriate manner. When this method is used, one Administrative Field called Key Field can be used to state which field it is that contains the data (as opposed to all the other fields that may contain data about the data in the Key Field. An alternate, purer and therefore better method is not to use any other fields than the ExoPonent itself uses and instead, to accompany the ExoPonent Data Record with a Field Parallel About record that can be used to state whatever is wished About the data record concerned. In this case an About field is placed in the Administration Fields. In the About record, the About field lists the record ID of the data record it contains data describing. In the data record, the About field contains the record ID of the describing About record.

In this manner, a single record can be referenced using its record ID in a list record or elsewhere and can have its ID referenced by other records, one or a million times, while at the same time there is only ever one instance of that number anywhere—all uses of it being references to it.

List records are an important mechanism needed to make this single ExoPonent recording workable and this is related to how the single original ExoPonent is displayed for the user.

In order to have a fully functioning Any-to-Any computing system the preferred embodiment is to construct the screen displays as Any-to-Any screens—screens capable of displaying Anything, coming from Anywhere in the Any-to-Any computing system, displaying Anywhere on the screen as was done in the tested ExoBrain. If that is done, then whenever it is required to actually display a phone number, the original record with the original phone number in it is retrieved and the required part of the record (the one field with the phone number in it) is displayed on the screen. Depending on the particular Any-to-Any screen structure that is given the data to display, the data will look to the user like "a letter" or "a spreadsheet cell"—or look like anything else for that matter—for example, like a photograph that has phone number on it. The data that is being displayed does not change, only the arrangement of the data on screen, and no matter how many times that number appears anywhere, there is only ever one instance of that particular ExoPonent.

In this manner, a person can have one or a thousand telephone numbers and telephone numbers can be added "in a manner that is not intrinsically hierarchical and is intrinsically unlimited." Since the screen display machinery is also an Any-to-Any structure, it can display Any field in relation to Any field "in a manner that is not intrinsically hierarchical and is intrinsically unlimited" and therefore, if an address assembly already has 4 telephone numbers, the View Exo-Modules simply move things around on the screen and make space for a new telephone number field using an ExoModule called "AddAnother" to do so. AddAnother, which is generically built like all functionality in an Any-to-Any system, can therefore AddAnother of Anything to Anything, Anywhere. What AddAnother actually does, in outline, is 1) copies an existing blank telephone record, including is associated Prompt, Label, Help, and View control records, 2) adds those to the List record that lists telephone number records—a List record that is itself listed in the highest level list record, listing all the records that are part of that address, 3) tells the User View ExoModule to redisplay. 4) The UserView Module tells the CoordinateCalculator ExoModule to recalculate what now goes where on the screen based on the user's previous (and recorded) instruction that he has in fact given by dragging things around on the screen, and hence 5) the new extra telephone number field appears on the screen together with its associated paraphernalia of Prompt, Help and so on. The user can add another telephone number or another 1,000 telephone numbers—he is not limited in how many phone numbers he can have in a given address record, nor is he limited as to how many addresses he can have for one person. Part of the ability to do this is that the Any-to-Any system's equivalent of window in the state of the art is not limited to screen size, but can be made as large as required and can itself be scrolled in any direction on the screen, and its contents can also be scrolled.

The highest level record that identifies a particular ExoPonent assembly such as a particular "address" or a particular "letter" will contain the record ID of a List Record that itself lists the record IDs of other List Records it uses, such as a List Record for listing phone number assembles and a List Record for listing address record assemblies that themselves contain their own lists. It is not necessary to back reference the records however—the records that are used in such assemblies do not need to know (retain a list of) which assemblies they have been used in. If the user wants to know, for example, everywhere that a certain telephone number appears, it is sufficient to use the phone number's record ID to search List and Data Records to find all records in the which that telephone number's record ID appears, then call the View Module that is referenced in the List Record that lists the records making up the item, and the View ExoModule will then display the items for review. When several records are to be displayed, the View Module can either operate in List (tabular) mode, or in OneAtATime mode (showing one assembly at a time) depending on which ViewModule the user chooses to control the display.

Section 4, Part A2 Environment Requirement 2—Group 1 Relational Methods,

7, Spatial Data Relationship Mechanism

The Spatial Data Relationship mechanism takes advantage of the fact that if one thing Is placed next to another on the screen, the human considers them to be related even if they are not. For example if the words "telephone numbers" are displayed next to some boxes showing numbers in what the user considers to be an address screen, the user will assume the numbers concerned are telephone numbers even if they are not. If the very same exact single instance of the words "telephone numbers" appears in the center over a paragraph of text in a letter the user will assume it is a heading and that the forthcoming paragraph is going to discuss telephone numbers. If the exact same instance of the words is displayed next to some boxes showing numbers in what the user considers to be an address screen, and the numbers actually displayed are UPC bar codes, the user will assume that the bar codes are some strange kind of telephone number even though they are definitely not. Hence by correctly displaying any given text with a specific and meaningful spatial relationship to any other specific data, the Any-to-Any computing machine constructor can use the Spatial Relationship method to visually create a relationship in the human's perception that does not in fact have to exist in the underlying data structure. In the example above, the single phone number has no fixed relationship to anything at all except the record in which is it recorded and that is only an environmental container for it. It may be related to many things by the mechanisms being described, but because it has no fixed relationship to anything at all, it is completely free to be related to anything at all, which is a basic principal of an Any-to-Any machine. And, one way it can be related is by using the Spatial Relation Mechanism, and—for example—displaying the field where a phone number should be entered in a specific spatial relationship to a displayed field of a Prompt record that says "Enter a phone number here".

A frequently used record type that is needed in this instance is the WhichField record type that is frequently used in a field parallel manner to many other records to designate which field or fields of the record with which it is presently associated is to be used or not used. A WhichField record could be used with the Telephone number record when that telephone number is being displayed as part of "an address", and would simply mark with an X or some other symbol the particular field (the one containing the phone number itself) that is to be displayed. Generic ExoModules with the same FieldLogic referenced in every field, use suitably marked WhichField records as triggers to activate the FieldLogics in particular fields and this applies to ViewModules also, so that a WhichField record can trigger which fields of a record or record label are, or are not displayed. Changing on the fly the WhichField record a ViewModule is using—without changing anything else—will change the screen display on the fly also. In the Any-to-Any system environment, the WhichField record is a widely used mechanism that enables any selection of fields from any record to be used and is key to enabling generic (type-handling) ExoModules and thereby greatly reduces the quantity of code without reducing functionality. It is also key to making the Spatial Data Relationship Mechanism workable.

Section 4, Part A2 Environment Requirement 2—Group 1 Relational Methods,

8. Cell Points to a Record

When it is needed to expand a cell in a record—to say more about whatever ExoPonent is in a cell in a record, such as to say more about the First Name of John ("in 1892 the first name of John was commonly used by religious persons . . . . Etc") then a cell in a record that is field parallel to the data record concerned can point to a single record point to a ID of a record that is a list of record IDs. In an Any-to-Any system environment, one structure should never do two things (to do so is to violate the ExoPonent Principle and thereby to create a One-to-Many machine—One cell, Two things it does—and thereby invokes all the many previously-described problems attendant upon One-to-Many structures). Instead a MoreRecord is used if the field is to be expanded by a single record and a MoreList record if it is to be expanded by a List of Records. The record reference in the MoreRecord record will contain up to one record ID in each field, while the MoreList record will contain the record ID of a List record that itself has in its data fields the IDs of Data records that say more about or add to the field in the data record that the cell of the MoreList record is field parallel to. The reference to a data record can be processed straight away—that record can be found and used, but a list record cannot be. The list record has to be found first and then each of the members on the list found, and then each of those processed in turn.

The effect of the Cell Points to a Record Relation Mechanism is that a single ExoPonent referenced by a singe cell—a single atomic mono-meaning—can have an infinity of things said about it (related to it) using a MoreRecord or a MoreList record, while the effect of the Relationship by Cell Reference combined with the WhichField record is that the single ExoPonent referenced by any one cell can be referenced by (say things to) an infinity of other structures. Visualizing the effect, the result is that all data becomes multiple superimposed hour glasses in shape, with the pinprick of each single atomic meaning ExoPonent at the center of its own hourglass of related data, with all data below it in the hourglass being data about the ExoPonent, and all data above the center of the hourglass, being data in which that ExoPonent appears. So the Any-to-Any machine is a kind of infinity-relationship machine also.

Section 4, Part A2 Environment Requirement 2—Group 1 Relational Methods,

9, A Field can have a Record of its Own Type.

A Virtual Table has so far been described as a group of records all using the same Label Record. A Virtual Field is all the cells in a specific column of each record in a Virtual Table—i.e. in all records that use that particular Label Record. Whether or not all the records in the virtual table appear consecutively in the physical table or not, is not important or material. Any one field (i.e. each of the Virtual Fields in a given Virtual Table) can each have a record of their own type. For example, a field such as a Label field can exist and that field can have a record which is of its own type—a Label Record. When a field has a record of its own type, then all data found in its fields is data of that type—the type which the record is.

Any selection of records that have ExoPonents in common also create their own Virtual Table (even if they have no Label Record to go with them). Every such record selection type may have its own accompanying Label Record for that type, to say what data is in each field of the chosen records—effectively re-labeling it—which points out that a given record can use more than one Label record at different times.

This points out that the broader and more correct definition of a Virtual Table is: any set of records that share any combination of ExoPonents or ExoPonent references in common.

A Label Record is a good example of a field having a record of its own type. Administration Fields in every record contain a field called Label, which is used in data records to reference the record ID of the Label record that the data record uses to label its ExoPonents when they are displayed by the Any-to-Any View display ExoModules. At the same time, there is also the Label record type, which is an example of a field having a record of its own type and all the data in it (ExoPonent records referenced by it) are used as Labels. Since Any data ExoPonent can be used anywhere, any data ExoPonent can be used in any field of a Label record, and hence, in effect, any ExoPonent can therefore have a field of its own type. Since a Field can have a record of its own type, it follows that any ExoPonent can have a record of its own type.

Finding and Viewing all the records of a specific type can be useful. For example, viewing all Label records (i.e., the whole Label Record Virtual table) may be useful to enable Concept hierarchies to be arranged and checked. Retrieving all the timing records of one particular Virtual Table containing a record type which gives successive times in separate fields (or successive torques or something similar) may also be useful.

There are many instances in which the mechanism of giving a field (which is itself a type), a record of its own type is useful and one particular one is the case of quality records. Quality is one of the DRT fields and is a Life Data Category Data Class. A Quality is something that humans consider exists, but that would not exist if there were no people on the universe. Good, Bad, blue, are all qualities. If there are no people, there is no blue—there is a wavelength to which we ascribe the quality blue, but there is no such touch it, feel it, kick it physical universe thing as blue. Any and every ExoPonent can have one or more Qualities and therefore the easiest way to deal with this is to have the Quality Administration Field contain the record ID of the Quality record whose fields parallel each of the cells of the data record. The cells in the Quality record can then either reference any record ID of an ExoPonent that is then doing duty as a quality or reference the ID of a list record that acts as a list of ExoPonent records that are doing duty as qualities, all of which are applicable to the field that the List record is parallel to.

A type of something—for example a "Start Time" can be used in the grid as a field only. Alternatively, a type that could be a field can instead be used as a record only or as both a field and as a record (which was the case of the Label Record just described). The extension of this is that an Any-to-Any system grid or DRT can be made narrower (but deeper) by eliminating fields and using record types instead or can be made wider and shallower by eliminating record types and using extra fields instead. For example, the field that would normally contain a reference number such as a phone number can be eliminated and a reference number record type used instead and then the Reference number type field can be removed, and a Reference Number Type record used instead and then used field parallel with the Reference Number record to say what kind of reference is in each cell of the Data record. Alternatively, a Reference Number record can be created, in which suitable fields contain the Reference Number and its type and the rest of the record is treated as containing data about—describing—the Reference Number. The choice is largely a matter of how many of that thing are likely to need to be recorded for an individual data record and whether the data to be recorded needs to be used field parallel with something else—if it does, that dictates that there needs to be a record of that type, whether or not there is a field of that type.

Not all record types need a field of their own. For example, a WhichField Record is a record type and works field parallel with other records in other fields, but it may not need a field of its own, unless one wants to use such a field to list the particular WhichField records to use.

Some record types can be made into fields and the record type eliminated and the field used instead—it really depends how much data is likely to occur in that field, because if more than one entry is demanded in a field, then ExoModules have to be used to create on the fly either a More record or a MoreList record to put it in and if this happens very frequently, unnecessary processing overhead is added.

Whether a DRT or storage grid is made wide or narrow using these mechanisms is a design choice to suit the intended application, and all that is really required is that the code ExoModules have to be structured accordingly (since code ExoPonent structures mirror the structure of data structures) so that the code ExoPonents are correctly related so as to act on the correct data ExoPonents with which they are paired.

With these mechanisms an Any-to-Any system can be made wide and shallow or thin and deep, as one might require in a small application such as a phone. However, if using a DRT as the data table structure, then small DRTs are only subsets of larger DRTs. It has been demonstrated and tested that a small DRT Any-to-Any system in a cellphone can control, or be controlled by a larger DRT in a computer, since data can be freely transmitted between them and used. The larger DRT simply has a Fields record (sent by the phone) which tells the larger DRT which fields the smaller DRT has, and then the TransmitData ExoModule, when it prepares the DRT records to be transmitted, looks up the phone's Fields record and only transmits those fields that the phone has in its DRT. When the phone sends to the larger DRT, the receiving Any-to-Any system used the same Fields record to see which fields it has received, and expands the received records to the same size as its own records by adding the fields that are missing.

Section 4, Part A2 Environment Requirement 2—Group 1 Relational Methods,
10. Record Joining Mechanisms.

It is sometimes necessary in order to accurately replicate the structure of the relationships in the language and for other purposes, to be able to join one record to the next both in a horizontal fashion or in a vertical one or both at the same time. Records are joined together horizontally—doubling their length each time—using Administration Fields called Next H and Previous H (Next H meaning Next Horizontal record, and Previous H meaning, Previous Horizontal record). In this way each record records which record it is connected to and which record is connected to it. The same principal applies to joining records vertically using the fields Next V (next record vertically joined) and Previous V (the record above to which that record is joined vertically). These mechanisms have several uses. For example, a data record that has been named by the user in the User Name For This Administrative Field can be joined to a Next V record of record Subtype Grid, and in that sub-type, each cell in the Next V record is an Next H cell referencing a record to be used horizontally. The result is to a Named virtual grid.

If that Virtual Grid is paralleled by another one, some of whose cells display numbers, and is paralleled by still another grid recording background colors for squares in the grid, when the result is displayed, it looks like a crossword puzzle. However, it is one that can be played collaboratively. It can also be played differently, with players designing clues on the fly, which the other player solves. Puzzles of this nature were easy to create in the test ExoBrain. If on the other hand, the same grid was given a name in its founding record, of "$3^{rd}$ Quarter budget" and paralleled by a mirror image set of ExoModules, and displayed, it would be said to be a "a spreadsheet", though one which would never run out of records or fields as AddNextV and AddNextH ExoModules would automatically add on more records any time the user got short of space. Using List records, the "workbook" could have one or a thousand sheets, but they would all be stored in the Any-to-Any database or ExoBase (a database specially designed for Any-to-Any purposes).

It proved easy to push and pull data transparently between ExoBrains. To do so it was only necessary to click a button on the data item concerned and then choose which ExoBrain/s to send it to or try and get it from and equally simple both to publish anything on the ExoWeb (make it visible to an other ExoBrains that went looking for it and to enable ExoBrain users to collaborate on anything in an ExoBrain) and to collaborate on it. "Collaborate" in an ExoBrain just means transmitting the record/s concerned to the other ExoBrains which displayed it on receipt, and retransmitted the record that anyone changed to the recipient list that came with the original ExoItem. Consequently if communication has been enabled between ExoBrains, Next V and H and Previous and H fields make it possible to construct "a crossword puzzle" or "a spreadsheet" or "a town Plan" or "a roadmap" and then to collaborate on it.

Section 4, Part A2 Environment Requirement 2—Group 1 Relational Methods,
11. Relating by Time Suitable ExoModules that are field parallel to the appropriate fields in every ExoModule that creates a new record enter the date and fractional time and location of creation of every new record into Creation time and Creation Location Administration Fields of every new record immediately it is created and before it is used. (The combination of Creation time and location are unique since the same event can never occur twice at the same place and time). Every user order that is of a type that the user might use to refer to the data concerned also gets a record made and saved of that order even the order was given by Mouse clicking an icon (this does not mean every mouse order has to be record though it can be, but those orders that MIGHT be used by the user to specify the data concerned (such as printing specific data) is indeed recorded in the preferred embodiment. In this manner everything that occurs in the Any-to-Any system is related on the basis of time it occurred. An Any-to-Any system, like an elephant, never forgets. It is in fact vital to record all orders and the results of their execution as that is one of the prime ways that a human uses to find things—by referencing the execution or activity that was done with it. The human gives orders such as, "get me the document I printed yesterday on the printer that broke afterwards". If these orders and events have not been recorded, the items can not be found using this particular frequently-used mechanism of human specification. "Find the spreadsheet I printed just before that email came in" is an order that cannot be executed if all events are not time stamped and recorded.

Section 4, Part A2 Environment Requirement 2—Group 1 Relational Methods,

12. Methods for Relating Any-To-Any Computing Systems.

Data transmission—via internet for example—is easily enabled between Any-to-Any computing systems as essentially all this entails is transmitting records between Any-to-Any systems. In the Any-to-Any system, records can contain any data or software, and additionally records themselves also specify the relations between data; additionally the DRT is a record-based universal relation mechanism within the same record structure which can relate anything to anything. In consequence records in the system can both contain and relate anything and therefore, anything can be transmitted or receive din the form of records. Transmission can be assisted either by relating each Any-to-Any computer to a fixed URL or in the preferred embodiment using a web based Any-to-Any system that acts as server and is usually called a MotherBrain. A MotherBrain is really only a limited function Any-to-Any system that "knows" each Any-to-Any system's IP address because the Any-to-Any system contacts MotherBrain (which has a fixed IP address) and informs it of its current IP address each time it starts and each time it detects an IP address change. When several Any-to-Any computing systems are connected in this manner it becomes necessary to identify each Any-to-Any computing system and to know where the data it sends is to go to and where the data it has received has come from. This is achieved firstly using the Any-to-Any system ID Administration Field (every Any-to-Any system's ID is unique)—also called the Administration Field Data Relation Table Identity field—and Destination and Sub-Destination Administration Fields. The Destination field enables an Any-to-Any system to record the ID of the Any-to-Any system it sends or sent a given record/s to. The Sub-Destination field can contain either a list of IDs of target Any-to-Any systems for the recipient Any-to-Any system to send the record on to, or alternatively it may reference a Find Spec record (a record used as a specification of what to find) to enable the recipient Any-to-Any system to find the Any-to-Any systems to which the record is to be sent on to. Secondly, Origin and Sub-Origin records enable an Any-to-Any system to know where data was received from and where the record came from before that. This double step process enables any one Any-to-Any system to die and still enable the origin of the data to be traced back.

Pushing and pulling data between Any-to-Any systems is a matter of transmitting records only and proved to be trivial to do. For example, multiple remote finds were accomplished simultaneously by transmitting Find Specs (records containing ExoPonents of the data to be found on a Query by Example basis) to other Any-to-Any systems together with Director records that told them what to do with the found data (such as send it back to Any-to-Any system ID XYZ, or send (whatever is found) to "the following list of Any-to-Any systems". Any-to-Any systems were set up to process such received Find Specs on receipt using a suitable ExoModules. The benefit of this remote Find ability is that data servers (and all the complications and expense they entail) are no longer necessary because data can be left wherever it was recorded or created. The data can remain where it was entered because can always be found by a remote find, no matter where in the whole world it was sitting. Any-to-Any systems could push and pull applications to one another (ExoModules with or without data) without prior set up and use them on arrival without any install. In the Any-to-Any system, code was written to scan Word documents and Excel spreadsheets into the ExoBase (and these mechanisms could have been extended to any other legacy file type). The result was that a single Any-to-Any system could issue a remote find order to an unlimited number of other Any-to-Any systems anywhere; each would search its own ExoBase and return to the requesting Any-to-Any system all legacy documents it had previously scanned in that matched the request where they would display on arrival—a no-setup, Legacy Document Remote Find. It would have been trivial to add Permission Records to control what legacy documents could be sent where, or what they could or not could contain in order to be sent somewhere. Code was also written to launch legacy software from Any-to-Any system, which resulted in documents of supported legacy software being findable from within the Any-to-Any system that launched the legacy document creation, and of course, remote findable by any other Any-to-Any system. When such finds occurred, they were able to find and return either the (remote) Any-to-Any system's own matching records, or matching scanned in legacy documents, or both.

The relational mechanism of Admin Destination and Origin fields is part of enabling Any-to-Any computers to do Chained Remote Finds—to chain searches indefinitely, transparently and automatically without prior programming setup, something that is not possible in the state of the art—as follows. Supposing 1) several car dealers each have an Any-to-Any system that contains their full stock list—full details of all their cars in stock and then 2) they each create a RemoteTag record (just by entering the data on screen) (that is show in the Figures as an Any-to-Any system Content or Content Type record) that says, in effect, "Brand X cars are in stock at Company Y in city Z"; this RemoteTag record will contain their Any-to-Any system ID in its Administration Fields. 3) They each send these RemoteTag records to a CitySearchBrain which saves their RemoteTag records, possibly for a fee. 4) The CitySearchBrain sends a RemoteTag Record saying "cars in stock in City X" to a StateSearchBrain 5) the StateSearchBrain sends a RemoteTag record saying CitySearchBrain in City X lists manufactured goods (or lists Schools, or lists restaurants, or all or any of these), and finally 6) this process continues to international level, where at each level, the more senior SearchBrain, like a secretary, does not know everything itself, but, based on RemoteTag records it received, it knows the TYPE of thing that is found at the next lower Any-to-Any system in the search system—it "knows" what type of thing is found where. (Notice that this is another application of the type mechanisms in the language that are reflected in the DRT and in the Any-to-Any data machine. In this case, each lower SearchBrain is a sub-type of the more senior SearchBrain and contains the data of a TYPE of something and what that type is, is recorded by the next senior Any-to-Any system. IN effect, this is a chainable search-by-type system.

The EarthSearchBrain, then, could then receive a request from an Any-to-Any system anywhere in the world either as a record or as a web request—Web to Any-to-Any system converters exist and have been tested and require a few hours work to tag the data on a website in order to work. (Any-to-Any systems can, with virtually no effort create their own ExoWeb and publish virtually anything at the press of a single button, by marking one of the Admin Confidential fields (used for designating confidentially of data) that the data is for general use enabling any Any-to-Any system to download it for use). Suppose that 1) such a request is received for a "blue model X, Brand Y car in Town Z or nearby" 2) such a request matches an IfNotFound record. IfNotFound Records are a type of Condition record that is itself a subtype of another record type, to which has been a Director field entry that calls code that is what is to be done if the record is matched. IfNotFound records and the Find itself are structured so that when a find is done, if nothing else matches, an IfNotFound record does match and that causes something to be done. Hence an IfNotFound record in this instance is a RemoteTag or (remote) Any-to-Any system Content Type record, automatically converted to add a reference to an ExoModule in its Director Field that says which ExoModule to call when the record is matched.

This IfNotFound record may be found after a number of Return Nearest Truth searches have used Concept Hierarchies to find that a car is a type of manufactured goods and City Z is in Country Y. 3) The IfNotFound ExoModule adds the ID of the requesting Any-to-Any system and sends its version of the original query record used to the next junior SearchBrain specified in the IfNotFound record, together with the original Commander (query) record generated by the requesting Any-to-Any system or website. 4) The next junior SearchBrain, receiving this package, uses it to run a Query By Example Find which results in a repeat of the operation just described and so on, indefinitely to the end of the chain. At the end of the chain, the car dealer's Any-to-Any system that does have the model the user wants will return the data record construction specifying the car in stock to the original requesting Any-to-Any system—without returning to him huge lists of cars he does not want.

Equally in this example, a) if the car dealer does not have that model in stock, his own IfNotFound records can retrieve and return another data record set that specifies, just as a salesman would, how long it would take him to obtain one or b) a second IfNotFound record can activate a Concept Hierarchy search to find, and return, the closest matching car he does have in stock or d) a similar IfNotFound mechanism can trigger a search on the manufacturers Any-to-Any system to see when the manufacturer can produce it and if he cannot that in turn can result in the manufacturer's Any-to-Any system querying its suppliers, which can in return query its suppliers, which can in turn query raw material producers Any-to-Any systems. Hence, in a suitably organized system of Any-to-Any system, can issue a query, and that query can result in hundreds of systems in many countries working together to replace when the requested product can be built and be available.

Note that these mechanisms are based on, and work because of the invention's ability to be used to construct a mirror image in the Any-to-Any computer of real life ExoPonent-based and ExoPonent type-based human language, data and search methods, particularly in the sense that they implement and use the Type and Concept Hierarchy mechanisms that exist throughout the language. In this utilization, the higher level Any-to-Any system is the Type server containing the type information, and lower junior ones are type member servers and contain type member data. In the above example, the Any-to-Any systems are configured as a location Concept Hierarchy containing virtual Types where the junior in the locational Concept Hierarchy contains the members of the Virtual Type whose existence is known to (recorded by) the senior in the Location Concept Hierarchy. Note too, that these mechanisms enable search engines to reverse current methods and, instead of crawling the web, allow anyone who wants to be found to make out and send in RemoteTag Records that any Any-to-Any system can find, and charge extra for more records, eye catching displays, etc.

The ExoPonent based Any-to-Any computing machine proved simple to protect and operated encrypted and transmitted all communications transparently encrypted also. When the ExoBrain first started, ExoModules in it worked with MotherBrain ExoModules to create a Private and Public key pair for the combination of that particular ExoBrain and MotherBrain so that from thereon out, all communications between an ExoBrain and its MotherBrain were transparently encrypted.

Then, in order for one Any-to-Any system to communicate with another, as a first step, suitable ExoModules did a remote find on MotherBrain to find other user's Any-to-Any system records that it downloaded. The user chose which of these he wanted to communicate something to. The first attempt to communicate to a previously uncommunicated-to Any-to-Any system launched a KeySetUp ExoModule as there was no encryption Public Key Record for the other Any-to-Any system to be communicated to. Using the Encrypted MotherBrain communication (which the MotherBrain also had set up with the other remote Any-to-Any system) the KeySetUp ExoModule sent and received records to the remote Any-to-Any system that resulted in those two Any-to-Any systems both setting up their own private and public key pairs. From then on, all communication between the two Any-to-Any systems can be configured to be either peer to peer or via MotherBrain as preferred, and transparently RSA encrypted in both cases.

Because the Any-to-Any construction system of ExoPonents of the invention enabled an ExoPonent record-based data and processing environment and system to be constructed, this in turn enabled record-based, individual and RSA encrypted inter-Any-to-Any system communications, and allowed the Any-to-Any system's own database to operate encrypted also. Obviously, the ExoPonent record based system allows individual records or even individual fields and ExoPonents to be differently encrypted.

The above constitute the Relationship methods of Group I, all of which are relationship methods that are common to both the Any-to-Any data machine and the Any-to-Any code machine. The description will now continue with the environmental requirements—relationship methods—that are individual firstly to the Any-to-Any data machine, and then go on to those that are individual to the Any-to-Any code machine.

Section 5, Part A2 Environment Requirement 2—Group 2 Relational Methods, Data Only Requirements Group II relationship methods are methods that operate on assemblies created or recorded using Group I methods and are the user-controlled methods needed to be able to find and use non recorded relationships between already recorded data. They enable a computer to produce the same results that a human does when the human, on the fly, finds previously unrecorded (unmemorized) relationships in data (and then uses them in some manner).

The human identifies, and may also memorize (save), recall (find), relationships between ExoPonents and ExoPonent assemblies on the fly and may then use them for some purpose, and the Any-to-Any computer needs to be able to do all these things too. Group II methods are computer versions of relational methods that the human uses to find and use relationships that actually exist in the data, as opposed to Group I methods that are used to construct recorded relationships between the data. Group II methods also enable the human to use the Any-to-Any computer to find, preserve and use relationships between ExoPonents and ExoPonent assemblies on the fly, but in a different manner to those so far discussed, and enable the computer to do this in a similar manner to the manner that the human himself does when handling data relationships.

In human terms the physical manifestation of human "ExoPonents and ExoPonent assemblies", are words, strung into sentences, but these words and the words of the sentences are processed by the human into mono-meaning ExoPonents and ExoPonent assemblies which are strings of such mono-meaning ExoPonents. Human-type ExoPonents and ExoPonent assemblies include ExoPonent actions and ExoPonent action assemblies—single activities and assemblies of many single individual activities into more complex actions. Examples of a human activity ExoPonent is retaining a number in memory as one action ExoPonent (mono-activity) and adding two single digit figures as another human activity ExoPonent, and then assembling ExoPonents so as to add multi-digit figures—which requires both the human ExoPonent ability to add single digits and the human ExoPonent ability to retain a number in the person's memory. Other examples of human ExoPonent activity assemblies are walking or writing—complex actions made up of many smaller ones performed in a harmonious interacting fashion.

Humans use two key methods to relate data. The Any-to-Any computer equivalent of the first of these is the called the Discoverable Component Commonality Relationship Method.

Section 5, Part A2 Environment Requirement 2—Group 2 Relational Methods,

1. Discoverable ExoPonent Commonality Relationship Method

Some relationship methods are built into the meaning structure of language (the way meanings in the language are structured), and Group I methods provide the needed mechanisms to replicate and record those relationships of meanings in a computer using ExoPonents. That ability is a vital requirement in order to be able to take the language, and turn it into meanings, and then record those meanings so that the recording is an accurate computer replica or mirror-image of the human-provided data, that is also in a form that the computer can do with it the same things the human can do with the data. Accordingly, the next step is actually doing useful things with the data that has been recorded or that is newly received, or both, and an extremely large part of what people do with is (or involves) relating different data to one another in some manner. In turn, one of the most extensively used ways that humans relate different data together is using two versions or flavors of a dynamic relationship system, and these are 1) the named dynamic meaning relationships system and 2) the unnamed dynamic meaning relationship system. It is interesting to note that humans use the first of these methods as one of the main tools used to create the language itself. Both these methods are ExoPonent based and both (appearances to the contrary) are dynamic—dynamic in this instance meaning, "based on or consisting only of latest known data". The things that are related change dynamically and are not static.

An example of the human named dynamic relationship method is "an address". "An address" might consist of a street, a town, a post code and so on all assembled together. ExoPonents are assembled on an Any-to-Any basis to make a street name, further assembled with a number in the street; that assembly is assembled with another assembly of ExoPonents which is a town, and so on. Even though it appears to be a fixed relationship, it is actually not fixed at all. It can change—now there is one phone number and then there are ten and then 3 got deleted and the street name changed and the postcode has another digit added to it, but no matter what the changes are, it is still and always "Joe's address" even if he moved to another town last week. The assembly that is "an address" is a set of relationships that match a certain specification, or, expressed in the computer terms, it is a set of ExoPonent assemblies that match a named Find specification. The characteristic of this kind of (named) group is that the human gives a name to whatever ExoPonent assemblies happen to match that find specification, and does so (one must suppose) so as to be able to handle the assembly conveniently without having to name all of the parts each time. In this example the name of the particular assembly of ExoPonents assemblies discussed, is, "an address".

It is a general principle of language that the human groups things together based on Commonality of their constituent ExoPonents (based on the ExoPonents they have in common), then gives that group a name, and then handles that group by using that name in future. And this name of the group is also what we call a "type". Thus, chair, table, lamp have a group or type name of furniture and are handled by that group or type name in future: "go and clean the furniture". But notice that "chair" is also name of a group of things, each of which is a chair, and again, this shows Concept hierarchies in operation—they could equally well be called Type Hierarchies.

Paper, pens, paperclips, acquire a group name of stationary and if a new thing meets the ExoPonent selection (commonly, together termed "criteria") that define "stationary" then the new thing is also considered to be "stationary" and is a new member of the "stationary" group or type. Hence, happy, sad, enthusiastic have a group or type name of emotion. Running, pumping iron, walking, swimming have a group or type name of exercise.

Note that the human Named Dynamic Relationship method is not at all the same as the state of the art relationship method in software which is different (and hence to some degree insane by human standards) and which is non dynamic. In the state of the art methodology all groups are fixed—these three files are the contents of this folder, from now to the end of time unless someone changes it. But when a human uses "a file" it is not fixed at all—it is dynamic. More than one person often puts things in it, and whatever meets the "criteria" of that file (ExoPonent Find Spec for the file) will appear in the file. The human Named Dynamic Relationship method is a dynamic method and is equivalent to a named computer find specification. Hence, and for example, someone's "address" (as humans use the term) consists of whatever happens to meet—at the instant of time the order is given or executed—the find specification for any assembly that is of the type address—so in one instance this might be a street address and a county in UK and in another a street address and a state in USA. So although the name is fixed—"Address", the contents of the assembly called "address" is not at all fixed but is dynamic—the assembly that constitutes a UK address is different from the assembly that constitutes a USA address, and a Russian address is more different still and in a different order. Even apparently fixed-in-stone human data relationships are dynamic underneath. One might think that a street name is a fixed assembly, except is it not, as buildings and companies and people on a given street come and go and so the term "Wall Street" refers to one particular assembly today, and to quite another tomorrow. So this type of human Any-to-Any relationship method is best described as a Named Dynamic Commonality of ExoPonents Any-to-Any Relationship method. It is a method of creating relationships, that is based on things having characteristics (ExoPonents or ExoPonent assemblies) in common, and whatever meets those criteria at the time in question, goes by the name named assigned to the group or type.

The other human method to relate data is wholly dynamic and is identical to the dynamic method just described with the exception that the group is only identified and is not specifically named. It is a process in which ExoPonents common to the things to be grouped are specified on an Any-to-Any basis and then, after something is done with it, the group is often instantly discarded and it then ceases to exist as a group. For example, when a human says, "take the things on the table onto the kitchen, please", "things" "on" and "Table" are all ExoPonents common to those objects on the table and it is those ExoPonents that are used to select them—in computer terms it is an ExoPonent find, based on Commonality of ExoPonents between the specification of what to find and the items to be found—it is a matching process based on matching sets of ExoPonents. (Note that the human "find" (which is the same thing as a specification) used in this example is find that mixes types of find. It is partly a Concept Hierarchy (Type) find: "Thing" is an alternative ExoPonent for "Matter", the highest type in one of the Data Categories—the Matter Data Category. "The table" is type converted to a specific by the meaning of "the" and "on" is an Operator word, Spatial Relation type designating the (spatial) relationship between "thing" and "table". Operator words are a matter for Meaning Processing to turn words into correctly related ExoPonents that are meanings and computer technology to deal with language and are outside the scope of this invention, but generally speaking, Operator words are words that do something or designate something or relate something—in general, perform an operation on—meanings of meaning of words meaning words such as "table", "chair", "Jump" etc.

The moment the order is executed and the group of things are in the kitchen, that person might then say, "wash the dirty dishes and put the rest of the stuff away". The group which was "the things on the table" has ceased to exist, and two new dynamic groups "dirty dishes" and "rest of the stuff" have been created and soon, they too will cease to exist.

Since both of these human data relationship methods (named and unnamed) are dynamic, if the computer is to handle relationships in the manner that the human expects, the computer's data relationship method has to be based around a find (which is the computer's equivalent of a dynamic relationship mechanism) because, a) the exact members of the group are not fixed but change dynamically with time and b) whatever meets the criteria right now is what the human is referring to and therefore c) has to found dynamically, at the moment that the user asks for the group concerned.

Note that a computer grouping mechanism based on a find can correctly find all members of both a named dynamic group and of an unnamed dynamic one, but a fixed grouping mechanism, such as the file-folder system of the state of the art (which is a sub-standard computer copy of the named dynamic group mechanism) cannot also find members of a dynamic group. Because state of the art computers have misidentified the human's dynamic groups and treated some of them as static, when all human groups are in fact dynamic even they superficially appear to be static, state of the art technology has to resort to having two relationship methods 1) hierarchical fixed folders and 2) finds as well. But it is not sane (from a human's point of view) to use two data relationship methods, as the human (and the Any-to-Any system environment) uses only one—the Dynamic Relationship method which is then divided into name and unnamed Dynamic Relationship Method—and the Named method is simply a second step on top of the same Dynamic Find method. For this reason, the preferred grouping mechanism for use with ExoPonents is a find-based method only, which finds for items containing the required ExoPonents.

The above human requirements are satisfied by the Discoverable ExoPonent Commonality Relationship Method and the Naming Relationship Method described below.

When all ExoPonents are placed or stored in a single table such as the DRT as used by the Any-to-Any computer, relationships between ExoPonents are visible and easy to find and use. But these relationships become virtually invisible and almost impossibly complex to use, if the data is split into several or many different tables, particularly One-to-Many tables—or One-to-Many directories. The large table that results (such as the 250 field Data Relation Table that is adequate for an office suite type of usage) is inconvenient for the programmer—but programmer convenience is not a reason to ignore Any-to-Any requirements—and is best dealt with using a computer with multiple screens. A computer with one screen is impossibly inadequate to the point of making the invention unworkable, three are a minimum, and five are better.

In order to enable the user to find relationships in the data himself as he would with another human by asking, "What are we planning to do tomorrow after Paul arrives?" the environment cannot use the relational database methods provided by state of the art databases as these divide related matter over different tables, making the huge number of relationships that humans can find between data, virtually impossible to find and even if found, impossibly complex to relate. There are in reality a huge and almost infinite number of more relationships between the data in relational Table A and that in Table B, infinitely more than just the one particular relationship the database programmer has decided was the only one that mattered. Every one of those relationships between the date in Table A and that in Table B that actually exist—but which have not been set up by a programmer—may be important for some reason or other, at some time or other, and, at some time or other, may be used as a condition for an execution to occur—but only one of out an infinity of these cross table relationships that do exist is going to be accessible and possible for the human to find and use.

Rather than using relational database methods, the Any-to-Any system environment invents two other user relational methods, the compound effect of which—when coupled with the ExoPonents of the invention—is to give the Any-to-Any computer properties that meet at least one definition of intelligence ("the ability to tell differences, similarities and identities" Hubbard) and this ability is enabled by data ExoPonents as follows:

Recording all data in one logical table is important to the first human-use relational method which is termed the "Discoverable ExoPonent Commonality Relationship Method" which is an on-the-fly relationship method which does not require relationships to be previously recorded but enables whatever relationships that do exist to be discovered on the fly when they exist. In this method "a relationship" is defined as Commonality of one or more ExoPonents between different things.

The relationship method is said to be "discoverable" because even though the relationship was not pre-recorded, when a relationship does exist, it can discovered (i.e. found) whenever required by doing a find on records concerned. Because any relationship that is there can be found when needed, that relationship does not have to be pre-recorded.

In fact, a human-acceptable relationship method has to be "discoverable" because it is an impossible to task to attempt to record all relationships between data. Some systems that are attempting to achieve artificial intelligence sometimes do attempt to record all relationships, which essentially amounts to an attempt to wire every hole of the switchboard to every other hole in the standard One-to-Many manner. But the only workable solution is to give the user wires with jacks on the end and let him do the wiring himself—in effect giving him a mechanism to discover or find whatever relationship he wants to find if it exists, which is what this group of relationship methods achieves. Noticeably, humans also do not attempt to memorize every possible relationship between all the data they know; but any time they want things that are related, they can a) often remember the data items concerned and b) rapidly figure out the relationships between them.

Simply considering the relationships between two identical pages of text for example two photocopies of the same page) demonstrates the futility of attempting to record all relationships between all data. In those two pages, for example, the $127^{th}$ letter in page A is the same as the $127^{th}$ letter in page B—that is one relationship. The $128^{th}$ letters are the same—that is a second relationship. The $127^{th}$ letter in page A is/is not the same as the $134^{th}$ letter in page B—and so on, letter by letter. The first paragraph in both cases is the same—another relationship; the fifth sentence is the same—another relationship. The first two words of line 3 are the same on both—another relationship; the dimensions of the left edges of the two pages are the same—another relationship. Just two printed pages have at least hundreds of thousands of potential relationships and that alone would be hard to record; adding a third identical sheet produces an exponential explosion of the number of relationships that are actually there; then add all the newspapers printed in the world in one day and the number of relationships is into the trillions to the power of trillions, and is categorically unprogrammable, which is what the relational database system attempts to do. But the human does not bother to remember every single relationship of any one thing to anything and everything else—he discovers—identifies, works out—the relationship when he needs it, and that is exactly what the Discoverable ExoPonent Commonality Relationship Method does also.

A human decides on differences, similarities or identities based on a) the presence or absence of ExoPonents and b) based on the relationship between ExoPonents ("in the sequence 2, 4, 6, what is the next number?"), As regards a) above (the presence or absence of ExoPonents) a human might look at two cups and say they are similar based on individual shape, color dimension, and thickness ExoPonents. The human could state that they are different due to one ExoPonent, a chip in the handle of one of them. In effect the human ability to tell differences similarities and identities is ExoPonent-based. The Any-to-Any computing system that uses ExoPonents is also able to tell differences, similarities and identities using the Discoverable ExoPonent Commonality Relationship Method. As regards b) above, using relationships between ExoPonents to predict, the Any-to-Any computing system can do that also, using code ExoPonents. In both cases, the ExoPonent itself is the enabling technology that makes these things possible and achievable for anyone skilled in the state of the art.

The Discoverable ExoPonent Commonality Relationship Method works because when any two records have some of the same data ExoPonents in common in the same specific fields, they are related by the mere fact that the two records do have some specific ExoPonents in common, or, not in common ("get me a copy of a letter find me a letter that does not say, 'dear so and so'.") This method basically enables a computer to perform multi-valued logic, since if one record A has 100 ExoPonents, and another record B has 80 ExoPonents in common with record A and a third record C has only 50 ExoPonents in common with record A, then clearly record B or whatever it represents is more similar to A than C is to A. The Any-to-Any computer can inform its user as to exactly why the records are similar and exactly why they are different and how different they are and in what respects they are the same and in what respects they are different. It can say, or find, for example, that Record B is more similar to Record A than Record C is similar to A, and that (while record A, B and C are similar), Record B is more similar to Record A than Record C is to record B, and so on, and can of course find, and show, exactly what are the differences and what are the similarities in each case. If a human did this, the human would be said to intelligent. The Any-to-Any computing system that can do this is not intelligent as such, it merely behaves in a manner that humans label as intelligent when observed in one another, and does so by copying the human's methodologies. Hence the real definition of "artificial intelligence" is behavior in a machine that, if observed in a human, would be labeled as "intelligent".

With these methods it is not necessary to record the relationships of different data one data to another, because either the relationship is traceable by record references created in the manners already described at the time it is recorded or received, or the relationship can be discovered if it exists using the Discoverable ExoPonent Commonality relationship method to match ExoPonents between records or data assemblies. Additionally, with these methods an Any-to-Any system can comply with one definition of intelligence, which is "the ability to tell differences, similarities and identities" (Hubbard).

The Discoverable ExoPonent Commonality Relationship method is used either as an ExoPonent query of the data grid (all Any-to-Any system queries are queries composed of ExoPonent) caused by a user or sent by another Any-to-Any system or by code ExoModules that use otherwise idle CPU time to search for previously unidentified ExoPonent Commonality relationships in stored data, which they do by comparing one record respectively with a succession of other records—a process that would seem to be remarkably similar to what a human does when he "thinks about something". This idle-time record comparison process can then find possibly important unidentified relationships and bring them to the users attention, "did you know that Joe sent you a letter 2 years ago similar to the one Bill just sent you yesterday?", "this is the third time Company X has rejected a shipment in that last 6 months", this is the seventh time that Unit X failed after a power surge" etc.

A Discoverable ExoPonent Commonality query and a state of the art database query appear (superficially) to be same, as a database query could be said to be a database query no matter what form it takes. The critical difference is that the state of the art method uses packages of meanings to query a database consisting of packages of meanings, and therefore returns answers that are packages of meanings in which a house that was set alight ("fired") and a person who lost his job (who was "fired") are identical—when a human says they are not and considers such an idea to be insane. In contrast the Discoverable ExoPonent Commonality method matches the ExoPonents in the human's query with ExoPonents in its grid, will return the correct answer and not one the human classified as insane or wrong or "not what I wanted". The query mechanism sending query data to the database and the mechanism receiving the found records may be the same; but the results are extremely different, because one is word-based and the other is ExoPonent-based.

A final advantage of the Discoverable ExoPonent Commonality method of the invention, is that it is never necessary either to specifically state where something is to be saved as there is only one place in which it is saved anyway—the storage grid. It is not necessary to save it in a directory, nor is it necessary to save copies of it in other directors where it might also be needed. Further, naming the data (the equivalent of giving it a file name) is optional, and choosing a place to save it are both unnecessary because neither of these things are obligatory in order to enable that thing to be found again. Hence when a user is done with entering some data he can signify in any convenient manner that he is finished with it, and this results in saving it to the only available place to save it—the storage grid. This is quite similar to the human, who has no computer file system equivalent in his head, he just "memorizes" automatically and then finds (remembers) based on Commonality of ExoPonents in the memorized data. The Any-to-Any computer does its version of "memorizing" and then does its version of remembering by running an ExoPonent Commonality Find.

A specific "file" (in human terms) or a specific "directory" (in computer terms) becomes a Named Dynamic Group Find Spec record (in Any-to-Any systems) that is run when needed and runs an ExoPonent Commonality find. Because of this, a particular data item such as a document can be "in" one "file" (directory) or "in" ten thousand different files (directories) while, at the same time, there is no specific recording anywhere in that Any-to-Any system of that document's relationship to any one of those files (directories).

A Named Dynamic group, then, is a Find Spec running an ExoPonent Commonality Find to which a name is given by the user, while a Dynamic group (a group of things which is identified, handled and discarded) is a Find Spec running an ExoPonent Commonality Find that is not named and which may never be used again. Once the human is finished with that group of things, it is discarded (the original data recordings remain, but the particular group itself is not kept.

Note that the Named Dynamic Group mechanism is the same mechanism that human uses to construct the type structure of meanings in language. "That" says the human, "is a chair and that is a table. Because (here comes the Find spec specifying the Common ExoPonents that are going to define and are the Find Spec for the type he is creating), "because both of them are used to decorate a room, I will give them the name of "furniture"" and presto, the human has defined a Find Spec that creates a Type and defines a Concept Hierarchy of that Type at the same time and hence, a Name, is a Type, and is a Label and a large part of meaning structures are built with these mechanisms. Named Dynamic Groups defined by ExoPonent-based Discoverable ExoPonent Commonality Find Specs are an essential mechanism for a computer to behave in a language-controllable human-similar manner and are enabled by the Any-to-Any construction mechanisms herein. Note that the Named Dynamic Group mechanism is an assembly of 1) the Dynamic Group Relational Mechanism and 2) the Naming relational Mechanism that will be described next.

Section 5, Part A2 Environment Requirement 2—Group 2 Relational Methods,
2. Naming Relationship Method As the second of the two human relationship methods that are not part of the meaning structure of language, the Any-to-Any environment provides the ability to name anything from a single ExoPonent upwards.

The Naming relationship method is created and used in the following manner. One of the Administration Fields in the highest level Label Record of the grid storage table in use (DRT or other) is called "Given Name for This" and is where the commonly used name of something can be recorded. Doing so effectively names whatever is recorded in the data fields of that record. Since the data fields can contain as little as a single ExoPonent, or can be as complex as a record in which every data field references a List Record that lists other records, each of which is a new list record that (eventually) lists records containing data—an extremely complex construction indeed—anything in the Any-to-Any system can be named, from simple to very complex. Because the Any-to-Any system is itself named in the Name field—with whatever name the user likes—using that name encompasses everything in the Any-to-Any system as the following command illustrates (supposing that the Any-to-Any system concerned is named "Jill"), "Jill, move yourself over to the home computer please, let me know when done".

Complex name constructions such as an address or a letter (which usually contains 2 or more addresses) are usually constructed with a "Base Record"—i.e. a first record that then uses its Administration Field called List to reference a List record that then references the various other assemblies and parts of the letter. (This Base Record—for data—is the equivalent of the BossModule record for code. Each are the top level record for their type of structure—Base record for data, BossModule records for code). Thus (for example) the Base Record that references the List record that lists all the records making up a particular "Address" would receive in the Name Administration field the record reference for the ExoPonent "address"—effectively naming that Base Record "address". The ExoPonent, "address" would be adequate to reference the entire address, since other methods already described have already connected all needed ExoPonents and ExoPonents assemblies to the List Record that is referenced by the Base Record that now has the name of "Address" in its Name Administration Field. The Base Record for "a letter" would be similarly named in the Name Administration Field.

The Naming relational mechanism is an Any-to-Any relational mechanism that has as its purpose the creation of a hierarchy (one name, many things named by it) and consequently it partly violates the requirement for an Any-to-Any relational mechanism by being intrinsically hierarchical as its purpose is to be so, but it does however comply with the other requirement for an Any-to-Any relational mechanism by being intrinsically unlimited.

As further example of another way of using the Naming Any-to-Any relational mechanism, the user could have a record in which the user enters a meaning in the Name field, a meaning which is an ExoPonent and is "chair" (the physical object). The Administration fields provide another field called "Type" which is usually next to the Name field (it could equally well be called "Senior Name" or "group"). The user could then enter the ExoPonent for "furniture" in the Type field, and it should be noticed that just by doing so, he would have recorded a Concept Hierarchy that exists in life, where a "chair" is something of type "furniture".

Note that the Concept Hierarchy in this case is a hierarchy of Matter and is just one kind of Concept Hierarchy; any ExoPonent can have Any Concept hierarchy and often is a member of many Concept Hierarchies. Every single ExoPonent has its own Concept Hierarchies—for example the ExoPonent "quality of length" has two—shortest, shorter, short, and long, longer, longest. That thing which is longest is also part of that group of things that are longer. The group which is long, includes all those things that are longer and the one that is longest. The Discoverable ExoPonent Commonality Relationship Method is capable of detecting and using these Hierarchies, as the human's comparative observations of the physical universe are based on Commonality of ExoPonents, and his use of language terms concerned with or derived from Life, use Life-equivalent extrapolations of his physical universe ExoPonent handling and usage methods.

Accordingly, using the Name and Type fields the user can create Concept Hierarchies of his own. Generally speaking, 1) if there is an agreed principal Concept Hierarchy in society for something (as "furniture" is for "chair", or "address" is for "name of street") then the appropriate ExoPonent meaning can be recorded in the "Name" Administration Field and the next senior ExoPonent in the Type field. If there is no generally agreed Concept Hierarchy, then the user can record in the NAME and Type fields whatever ExoPonents best describe it for him. If there is more than one senior Concept Hierarchy, then a List Record can be used to list the records containing the appropriate ExoPonent values, and the record ID of the List record is placed in the Name or Type field as appropriate). When searching, if Name, Type and Subtype fields exist, they are treated as being a single field, since all of them are just junior and senior members of the same class—junior and senior types of something.

With this understanding, it will be seen that the Name field (or its senior version the Type field) enables members of a type to be found using a Find Specification record. A Find Specification record is a record that either has some ExoPonents already in it, or which acquires them from elsewhere, and is then used to find other records on a Query By Example ExoPonent Commonality matching basis. If the user enters the ExoPonent "furniture" into the Name field of the Find Spec record, and if this Find Spec is then used as a Discoverable ExoPonent Commonality find to find matching records, it will find records for "chair" "lamp" etc if they are present and if their records have recorded that they are something of type "furniture".

In a more sophisticated implementation, the Name and Type field can enable an Any-to-Any computer to identify and create Concept Hierarchies by itself in the following general manner.

Every object can be entered into the Any-to-Any computing system as a full list of its ExoPonents—something that could be done by suitably written visual code to break down observed images into ExoPonents and store them (for example in a 1000 column table or a 1000 field virtual record made of 5 records of 200 data fields joined together, or a 10,000 field virtual record as necessary). For each object, the Any-to-Any system would ask the user for the NAME of the object just treated in this manner, and, being told the object is a "chair"—(much as a baby has to be told for the first time "that is a chair"), the ExoPonent "chair" is recorded in the Name field of the record that contains the ExoPonent list for "chair". Thereafter with suitable ExoModules to run comparison queries, the Any-to-Any computing machine could determine that the records for "chair and "table" have (for example) 300 ExoPonents in common. Finding that several physical objects have these 300 components in common, it could ask the user if there is any name or word that covers the following list of objects—producing not the list of ExoPonents for each, but showing the user just the entries found in the Name field of each of the records it has a selected. Being told by the user that these objects are all called "furniture", firstly it would record the ExoPonent "furniture" in the Administration Field called Type and secondly it would create an Object Find Spec Record containing that combination of ExoPonents that it had just found that was common to all objects that the human had said were called "furniture" and place ExoPonent "furniture" in the Name field of the Find Spec Record. Once some reasonable numbers of such operations had been done, the Any-to-Any computing machine provided with code to break objects down into ExoPonents would be able to compute that new, never before seen objects were furniture also. When presented with a new, never before seen object, the same visual ExoPonent production code, which would break down every observable feature into ExoPonents, would produce a new record for the new object. A BestMatchingObjectFindSpecRecord ExoModule would use the new record as a Find Spec to perform searches that would find the ExoPonent Find Spec record with the highest number of ExoPonents in common with the new record being used as a Find Spec. That process would find the Find Spec record which has the name of "Furniture". The Any-to-Any computing machine could then say to its human user "What do you call (NAME) that piece of furniture?"

These abilities, all of which are made possible by a) ExoPonents and b) the NAME relational mechanism, are the basic abilities that are capable being made to supply the object identification management requirements for the correct execution of a command such as sending an Any-to-Any computing machine into a room full of furniture, all of which are kinds of furniture it has never seen before, and telling it to "move all the furniture out of that room and into the next one" and having it execute the command correctly.

In order to implement such abilities, the Discoverable Component Commonality method has to be used with an understanding of the Greater Similarity Principle. The Greater Similarity Principle is the mechanism used by humans to answer the question—and can be used to enable an Any-to-Any computer machine to answer the question—"why is a table not a chair?" The Greater Similarity Principle states:

A human classifies a thing as being of a certain type, because it is more similar to others of that type than it is to anything else in the universe.

Defining the Greater Similarity Principle on an ExoPonent basis, the Principle becomes:

A human classifies a thing as being of a certain type, because it has more ExoPonents in common with the exact ExoPonent selection defining that type, than it does in common with anything else in the universe In the case of an Any-to-Any computing system, a Type in ExoPonent terms is defined by (a Find Spec which is):

"That set of ExoPonents which is common to all members of the type"

Hence, the detection of a type is the detection of two or more things that have any set of ExoPonents in common. The fewer the number of ExoPonents those two or more things have in common, the more senior the type and the greater will be the number of its members. Conversely, the greater the number of ExoPonents those two or more things have in common, the more junior the type and the fewer will be the number of its members. As a corollary to these, the detection by an Any-to-Any computing system of the next senior type is the computing detection of records of other things (not members of the type concerned) that have the least fewer number in common of those ExoPonents that define the type. The next junior type is the computing detection of records of other things (not members of the type concerned) that have the fewest number of ExoPonents (in addition to those that define the type) in common.

These mechanisms would enable an Any-to-Any computing system to detect such subclasses of furniture as modern furniture or renaissance furniture or to detect that a chair, a table and a lamp are all members of a type (that, if the human was asked, he would say is, "furniture". If the Any-to-Any computer was enabled to be able to point or show to the human an example of the what it had detected as being of a type, it could then ask the human "what kind of furniture is that?" and could then record the human's answer (in the Admin Sub-Type field) namely, the ExoPonent value for "modern" or "renaissance". It could then record a Find Spec for that Type and so have recorded a new Concept Hierarchy. When it was needed to find to which Concept Hierarchies an ExoPonent belonged, that would be found by a search using that object's ExoPonents record as a ExoPonent Commonality Find Spec to find those Concept Hierarchy Find Spec Records. This makes the point that Concept Hierarchies, as just described, are fundamentally dynamic and (for physical objects when ExoPonent recording of the object has been enabled) would be best recorded as Find Specs and not as fixed relationships using Type fields—the other method that was described earlier. The successively more senior Concept Hierarchies to which the object belonged would be found by the successively finding the Concept Hierarchy Find Spec records with the least fewer ExoPonents in common.

While the procedure of recording all the ExoPonents of every object so that they can be NAMED using the NAME fields might seem to be extreme, Any-to-Any systems (as will be described elsewhere) can, a) be copied and b) can transparently transmit any newly created data records (new "knowledge") to all other Any-to-Any systems anywhere via the net. Hence the Any-to-Any computing machine learning process only ever needs to be done once and thereafter, every Any-to-Any system can "know" what any one of them has "learned" and the only real limits are then storage capacity and speed and processing speed. If most of the "knowledge" is stored in data centers on the net, then an Any-to-Any system can use IfNotFound procedures (elsewhere described) to find out what it does not already know whenever it needs to know something.

The Name relational ability is critically important in the case of ExoModules as it is the Name of user-controllable ExoModules that enables the Any-to-Any computing machine to correctly relate user data to code activity as will be described later, using a process termed Command Matcher. If the user says, "send an EMAIL to Joe" the activity he asked for ("email") is placed in record that is used as a Find Spec to find a BossModule that is in effect named EMAIL. The BossModule has record references for all the ExoModules and other records it needs to construct and send an email and verify it went.

The Administration fields also have a field called "User Name for This" that let a user name something anyway he wants no matter what else is may be called. This field can be used for names such as "weekend address" or "The funny letter" and so on.

The naming method is absurdly simple yet it is one of the most powerful Any-to-Any relational methods used by the invention as it is the Any-to-Any computing machine equivalent or representation of a particular method at the core of the methods a human uses to create a language that, using relatively few meanings, can express everything there is. It is has been estimated that most people use about 8,000 words in their normal language; supposing each of these words is assembled from (has) five meanings, and each of those meanings is assembled from 3 ExoPonents, then the number of ExoPonents people use in everyday language is about 8,000× 5×3=120,000 ExoPonents, which is not an overwhelming number—but gives 120,000 to the power of 120,000 possible combinations. Defined in this manner, "language" is an ExoPonent Relationship Engine, in which ExoPonents are used in many combinations (ExoPonent Assemblies) to express anything and everything and in this sense, normal language is a Base 120,000 Any-to-Any system, in which Any meaning ExoPonent can be used with Any meaning ExoPonent in a manner that is not intrinsically hierarchical and is intrinsically unlimited. One of the most fundamental and maybe the most fundamental structural meaning constructional relational method used in language is Naming. Naming occurs in the construction of types within the language. Many words are type names even if they do not immediately appear to be. Take for example the word "Wednesday" which may superficially be thought to be nothing to do with a type—yet it is. When a person says just the word "Wednesday" (and referring only to its meaning as the day or the week as it does have other meanings) this meaning refers to all Wednesdays that ever were or ever will be. "Wednesday" is the NAME of an immense group of days, all of which are a "Wednesday", and every one of which is "Wednesday". The word "day" used with the meaning of a 24 hour period of time, is a name of a time period that includes all "Wednesdays" as well as every other day there was or will be. It is an interesting exercise to attempt to find on this page a word whose meanings is not a type.

Hence, further defined, the Co-Reducing Concept Exclusion Specification Principle is really seen to be a Co-Reducing Concept Exclusion Specification Principle of Meaning Types—a mechanism in which the operative elements are actually Types. Hence the human specification method is the use of adequate individually massive types with one another on a co-reducing principle so as to exclude everything that is not required to be specified. A particularly elegant example underlining the power of this mechanism is shown by the user who says "the" alone'. This "the" specifies anything there ever was, is, or will be that is "the"—it specifies a type and a particularly massive on at that. Similarly the word "newspaper" specifies all newspapers that ever were, are or ever will be. These two meanings (that are individually a) names of groups b) enormously massive as each specifies trillions of things) when said together (as "the newspaper") co-reduce one another to specify one particular newspaper. (It does so by interlacing with other Language mechanisms beyond the scope of this invention, but provided for in it, termed CanDoCant mechanisms in which what can and what cannot be done act as further Co-reducing Concepts)

The environment mechanisms (Storage and Group I and II relation mechanisms) so far described constitute an adequate and sufficient environment for the Any-to-Any data machine to function and produce a useful result on its own as a knowledge machine—basically as a more flexible equivalent of a state of the art database, in which the state of the art database's inflexible relational mechanisms are replaced by Any-to-Any environment's more flexible ones. This is a minor but useful result. As an example, to include the account balance from state of the art database Account Database A, in Supplier state of the art Database B where the salesman can see it, can be a major undertaking that can disrupt the entire company and cost a fortune to achieve. With the Any-to-Any data machine just described, placed in the environment just described, making such a change only requires adding the field containing the account balance to whatever ExoPonent data assembly the salesman is using (that can be in a remote computer using the simple ExoPonent communication mechanisms to be described,) and is the work of a few minutes to achieve that can be done on the fly without programming. If the Any-to-Any data machine is employed in a more sophisticated environment by adding the Data Relation Table, then the much-sought-after but elusive goal of a knowledge engine capable of relating all knowledge correctly in a comprehensive fashion becomes possible. If that is further coupled with Meaning Processors for different languages written using the Any-to-Any code machine constructed by the invention (to be described later) then a comprehensive knowledge engine can be built that takes ordinary language text input in any installed language and can be queried and respond in any installed language. If used as an Internet Search Engine, the Any-to-Any data machine can transform a state of the art very limited data, uni-language question and mostly wrong answer machine, into a very broad data, multi-language question and accurate answer machine. Those are examples of the types of benefit that are possible from using the Any-to-Any data machine by itself.

Section 5, Part A2 Environment Requirement 2—Group 1 & 2 Relational Methods and Code ExoPonents While the twelve Group I Relational methods and two Group II relational methods have mostly been described in relation to the Data Any-to-Any machine constructed by the invention, they apply equally to relating code ExoPonents. The following short description of uses made of the Any-to-Any environment by the Code Any-to-Any machine will describe some ways that the already-described relational methods can be used by code ExoPonents and code ExoPonent assemblies (called Execution records if the assembly is one record whose non-Administration fields contain only code or references to code, or called "an ExoModule" if the assembly consists of several Execution records or a mix of Execution records and data records, or a record whose non-Administration fields contain a mix of code and data or references to them).

In the Any-to-Any system environment described above, code ExoPonents are termed "ExoLogics". The Naming relational method is generally used to Name each ExoLogic (Code ExoPonent) or Assembly of ExoLogics (ExoPonent code Assembly) so that the Name Says what it Does and the ExoPonent or ExoPonent assembly Does What it (the name) Says. This convention will also be followed in the remaining description. As an example of this convention, an ExoPonent called FieldCopy can be expected to copy data from one field to another. ThreeThreeInTwoOutFieldCompare or 33I2OFieldCompare can be expected to compare the contents of three fields (in three different records) with that of the contents of three other fields (in three other records) and output results to two other fields (which records provide the comparison fields and the output fields is something the BossModule "knows" and controls in manners that will be described in due course).

In the preferred embodiment, as per the ExoPonent Principle, an ExoLogic (which is a code structure that meets the definition of an ExoPonent) is only ever recorded once—in a code ExoPonent record, whose other fields can be used to describe it and control it. Thereafter, its record ID is referenced in all other records in which it needs to be used. In this way, if there is something wrong with the ExoLogic, there is only one ever one instance of that ExoLogic to correct and not thousands, as may otherwise be the case in state of the art software, where—worse still—the same code is copied and repeated in many places with minute variations that change its connections in the different places and any error has to be found and corrected in all those places, often with unpredicted effects that break something else. Since there is only ever one recording of anything in a purely constructed Any-to-Any system, an error in an Any-to-Any system can only ever stem or come from one single place, and in practice is easily and quickly found and corrected.

At a first level of relationships, Code Any-to-Any ExoPonents are related to one another using the identical Group I and II relational methods just described. Code ExoPonents are stored in the form of records whose Name field contains the Name of the ExoLogic or ExoModule. The record ID of the record containing a particular ExoLogic is then referenced (usually) in each data field of an Execution record, which produces a generic Execution Record able to perform the identical operation on each data field of a data record to which it is targeted by a BossModule. Which FieldLogics in which fields are activated is usually controlled by a WhichField record already described—the FieldLogic looks up its own field in the WhichField record, and acts if its field is marked and not if its field is not marked. This type of Execution record, which performs the same operation on every data field, is called a "generic" Execution Record because it performs its one and only operation on all types of data records; it is generic in that it performs its operations on all types of data records, not just on one specific kind of data record, and this is a mechanism that greatly reduces code quantity. Execution records do not have to be generic—they can contain references to any mixture of available ExoLogic records (though no more than one per field in the preferred embodiment).

Code ExoPonents that are built to be placed in a field or referenced in a field of an Execution Record are termed FieldLogics. Code ExoPonents are of six basic types (some with a number of subtypes) though others can be created if required as long as the ExoPonent Principle and the other teachings of this invention are otherwise followed.

Starting from the most frequently used, Code ExoPonents types are:

1) A FieldParallel ExoLogic is a code ExoPonent that is field independent and operates on data on a field parallel basis—i.e. it is built to operate on data and outputs that are in the same field of different records as the field it is in itself (whichever field that is). For example, if it is in (which means "referenced by") field 99, it operates on field 99's of other records. If it is placed in field 89 it operates on field 89's of other records. (This is the "Field Parallel Processing Principle in which the grid structure positionally relates the code ExoPonent to the data ExoPonents on which it is to operate and does so in an Any-to-Any manner—one that is not intrinsically hierarchical and is intrinsically unlimited).

2) Serial Logics are code ExoPonents written to process horizontally in the grid. Field ExoLogics process vertically in the grid and Serial ExoLogics process horizontally—along a record. They are of fifteen types of these but others can be written if they are ever needed following the principles taught by these sixteen:

(1) A StarterRecordLogic is written to obtain its input from somewhere (usually from a field in another record that is designated by an OtherRecordField record) and supply it to the record ExoLogic in the next field to their right.

(2) A StarterCopyDataLogic is written to obtain its input from somewhere (usually from a field in another record whose relative or other position is designated by an OtherRecordField record) and copy it into the next field to the right of its position in the record.

(3) MainRecordLogics are written to take their input from the output of a SerialLogic in the immediately previous (to the left) field in the same record, process it and pass its output to whatever ExoLogic is in the next field to the right in the next record (which has to be built to accept that type of input).

(4) A CopyDataLogic is able to take its input data from a particular field in the same record that is in a specific relative position designed by a WhichRelativeField Record, and copy it to another field of the same record in a specific relative position to a record that is designed by a WhichRelativeField record.

(5) A SupplyDataLogic is able to take input data from a particular field in the same record that is in a specific relative position in the same record that is designed by a WhichRelativeField Record, and supply it to a MainRecordLogic that is in another field in the same record that is designed by a WhichRelativeField Record.

(6) A ReceiveDataLogic is able to take input data from a MainRecordLogic in a particular field in the same record that is in a specific relative position in the same record that is designed by a WhichRelativeField Record, and copy it into another field in the same record that is designed by a WhichRelativeField Record.

(7) A BridgeDataLogic is able to take input data from a MainRecordLogic in a specific relative position in the same record that is designed by a WhichRelativeField Record, and supply it to a MainRecordLogic in another field in the same record that is designed by a WhichRelativeField Record.

(8) A CrossCopyDataLogic is able to take its input data from a particular field in one record that is in a specific relative position designed by a WhichRelativeField Record, and copy it to another field in a specific relative position in another record that is designed by a WhichCrossRecord record.

(9) A CrossSupplyDataLogic is able to take input data from a particular field in a specific relative position in one record that is designed by a WhichRelativeField Record, and supply it to a MainRecordLogic that is in another field in another record that is designed by a WhichCrossRecord Record.

(10) A CrossReceiveDataLogic is able to take input data from a MainRecordLogic in a particular field in the same record that is in a specific relative position in the same record that is designed by a WhichRelativeField Record, and copy it into another field another record that is designed by a WhichCrossRecord Record.

(11) A CrossBridgeDataLogic is able to take input data from a MainRecordLogic in a particular field in the same record that is in a specific relative position in the same record that is designed by a WhichRelativeField Record, and supply it to a MainRecordLogic in another field in another record that is designed by a WhichCrossRecord.

(12) A CrossBrainCopyDataLogic is able to take its input data from a particular field in one record that is in a specific relative position in one record in one Any-to-Any system designed by a WhichRelativeField Record, and copy it to another field in a specific relative position in another a record in another Any-to-Any system that is designed by a WhichCrossBrain Record.

(13) A CrossBrainSupplyDataLogic is able to take input data from a particular field in the same record that is in a specific relative position in one record in one Any-to-Any system designed by a WhichRelativeField Record, and supply it to a MainRecordLogic that is in another field in another record in another Any-to-Any system that is designed by a WhichCrossBrain Record.

(14) A CrossBrainReceiveDataLogic is able to take input data from a MainRecordLogic in a particular field in the same record that is in a specific relative position in the same record in one Any-to-Any system that is designed by a WhichRelativeField Record, and copy it into another field in another record in another Any-to-Any system that is designed by a WhichCrossBrain Record.

(15) A CrossBrainBridgeDataLogic is able to take input data from a MainRecordLogic in a particular field in the same record in one Any-to-Any system that is in a specific relative position in the same record that is designed by a WhichRelativeField Record, and supply it to a MainRecordLogic in another field in another record in another Any-to-Any system that is designed by a WhichCrossBrain Record.

3) The third type of Logic is a Grid ExoLogic which is essentially a combination of FieldLogics and SerialLogics and is a code ExoPonent written to take its input from one or more cells in the same or another record or Any-to-Any system, transform the data and output the result to one or more cells in the same or another record and/or Any-to-Any system, or to any of these. Where it gets its data from and where it places its output is designated by a suitable Which-Records (a WhichField, WhichRecord, WhichRelativeField, WhichCrossRecord or a WhichCrossBrain Record (other types of Which Records can be written as needed following the same teachings)).

4) An Output ExoLogic is a code ExoPonent that acts as a translator ExoPonent that takes Any-to-Any system data records as input and outputs the data in a format that a One-to-Many code connecting to the outside world (a printer spooler or emailer for example) requires.

5) An Input ExoLogic is a code ExoPonent that acts as a translator ExoPonent that takes as input, the output of a One-to-Many software that connects with the outside world (such as email) and outputs the received data in the form of data records for use by the Any-to-Any system.

6) A Service ExoLogic is a code ExoPonent, that is often independent, that performs services for other ExoPonents or ExoPonent assemblies. Hence the CopyRecord ExoLogic is a Service ExoLogic that copies a record; the Find ExoLogic retrieves records as requested; the NewRecord ExoLogic creates a Blank new record. The MakeNumber FieldLogic gets a record ID for the new record; the SaveRecord ExoLogic saves a record and so on. One man—one job; one job—one Exo-Logic is the Any-to-Any code motto.

These code ExoPonents, with the exception of Input, Output and Service ExoLogics, are generally assembled into the data fields of Execution records by putting the record ID of the ExoLogic to be used in the field concerned, thereby preserving the previously described preferred manner in which there is only ever one of any given ExoPonent (or ExoPonent Assembly). Of course, this optimal method can be ignored and the ExoLogic itself can be copied into the field and this method was used for quick and dirty tests in the test Any-to-Any system, but with a considerable penalty in bugs which appeared that should not have done and in time to debug problems. Administration Fields are used, to control the use of ExoLogics and ExoModules in the previously-described manners.

It will be understood that between these ExoLogics an Any-to-Any computer can:
 a) Draw data from anywhere in any number of Any-to-Any systems anywhere, do something to that data and put the results anywhere in any Any-to-Any system
 b) Trigger any execution in any Any-to-Any system anywhere.

In short, these logics between them can assemble any number of Any-to-Any systems into a single logical whole, while each Any-to-Any system can still continue to do its own independent processing. Thus a fully implemented Any-to-Any system is one which consists of an unlimited number of Any-to-Any systems acting as a logical whole, with each Any-to-Any system acting as its own computing center where the CrossBrainLogics act as a kind of nervous system that interconnects centers of computing activity, much as occurs in an animal body to some degree. It is foreseeable that such a construction could control a fleet of vehicles each of which has an (interconnected) independence, or could control a robot in which each foot, foreleg, thigh and so on has its own Any-to-Any system with the whole construction controlled by a main Any-to-Any system that itself is part of a higher level robot fleet construction with a fleet commander Any-to-Any system giving orders to individual units which are continuously reporting to it on their environment, status and execution results.

ExoModules consist of one or more (always separate) Execution records and may list what other records they use to operate such as Condition records and Which Field records, though these are often provided to the ExoModule dynamically by a BossModule. In that manner and for example, Any Execution record can be assembled with any record—for example with any Condition (record), though, in the preferred embodiment, with a Condition record appropriate and useful to the Execution record in question.

As has been outlined, language is structurally a type-based ExoPonent meaning transmission system for data. Terming language a "meaning transmission system" is in contrast to state of the art language technology—grammar—which is an ExoPonent Assembly (i.e. word) based inter-word functionality classification system, which, while it may be very interesting, throws no useful light at all on how a human handles meanings. Since these meanings, as has been shown, are handled by a human by Type it seems likely that code might benefit from being treated in the same manner, and in fact, when code is created to handle data by types (paralleling the human ability to handle things by type), the number of ExoLogics require falls dramatically. In the case of code, ExoModules that handle types of data are referred to as Generic ExoModules and generally use generic Execution Records. By building ExoModules generically, the practical result is a considerable decrease in the number of ExoLogics and consequently a decrease of complexity also.

Section 5, Part A2 Environment Requirement 2—Group 1 & 2 Relational Methods, Generic ExoModule Construction.

An ExoModule is an assembly of a) code ExoPonents assembled into Execution Records and of b) data ExoPonents assembled into data records that the Execution Records need to function. The Generic method of assembling ExoLogic into higher level assemblies such as Execution Records and ExoModules arises from applying the ExoPonent Principle to the assembly of code ExoPonents. Applying the ExoPonent Principle to ExoModule construction means that each Execution Record and each ExoModule may only perform one function. Application of the ExoPonent Principle to code assembly in the Any-to-Any code machine in this manner, increases the power of the Any-to-Any computer because the generic ExoModules concerned operate on Types of something (many of kind of something) rather than on instances—specific examples of something—and this increases the word done by each piece of code while reducing the amount of code that needs to be built for a given amount of functionality.

For example, if an ExoPonent assembly is assembled to construct an email only, then another one has to be assembled to construct a letter and another one has to be assembled to construct each of the limitless numbers of document types that now exist or that some human somewhere may invent, and this becomes a race that a programmer can never win. Instead, a Generic ExoPonent Assembly is created to check the correct completion of ANY document type, according to ANY (but separate) mandatory requirement (Condition) that a user can create by himself at any time. Then ANY Condition record can be created (which is just a data record the user can make) and used with that one generic document completion ExoPonent Execution Record (that the programmer assembled) which has the same FieldLogic in every field. Each FieldLogic simply tests whether its field in the WhichField record being used as a Condition Record is a mandatory field that needs to be completed with mandatory data (that is specified by another separate record. (The WhichField record was created unknowingly by the user when he chose which (of the available) fields should be in his new data construction). As a result of this generic construction method, it now only takes one single FieldLogic to create all documents that now exist, or that may get invented from now to the end of time. The user can now himself create new documents types, as all he has to do is copy and change an existing item to the way he wants the new item to be.

In the Generic Method, an ExoModule is not built to create and send email in a manner that is a copy of a state of the art email program. Instead, a Generic ExoModule is assembled to prepare any document of any kind as just described. Another ExoModule is assembled to perform the action of emailing data of any kind. Then the email ExoModule has no connection with the code that prepared the data it sending, and the preparation ExoModule has no connection with any code that will do something with the data it prepared. Similarly, another ExoModule is assembled to perform one type of calculation on any number of anywhere—once a FieldLogic is built to add 2 and 2, it can add 2 and 2 anywhere that 2 and 2 are found (just as a human can). In this Generic manner, one ExoModule prepares any and every document type—every data type—while another one emails any and every data type.

Which particular document gets prepared depends on which particular data display and record selection is used by the BossModule that creates the document concerned. A letter is a multiple assembly consisting of one of more address assemblies, text, signature assemblies and so forth—and so is an email. Ignoring for the moment what activity is going to be performed on the finished data, the differences, data-wise, between an email and a letter are, a) the selection of data records each uses (a letter uses more address-type records than an email does) and b) the fields from those records that do (or do not) get displayed (controlled by WhichField records) and c) the visual spatial relationship of the displayed fields on the screen or when printed, d) the Labels, Prompts or Help (all of which are different types of data records) that get displayed or used with each item. But the data itself does not have to be changed just because of any of the activities that can be performed on it.

Section 5, Part A2 Environment Requirement 2—Group 1 & 2 Relational Methods, View (Display) ExoModules.

Those fields that are designated for display by a WhichField record are displayed by the Any-to-Any "View" display ExoModules. The Any-to-Any View system has its own record types and these are stored in the same table as the data and code ExoPonents and ExoPonent assemblies. View ExoPonents are separate (like every structure in the Any-to-Any computer) and control the positioning and appearance of everything that is seen on the screen or that is printed. (From an Any-to-Any viewpoint, screen display and print appearance are controlled in an identical fashion and do not have to be the same). An Any-to-Any screen is an Any-to-Any structure in which each discrete separate thing that is identifiable on the screen is the result of the output of several single fields in underlying data records. In each case, it is the same field (field 122 for example) in several records that are controlling the positioning and appearance of the data being displayed from the same field 122 of a data record. All the different View records that are part of the ExoModules View records are acting together on a field parallel basis to control the display of each data field's data.

The Any-to-Any View code subsystem takes the data to be displayed from the designated fields of designated Data records, and provides it to the One-to-Many OS display system so as to make the screen perform in an Any-to-Any manner.

Differently to a state of the art system, in an Any-to-Any computer, the data, and the display of it, are two completely different and totally separate things. Because the data and the display of that data are two separate things (the headlamp and the wire are not joined together), the data can be used or printed without being displayed at all (which resolves one of the data insanities noted in the background). A further consequence is that what a human says what something is (such as when he says it is "a letter" or "a presentation" or "a spreadsheet") what that display is for him depends entirely and only on the display of the data and does not depend on what that itself data actually is. Because an Any-to-Any system is built to connect anything to anything, consequently, an Any-to-Any system can couple any data to any display of that data and could, for example, couple and get any given data displayed by a letter display, or by a presentation display, or by a spreadsheet display. Whether it is sensible to do so, is neither the Any-to-Any system's job, nor the programmer's job to decide. Only human users decide what is sensible—after all they are the only ones that know.

For example, "a presentation" may also contain any or all of the same data that "a letter" contains—but it just uses a different set of View records to display the data. Consequently, changing the View records that data records are using to display themselves changes what the user considers the data to be and this is key to avoiding the data insanity of the data itself being in different boxes. Consequently, the single ExoPonent record of "Joe Brown" can be used in an email, in many letters, and in the accounting application—and there is still only one record of that particularly Joe Brown. With these mechanisms, there is no need for email data to be in one format and spreadsheet data in another—the data itself is all in a single format but uses any display that is available or that the user chooses to construct to show it and consequently, the exact same data appears to the user to be an email at one moment and then seems to him to be a presentation the next moment. With these methods, a "spreadsheet" is just a grid-style visual display that can be used as a display type for number data, picture data, text data, or any mixture of any data. Calculation ExoModules can be used with it—or with any other data—but are nothing to do with the "spreadsheet" display format at all. Hence operations such as add, subtract and multiply are just Grid ExoLogics and GridCalc ExoModules in which Grid ExoLogics are assembled to perform calculations that are performed by a state of the art spreadsheet, but are equally generic and so can perform their calculations anywhere, whether the display is spreadsheet style or not, or even if there is no display at all. GridCalc ExoModules are simply ExoModules that are written to take input from wherever the user tells it to get its input and to output the result to whatever cell it was invoked from—or to another cell if the user so chooses. Consequently, each cell in a record can be field paralleled by a Calculation List record. Each field of such a record can reference a Cell List record, and that Cell List record can contain a reference to one Calculation ExoLogic in each cell. Obviously the whole ExoModule can calculate without anything at all being displayed and can calculate in a spreadsheet, but also in "a database", or in "a document" or in "a photograph" or on web data that has been converted to Any-to-Any system format, or on a data type that has not been invented yet.

Anything in the Any-to-Any system can be named. If the user creates a Calculation ExoModule by pointing and clicking (much as he does today) to make a formula in a spreadsheet cell, he can then name it as his "Bingo Formula" (for example). That opens the way for him to given an order such as "copy the Bingo formula into the next ten cells down" or "copy the Bingo formula to the email I am preparing to Joe, and into the photograph of the cat.

Because each thing in an Any-to-Any system is separate from everything else, the formula in a spreadsheet cell is either in a particular field of one record or referenced in the cell, and that (formula) cell is being displayed (or not as the user chooses) by one set of VewLogics. The result of the formula is in or referenced by the same field of another record, which is being displayed (or not) by another set of View Logics. Both sets of View Logics display in the same physical area of the spreadsheet or data item but only one is being displayed at a time. The user can click buttons (which appear to him to be active areas of the cell) that execute an ExoModule that switches one display off and the other on. The result is that some cells can show formulas while others show results, if that is what the user wants. Because the data itself is not a spreadsheet grid as such (just a grid display of data), these same GridCalc ExoLogics can be used to calculate in something that looks like a database or in an email or in a photograph, and no matter how many different types of document it calculates in, there is only ever one of any one Grid ExoLogic that does one kind of calculation.

Per the ExoPonent Principle, the data and the display of it are two entirely separate things and consequently different methods can be used to display the same data. In one method, the Condition Director pair for checking the completion of required fields in a document are used in AllAtOnce Mode, in which the whole visual display is placed on the screen at once in the usual fashion. In AllAtOnce Mode the data record is checked as data is entered or when the user says data entry is complete, using a ConditionChecker generic module that uses a WhichField record to see if data in mandatory fields (for example, in the email address field) is present and correct. If it is, the FieldLogic in that field reports complete. If it is not complete, the FieldLogic has an associated Director record from which it captures the record ID of the referenced ExoModule in the same field and transmits that to its Controller for subsequent activation. The activated ExoModule in the Director Record causes the display of an error message, encouraging the user to complete the missing data—and preventing him from going on until he does. That is an example of the Field Parallel processing method, which allows branching anywhere, by enabling ExoPonents in the same field of different records to be processed without having to process anything else.

In a second display method, which can be useful for an unskilled user, the Condition-Director pair can be used to control Conversation Mode, in which just one field is placed on the screen at a time and when that one is correctly filled in, either the next field to filled in is added to the screen display (ConversationAddMode) or replaces the previous field (ConversationChangeMode). Note that ConversationChangeMode is the fundamental data completion mechanism needed for an Any-to-Any human-computer system to accept verbal orders over the phone (assuming that speech recognition and synthesis is installed, works, and is accessible to the Any-to-Any computing system).

In the third method, where execution is occurring with no screen display or verbal output at all—called OutOfSight Mode or OOS Mode, these mechanisms enable just that field to be displayed in which an error occurs, without displaying anything else (i.e. just displaying the email field and the error message pointing out it needs completing, but not displaying anything else). Such a mechanism is essential for OOS execution, because having the whole email appearing on the screen just to complete one field, is a data insanity already commented on in the background to the invention.

Note that, if an email address is corrected in the course of creating something else (such as an email) then, because it is the one and only example of the email address and is just being redisplayed, when the email is completed (which automatically saves it) the original and now corrected email address is saved also. Note secondly, that records are inactivated but are never erased or over-written in an Any-to-Any human-computer computing system, since to not record (memorize) orders received or to delete (compulsorily forget) data would be a considerable insanity in humans, and in the state of the art, when a personal computer can have terabytes of storage, is also wholly unnecessary. Note further, that for this reason, when something is corrected, it is re-saved with the new time stamp in all records and hence the uncorrected previous one always exists and can be recovered and reverted to or used to identify something—for example, as would be required by an order such as "get me the email about apples that I sent to Joe before he moved from New York". If Joe's New York address was either erased or over-written when he moved form New York, that order would fail and instead, the user would own a computer that had "forgotten" Joe ever lived in New York—a characteristic that humans classify as Alzheimer's diseased. Further that, again for this reason, searches in the Any-to-Any computing environment are always conducted from present time backwards and the first match is used. (Various mechanisms can be used to retire earlier records to a secondary table of identical structure that is only searched upon specific request, and other mechanisms can be used—if desired—to deteriorate the level of data detail that is retained for earlier times.

Finally, when a document such a document that is intended to be emailed has been prepared in one of these manners, it is handed to the last ExoModule specified in the Email Boss ExoModule—the Email Out, Service ExoModule—to convert the record set to the format the outside world One-to-Many state of the art email sender requires.

The above description of Any-to-Any code machine uses of Group I and Group II relation mechanisms shows how these mechanisms are used to cause useful results and will be later de described in more detail by reference to the Figures, but in order to produce useful results, a third group of code-only relation methods are also needed—Group III relation methods.

Section 6, Part A2 Environment Requirement 2—Group 3 Relational Methods, Overview Group 3 relational systems are code-only relational mechanisms and are mechanisms that enable code ExoPonents and code ExoPonent assemblies (ExoLogics and ExoModules) to execute their activities in a coordination fashion. In describing Group 3 relational systems—all of which are Any-to-Any functional relation systems (systems that relate parts so they can function or work)—it needs to be remembered that in the state of the hardware and operating system art, the 100% flexible, Any-to-Any code machine and the Any-to-Any data machine and their Any-to-Any environment, has to be coupled to the comparatively inflexible state of the art One-to-Many operating system. The operating system makes available 1) memory and processing power 2) Video control and 3) mouse control, all of which are comparatively inflexible One-to-Many systems, to which the Any-to-Any system has to output data and from which it has to receive data. This is made more difficult as the only available software language tools with which to make it do so are One-to-Many software writing tools that try and enforce One-to-Many-ism. Of these, the least bad, and the most Any-to-Any language was Java in which the test Any-to-Any system Any-to-Any system was written.

In the future, it is to be hoped that those skilled in the state of the art will understand the teachings of this invention and make available Any-to-Any hardware, OS and software tools which will make integrating the Any-to-Any computing machine with them easier and more powerful. Until they do, this aspect—particularly the control of visual display, while proven to be within the ability of those versed in the state of the art, is still the most difficult aspect of creating an environment for the Any-to-Any systems. There are no fixed rules or methods for connecting the Any-to-Any system to elements of its One-to-Many OS environment, since the interfaces presented by different operating systems and hardware types are totally different—the hardware and operating system of a phone or a watch is not the operating system and hardware of a computer. However, it has proved possible in actual practice for those skilled in the state of the art, and even with limited understanding of the Any-to-Any computing machine to successfully connect the Any-to-Any computing machine to the rest of the computer (OS, computing power, video, and mouse).

In some future time where hardware and OS have been constructed on Any-to-Any principles with matching structures to the data structures, it will be possible to place Exo-Modules as already described directly into memory where they would just be straightforwardly executed by the operating system. In the absence of this desirable situation, Group 3 relational mechanisms consist entirely of work-around mechanisms to connect the Any-to-Any system to the operating system and though it, to computing power, video, and mouse.

Group 3 Relation Systems are relational systems used by the code ExoPonents of the code Any-to-Any machine only and consist of 3 relational mechanisms, as follows:
Section 6, Part A2 Environment Requirement 2—Group 3 Relational Methods,
1. Controller Group 3 relational mechanisms are actually communication methods needed to control the operation of Code ExoPonents and whereby it can be known when a Code ExoPonent has completed its work and the results of its having done so, and hence, when all Code ExoPonents (FieldLogics) in an Execution record have completed their work, to launch the next step of the execution sequence as recorded as part of the BossModule.

Controllers are code ExoPonents that are the first part of the Group 3 relation methods that enable code Any-to-Any ExoPonents and data to be related to the One-to-Many operating system, memory and processing power. In order to control code ExoPonents, each assembly of ExoPonents—an Execution record—has one Controller ExoLogic associated with it which is referenced in the Administrative field termed the Controller Field. Controller ExoLogics are generally ExoLogics of the Grid FieldLogic type and colloquially described they act as kind of boss or orchestra conductor for the Field ExoLogics in their particular Execution record. A Controller Logic can activate Field ExoLogics, receive their completion reports and can itself perform communication activities with other Controller Logics that are found in other Execution Records, or in BossModules. A Controller Logic is one structure but with more than one function, and is a small One-to-Many machine—the price of connecting the Any-to- Any environment to a One-to-Many environment—but since its One-to-Many aspects do not affect user or programmer data handling, and since the Controllers functions are standard and do not need to be individually controlled by the programmer, the One-to-Many potential negative effects are limited to adding an unnecessary layer of complexity and difficulty that would not be necessary with an Any-to-Any Operating System.

Controller ExoLogics are of different types. A Field Parallel or FP Controller controls execution in a Field parallel operating Execution Record. A Serial Controller controls serial (one field after the other) Execution in a Serial Execution record. GridLogic Controllers such as those controlling calculation logics may be written not to depend on individual ExoLogics to report completion but if so, they provide a way to be told that execution is complete (only the user knows when he has completed calculating in a spreadsheet, something he can signal by exiting it, for example). The operation of a Controller Logic will be described in more detailed in the course of describing the Figures.

Section 6, Part A2 Environment Requirement 2—Group 3 Relational Methods,
2. ExoModule Communication System The second relational system required by code ExoModules is a Communication System between Controllers and their ExoLogics. While such a communication system is Operating System dependant, those skilled in the state of the art have proved capable of creating such systems without further teaching than that contained herein.

The communication system needs to have the capability 1) for the Controller Logic in a record to communicate to a FieldLogic so it can order the FieldLogic to execute 2) for the FieldLogic to tell the Controller it has completed executing and 3) for the FieldLogic to pass to the Controller Logic a record ID it may have obtained from another record such as a Director Record which contains the record IDs of Execution Records to be activated.

In a Generic ExoModule where every field contains reference to the same ExoLogic (i.e. that ExoLogic's operation can be performed on any and every field at will) which fields it is to perform on is controlled by an accompanying or provided WhichField record. FieldLogics built to work with a WhichField record automatically report done (without performing their execution task) immediately on accessing their own field in the WhichField record if there is no mark in their field of the WhichField record (meaning they should not execute). But, if their own field is marked in the WhichField record, they only report done when they have finished performing the operation they were written to do. (Examples of these communication operations will be described later in relation to the figures).

Section 6, Part A2 Environment Requirement 2—Group 3 Relational Methods,
3. Kernel In order to connect the Any-to-Any computing machine to the One-to-Many operating system which controls memory, computing power, screen and mouse, practical experiment shows a small kernel is required. When records are found they are loaded into the kernel in memory; the kernel executes the ExoLogics by executing the Controller, which launches and controls the remaining ExoLogics in the Execution Record. The operation and construction of the kernel depends on the requirement of the operating system in use, and is again outside the scope of this invention, but proved to be within the capacity of those skilled in the art without additional teaching or guidance. (Examples of the operations that Controllers and FieldLogics perform in the supporting environment of the kernel will be described later in relation to the figures).

Section 7, Part B Overview

Parts B1, B2 and B3, cover the requirements for making the data Any-to-Any machine and the code Any-to-Any machine harmoniously interoperate so as to produce a human-controllable Any-to-Any system that produces useful results.

Section 7, Part B1 Environment Compatibility

The first requirement for two Any-to-Any machines to harmoniously interoperate is that the environment requirements of the two Any-to-Any machines concerned must be compatible. As the description so far has shown, the environment requirements of the Any-to-Any data machine and the Any-to-Any code machine environments are compatible—no part of the environments described for both Any-to-Any machines clashes with any other part, neither in theoretic terms nor by actual practice in the ExoBrain test system.

Section 7, Part B2 Same Number of ExoPonents

The second requirement for two Any-to-Any machines to harmoniously interoperate is that the number of different components of the required type is the same in both cases.

As was previously described, the number of data ExoPonents that can be used in the data Any-to-Any machine and the number of code ExoPonents that can be used in the code Any-to-Any machine are both infinite, as the human can always invent more of either of them. But, as will now be evident, and as will become more so with the remaining description, the number of code ExoPonents will always be able to exactly match the number of data ExoPonents, because, a) all data ExoPonents can be matched with any code ExoPonent and b) code ExoPonents are not actually created one-for-one with data ExoPonents but can be used one-for-one as they are used by referencing them, and there can be as many references (and therefore as many virtual copies) of an ExoLogic as there are data ExoPonents. Hence the numbers of ExoPonents in both the data Any-to-Any machine and in the code Any-to-Any machines are not physically the same but the relation mechanisms make the quantity of each logically the same in number.

Section 7, Part B3 Any-to-Any System Overview

Group 4 relational mechanisms are those mechanisms that enable two Any-to-Any machines to harmonious interact and produce an Any-to-Any system that produces a useful result. There are two Group 4 relational mechanisms that between them create the Any-to-Any system and they are the Any-to-Any data and code machine equivalents of those mechanisms which (in an electronic environment) enable the binary code Any-to-Any machine and the transistor Any-to-Any machine to harmoniously interact so as to produce the useful of doing all of today's computing. Hence in the software (code and data) sphere.

The first Group 4 mechanism bridges or couples the data Any-to-Any machine to the code Any-to-Any machine and enables the code Any-to-Any machine to act on and be acted on by the data Any-to-Any data machine. The result is an Any-to-Any system that (in the absence of anything else) would not be able to be controlled by anyone and hence would be inactive.

The second Group 4 relational mechanism bridges or couples the human user to the Any-to-Any system and enables the user to control it and so produces a combined human-computer Any-to-Any data-activity system that not only harmoniously interacts within itself, but also harmoniously interacts with the human. These relational mechanisms enable the human's wishes to be related to the Any-to-Any computing system's abilities with the result that data provided by the human is converted into ExoPonents which then act both to control the Code Any-to-Any machine and to be acted upon by it in a harmonious manner with a useful result.

Section 7, Part B3 Any-to-Any System Anatomy

In order to relate the Any-to-Any data machine and the code Any-to-Any machine together so that they harmoniously interact, the basic principle is that one code ExoPonent performs one action on one data ExoPonent at a time. In principle any code ExoPonent can act on any data ExoPonent. Whether getting a particular code ExoPonent to act on a particular data ExoPonent produces a useful result is not the point. The point is that one code ExoPonent can act on any one data ExoPonent, and, if there is a mismatch when they do so, that will not destroy anything else. The only result of such a mismatch would be that the interaction of the pair has no result—much as a human might try and cut a rock with his finger and produce no result by doing so either. The freedom to do anything is also the freedom to try to do unworkable things.

Code ExoPonents that are FieldLogics as already described are assembled into Execution records and execution records can be assembled so as to match and be mirror images of, any assembly of data ExoPonents. As has been seen in a previous example of an address, data ExoPonents can be assembled into multi record structures that are an ExoPonent mirror image of the data that the human calls "an address" or "an email" (for example). Code ExoPonents are then assembled into one or more code structures that are mirror images of the data assembly, and, by using any required mirror image code assemblies on the data assembly, can perform any operation on any part of the data assembly.

Code ExoPonents operate on data in individual fields (or may sometimes take data from more than one field). For example, supposing that the Reference Number field in this case is labeled with the sub-type of "email address" and that it has not been filled in by the user (which, obviously, will prevent a successful send of the email). Now the email itself is one structure that is assembled from others, one of which is an email address record—a record containing the single ExoPonent of the particular email address. If the email address is missing, in order to send a successful email, something—code of some description—needs to detect that, and something else needs to ask the user to provide the email address. Finally it would be helpful if something else showed the user what the result should look like. Now each of these somethings are all things that need to be done to that one single field—the (so far blank) field of the email address record. Effectively, that single field needs to be paralleled not by one, but by several different ExoPonents, each performing a single, but different step on, or by reason of, the data field contents or lack of contents.

However, similar situations apply in every other displayed field of all the other records making up "an Email" or "an address" or "a letter" or any and every data item or type, and this makes it apparent that to create the Any-to-Any computing machine, each ExoPonent part of each ExoPonent data structure needs to be paralleled or mirrored by not just one but by several similarly patterned code and other (data) ExoPonent structures that the code ExoPonent structures need to refer to, to do their work properly.

Visualizing this, a single row of white data bricks, needs to be paralleled, one for one, by several rows of red code bricks, plus other rows of white data bricks that the code refers to. It there is a data structure consisting of several rows each with a different number of white bricks, each of those rows needs to be exactly paralleled or mirrored, by several different rows of red code bricks. This can be further visualized by thinking of a row of white Lego mono-meaning data bricks sitting on top of a row of red monofunction Lego code bricks, and underneath that, another two or three rows of white Lego mono-meaning data bricks that the red code bricks are accessing and using as instructions or comparison data to do their work on the top row of data bricks. This makes it obvious that the row of white data bricks that is being acted on by the row of red code bricks right now, could easily, a few instants later, be being used to supply data to or control the activity of some other row of red code bricks and that, at any moment, any data record could be used as a data record to control execution. To provide a colloquial comparison, if the state of the art system is something like a complex of automated factories with a central control room each producing one particular model (and no other) of complete data cars whose features were decided by the factory owner, then, the functioning Any-to-Any system is more like a bucketful of data and nanomachine soup that produces on demand whatever its controller wants—this model, that model, or any other model of anything its controller can dream up.

Each data ExoPonent is a mono-meaning entity, referenced in one field of a data record. That one atomic meaning in one field of a data record is then normally paralleled by a number of mono-function code ExoPonents each referenced in the same field of Execution Records, each using data in a number of fields of other data records such as Condition Records and Director Records. Imagining this in a spreadsheet type of display, the data record to be acted on (an email being constructed, for example) might be in row 1, while row 2 would be an Execution Record, row 3 would be a Condition Record containing data to be compared to the Data Record and row 4 would be another Execution Record being used as a Director Record—in other words, containing reference to ExoModule records, that are each the correct ExoModule to call if the tested condition in that field of the Condition Record is not met. At the same time as execution can occur in parallel, horizontally, simultaneously in any or all of the 200 or so available data fields in the Row 2 Execution record, it can also occur vertically down the columns. So if the condition required in field 60 (column 60) of the Row 3 Condition record is not met in field 60 of the row 1 data record, the ExoModule referenced in field 60 of the row 4 Director record is called by the FieldLogic in column 60 that performed the test on column 60 data in the data record in row 1. Obviously, the ExoModule that gets called if the data in column 61 fails to match the condition in column 61 of the conditions record in row 2, can be completely different to the ExoModule that gets called if the data in column 60, or 50 or 62 etc fail their tests. This means that each atomic meaning is able to cause any chain of executions. There are two effects of these mechanisms.

Firstly, execution actually occurs as a grid of mixed data and code. Secondly, even a single atomic meaning—a single ExoPonent—can cause a branch. This branch can go off and execute without having to stop the original Execution, which just waits for the branch to finish executing and come back with the right data that now tests as OK. The result is a system that can branch from anywhere to anywhere, without having to halt any of the executions concerned (which was one of the data insanities noted in the Background).

The BossModule is the relational mechanism that fulfills the requirement to be able relate data ExoPonent structures with code ExoPonent structures and so that they mirror one another structurally, so that the code Any-to-Any machine can produce transformations on the data Any-to-Any machine.

Execution Records are assembled into more complex structures (potentially on the fly) by BossModules. A BossModule consists in part of a List record—the list it contains is an assembly plan of all the different records the BossModule needs to produce the required result. A BossModule is so assembled that if it is supplied with a data record and an instruction to execute, it will do the rest.

The activity of a BossModule is analogous to that of a human who performs a number of operations on a given something. For example, the human may have one piece of data—say a first name—that is printed on a piece of paper, and wish to take that first name and stick it on the spine of a physical file to label it. The human performs several operations in sequence on the first name printed on the piece of paper: 1) first he cuts (action 1) the name out of the printed sheet using scissors, then he applies (action 2) glue to the back of the rectangle he has cut out, then he positions (action 3) the new label on the file and presses (action 4) the label onto the spine. As this example shows, the human joins any action to any action in a manner that is not intrinsically hierarchical and is intrinsically unlimited to perform the action sequence he wants. The data output of one action (the cut paper) is the data input for the next action—the action of applying glue to it, and so on down the sequence. Each of these activities the human can do is completely separate from one another and can be applied to any target for that activity. Once the human knows how to cut, he can cut anything that can be cut as well as trying to cut things that cannot be cut. Once he knows how to glue, he can glue anything that can be glued. His activity ability is not specific—e.g. it is not just the ability to glue a small rectangle of paper—but is a generic ExoPonent activity—the ability to glue anything. He can assemble his gluing ability with anything glue-able and can even try and glue things that cannot be glued such as trying to glue water to air. The human assembles his ExoPonent activity ability, on the fly with the data—whatever he wants to perform the activity upon. Hence, with the human, while the data or thing upon which he wishes to act is often pre-assembled into a complex structure as it is in the Any-to-Any data machine, the human's abilities are mostly not pre-assembled into complex activity sequences (except with frequently repeated sequences such as walking) but are assembled on the fly, on demand. The Any-to-Any system's method of assembling activities on the fly is the BossModule.

The programmer assembles single activity Any-to-Any code machine ExoPonents as far as making them into single activity ExoPonent assemblies—Execution records—often containing the same FieldLogic in every data field and when so assembled, the Execution Record is able to perform that single activity on each and every data field if the FieldLogic in that particular field is ordered to do so. If there are 200 or 10,000 data fields in use, this essentially makes the Any-to-Any computing machine into a 200 or 10,000 parallel channel execution machine (that is not difficult to "program"). The programmer—and sometimes a designer or user—assembles these Execution records with those Data records needed to control its execution and thereby makes a BossModule.

Because each code ExoPonent Execution record is separate from every other code ExoPonent Execution record, it can perform its activity on whatever data record is fed to it to be acted upon, and any one Execution record can be sequenced in any sequence with any other Execution Record in a manner that is not intrinsically hierarchical and is intrinsically unlimited—much as the four ExoPonent bases of the genetic system, adenine, thiamin, cytosine and guanine can be assembled in any sequence, and the sequence they are assembled in controls the protein they make and the body or plant they produce.

Which of the data fields (channels) a single activity Execution record acts on in any given circumstance is controlled by an accompanying field parallel WhichField record, which marks with an X or other suitable symbol each field where the FieldLogic is to activate and act. If there are 200 data fields, then the combination of one Execution record and one WhichField record provides 200×200=40,000 possible combinations of activity. If there are two such Execution-WhichField record combinations following one another in sequence, then 40,000×40,000=1,600,000,000 (one billion, six hundred million) different execution combinations are available between them—using just two 20 Kb copies of ONE Any-to-Any code machine ExoPonent Field-Logic. Considering that a working Any-to-Any system may contain several tens, hundreds or thousands of such potential combinations, the available execution combinations are staggering while complexity is almost non existent, showing that the invention meets the requirement noted in the background that adding arithmetic complexity adds logarithmic functionality and is not in any way self-limiting.

Practical experiment shows that very few FieldLogics and hence single-activity Execution records are needed to handle data, and the fundamental basic operations (much like add, subtract, divide and multiply in arithmetic) that all data uses are: Enter Data, Find data, Copy data, Compare data, Calculate data, Save data, etc. (A review of all Any-to-Any systems—binary, transistor, Lego, Base 10 arithmetic, Genetic code, shows that in every case, the basic activities performed by the ExoPonents of which they consist are staggeringly simple. As an example, with the Lego Any-to-Any system, exactly two activities are permitted—1) plug (bricks) together 2) unplug (bricks), and that Any-to-Any system is one in which one single component (the brick) and a grand total of two activities between them build and model anything from a square to a complete model city, world, universe or unlimited (e.g. science fiction) universes. With a One-to-Many system the sophisticated activities arise from the complex sophistication of the assembled component structures themselves, coupled with relatively little relational sophistication, if any. In an Any-to-Any system, the exact opposite is the case, and far more sophisticated activities arise from extreme simplicity of component, extreme simplicity of (very few) actions that can be performed by them, and sophisticated relational systems that together allow the most extreme and almost incomprehensible sophistication of assembled structure to be created—like a human body, for example.

Hence, relatively few FieldLogics and single action generic Execution Records are needed to handle meaning data (ExoPonents from words); the most complex are those needed to perform mathematical functions. Far more Execution records are needed to control the screen in an Any-to-Any manner. The earlier partial listing of the ExoPonents of just one visual structure—a box—when completed leads to an extensive list of screen ExoPonents, each of which needs its own Execution record to handle it and often more than one. For example to change the length of a line, requires two—one ExoLogic is needed to change the length in one direction (e.g. lengthen it) and another to change it in the other direction (shorten it). It is under such circumstances that strong programmer resistance can arise to this "inefficient" manner of performing executions (as mentioned in the earlier cautionary note to Any-to-Any system builders).

Examples of typical activities for single-activity Execution records are 1) to copy ExoPonents in a particular field of one record to the same field of another record and signal completion to the Controller Logic when done. 2) To compare ExoPonents in a field of a Data record with another ExoPonent in the same field of another data record being used as a Condition record and, if there is a match, signal completion to the Controller Logic and if there is no match, then activate the Execution record referenced in a third, Director record. 3) To compare ExoPonents in a field of a Data record with another ExoPonent in the same field of another data record being used as a Condition record and, if the data record value is greater, signal completion to the Controller Logic and if it is not, activate the Execution record referenced in a third, Director record.

It comes as a shock to the Any-to-Any system designer, to discover, when creating functionality in this manner, that virtually all higher level functionality is simply assembled from very simple functions such as these, in much the same way that all computing is done by assembling the two available states of a single type of transistor (which can only be either on or off) so as to do all computing. It is shocking that software, from being an exploding mountain of hideous complexity in the state of the art suddenly becomes small to the point of almost vanishing and that software goes from being inhumanly complex in the state of the One-to-Many art to being childishly simple in the Any-to-Any computing machine; and that extremely sophisticated functionality derives from the assembly of the functionality using sophisticated relational systems and not from the code itself. In the light of Any-to-Any computing machine experience, it has become very clear that the complexity in the state of the art—code bloat and other undesirable phenomena—arise not from code attempting to do useful things for the user, but from code attempting to provide a data-data and code-data relation system while doing so—activities that, in the Any-to-Any computing machine, are entirely separate and nothing to do with code. Additionally, state of the art software bloats because it uses One-to-Many relational systems instead of the Any-to-Any relational systems the human requires.

Section 7, Part B3, Any-to-Any System—Group 4 Relational Methods 1. BossModule

The BossModule is the Any-to-Any relational mechanism that relates code and data so as to cause and control execution. A basic BossModule consists of 1) a Commanded Record 2) a List Record, Execution Control type, which lists the Execution records the BossModule uses, and the data records of various types used to control the Execution records it uses 3) A Reader Execution record and 4) a specialist Controller Logic called a BossModule Logic. Describing these parts in turn:

1) The Commanded record contains the ExoPonents that are later matched with those ExoPonents in the user's order that denote the activity the user wants to do and which (when matched to the user's order) gets sent to the kernel to get executed. As will be described in more detail in the Figures, it is the process of matching the ExoPonents specified in the user's order with those ExoPonents in the BossModule's record, that results in the BossModule being found, retrieved and executed, thereby performing the user's order. Note that while "send an Email (now)" is one activity, "prepare an email now and send it if (some condition is fulfilled)" is another one, and would require a different (though similar) BossModule. (Copying a BossModule, and making changes to a few parts of it, is an elementary activity taking a few minutes, but doing so, does not copy any code, and only copies references to code—references to FieldLogics—and does not require any programming for the changed BossModule to work. This sort of activity does not need a programmer, only someone who can read and follow instructions).

2) The Execution Control List record is a List record whose record ID is listed in the BossModule Commander record's List Administration field. This record lists the IDs of the Execution records and the other records that the Execution record needs to operate and does so by entering the record ID of a particular needed record into each data field in the correct sequence in which they are needed. However, and unlike any other record type, any individual data field of a List Execution Record may alternatively contain a single execution control symbol of which there are four different ones (others can be created on the same principles as required). It does not matter which symbols are used, as long as the symbols used are recognizable by the BossModule in the manner described. The symbols are 1) A semicolon ";" which is an "End of ExoModule" indicator that tells the BossModule that the list of records needed by the Execution record in the sequence ending with the semicolon is complete and that the Execution record in the sequence should now execute—in other words, the records listed up to the semicolon constitute a complete ExoModule. Accordingly, the BossModule, when informed by that Execution record's Controller Logic that the Execution record has completed, goes to the next record after the semi-colon where it previously stopped reading, and now goes on and gets Finds performed on all the records in the next fields of the List record (i.e. on the next ExoModule), stopping when it reaches the next semi colon, and then hands all the retrieved records of the ExoModule to the Kernel to Execute together with the data record on which it is to execute. 2) The second symbol is a "?" that serves to tell a FieldLogic where to put a record ID it needs to write into a field. As execution occurs, a new record will sometimes be produced and the next Execution record in the sequence may need to be handed that record ID. It can be handed that ID (as will be described) by a FieldLogic handing the record ID to its Controller Logic, which hands it to the BossModule Controller. The "?" Mechanism provides an alternative method which is useful under some circumstances. When the record ID that will need to be used is not known in advance (for example, if it is created on the fly) the "?" symbol exists to tell a suitable FieldLogic "the record ID you want to copy to somewhere should be copied here". An Execution list record may contain several of these "?" symbols, but as each one is overwritten with the record ID it is there to receive, any one FieldLogic that needs to write in a record ID simply scans along the list record to find the next "?" in the sequence, and wherever that is found, overwrites it with the record ID it needs to write. (In fact this activity is not done by the FieldLogic itself, but by a specialized Logic to which it hands the record ID to be written 3) The third symbol is "+" which is joined to a record ID. This is to tell the BossModule that there is another List Execution record that is joined end to end with this one, and that that the joined record is the one that precedes the "+" sign. 4) The final symbol is a colon ":" which essentially means, "create a new record and write its ID here".

3) The Reader Execution record is an Execution record with the same FieldLogic in every field and is field parallel with the Execution List Record; it is designed to read the record IDs in the Execution List record and supply them to the BossModule. Its Controller Logic is a Serial Controller Logic, and therefore controls its FieldLogics to act one after the other in sequence along the record. (Different types of Serial Controller Logics can be written to operate in different modes. For example, a) they can be written to execute all FieldLogics at once, or b) one after the other or c) can be written to execute in step mode, so that it activates the first FieldLogic in the record's data fields and then stops and when instructed by the BossModule Controller, it activates the next one and stops and so on, or d) can be written as burst mode Controller to execute some FieldLogics and then stop then others and stop, as controlled by a Burst record or by the presence of the End of ExoModule indicator ";" described above). Each FieldLogic in the Reader Execution record, when instructed to do so by the BossModule Controller Logic, checks the accompanying field parallel WhichField record, and if its own field is not marked, it reports complete, and if its own field is marked, reads the value in its field of the Execution List record and hands the read record ID back to its Controller, which hands the read record ID to the BossModule's Controller Logic.

4) The BossModule Controller Logic is a specialized code ExoPonent that controls the operations being described in this section and is needed as part of the bridge between the Any-to-Any systems built by the invention and the One-to-Many Operating system. (Supposing a 250 channel Any-to-Any Operating system existed, in the preferred embodiment this would be backed up by 250 channel memory and processor channels, the operating system could just be handed a package of records, as listed in the BossModule's Execution List record and would then simply execute them, effectively taking the place of both Controllers and Kernel).

A BossModule is activated when it is found and retrieved from storage by the Command Matcher (to be described shortly) and handed to the kernel to execute. The Command Matcher a) sends the BossModule to the kernel to execute, b) together with a data record on which it is to act—the data record may be either a single data record or a data record that is the Base Record for a data record assembly, that lists, in a List record referenced in its List field, the other records that are part of it, together with WhichField records that say which fields are to be displayed and ViewData records that control and state the View to be used to display it, if any.

The BossModule Controller Logic's functions from the moment it is first activated by being placed into memory are as follows: 1) it uses the Reader Execution record to read the first sequence of records in the List Execution Record up to the first stop symbol (a semicolon in this example). 2) It calls a Find ExoModule to find and retrieve all those records from storage and 3) creates a new output record for the Execution record (using a New Record ExoModule) if called upon to do so by a ":" symbol in the Execution List records. It then 4) hands these records to the Kernel, 5) communicates to the Controller of the Execution record, the other record IDs handed to the kernel for it to use (for example, the data record it received, potentially a WhichField record, potentially a Condition record Director record pair etc) 6) instructs the Controller of the Execution Record to execute. 7) The first Execution record executes, its Controller getting completion reports from its FieldLogics as they complete. 8) the Execution record Controller informs the BossModule Controller that it is complete, then 9) the BossModule Controller repeats the sequence 1-8 on further ExoModules until there are no more such sequences to repeat and then 10) terminates and unloads all records from memory, or awaits user instruction to terminate, depending on how it was written.

Branching can occur at any point—at any field—in the execution and in the preferred manner, each Any-to-Any system data field contains a single, individual meaning—which therefore makes it obvious that every single meaning in a data record can result in a branch, just as any single meaning a human receives from another can cause him to branch his execution. For example, a Condition Checker Execution record might check a given data field in a record and find it is not complete and that will cause it to go to the same field in the Director record and find the ID of a BossModule that is recorded there. The FieldLogic in a Condition Checker Execution Record is written so that if it does collect a record ID from a Director record, it will a) return this ID to its Controller which returns it to its BossModule's Controller together with the ID of the Data record on which the Controller is acting, together with a symbol indicating this record is already in memory. The BossModule, receiving this information from the Controller, will a) Find and send to the kernel the record ID that it was handed (which is always that of another BossModule) together with the ID of the data record it received. The new BossModule, BossModule 2, will execute and will either get the incomplete field of data record in question completed, or will similarly launch another BossModule sequence that will do so. The FieldLogic that found the field incomplete, when it hands a record ID from a Director Record to its Controller, then periodically rechecks its field to see if that field now meets the required condition and when it does, reports completion to its Controller, which so reports to its BossModule Controller, enabling the BossModule execution sequence to complete.

If it is not possible to complete the execution at a given time, an Abort ExoModule can clear the BossModule and all its called records from memory, and place a User Aborted symbol in the Execution Result Record. A SaveForLater ExoModule can save the whole record set being executed in its present state, and mark the Execution Result Record with the value of "Pending". As one efficiency, since there are relatively few Execution records and many of them are used frequently, the Execution records that have had their FieldLogic record references replaced with the actual FieldLogics when they were loaded into memory, can be saved in memory by the kernel, and kept available for re-use during a given session and only unloaded if memory space gets short.

The fact that processing is occurring one ExoPonent at a time, means that it is possible to pause processing anywhere, at any time, at any ExoPonent meaning—which is just a small part of "a word"—and make that ExoModule wait, while branching to somewhere else (to get or create missing data for example) and then return to continue execution without having to restart the whole execution process over again as is current in the state of the art; hence, branching can occur at Any atomic meaning, and go Anywhere at all from there. (In the state of the art, if an email will not send due to a wrong address, it simply sits in the outbox and in order to make it go, the email send execution has to be restarted—the email has to be opened, the address corrected, but then it has to be then sent and re-spellchecked (or the spell-check cancelled), before it will go to the send mechanism again—all of which occurs because the sending execution cannot branch at the user level).

A Senior BossModule can call other BossModules either in sequence or simultaneously as necessary. Senior BossModules can call other Senior BossModules and always in a manner that is not intrinsically hierarchical and is intrinsically unlimited.

The ability of BossModules to call other BossModules enables the user to use the screen to assemble powerful functionality. For example with an Assembly ExoModule a user can click on the Button it displays for a ConditionChoose ExoModule's Button to chose (or create) as many Condition (records) as he wants as conditions to be met for an execution to occur. He can follow this by clicking on an ActionChoose ExoModule's Button to choose one or more Actions to be done when the Conditions he chose are satisfied. He can then complete the sequence by clicking on a SpecificationChoose ExoModule's Button to choose (or create) one or more Specifications on which the chosen Actions are to be done. As is normal with the Any-to-Any system, the resulting package can then be named (so it can be called by Meaning Processing) and is anyway given its own button so that it can be activated either individually or by having its own Commanded record (and that record's Button) placed in another Button's Execution list. In this manner, Any Condition can be assembled on the screen with Any Action and Any Specification in a manner that is not intrinsically hierarchical and is intrinsically limited, just as a human does. In this manner the user can himself assemble (with screen techniques that do not need language control) a button that results in thousands of Any-to-Any systems calculating the profit made in their respective organizations in the last x minutes, or results in executing a command such as "if my wife sends an email saying apples, and if XXX other condition, or YYY other conditions and ZZZ other condition (etc) then email this promotional brochure to anyone who bought apples from us last week". As described in the background the ability to assembly any Condition with any Action and any specification for that action is a human ability that a computer needs to be able to do, which it cannot do in the state of the art, and which, as this description shows, the Any-to-Any systems enable a computer to do.

Section 7, Part B3, Any-to-Any System—Group 4 Relational Methods 2. Token System In order for one record to transmit to another information such as its completion or the ID of a record that has been produced, the Token Communication system is an alternative or supplemental communication system to the BossModule Controller Logic communication system already described. The Token system consists of a TokenIn and TokenOut Administration fields together with specialist Token Field ExoLogics that are used field parallel to the Token fields and operate them. These Token ExoLogics are referenced in the Token fields of Execution records where they operate under the control of that record's Controller. (If TokenIn or TokenOut fields are required in an Execution Record itself, as well as the TokenIn and TokenOut FieldLogics in the same record, then, additional Administration fields have to be created to reference them). The Controller normally starts TokenIn FieldLogics before starting any other FieldLogics (so as to acquire any record ID that is in the data record's TokenIn field, and then starts the TokenOut FieldLogics when all remaining FieldLogics are done, so that the TokenOut FieldLogic writes the record ID the Controller gives it to the TokenIn field of whatever record ID the Controller tells it to. Alternatively, the activity of the Token ExoLogics can be specified and controlled by data in specialist Token (data) records, always on the general principle and mechanism that a field can always have a record of its own type.

A specialized Token ExoLogic of GridLogic type can write a record ID into the next available field in a Boss ExoModules Execution List that is marked with a WriteHere "?" symbol. With this method the newly produced record is dynamically incorporated into the execution sequence, enabling the BossExoModule to pass that ID on to the next ExoModule in its list that is to execute. Using the same general method, the record ID of a record that has just been copied by a CopyRecordField ExoModule, can be passed on to the next ExoModule that needs it to execute.

Between them, the BossModule and the Token system are the methods needed to relate the data Any-to-Any machine and the code Any-to-Any machine together so that they can harmoniously interoperate, and all that is then missing, is to provide a bridge between the human and the harmoniously interoperable Any-to-Any computing machine so that the human can control it to do useful things for the human, and that is the role of the Command Matcher.

Section 8, Part B3, Any-to-Any System—Group 4 Relational Methods 3. Command Matcher As previously mentioned, it is necessary that an Any-to-Any human-computer data-activity system is data driven and not software driven. It is clear that visual/mouse Point and Click or Drag and Drop methods will always be the fastest way to control many of the simpler actions in a computer—it is faster to drag a value from one cell in a spreadsheet to another using a mouse than it is to give written or verbal orders to do the same thing. On the other hand it is faster to give more complex orders verbally (if voice recognition exists) or in writing if it does not. Orders like "get me the list of people who wrote to us about bananas who also bought applies" is much faster given as a verbal or written order than if the same order is given in a point and click visual/mouse fashion. Even when ExoMeaning Processing (Meaning Processing that turns words into correctly related ExoPonents) is available to turn the user's language orders into executable ExoPonents, some orders will still be given using mouse, screen, and touch screen methods and orders may also be received from other sources such as a remote Any-to-Any computer. All these order inputs must all be able to be integrated with one another and used interchangeably and that requires a common mechanism, in which data—the order that is given—drives the choice of code with which to execute the order.

That common mechanism is the Command Matcher. The Command Matcher takes orders from any source—from an ExoMeaning Processor if one is installed (which in turn can be fed by either workable Voice recognition if that exists, or from Talk Box into which orders are typed), or remote orders from elsewhere (for example from another Any-to-Any system) or visual screen and mouse orders generated by clocking buttons. All orders must however be given to the Command Matcher in ExoPonent record format. Orders in ExoPonent record format are termed Commander Records. Commander Records are either the user order in ExoPonent form, or a modified version of it. When the Command Matcher receives a Commander record, it causes a find to be run using the Commander Record as a Find Spec. This process matches the received Commander Record/s to the appropriate Execution BossModule Commanded Record which is then retrieved, and is handed (together with the Commander record) to the kernel to execute.

An order may be given through a Meaning Processor. Meaning Processing is outside the scope of this invention but in brief outline identifies the particular ExoPonent meanings in use in the order and correctly relates them in ExoPonent record format as a first step. As a second step it will, if necessary run the record so produced through a Resolver Stage which resolves such terms as who "he" actually refers to, which day "yesterday" is and so on and in all cases replaces these with the concrete data the term references. As a final step the Meaning Processor generates one or more Commander Records (each containing one of the Actions the language said should be done) and potentially additional data records which between them form a complete executable order in ExoPonent record format as has been described herein. The Meaning Processor is the computer version of whatever a person does when he receives and understands an order but does not include executing the understood order.

The Meaning Processor sends the Commander Record (and any additional data records) to the Command Matcher. The Command Matcher is a Service ExoModule that hands the Commander Record to the Find Service ExoModule which uses the Commander record as a FindSpec to perform a find using the Record Type Administration Field to limit the find to Commanded Records. The Commanded records retrieved by this process are BossModule records, whose Admin List fields contain reference to a List record that contains record IDs for the records needed to perform each BossModule's intended task. (For example, the Email BossModule would list all the various records and Execution records it needs in its data fields in the order they are to be executed, and by executing them, the BossModule gets the Email fully completed by the user and then calls and sends it to the EmailSender ExoModule to send out). The Command Matcher hands the Commanded (BossModule) record that the Find ExoModule retrieved for it to the kernel to execute together with the Commander (user order) record and any additional data records.

If the activity of sending an email is being controlled by the screen and a button which is attached to a data item, and which displays a label of "Email" item is clicked, doing so does not directly launch email preparation ExoModules. Instead clicking this Email button causes an associated Commander record (referenced in the Director field of the Button record) to be sent to the Command Matcher together with the item's data records and the Command Matcher processes these as described above. In effect, the button the person clicks is a substitute for the person ordering the computer using an ExoMeaning Processor which outputs ExoPonent record, or for a command received from another Any-to-Any system also and always in ExoPonent record format. Alternatively, if a stand-alone "Email" button is clicked when the user just wants to create and send an email, this too causes a Commander Record to be sent to the Command Matcher, but the accompanying data record it newly creates is empty. Note that in all cases the code activity is data-driven—the data (the Commander record which is always generated by every type of incoming order) chooses the code, thereby rectifying a problem note din the state of the art which is software-driven, where the user chooses the software and the software chooses the data.

The Command Matcher mechanism, combined with the remote find ability can also be applied to retrieve code from a remote Any-to-Any system also, so that if the Any-to-Any system does not "know" how to do something, the Any-to-Any system IfNotFound mechanism is triggered, resulting in the Commander Record being sent to another, remote Any-to-Any system in order to cause the retrieval of the missing BossModule or ExoModule as will be described in the figures.

The Command Matcher relational mechanism confers a great deal of flexibility. Because of it, for example a) a local Any-to-Any system does not have to stock all functionality but b) the MotherBrain (effectively a specialized web-based Any-to-Any system) can act as a central functionality warehouse, c) those running the MotherBrain can be instantly alerted to missing functionality in real time and supply it soon afterwards, potentially within a few hours as most code ExoPonents are simple to write and finally d) just like a secretary given an order she does not know how to do, who goes to another secretary to find out how that is done, and then returns and does it (a process that is transparent for the boss), the Any-to-Any computing machine, that does not know how to do something, can go to another Any-to-Any computer that knows how to do something, "learn" how to do it (download the ExoModule) come back and do it—transparently for the user.

Further, providing the kernel is correctly written so as to allow it, nothing prevents many BossModules executing simultaneously on the same machine. Equally BossModules can execute remote finds and remote saves on other Any-to-Any systems connected through the internet as described herein. Equally, the Command Matcher mechanism, Cross-Record and CrossBrain ExoLogics, and the ability to relate a single cell in the data grid to what amounts to a complex data such as a spreadsheet means that extremely complex calculations can obtain data from anywhere, be performed anywhere or by any complex of computers, and output anywhere, to any or many cells in any or many Any-to-Any systems, and additionally data or code can be called from anywhere in real time, assembled, used and output anywhere. Using RemoteSave and RemoteFind it is also possible to split up the Any-to-Any system transparently and the result could be (for example) that data can be on one (or several) Any-To-Any computers, the data display on another, and most of the code elsewhere, all these things being executed without prior setup and used by an Any-to-Any system that is held on a USB key that can be plugged in anywhere.

The above completes the description of the outline of the mechanisms that between then make up one of many possible Any-to-Any environments in which the data Any-to-Any machine and the code Any-to-Any machine and their Any-to-Any bridge mechanisms can harmoniously interact in a manner that is not intrinsically hierarchical and is intrinsically unlimited so as an Any-to-Any system that produces useful results.

The data Any-to-Any machine is separately useful as a question and answer system that does not require any particular code other than 1) the ability to enter ExoPonents 2) the ability to search for them using ExoPonent Commonality searches and 3) screen control functioning in an Any-to-Any manner with which to display the results.

The code Any-to-Any machine can also be independently useful in that code ExoPonents can be strung together directly, much like transistors are, so as to process comprehensive data, with the advantage that provided the code ExoPonents are each constructed to use a standard set of input and output registers, any convenient selection of them can be strung together, on the fly if need be, to process computationally intensive data for example. Data on which they are to work is still required but does not absolutely have to be in data Any-to-Any machine form.

However when the Any-to-Any data machine and the Any-to-Any code machine are related so as to harmoniously interact as an Any-to-Any system analogous to the binary code/transistor system and the human data/activity system, then spectacular benefits occur.

Section 9, Description of the Operation of the ExoBrain Test Any-to-Any System

It should be understood by this point and with the many examples that have been given so far that Any-to-Any construction is a different way of thinking about software, and after a time, and studying the comprehensive panorama of construction examples given here it becomes possible to "think Any-to-Any" and when that happens, which of several different alternative mechanisms to use to achieve a given objective is immediately or soon obvious, and when an objective presents itself, working out the right Any-to-Any solution to it becomes almost second nature just as today's programmers can plan out a state of the art solution in their head with great ease.

It should be clear how the individual specific mechanisms of the Any-to-Any system construction method enable individual specific advantageous objectives to be achieved, but it may not be so obvious how this basket of different mechanisms are used together to create an entire user application. In order to provide orientation as to how to fit the various mechanisms together so as to make a user application with them, the following description outlines how the methods and teachings of the invention were used to make a data Any-to-Any machine and an Any-to-Any code machine harmoniously interact as a test Any-to-Any system called an "ExoBrain" in a desktop computer and in a cellphone that in turn performed useful computing results. The test system, called an ExoBrain, was a rudimentary office suite together with further functionality from what would normally be several other packages also integrated into it. While the resulting construction was tiny—about 10 Mb without images which brought it up to 40 MB, the results offered functionality that today's software cannot offer.

1) Firstly, it will be outlined how an Any-to-Any functioning GUI was constructed and how it behaved. 2) This will be followed with an outline of how data ExoPonents are able to be entered into the ExoBrain using the GUI and then 3) the construction and use of a new user data structure such as a Supplier "database" in an ExoBrain will be described in outline.

It will be appreciated that there are a numberless ways in which an Any-to-Any data machine, an Any-to-Any code machine, and their harmonious interaction Any-to-Any system can be built using the methods of this invention and then usefully employed—just as there are numberless ways in which binary code and transistors have been built and then usefully employed in equally numberless ways in everything from car injection controlling embedded computers, to calculators to supercomputers. The ExoBrain being described in outline is just one of a multitude of ways in which the Any-to-Any machines and systems can be built using the methods of the invention. As is usual with all new technologies, this first—ExoBrain—Any-to-Any system test bed to be described is thought to be very primitive—a sort of Any-to-Any Kitty Hawk—compared to anticipated future Any-to-Any computing systems. But the results of its tests on the general public show that, primitive as it was thought to be, the first Any-to-Any system still produced very useful results (some of which will be described in the figures) and consumer test results that state of the art software construction methods have been unable to achieve.

ExoBrain Construction Overview

Building the first ExoBrain frequently lead to remarks that 'one really needs an ExoBrain in order to build an ExoBrain'. These remarks underline the fact that building an Any-to-Any system from scratch is a bootstrapping process mainly because no Any-to-Any parts or tools already exist to be used in the process. Large amounts of time and money were wasted when constructing the test ExoBrain, with what turned out to be out-of-sequence construction and hence it is strongly recommended to follow the construction sequence described herein as. The very first step that must be completed before anything else is started is the provision of a suitable database that can function in the Any-to-Any fashion described herein. While the data base that was used is a matter outside the scope of this invention, it was found that Meaning Processing and the Discoverable ExoPonent Commonality relationship system would have required SQL (Structured Query Language) expressions 800-900 or more terms in length, and while not impossible, those would have been complex, difficult to maintain and overly complex for users to modify. This was solved by inventing a new type of database, called an ExoBase, which (amongst other things) allowed relationships between any two complex records to be queried for similarity and for relationships to other groupings of data. The ExoBase will be the subject of a separate patent application.

After the chosen database has been commissioned, then the field parallel processing system can be constructed. These two parts have to be constructed and operating first as they are both needed in order to build the necessary Any-to-Any field parallel operating GUI. An Any-to-Any GUI is a GUI which can display any ExoPonent anywhere on the screen in a manner that is not intrinsically hierarchical and is intrinsically unlimited. An early requirement of the GUI is the creation of a tabular record display much like a spreadsheet, as this greatly facilitates the assembly of data and code structures and replaces the normal spreadsheet which is used to plan these in early stages.

Once these parts are operating, the Any-to-Any computing machine can then be further built up by adding basic service infrastructure functionality next. Basic services infrastructure consists of structures such as the Command Matcher, and basic services code ExoPonents that all BossModules use, such as Find and Compare ExoLogics and ExoLogics that enable data to be added, saved, retrieved and displayed. During the early stages mostly code ExoPonents are created and added, and just enough data ExoPonents to test the ExoLogics. Before starting to create field parallel ExoLogics and assembling them into code ExoPonent assemblies—Execution records, ExoModules and BossModules, more data ExoPonents need to be added and data ExoPonent assemblies created first. Hence data assemblies such as addresses letter and so on are created first and then, the ExoPonent code assemblies are created that mirror them. The code mirrors the data, the date does not mirror the code and hence data structures are built first and as each one is built, code structures are built to mirror them and do things with them. Failure to follow this sequence in early attempts resulted in numerous and essentially unnecessary re-builds of various parts of the ExoBrain.

Work then has to be done to create the necessary Service ExoModules to connect the Any-to-Any system to the outside world. In essence, the totally flexible Any-to-Any ExoModules have to be connected to the very inflexible and rigid One-to-Many software of the outside world so as to enable the Any-to-Any system being built to communicate with the outside world and send and receive email, print and so on. Except in the case of the Any-to-Any GUI and printing formatting which needs considerable work, this is not difficult because ExoModules, being Any-to-Any machines, are completely flexible and can easily conform to the rigid demands of the One-to-Many email sender/receiver, or the One-to-many printer, the One-to-Many fax sender/receiver and so on and connecting these things proved to well within the capacity of those well versed in the state of the art software.

Practical experience is that the process of building an ExoBrain is strangely similar to the growth of a child that is born with a brain but has almost no ability to do anything with it except bare minimum survival activities. Using those minimum abilities, the child uses these, builds upon them and acquires more data and learns more activities, often by assembling already known ones into more complex ones and eventually builds to adult abilities over the course of years and much learning (data acquisition) on the way. The difference with a functioning Any-to-Any computing system, however, is that it only has to be built and learn once, because a functioning Any-to-Any computing machine can be copied straightforwardly to another computer where it runs without installation (provided Java is installed, which can also be done at the time the ExoBrain is copied over) and if the two of them have communication ExoModules built into them and are connected in some manner—through the internet or by any LAN connection—then it proves very easily possible to arrange for either of them to automatically and transparently push communicate new data and new ExoModules either receives to the other. Or they can equally easily be set up to pull communicate new data and/or ExoModules from the other, and hence one Any-to-Any computing system can "learn" from another transparently. "Teaching" an Exo-Brain—which basically means to add ExoPonents—is not time consuming and ExoBrains only have to be "taught" once and thereafter they can all teach one another what one of them learned or was "taught". Review of the construction methods described will show those skilled in the art that creating ExoModules to modify the behavior of other ExoModules in the light of experience is a trivial matter. For example, in an Any-to-Any system, the results of an execution are always stored as a record. These records can be tested by Condition Director pairs. If an execution fails—for example, an fax does not go through—that failure can launch a Concept Hierarchy Search that finds other alternative executions in the same Concept hierarchy—for example, emailing, sending a letter and so on and these can be tried in turn. Based on which ones are successful, the previously successful method can be tried first the next time and other methods move down in order in a priority record that parallels the execution Concept Hierarchy recording, in effect the Any-to-Any system has learned and c an now transmit those records (that knowledge) to another Any-to-Any system, in effect telling it "don't bother faxing Joe on Sundays, he never answers, email and phone him instead", so that not only has one Any-to-Any system learned from experience, one Any-to-Any system can learn from another's experience.

Views

Constructing a GUI that behaves in an Any-to-Any manner is one of the more time consuming parts of constructing an ExoBrain, although tests have shown it to be within the capability of those skilled in the relevant art; how it needs to be done depends on the operating system concerned and is therefore operating system dependant. The screen itself is an Any-to-Any machine in which Any pixel can be used with Any pixel in a manner that is not intrinsically hierarchical and is intrinsically unlimited (which is exactly why it is so flexible and can display any image at all). The challenge arises because, the very flexible display screen itself and the very flexible Any-to-Any computing system are both Any-to-Any systems, but the OS and its GUI control code at both inflexible One-to-Many machines, and consequently it is not so easy to make the One-to-Many video screen control software behave in an Any-to-Any manner for which it was never intended.

As the first Any-to-Any system (ExoBrain) was being constructed, a useful rule of thumb emerged, which was "if you can't do it with the screen, you can't do it with language control either". This rule of thumb arose as programmers tended to sweep their problems into a file labeled "language control will handle that". But it became obvious that language control serves merely to give an order, and does not serve to execute that order in any way. If there is nothing there to execute that order, there will be no result, just as there would be no result if a very competent secretary who knew nothing about accounting, was given an order to prepare the accounts for General Motors for last year—she would understand the order clearly but have no idea at all how to execute the order and would be unable to execute that order. On the other hand, if there is some code there to execute the order, then it can be caused to execute either by language or by the screen, and in any case, language control and screen control need to be interchangeable. This gave rise to the rule of thumb described above that "if you can't do it with the screen, you can't do it with language control either". Language control (as already described) is an Any-to-Any control, in which any data or instruction can be used by the human with any data or instruction in a manner that is not intrinsically hierarchical and is intrinsically unlimited. Since language and screen control have to be interchangeable, these factors impose the requirement that the screen/GUI has to be an Any-to-Any construction also, in which "any data or command can be used with any data or command in a manner that is not intrinsically hierarchical and is intrinsically unlimited." The following then is the outline of how these GUI requirements were achieved in the test Any-to-Any system called an ExoBrain.

As previously described, there is no particular screen or any other visual view necessarily associated with, or in use by any particular data. Data is data and does not does not have a screen "look" or any screen hard wired to it. Consequently the data can be computed and transformed by code without appearing on the screen at all—so that the ExoBrain "secretary", when required to print a series of documents, just prints them and does not also, and unasked, throw these on the screen one after the other in an unrequested slide show, as is done by art code as described in the background.

As previously described, ExoPonent data assemblies are not any particular type of item such as "a supplier database", an "email", or a "letter". The terms "supplier database", "email", "letter", "database" are just names describing one way the data can look when displayed (and sometimes also describes the intended use of the data at that time—e.g. "email"). Because of this, ExoBrain data items such as those listed above are termed "ExoItems" to provide a global term for them. "ExoItems" can be used with different display assembly structures (ExoViews) and, depending on which display assembly structure they are used with, are then said by the user to look like an "email", a "letter", or a "supplier database" or, can be made to look like whatever the user wants them to look like.

In an ExoBrain, when it is required to show data on the screen, this is done by ExoViewModules, which are ExoModules (just like any others) but ExoModules that are used to control the screen. A typical screen construction would consist firstly of a SeniorView which is logical container which contains and controls UserMasterViews, each of which corresponds to a single user using the Any-to-Any computing machine at the time in question. All Data records have Administration Fields that can be used to control who can use that record and how and this can be extended to control of individual fields, with individual and different encryption and complex activity control possible for each field. With this access and activity control and by using User Master Views, any number of users can be operating in a single Any-to-Any computing machine at the same time, and a single physical screen or set of screens can be divided into areas for different users while other users do computing with no screen display at all, for example using language control with installed speech recognition and synthesis, giving orders by phone or, doing lengthy computing projects that use idle processor time but need no screen display.

The SeniorView and the UserMasterView are each controlled by their own instances of identical View ExoModules and the UserMasterView gives its user their own ExoDesktop. An ExoDesktop is a standard ExoItem in its own right, and (like any ExoItem) can be of unlimited size (somewhat like a spreadsheet though without spreadsheet limits). The absence of a size limit allows different work activities to be laid out in different named parts of the "desk" whose top left coordinates are the coordinates of the top left part of the screen, and to jump from one to the other with navigation ExoModule that move the focus of the display relative to the ExoDesktop. There is no real difference at all, between a desktop and a standard ExoItem. However, with a desktop, the ability to move the focus of screen to the left of the left edge of the desktop, or above the top edge of the desktop can be disabled by an extra ExoModule (that is also available to all ExoItems) and made unavailable. In other words, a desktop (like any ExoItems) can have the ability disabled to move the leftmost and topmost coordinates of the ExoItem (desktop in this case) to the right of or lower than the leftmost and topmost coordinates of the screen. Desktops are just standard ExoItem structure and "desktop" is an ExoItem behavior, not a different kind of thing. Consequently any ExoItem can be made to act as a desktop by i) using a DesktopPosition ExoModule to keep it correctly positioned relative to the screen ii) using an AutoExpand ExoModule to make sure it always does fill the screen and iii) Adding navigation buttons to it (the same navigation buttons can be added to Any ExoItem if required).

Each ExoItem can have an unlimited number of ExoViews of itself. An "ExoView" or simply "View" is the term used to refer to the appearance of an ExoItem, and how it behaves, and the functionality that is available to that ExoItem in that particular View of it and includes all the View Control data records and View ExoModules that are used to control and create this particular "View" of an ExoItem. Hence a particular View of ExoView is a particular combination of look and user-available functionality for an Item. All ExoItems have an unlimited number of both Named Screen Views and Named Print Views available to them. A given Screen View and a given Print View can be the same but do not have to be the same.

Everything that is visible on an Any-to-Any screen is completely separate and directly and separately controllable from every other thing on the screen. Because anything visible on the screen can do something (such as display data) or be made to do something by the user when he clicks on it, it can be "active" in the sense that it can do something. Hence, each user-identifiable item on an Any-to-Any screen is termed an "Active Element" as it is an Element—a single thing—that does something. Sometimes, several Active Elements can be usefully superimposed on top of one another with the same screen coordinates.

Any number of ExoItems (each with their own Active Elements) can be superimposed on the ExoDesktop. Each ExoItem has a container, which is an Active Element that is a shape that "contains" all the parts of a View. Containers can be any shape such as a bubble or cloud, or invisible (not displayed at all). Containers are not normal "windows" as these are experienced in the state of the art, because things that are "within" the container, can also be moved outside the Container's borders if required. (This can be useful, for example, to move buttons that do something to an item outside the borders of the item, and thereby arranging a "menu" of buttons along the exterior edges of the Container).

The Container acts as a potentially visible, bordered reference space for a given namable grouping of functionality and data. The Senior View records the relative coordinates of each User Master View container. Each User Master View records the relative coordinates of the Container of each ExoItem in it. (A "relative coordinate" is a coordinate that is relative the Container of the View. Each View tracks the coordinates of its juniors relative to itself). Each ExoItem records the relative coordinates of any other ExoItems in it. Any of these ExoViews can each have their own Active Elements, and they also record the relative coordinates of their own Active Elements. There is a Container Administration Field, which usually references a Container Record type, and each View Record uses that field to reference its own Container record. The relative positions of any View and all the items within it for which it is responsible, are recorded in View Coordinate records maintained by View Coordinate ExoModules. The result is that each ExoView knows the position of everything that is part of it. However, because there is no constraint for anything that is part of an ExoItem display to be displayed "within" the boundaries of the Container, it can be displayed anywhere, so for example, buttons that activate ExoModules for that item, can be placed anywhere on the screen—at the top, inside the ExoItem display, along an outside edge of its container display—anywhere and ExoModules can switch whether they move with the Container when the Container moves, or not. If they do not move with the Container, then these buttons can appear to change a menu bar when the ExoItem is opened. The functionality that is available for a given ExoItem is the functionality that the user or designer added to it; in effect, each View of each ExoItem beings its own menu or menus with it.

In an Any-Any Screen, every Active Element either receives data from or supplies data to a single field in an underlying data record. Different Active elements displaying in the same space can come to the top in response (thereby hiding other Active elements using the same coordinates) to input or output data. Many different records can be showing individual fields on any one area of the screen. Each displayed (and often superimposed field) is an Active Element.

In the test ExoBrain what appeared visually to be a single entry data field had associated with it and potentially displayed at the same time 1) a data Active Element to show data in that field from a data record that was then 2) superimposed over a Prompt Active Element containing prompt information—for example: "Enter first name HERE"—that was obscured if the data field had data to display or subsequently received data for display, 3) a Label Active Element displayed near the data field 4) an invisible Help Active Element which, when the mouse hovered over the Help record's Active Element, caused a Help ExoItem's own Active Elements to display after a delay set by a field parallel Timing record. The Help ExoItem was constructed on a field parallel basis as a set of 6 Help ExoItems, which the user could move between by clicking the More Detail or Less Detail buttons that were further Active Elements that appeared "in" (superimposed on top of) the Help Active Element. The data to be displayed by each of these 6 sets of Help were provided by 6 sets of Help data records. Accordingly Help could be tailored to the experience of the user using the screen, with level 1 being suitable for a child beginner and level 6 suitable for an export. Consequently one size of Help was no longer required to suitable for everyone from the age of 6 to 60.

Each Active element had an extensive series of ExoPonents (such as background color, transparency, first border color, first border style, second border color and so on, each of which was recorded in its own type of data record and then used by the Active Element being displayed on a field parallel basis. While this Any-to-Any method is extremely "inefficient" in state of the art terms, and uses a lot of records, disk memory and processing power—all of which are available in abundance today—it is totally efficient in the human usage sense, in that it enables the screen display a) to be controlled by the user so that it looks and behaves however the user wants the screen to look and behave and b) since everything that can be seen is totally separate form everything else, it can be directly controlled by the user without having to go through anything else to do it and additionally and therefore, can be controlled by language commands when ExoMeaning processing is installed. The Any-to-Any screen obviously allows the user to give anything whatever look and functionality he wants (he adds functionality by adding buttons to Views), within the limits of the View ExoModules and facilities provided by the programmer. The Any-to-Any GUI implements the Group 1 Any-to-Any Relational Method 7, Spatial Data Relationship Mechanism, and by doing so, replaces large quantities of relationship creating code that is needed in the state of the art. The Any-to-Any GUI is a major element in enabling the user to create his own data relationships without programming and is part of the Any-to-Any method whereby the user builds—and adapts—the exact functionality he wants, rather than, as in the state of the art, the programmer building the one functionality he hopes everybody wants.

Meaning Entry

ExoPonent Meaning Entry is the general subject of the tools with which to receive data from the human, convert it to data ExoPonents and 1) correctly record which ExoPonent goes where within its own ExoPonent assembly recording in the grid relational structure so as to correctly relate it both to other ExoPonents from other recordings and to other ExoPonents in its own ExoPonent Assembly and 2) to record the ExoPonent Assembly of which it is a part, so that the ExoPonent assembly is correctly related to other ExoPonent assemblies. The objective is that the newly recorded ExoPonents are functionally a mirror image or computer replica of the human's data in the computer. If the recording is an accurate replica, this enables it to be subsequently found in response to a user's order, and enables code ExoPonents to use the data by copying the usage that the human makes of the same ExoPonent and ExoPonents assemblies. If the usage a human makes of the data is successfully copied, the Any-to-Any computer will get itself classified as "intelligent" simply because it is shows the whatever behavior it is that a human classifies as "intelligent" when he observes that behavior in others.

A system that takes ordinary words and uses the ExoPonent Principle to turn them into ExoPonents and correctly structured ExoPonent Assemblies is termed an ExoMeaning Processor. There are two types of ExoMeaning Processors Type I) is screen based and Type II is a code-based "quickie" Meaning Processing which uses some basic principles but is not very complete but is completely workable for small applications. Type III is code-based Meaning Processing and can correctly handle any language input. The Relationship methods already described (which describe one way the data and code Any-to-Any machine's environmental requirements can be satisfied) between them provide all methods necessary to correctly structure the entered ExoPonents so as to create correctly related ExoPonents and correctly structured ExoPonent assemblies, so that the resulting structure accurately mirrors the structure of ExoPonents in the language. "Correctly Structured" as used above really means "consistently structured" so that if a certain type of relationship of meanings occurs it is always structured the same way.

Screen-based Meaning Processing as enabled in the ExoBrain test Any-to-Any system uses the screen displays constructed around the DRT and Label records and the understanding taught herein so that the combination of these things, plus what the human himself does automatically in response to what the screen says, results in the human entering spellings that, although he does not realize it, represent ExoPonents. In the preferred implementation, these spellings are then be further processed into Base Concepts and the data record in terms of Base Concept record numbers, which then makes the Any-to-Any system multi-language translation capable and ensures only one record of each ExoPonent exists.

For example and as described previously, a Type creates a Label and a Label creates a Type. Accordingly, if a Label is displayed for a data entry field with the text "Type of Document", the human, seeing this and understanding what it means to him, may enter (for example) the letters "f.a.x". By doing so, the human has processed the possible meanings of the word "fax" (which also include fax, the activity and fax, the type of machine) and selected one of these "fax, the piece of paper" and then written in the box concerned that set of letters which best represents that meaning to him, which happens also to be spelled "fax". What has happened is that the combination of statements on the screen, and the human's own processing of those on-screen statements, has resulted in the human choosing a particular ExoPonent mono-meaning, which he symbolizes and represents with the same set of symbols (f.a.x.) that he uses to represent the other meanings also. For example, if another Label on the same screen next to a data entry box said "activity" with a Prompt of "enter here what you want to do", the human might enter the letters f.a.x in that data entry box also, and would thereby have processed and selected another—completely different—ExoPonent meaning of the word "fax" which he represents with the exact same spelling—"f.a.x."

In order to construct a screen-based ExoMeaning Processor, screen Prompts are constructed using the understandings and teachings of the invention and the invention's Any-to-Any relational mechanisms are used to create records that are ExoPonent data assemblies. If a DRT virtual table is used—which is not mandatory—then the Type prompts that are displayed are those of the DRT, and once displayed, the user will, in practice, always turn out to be able to find one or other field somewhere in the DRT, which he "feels" is closest to what he wants, chose that and then overwrite it with a new label that seems more appropriate to him. In practice what happens is that because the DRT is composed of very high level types, each of which has large numbers of subtypes, the user is able to compute a relationship between the high level type that is a label displayed by a particular DRT field and the sub-type he actually wants to use—because when he changes a Label to make it more appropriate to him, and overwrites the DRT label display with his own version of the Label, he is actually always creating a sub-type of that Label without either knowing or understanding exactly what he is doing. Since that sub-type is recorded as a new Label Record (for the item he is making), which references the user's newly-entered Label value in the same column of the DRT as the column used by the original Label, any subsequent data he enters in that field will (without any further steps) be automatically and correctly related not only to other entries in the same field produced by the same data structure, but also automatically related on the same Type-Subtype basis with all other data entered into the same table by anyone about anything. When tested, this system worked well even though the people who used it did not have much understanding of what they were really doing or why it worked.

While it is easy to use a screen-based Meaning Processor, in order to create a workable screen-based Meaning Processor (as opposed to using one) a full and clear understanding of the teachings of this invention is required and is a non-trivial part of making a successful screen-based Meaning Processor.

In order to maintain a single instance of each ExoPonent a) screen displays are created by FieldLogics that receive the data entered in each data entry field and result in the record ID of the ExoPonent being entered into the field being looked up and recorded. If the user enters something in a field, FieldLogics supporting that field look up the spelling the user entered to see if an ExoPonent record exists for that spelling for the data type of the field in which it was entered. If it does, the backing FieldLogics enter the spelling into an ExoPonent spelling record, and other backing FieldLogics then use that spelling to find the ExoPonent and record its ID in that same field of the data record being created. If the ExoPonent record for that spelling in that field does not exist, the ExoLogic activates a branch which creates the correct ExoPonent records, and then calls, as the last step, the Field Display ExoLogic to recycle and look up the now-recorded ExoPonent spelling and process it as described above.

Code based ExoMeaning Processing is outside the scope of this invention but the following provides an overview. State of the art software, despite determined attempts to make it do so, proved incapable of performing the necessary operations (even though the operations could be done manually) to process Stage II Meaning Processing and turn ordinary language into ExoPonents and into correctly structured ExoPonent Assemblies and it became obvious that only an Any-to-Any system was powerful and flexible enough and able to branch adequately flexibly to do this. Accordingly, a Type III ExoMeaning Processor is Any-to-Any code machine that receives normal language input and uses Any-to-Any processing provided by the Any-to-Any computing system and its own methodologies that are not within the scope of this invention, to detect each of the meanings in use in the language input, and uses the relational mechanisms in the Any-to-Any environment to output records containing only ExoPonents, correctly placed in records that are assembled into record structures that the Any-to-Any computing system can use. In effect the records output by the ExoMeaning Processor are an Any-to-Any data machine image of what the human said. The reverse of the operation of disassembling language into ExoPonents is performed by Meaning Assembler processes that take ExoPonent record meaning input, and use them to create normal language output—the one place where Grammar comes in useful to assist in creating conventionally acceptable language output.

In this context it should be mentioned that the Any-to-Any system when used with a Type III ExoMeaning Processor provides the core technology needed to enable accurate machine translation of languages. This is possible because, for example, in one language, a certain combination of ExoPonent meanings may be assembled into particular multi-ExoPonent word. But in another language, there may be no identical ExoPonent meaning combination represented by a single word, and the ExoPonent meaning combination concerned is only found as separate ExoPonents in several different words, resulting in there being no exact word match between languages. (Worse still, the combinations of ExoPonent meanings in a given word may not be the same in both languages). While there may be no exact translation of any given One-to-Many word (an assembly) from one language into another word in another language, there nearly always is an exact meaning Base Concept ExoPonent match between languages because the meanings are mostly a reflection in ExoPonents of what the physical universe is, and how it behaves (which is the same everywhere). Because of this, if words in one language are ExoMeaning Processed into ExoPonents, those ExoPonents can usually be assembled into words of another language by an ExoMeaning Assembler for another language and will result in accurate machine translation. Whereas the physical universe and its laws and hence its behaviors are virtually the same across the globe, Life Data Category meanings have no such unifying laws, except for the law that they do not obey any law, and consequently, specific Life Data Category meanings may exist in some places and not in others which manifests as people saying "there is no exact word for that, in this language". Where that happens, such meanings have to be defined in Base Concepts that occur in that language and then the words conveying those Base Concepts in the target language are selected and assembled according to the grammar rules of the target language.

The Any-to-Any data machine which powers ExoMeaning Processing of language, also provides the core technology needed to enable accurate (and hence useful and widely used) speech recognition technology, as follows. Speech recognition today, attempts to take sounds and ascribe spellings to these sounds, in order to output words. But this runs into two problems 1) words are multi-meaning assemblies and there and 2) there is no one-for-one correspondence between sounds and words; one sound sometimes be any of several spellings, and one spelling can be any of several meanings. Voice recognition attempts to get around this (wrong) problem by using probabilities, basically on the theory that since 79.5% of all housewives leaving a supermarket have an 8 ounce jar of coffee in their caddies, all housewives should be automatically charged for an 8 ounce jar of coffee—a proceeding that is acceptable to those who have an 8 ounce jar, and completely unacceptable to those who do not. The results of state of the art speech recognition are not very good for that reason and only get widespread acceptance and use in environments where the number of possible meanings is extremely restricted and hence the possibly of error is small. Apart from the problems posed my multi-meaning words, the problem also arises because a spelling cannot be automatically ascribed to a sound. If the sound that is "u" is made, this sound could be spelled "U" (U-boat), "you" or "ewe" and which spelling is correct depends on which meaning of the sound is in use. Therefore, which meaning of the sound is in use has to be detected before the spelling representing that meaning can be known and displayed, so any attempt to process a sound directly into spelling is doomed before it starts. But which of several meanings is in use cannot be known with certainty in the absence of an ExoPonent-based technology. Humans process sounds directly into ExoPonent Meanings and ExoPonent Meanings into written words and written words back into ExoPonent Meanings, and hence for accurate voice recognition a sound-based ExoMeaning processor—a close cousin of the word ExoMeaning Processor—is required, which processes sounds into Meaning ExoPonents, to which (correct) spellings can be ascribed as needed. Before a SoundMeaning Processor can be constructed, the Any-to-Any data and code machines have to be built, and then Meaning Processing itself has to be built using them, and finally a SoundMeaning processor can be built as the last step of all.

ExoItem Construction

3) Construction and use of ExoItems. While ExoItems and new ExoItems—such as a new invoice for example—could be created entirely through language control if ExoMeaning Processing was installed, creating them using screen methods of creating Any-to-Any data assemblies can be done without any ExoMeaning Processor installed. There are two ways of doing this; the simplest is to take whatever existing ExoItem is closest to the desired new ExoItem, add a NewItem button to the View. When that NewItem button is clicked, it activates the NewExoItemSave ExoModule which results in saving the unchanged ExoItem as a new ExoItem with a new (user-supplied) name for the ExoItem that the users feels is suitable for what he intends the new ExoItem to do. Once the new ExoItem has been created, the user can then change it around however he desires.

The second method is to create an entirely new ExoItem in the ExoBrain from scratch. In this case, an ExoItem designer (who can be an ordinary user who wants to create a new application and who is trained in how an ExoBrain works, which is not difficult to do) presses a New Item button that can be placed anywhere but is often placed on a Design menu.

In an ExoBrain a "menu" is an ExoItem just like any other and the only difference is that whereas most ExoItems contain fields for a lot of data, and relatively few buttons, an ExoMenu (an Any-to-Any menu) is the reverse—many buttons and no or few data fields. Consequently, anything can be done to an ExoMenu that can be done to any ExoItem—it can be emailed or printed, or transmitted to other ExoBrains for example. An ExoMenu can have any kind of data fields on it including, if desired, the address of the designer. Such an ExoMenu can be placed anywhere or attached to anything just as an ExoItem can have other ExoItems attached to it, if the user wants to do so, the user can create a (senior) Menu that contains only the ExoItem buttons for other menus, or contains buttons for user-accessible BossModules or both.

Clicking the NewItem button activates the NewItem BossModule which calls other ExoModules as necessary and has the overall effect of: 1) creating a new blank data record and assembling it with a basic default record set of Prompt record, Label Record, each with their own set of View (controlling) records and a View ExoModule for each record in use. 2) The user is asked to Name the item, and whatever name the user gives the new ExoItem is placed in the Name field of that record. 3) A Prompt that is part of the default View set suggests to the user to click the AddField button in order to add fields to enter his data in the future and when he does so 4) presents the user with the Label record for the highest level table in the system (which would be the DRT Label set if that is in use). 5) The user clicks on as many of these field name Labels as he wants to use and by doing so adds that field to the Virtual Table he is creating. Adding a new field causes the Data record's View ExoModule to display that field (essentially all the user does is to mark field in that View's Which Field record which causes the marked field to display), and also causes the Label and Prompt record View ExoModules to display their fields corresponding to that just-added data field. 6) The user uses the mouse to drag these fields around to whatever position he wants for them and the underlying ViewCoordinatesRecorder records where he leaves them relative to the newly-created ExoItem's Container Active Element field. 7) Right clicking on any Active Element causes a right click menu to display that can be used to change the look and functionality of his new ExoItem.

Any menu can attached to any Active Element by an AddMenu ExoModule that is field parallel to the View Control record of the Active Element on display. In an ExoBrain, Right Click menus, while they appear to be attached to the mouse just as usual, are in fact attached to each Active Element and so can be different for each Active Element and can contain Any selection of menus or Any selection buttons each of which represents one activity of which the ExoBrain is capable. Right Click menus can include any of the Activities (ExoModules) of which the ExoBrain is capable and that includes displaying a list of menus to display.

If the right click menu in use is a Change (Active Element) Features menu, this calls the ChangeAEFeatures ExoModule, that ExoModule launches a find for all AE Features records and displays the results as a list. The user clicks to change features or to add features like more borders, border colors, backgrounds, fonts and so on, to each Active Element, one at a time. ExoModules also existed to make the same change to all Active Elements in the item or in the entire ExoBrain. ExoModules existed to make all other Active Elements in the ExoItem—or in the entire ExoBrain look like this one—in each case, doing so is only a copy operation performed by suitable ExoModules. 8) Additional fields can then be added from other pre-existing ExoItems by pressing a AddFromOtherItem button which causes the AddFromOther ExoModule to launch a ListExoItems ExoModule. When activated, the ListExoItems ExoModule runs a FindSpec that finds all existing ExoItems which are then displayed in list form so that the user can click to choose open any one of them. When he does so, the full Label record of the chosen ExoItem is displayed, and (due to a Field Parallel Execution record that is activated at the same time and associated with the list by the ListItems BossModule), when the user clicks a particular field, that field from that item is added to the ExoItem being created (which now classes as a Compound ExoItem, feeding to and getting feed from different ExoItems). 9) The designer then adds whatever selection of the available functionality he wants to the newly designed ExoItem. Because code user ExoModules (code) are built so that they perform their function (such as Save, Email, Fax) on ANY ExoItem, Any Function can be added to Any data item. The Designer adds the functions he wants by clicking a menu or right clicking a DesignMenu button to activate a ShowFunction ExoModule. The ShowFunction ExoModule a) runs a find using its own related FindSpec record with pre-entered ExoPonents that recover all Commanded records (in effect thereby recovering the top level record of all User BossModules), b) displays these in a suitable, designer-created list ExoView so that c) the user can click the one(s) he wants. Clicking on one of the Commanded records d) issues a Commander record into which is placed the record ID of i) the top level record of the newly created ExoItem ii) the record ID of the ExoModule chosen e) the Commander record is given to the Command Matcher which f) finds and activates an ExoModule that adds the record reference of the chosen ExoModule to the ExoItem.

In this way, Any function can be added using visual methods to Any ExoItem. For example, the designer might add "email", "fax" and "save" and "find" functions as well as many other functions to the new ExoItem. 10) The designer NAMEs the new ExoItem (for example, naming it "Supplier Database", thereby recording the name he chooses for it in the NAME Administration Field of the top level record of the structure. 11) When he has finished adding, removing or changing, the designer clicks the Save button he has added to the new ExoItem. The Save ExoModule calls an CheckExist ExoModule that checks if the ExoItem name already exists (by attempting to Find it). The failure of the find matches a condition record, whose associated Director Record launches a NewItemSave ExoModule. This BossModule a) activates structure-creating ExoModules that use the relationship methods to create the record assembly structure of the new ExoPonent assembly—the new ExoItem. b) Saving the structure results in appropriate FieldLogics creating a button that represents the newly created ExoItem which can appear on lists of ExoItems where it can be clicked to add the new ExoItem to any other ExoItem (such as an email, a menu or a desktop). c) Saving the ExoItem also results in an appropriate FieldLogic creating a button for the new ExoItem to use and which, when pressed, finds and opens the default View for the new ExoItem (whose button record is referenced in its Button Administration Field). d) The newly-created ExoItem is recorded with ExoPonent entries in its Administration Fields that between them define the item and the first (default) View it uses (the one it was designed with). Finally e) a Commanded record is created that adds the name of the item in the Name field and the AddData ExoModule referenced in the record's Director field, and this is saved, which is the process for creating a new ExoItem's BossModule, that now enables it to be matched by the Command Matcher, and enables it to display and record data of its own type.

Any one ExoItem is actually a data type and is also a virtual database (table) within the Any-to-Any grid. Individual items in the ExoItem (since they always have a database-like behavior in addition to what other behaviors they have), would be thought of as being "records" in the state of the art, but in the Any-to-Any computing machine, ExoItems are assemblies of usually of more than one data record and therefore individual (multi-record) items in an ExoItem are called ExoRecords to distinguish them from normal records—the word "record" in an Any-to-Any computer is reserved for a recording that is a single line in the grid storage structure.

Once created, the new ExoItem can be added as a whole, or one of its ExoRecords alone can be added to any other a) ExoItem (the type) or b) to any individual ExoRecord (individual single data assembly prepared and recorded by an ExoItem). In an ExoBrain, because it is an Any-to-Any computing system, anything can be added to (which means "related to") anything.

The first-saved ExoView of the ExoItem that was created during the process of creating the ExoItem can thereafter be used in following ways. Firstly it can be changed around to look different and new fields added (which means turning on their display), old ones removed (which means turning off their display by unmarking the WhichField record) and then it can be saved as a new (named) view of the existing ExoItem. Secondly, the Prompt and Label records can be translated on screen and overwritten in a new language and then saved as a new (named) ExoView for the ExoItem in Language X, by writing the language name (Hindustani) into the Language Field of the item ("Language" being the name of one of the Administration Fields in each record). (Language ExoModules a) enable all finds for Label, Prompt and Help records to be set to match the user's language choice at login b) enable the on-screen language to be changed on the fly (which only requires resetting the language value in the Language Administration Field of the Find that finds the ExoView to be used to display the ExoItem and then initiating a screen re-display).

Once the ExoItem has been saved, the data entered into any of the ExoViews it has or that are added to it each act in a number of different ways, depending entirely on the ExoModule the user chooses to activate by clicking its button, as follows. 1) If data is entered into the ExoView and the FindThis button attached to the ExoView is pressed, the FindThis ExoModule matches the ExoPonents entered into the ExoView with ExoRecords for that same ExoItem that contain the same ExoPonents and causes them to display. 2) If the FindThis button is pressed without entering any data, then all ExoRecords for that ExoItem are found 3) If the FindAny button is pressed instead, then any ExoRecord created by any ExoItem will be found and displayed if its ExoPonents are a match, whether or not the found items were ExoRecords created by the ExoItem from which FindAny was launched. 4) If the RemoteFindThis button is pressed, the ExoBrain finds matching records on other ExoBrains (which can be anywhere in the world) chosen from a then-displayed list of ExoBrains previously known or (if required) from new ones known to MotherBrain And selected by the user. RemoteFindThis finds only ExoRecords from the same ExoItem one remote ExoBrains while RemoteFindAny then any ExoRecord created by any ExoItem will be found and displayed if its ExoPonents are a match for any ExoRecord in the remote ExoBrains, whether or not the found items were ExoRecords created by the ExoItem from which RemoteFindAny was launched. 6 If the RemoteSave button is pressed the ExoRecord is saved to other ExoBrains chosen from a then-displayed list. 7) If the Collaborate button is pressed the ExoRecord is sent to other selected ExoBrains which can then collaborate on it and add to it or change it in a collaborative fashion. (Normally, the Collaborate ExoModule is set up by the user to call an ExoChat ExoItem as well as the main ExoItem, so that collaborators can chat about what they are doing at the same time as they collaborate). 8) If the Save button is pressed, the entered words are saved as ExoPonents 9) If the RemoteSave button is pressed the ExoRecord is saved on chosen remove ExoBrains, and finally 10) if any of the other functionality buttons on the ExoItem are clicked (such as email, fax, Show As (and then choosing the type of view that is wanted such as a Presentation or spreadsheet, or any other previously saved View used by any ExoItem), the activity concerned will be performed on the data in the ExoView.

Because of the independent construction of ExoModules, ExoModules can easily be chained together. Hence a Multi-ExoButton can be created that performs several other functions. Hence the user can point and click to create a MultiExoButton that (for example) saves the data entered in the ExoView a) locally b) to two remote ExoBrains and c) emails it to his wife. (Multiple simultaneous saves done in this fashion act as automatic "backup" and automatic "synchronization" without having to "backup" or "synchronize" anything).

More advanced use of this assembly function of named activities allows a user to create a button (i.e. activity) to which he might assign the name of Bingo which, when pressed does A, B, C activities. If Language control is installed, these functionalities enable him to give an order such as "When I say Bingo, I want you to do A, B, C, and SMS my wife to say I am leaving the office, and then transfer yourself to my mobile."

It will be understood that through using the data Any-to-Any machine and the code Any-to-Any machine as an Any-to-Any human-computer data-activity computing system, certain activities that were complex in the state of the art, become much easier to do using the invention. As one example of this, sending a Parts Database newly-created in one ExoBrain to another ExoBrain (that is using the same high level table as the first one) only requires transmitting the ExoItem itself—the ExoTemplate—and does not require any install to make it operate. The receiving ExoModule just saves the new ExoItem's records (with the user's permission) and then becomes an ExoItem in the receiving ExoBrain just like any other and usable as if the receiving ExoBrain had itself created it. As a second example, transmitting an ExoRecord (RemoteSaving it) to another ExoBrain (if the user of the receiving ExoBrain authorizes it) both creates the ExoItem in the receiving ExoBrain and records its first ExoRecord in it. Once this is done both parties can RemoteFind and RemoteSave (pull and push) ExoRecords in this ExoItem one another's ExoBrains with no setup. As a third example, if a find is initiated on one ExoBrain, but the find spec is transmitted to the other ExoBrain, where a receiving ExoModule executes it, and sends back the found records to the originator, then the ExoBrain is executing a remote find, with no specific set up required to do so. As a last example, if one ExoItem is transmitted to several ExoBrains, together with a WhoGot record, by clicking on a Collaborate ExoModule, then the CollaborateSend ExoModule in other ExoBrains only has to send the changed records to the other ExoBrains involved and whatever change one user makes, appears on the screens of all collaborating users who could Collaborate on anything. In the test ExoBrain, once the Collaboration ExoModule set was created, collaboration occurred easily with one or twenty ExoBrains and operated on all data items such as emails and letters and also on visual items like chess, checkers and Noughts & Crosses and a Monopoly-like game in which a DiceRoller ExoLogic created an output record that was sent to Collaborating ExoBrains and resulted in their using the appropriate ExoView to display the result of the dice that were rolled by someone else, in the form of dice on that person's ExoBrain showing the numbers rolled elsewhere.

Benefits of Any-to-Any Data and Code Machine and Any-too-Any System

ExoPonents enable every meaning to be identified individually (ExoPonents that are meanings are termed meaning ExoPonents and are one form of data ExoPonent). Because each meaning ExoPonent is a single meaning, each meaning ExoPonent is unique. Because it is a single meaning and unique, a meaning ExoPonent cannot be ambiguous—it cannot have more than one meaning and therefore cannot be confused with any other meaning ExoPonent. Consequently, when meaning ExoPonents are assembled together, any assembly of ExoPonents is itself also intrinsically unambiguous and intrinsically unique and that ExoPonent assembly cannot have more than one meaning and cannot be confused with any other assembly of meaning ExoPonents. Consequently, assemblies of meaning ExoPonents can be used to specify any data at all and to do so uniquely and unambiguously.

This may seem superficially counter intuitive, because people are used to dealing with words, each of which is a package of multiple possible meanings, and hence any assembly of words can have multiple possible meanings and is almost never unique—there are almost always other combinations of words that can say the same thing in some manner or other.

But because ExoPonents and ExoPonent assemblies are each unique, they can be used to specify any data made up of meanings in a manner that is unique and unambiguous and without possibility of confusion and this enables data upon which execution is to occur to be exactly identified, an identification which can be achieved reliably by newly entered ExoPonents or by recorded ExoPonents.

However, while an unstructured bucketful of atomic meanings is capable of total precision of specification, it is also extremely hard to understand and hard to manage and it is also very hard to determine and use relationships between data expressed in unclassified ExoPonent terms. The Data Relation Table (DRT) solves that difficulty because (apart from other things) it is an ExoPonent meaning classification system. While not inescapably essential, the DRT is an efficient method to bring order into the unstructured sea of atomic ExoPonent meaning madness and thereby helps to make meaning ExoPonents easier to use productively.

At its most simple, the DRT does this by classifying ExoPonent meanings into a very few categories of meaning ExoPonents called Data Categories that mirror and are the meaning equivalent of the component parts of the physical universe itself. Physical universe matters being a great part of what humans communicate to one another about, it should be expected that a good part of the meanings in use in language are there to communicate those meanings that are detectable in the physical universe itself. The DRT builds on these basic ExoPonent Data Categories of meaning by emulating the meaning type usage mechanisms practiced in the use of the language. Meaning types and their usage are ubiquitously structured into the language and form one of its key building mechanisms and the DRT leverages this by dividing the meaning Data Categories into sub-categories called Data Classes each of which are one of whatever types of meaning are frequently used in the application concerned. The net result is to introduce sufficient order into the sea of ExoPonents to enable more or less any data that is likely to occur in an office application to be specified and related usefully (using methods emulated from human practice) using around 250 of Data Classes. Hence the combination of ExoPonents themselves, and the use of the DRT to classify them manageably, results in a data system that is able to specify unambiguously (and therefore computer-manipulably) pretty well anything. That in turn opens the door to enabling computers to do any activities that require data to be unambiguous specified based on its meaning—activities that they could not do before in the absence of meaning-based unambiguous data specification.

When data is unambiguously specified with ExoPonents and these ExoPonents are classified with the DRT in the form of records which has the effect of correctly relating then also, it is obviously possible to transmit these records freely between Any-to-Any structures that use the same DRT (called an "any-to-Any family") and if these different Any-to-Any structures are provided with mechanisms (that will be described) enabling them to transparently obtain any missing code, then obviously, any data can be processed anywhere in a particular Any-to-Any family, and getting one Any-to-Any system to execute an order created or sent by another Any-to-Any system becomes trivial.

There is a school of thought that hopes by emulating structure—a neuronal system—to emulate human intelligent functioning. But this invention shows that it is by identifying the methods of human data handling and then emulating those as ExoPonents and the other mechanisms described herein, that human intelligent functioning can be reproduced in a computer.

Hence the principle need for and achievement of meaning ExoPonents is the exact and precise identification of data to be processed and this is added to by using atomic activity code ExoPonents to bring about atomic change in or by reason of atomic meanings (ExoPonents), just as a human controls data (or may at any moment want to control data) by or based on any atomic meaning or any atomic property of that data that he can observe.

In contrast, data in terms of raw words cannot be so used because words that have not been processed into ExoPonents are incapable of being used by computer code to exactly identify data simply because data in the form of words is multi-meaning and therefore results in multiple identifications when the human perceives only one identification and this prevents the computer from producing the same result as the human does, given the same order.

Overview of Figures

The invention will be more comprehensively understood with study of the following figures and their accompanying descriptions in which it will become apparent that In the following figures, FIGS. 1 to 6 and FIG. 8 show methods to create data ExoPonents and code ExoPonents and make them functional in a computing environment. FIGS. 7 and 9 to 16 are examples of functionalities that can be implemented in a computer principally due to the fact that meaning ExoPonents coupled with the DRT enable manageable unambiguous identification of data specified in terms of data ExoPonents and enable manageable handling of it by code ExoPonents that can individually manipulate atomic meanings and atomic observable properties as humans are used to doing themselves. FIGS. 17-24 list DRT fields for a typical office suite application.

FIG. 1

FIG. 1 illustrates the translation of words into meaning ExoPonents usefully classified by the Data Relation Table meaning classification system in a small scale example of part of an operating Any-to-Any data machine constructed as per the methods of invention using the grid relational system that enables a computer to manipulate meanings and Base Concepts individually. It also shows the results of applying the previously-explained ExoPonent Principle method of the invention to the word "e-mail" (and to some other words) in order in order to disassemble them into their constituent ExoPonent Meanings of the Any-to-Any data machine constructed with the methods of the invention, thereby further producing the useful result that each of the illustrated meanings of "e-mail" can be separately and individually and directly found, accessed, related, and otherwise used, thereby enabling the foundation for Any-to-Any computer mechanisms to use meanings in a manner that enables a computer to produce similar result to the results produced by human use of meanings, and enabling ExoPonent Meanings to be used with any other ExoPonent in a manner that is not intrinsically hierarchical and is intrinsically unlimited.

In FIG. 1, a virtual table 30 (as previously described) in a computer database (as previously described) has recorded in it records that have Record Identities ("IDs") 1 through 20. (In practice it is confusing to give each record and each field a number just to identify it for the purposes of the figure, when each record already has an I/D number (in the case of records) and each field already has a number that clearly designates it (in the case of fields). Therefore, throughout these Figure descriptions, wherever record IDs or field numbers occur, these numbers are considered to serve also as figure numbers and when so used as figure numbers in this description are shown in bold as per the normal convention for figure numbers, as follows: Record ID 4, Field 2). Note that the term "Record ID" is a number used in the Any-to-Any data machine as part of a specification identifying a particular record and sometimes identifies several records of the same type (as will be explained later). An Any-to-Any system specifies unique records using combinations of field values according to the Co-reducing Concept Principle, just as the human specifies things uniquely using combinations of meanings according to the Co-Reducing Concept principle. Therefore, the values found in any one field of any one record of an Any-to-Any system record are unlikely to be unique, but the combination of values in any one record will always be unique, and any combination of values from any one record that is unique can be used to specify it. The term "Record ID" is different to the "Record Number" used by the database software itself, which may be needed for database mechanics, but is ignored by the Any-to-Any data and code machines.

The parts 20, 21, and the row indicated by 31 of the virtual table 10 are shown shaded, to indicate that these parts are shown in FIG. 1 only for the purpose of explanation and comprehension and are not part of the virtual table of the grid storage mechanism 30 itself. Those fields that are used as Administration fields (as previously described) are shown at 20, which covers Fields 1 through Field 8, while 21 indicates those fields (Fields 9 though Field 18) that are used as data fields into which user data or other ExoPonents for use by the user or user-related code ExoPonents are entered. Normally 250 around fields would be used but, throughout these Figures, just a few fields are shown for illustrative purposes, in order to reduce the size of the table to a size that will fit legibly on one page.

The numbers assigned to each field of the single table that is used in the database (as previously described) are shown in the row designated by 32 and these field numbers serve the purpose of fulfilling state of the art One-to-Many database requirement for a field name, and solve the inability of the database to proceed without one. In the case of a Label record, Record ID 1 the type name (Field Label) ascribed to each field of the Administration Fields section cannot be shown in its Administration Fields 20 because (even in a Label Record) those same Administration fields are always needed to contain values used to control the Label record itself. For the purpose of clarity this description, the Field labels considered to be ascribed to the Administration fields only are therefore shown by row 31 instead. Although not shown here, the label for each Administration field could be recorded using the data fields of a record of type Programmer Notes. Programmer Notes Records are used as aide memoires and a Programmer Notes Record can be associated with any other record by referencing the Programmer Notes Record ID in the Administrative field called "Programmer Notes" (not shown) of the other record. For convenience of comprehension, the row indicated by 31 also shows (where the data fields 21 are concerned) the Data Categories of Life, Time, Space Energy and Matter, from the DRT previously described and whose Field List is described in FIGS. 17-24. These Data Categories can be entered in the table itself as a Data Category type record if required for reference purposes.

As previously described, the word "Label" and the word "Type" are related words, in which the word "label" is the word for a "type" when that word is in use as a Label; Record ID 1 (the first of the records indicated by 30) is a Label (type) record that is used to show the Label ascribed to each data field—Fields 9 thorough Field 18—of Record ID 2 through Record ID 20—the records using this particular Label record. This Label Record ID 1 is using Field Labels from the DRT described in FIGS. 17-23.

Record ID 2 to Record ID 7 are each records for an ExoPonent that is a different spelling. This spelling shown in Field 18 of each the records, Record ID 2 to Record ID 7.

In the Spelling data record, Record ID 2, field 1, the Administration Field "Record ID" shows that the ID of this record is 2, the record type of this record, shown in Field 2, is type 2, which is a record type that records a single ExoPonent which is a Spelling. In language, all language begins with sounds, usually made by the human vocal system and humans associate one or more meanings with these sounds; however, the relation of sounds to ExoPonent meanings is both non-trivial and outside the scope of this invention, and for this reason, the language is treated for the purposes of this description as beginning with a symbol or symbol assembly of some description (the spelling of a word for example) with which humans associate meanings. In this description (which uses the English language) language is considered to begin with an assembly of letters termed a "spelling" as one ExoPonent, with which humans associate one or more meanings that are other ExoPonents or ExoPonent Assemblies. The assembly that is the spelling plus the meanings, plus the rules for using those meanings and the rules for detecting the use of each meaning, all of which the human associates with that spelling, are termed "a word". A word is a small, but often quite complex structure.

Field 8 "Record Label Number" of each of the records, Record ID 2 to Record ID 20, each have Record ID 1 recorded in their Field 8, showing that they are all using Record ID 1 as their Label, which is the Label record just described.

Record ID 2, Field 18 is using the label of Label Record, Record 1 which shows that the Field 18 Label is the letters "Spelling". Entries in this field are ExoPonents that consist wholly and only of sequences of letters that have no other significance as stored at all. Thus and for example, Field 18 of Record 2 contains the letters 'e' and 'm' and 'a' and 'i' and 'l' with no spaces—spelling "email". This spelling is an ExoPonent and signifies nothing at all, it is just a sequence of letters; it is one—and only one—of the ExoPonents that make up the assembly that is the word "email". The human gives various significances (meanings)—and often several meanings—to any given spelling under different circumstances, but as soon as he does so, that spelling is no longer an ExoPonent (one single thing) it is a small assembly of two ExoPonents—a spelling plus a meaning. However, the preferred method of the invention is that all data is recorded firstly as ExoPonents and thereafter as assemblies of these ExoPonents. In order for a component to be classed as an ExoPonent it may only have one single meaning or function that the human may wish to directly control and therefore a) a spelling plus a meaning is not an ExoPonent, b) the spelling is recorded as one ExoPonent and each meaning associated with that spelling as other ExoPonents. (Tests showed that it was a costly mistake (as attempted short cuts in creating an Any-to-Any system usually seemed to turn out to be) to violate the requirements for an Any-to-Any ExoPonent by entering a spelling plus a meaning of that spelling in one single field of data record (two ExoPonents combined). This became apparent when attempting to associate sounds with meanings, as it surprisingly turned out that there is no one-for-one correspondence between sounds and spellings, and that lead to difficulties and confusions symptomatic of a One-to-Many machine—re-cording one spelling+one meaning together, made it impossible to use that meaning, or that spelling separately from its partner in the same field and required essentially unnecessary mechanisms to separate them again and caused more work and confusion and difficulty than recording them separately in the first place would have done.

Thinking of a spelling as nothing more than a sequence of letters can be confusing; strong mental discipline has to be kept to distinguish clearly at all times between a spelling, which is one ExoPonent, and a meaning, which is something in a person's head, for which the same spelling is sometimes used again in this description as a kind of place holder or reference to the meaning in a person's head. Hence, in the table 10 in FIG. 1 (and also in other figures) being described now, the spellings entered in Field 18 of all records show are indicating only spellings (sequences of letters only) while all entries in all other fields—Fields 1 to Field 17—of 32 are meant to indicate only meanings and are not spellings. The convention that will be used through the description of the Figures is, that if a certain spelling appears in Field 18 of the row indicated by 32 then it is a spelling ExoPonent. If a spelling occurs in any other field than Field 18 of 32, then that spelling is representing the Base Concept meaning (as described in Section 2). In the Administration fields there is a field with the label of "Language" (not shown here) and in the case of a Spelling ExoPonent record (of the type shown in Record ID 2 to Record ID 7) the language of the Spelling in the record would be recorded in that Language field—and would be "English" in these examples.

Record ID 8 to Record ID 13 are a different kind of ExoPonent record—they are Base Concept Records that reference in Field 11 the Record ID of the record containing the spelling best indicating the Base Concept concerned. A "Base Concept" was fully described in Section 2.

The Base Concept of "email" is "essence of email" and is the common meaning factor (for example) between the action of emailing, and email the piece of paper. The relationship between the spelling in Field 18 of Record ID 2 and the Base Concept of "email" is recorded by putting the record ID of the record containing the spelling that best represents the Base Concept (which is the spelling in Record ID 2 in this case) into the Base Concept field, Field 11 of Record ID 8. Doing this uses the relational method of Group 1 Relational Method 8, A Cell Points to a Record, in order to create a relationship between the spelling and the Base Concept.

Similarly, Record ID 9 shows the Record ID 3 in Field 11, signifying that the value in Field 11 (which is Record ID 3) is the spelling that best represents the meaning of the Base Concept of Record ID 9 namely "paper" and this record therefore records the Base Concept which can be expressed (in English) with the spelling "paper". A similar description applies to all remaining Base Concept records, Record ID 10 through Record ID 13.

ExoPonent records of Base Concepts (such as records Record ID 8 through Record ID 13) are THE records that are meaning ExoPonents. In the preferred embodiment, it is these record IDs that are assembled to make meaning data ExoPonent assemblies that are the ExoPonent translations of individual meanings of words, as follows. Record ID 14 is a record in which a particular meaning of the spelling "email", namely, "email the piece of paper" is translated into ExoPonents and this is indicated by the record type shown in Field 2 of Record 14 which is "Word Meaning". In Record ID 14, Field 15 shows that the Type (of Matter) is that of Record ID 8; Record ID 8 is the Base Concept of the Spelling in Record ID 2 and hence, the type of matter in Field 15 of Record 14, is email, so it is the meaning of "email" that is a thing. (Note that email the thing does have mass—even electrons have mass, and electronic digital transmission of an email has mass, which, though tiny, is much more than that of a single electron). Going on now to Field 16 of Record ID 14 shows it contains the value Record ID 9, which (tracing it back) is the Base Concept whose spelling is represented by the spelling "paper". Hence Record ID 14 is the ExoPonent translation of that one meaning of the word that has the spelling of "email" in Field 18 of Record 14, and the meaning being translated into ExoPonents in this record is the one meaning associated with the spelling of "email" that is "email, the piece of paper."

Similarly, Record ID 15 has the value of 1 in its Field 8 Label Record ID, showing that it is using Record ID 1 as its label. Field 15 "(Matter) Type" of Record ID 15 references Record ID 8. Record ID 8 is a Base Concept Record that references Record ID 2 in its Base Concept Field 11 which is the spelling of "email". Hence Field 15 of Record ID 15 is translating the word email into the ExoPonents of Matter and email. But this Record ID 15 in its Field 16, Sub-Type of Matter, is referencing Record ID 10. Record ID 10 is a Base Concept Record that shows Record ID 4 in its Field 11 Base Concept field. Record ID 4 is the spelling of "electronic". Hence Record ID 15 is the ExoPonent translation of that meaning of the spelling "email" which is electronic email, such as one might see on one's screen or being transmitted. Using the mechanisms described for Record ID 14 and Record ID 15 the Any-to-Any computer now has the means to record and use and distinguish and correctly handle the two different meanings of an email on paper or an electronic one.

The same principles and methods as those just described apply to creation of all meaning data ExoPonent translations of meaning words. It only needs a moment's reflection to realize that the actions that can be done to the two types of "an email" (electronic or paper email) are quite different and a computer will only be successful if it tries to perform the correct actions on each type and this is the fundamental philosophic reason that absolutely requires the use of the ExoPonents of this invention in order to for a computer to function correctly in response to human language orders; the very first prerequisite to do so is to be enable a computer to identify each different meaning unambiguously and that is exactly the breakthrough benefit the data Any-to-Any machines, combined with the DRT achieve.

Once a recording has been made for an ExoPonent translation of a meaning word the Any-to-Any system constructor, or a user himself (if so enabled by the Any-to-Any system builder) may then add further ExoPonents to describe that meaning by adding descriptive specifics (not been added here for sake of clarity).

Similarly, Field 14 of Record ID 16 is using Record ID 1 as its label as shown by the Record ID 1 in its Field 8. Field 14 of Record ID 16 is using the Label of "Action" from the same Field 14 of Label record, Record ID 1. This Field 14 of Record ID 16 references Record ID 8. Field 11 of Record ID 8 (which is a Base Concept Record) references Record ID 2, which contains in Field 18 the spelling of "email" that best represents the Base Concept. So far, Record ID 16 is translating the word email into ExoPonents that state the meaning consists of two ExoPonents 1) activity 2) email—i.e. the activity of emailing. So far, this record has no time recorded with it. However, in the English Language activities are always coded with time in some manner.

Although beyond the scope of this invention, in the English language there are three discernable Viewpoints of time in the language and from the position of each Viewpoint, there are again three more viewpoints of time, starting from the position of each of those Viewpoints. From the viewpoint of the present, there are the viewpoints of the 1) present itself, 2) the future as viewed from the present and 3) the past as viewed from the present. From the viewpoint of the future, three viewpoints of time also exist—1) the present of that future time, as it is viewed and from the future, 2) the further future as viewed from the future and 3) the past as viewed and beginning from the Viewpoint of the future. Equally from the point of view of the past, there are also three points of view—1) the then present as it was as viewed in the past, 2) the future as viewed from the past and 3) the further past as viewed from the past. This makes nine viewpoints in all, each of which are clearly discernable in the English language and each of which designed a block or group of time, just as "the past" is a group or block of time. It is the practice of the English language to specify time by associating time meanings that are groups of times, with Action or activity meanings.

Because all activities (in the English language) are coded for time or associated with time meanings, Record ID 16 also has a value in its Field 12, Time, and this references Record ID 11. Record ID 11 is a Base Concept Record that shows Record ID 5 in its Field 11 Base Concept. Record ID 5 has the spelling of "future" (A further Time field called Viewpoint is not shown here, but if it was shown it would reference a Record ID for "present" meaning that the record future time was being viewed from the Viewpoint of the present in this case. Hence Record ID 16 in total is the ExoPonent translation of the word Email, and is the meaning email which is the activity of emailing in the immediate future—as might occur in the command, "email this to Bill". Note that Grammar gets confused about viewpoints of time and particularly about the present; the action of email is not happening right now this second and is therefore not happing now in the present as grammar would have it. It will happen in the near future and is therefore a future action that will occur in a time that has not yet arrived and therefore cannot be an action occurring in the present.

As a note of warning in understanding this invention, grammar is an invented sentence function word classification system and grammar has nothing at all to do with how humans handle meanings. In the Base Concept explanation already described, grammar says that, "invite", "invited" and "invitation" are all different. The human says that, (meaning-wise) as far as he is concerned they are all partly the same. Grammar deals with and classifies words on the basis of sentence functions and not on the basis of meanings, whereas humans deal with and handle and use words based entirely on the individual meanings of those words that they detect are in use. Therefore, grammar must be put to one side when understanding and using ExoPonents as it is often dangerously misleading when trying to understand meanings and their relationships, and is not at all helpful as far as meaning classification is concerned.

Field 13 of Record ID 17 (which is using Record ID 1 as its label, where Field 13 is "Location") has referenced in Field 13 the record ID of Record ID 8; Record ID 8 itself, is a Base Concept Record that is referencing Record ID 2 in its Base Concept Field 11 and Record ID 2 contains the Spelling of "email". Hence, Record ID 17 is translating the word email into ExoPonents, but this time it is stating translating the meaning into two ExoPonents—the ExoPonent Location (from Field 13 of Record ID 1) and the ExoPonent that is the Base Concept of email. Hence it is translating the meaning into "email as a location". Humans often use matter objects to specify a location—as occurs, for example, in the requests, "walk over to the email", or "go to the table" or "walk over to the email".

This usage of a matter object as a location perhaps occurs because the Data Category of Space is invisible and does not have mass either and so is not easy to specify in normal conversation. Perhaps as a convenient way of naming or identifying a Space, humans specify whatever is in the Space they want to identify. This is more clearly visible when considering statements like "walk over to where the table used to be and then turn around"—the table is not there any more, and now, there is nothing there at all, but the human remembers where the table used to be and walks over to that Space, even though there is nothing at all in that Space to identify it to him now. He is not walking to wherever the table is now, either—he is going to a space, a space identified by the former position of a matter object. It is perhaps for this reason, that most ExoPonents that have a matter meaning generally have another meaning that is a Space meaning.

Similarly, Field 12 of Record ID 18 (which is using Record ID 1 as its label, where Field 12 is "Time") has referenced in its Field 12 the record ID of Record ID 8. Record ID 8 is a Base Concept Record that is referencing Record ID 2 in its Base Concept field, Field 11 and Record ID 2 contains the Spelling of "email". Hence Record 17 is again translating part of the word "email" into ExoPonents, but this time it is stating that the meaning of email is now "email as a time". An example of the usage of such a meaning is a boss who says to his secretary, "Jill! Email time!"—meaning that it is time to do the emails. Or he might say "Jill, 4 o'clock" and she responds, "yes I know, email time"—i.e. it is a time called "email" just like another and different time is called—named—"Wednesday". In practice, most words that have an Activity meaning generally also have a Time meaning.

Record ID 14 to Record ID 18 are all showing ExoPonent translations of five different meanings of a single spelling—of one word—spelled "email", two of which are types of Matter, and others of which are an Action, a Location and a Time (and there are other meanings of the spelling "email" that are not shown here). However, even these five examples enable a computer to clearly distinguish between five different meanings of one word that, in the state of the art, a computer would only have recorded as one things, the letters "e.m.a.i.l." and it would have no way to distinguish and therefore, not way to handle the individual meanings correctly.

Although language understanding is outside the scope of this invention, the words so far translated into ExoPonent meanings have all been what are termed "Meaning Words" by Meaning Processing. Words in general are of two main types, "Meaning Words" that are the only ones described so far, and "Operator Words" that perform operations on, or between meanings—they can be thought of as a language's own software code in that they do things to meanings. Examples of Operator Words (in Meaning Processing often called just "Operators") are "and" "of" "when", "above". Examples of Meaning words are "table" "jump", "Jim", "Wednesday", "London". In practice most Meaning Words have meanings in all five Data Categories, including the Life Data category where they usually act as a Quality, as the Base Concept of email does in the following example, "that is an emaily text" (an email-like text). This example illustrates the fact that some of the meanings of common words in different Data Categories appear in the bigger dictionaries and some do not appear in even the largest dictionary there is; some are in common use and some are not, but all are understandable by a human and hence (since the human can understand them and may therefore use them) the Any-to-Any computing system needs to be able to handle them correctly also.

Some idea of the complex construction that is a word comes to light what totaling the parts of the one word "email" as translated into ExoPonents above, a translation that does not include all its meanings. As illustrated above "email consists of 1 spelling, 5 meanings and various combination of 9 ExoPonents. Hence the world "email" already consists of 15 parts, and this ignores other meanings, and various rules that go along with each of those meanings that detect which meaning is in use.

Similarly, Field 14 of Record ID 19 (which is using Record ID 1 as its label, where Field 14 is "Action") has referenced in Field 14 the record ID of Record ID 8. Record ID 8 is a Base Concept Record and its Field 11 references Record ID 2 which contains the Spelling of "email" and is the record containing the spelling that best represents its Base Concept. Hence, Record ID 19 is translating the word email into the ExoPonents of Activity+email=the activity of emailing. But this Record ID 19 in its Field 12, Time, is referencing Record ID 12. Record ID 12 is a Base Concept Record that references Record ID 6 in its Field 11 Base Concept; Record ID 6 has the spelling of "present" i.e. Time, type present, or "present time". Hence this record is translating this meaning of the spelling "emailing" (in Field 18 of Record ID 19) into ExoPonents that state the meaning concerned is Activity & Email and Time & present, in other words the activity of in present time of sending an email. Hence Record ID 19 is showing the activity of emailing occurring right now at this very moment. (This is the only true "present time" that exists; grammar solves its own confusions of having two presents when there is only really one, by saying one of them is continuous). Record ID 19, then is one ExoPonent translation of a spelling which is "emailing" ("emailing" has other ExoPonent translations—other meanings—not detailed here).

Finally, Field 14 of Record ID 20 (which is using Record ID 1 as its label, where Field 14 is "Action") has referenced in Field 14 the record ID of Record ID 8. Record ID 8 itself, is a Base Concept Record, referencing the spelling record that best represents it referenced in its Field 11. Field 11 of Record ID 8 references Record ID 2, which contains the Spelling of "email". Hence Record ID 20 is translating the word "emailed" into the ExoPonents, Activity+Email—the activity of email(ing). In its Field 12, Time, this Record ID 20 has referenced Record ID 13. Record ID 13 is a Base Concept Record that references Record ID 7 in its Field 11 Base Concept. Record ID 7 has the spelling of "past" i.e. Time, type past, or "past time". Hence the ExoPonents in Record ID 20 between them mean 'the activity of emailing in past time', while Field 18 of Record ID 20 is showing the spelling of "emailed". Hence this one meaning of this word "emailed", is actually composed of six separately human-usable ExoPonents—1) Base Concept of Email, 2) Time, 3) Past, 4) Activity, 5) Email type of activity and 6) the spelling. And again, there are other meanings of "emailed" and they are similarly assemblies of a number of ExoPonents. It will be obvious that each different ExoPonent that is part of a spelling is likely to have some effect on the activities a computer can be perform on the thing in question. But in the state of the art, the practice with One-to-Many software constructed software, is to hand the software a word (such as "email") which (as has been shown) is a complex package potentially consisting of tens of parts (ExoPonents) each of which may influence the performable activities, and then say to the on-or-off transistor "get on with it"; and, when this does not work, to then proclaim that "language is very difficult".

It will also be observed that the Base Concept type of ExoPonents as implemented by the invention methods just described, enable a computer to detect that the spellings in Record ID 14 through to Record ID 20 are all related by having the same Base Concept of Record ID 8 as part of each of them. Hence if a computer had recorded in it the ExoPonent equivalent of "email XXX to Joe", or "start emailing this to Joe" or "show me what Bill emailed to Joe" and was asked "did Joe get an email?" it would in all cases correctly answer "yes" just as a human would because each of those records and the query, would all have in common the same Base Concept of Email and (what would not be) past time. However, state of the art software would return the wrong answer in some instances as it would not be able to detect (for example) that "email", "emailed" and "emailing" are related to one another in any way.

The benefits of the ExoPonent Any-to-Any data machine as created by the invention methods just described will become even more apparent when considering the queries that even the FIG. 1 micro version of an Any-to-Any data machine would respond to correctly where state of the art, One-to-Many constructed software would not. Remembering that humans often (even usually) query by type, a boss might say to a secretary—or a computer—"what have you done today?" which is essentially a query for any Action, done in past time. If the word "emailed" were in the database or storage grid, in the form of the ExoPonents in Record ID 20, the query would produce a correct response because it could detect things that were Activities, which were done at a time earlier than the time now is. But there is no state of the art software that could answer such a query correctly because (even if state of the art, One-to-Many constructed software had a recording of the word "emailed"), it would have no way to know that past time was anything to do with the word "emailed", because state of the art recordings are not ExoPonent based but are based on words. Words, as has been shown, are factually baskets of meanings with a few other things like spellings and rules thrown into the package that is termed "a word".

As another example, if a different spelling with the same meaning were entered—for example "mailed" instead of emailed"—"mailed" is a spelling that would also have one meaning that would be "electronic mail" and that meaning would have the exact same ExoPonent translation as Record ID 20. Because its ExoPonent translation would be the same, the query for "what have you done today?" would therefore also returned a correct answer to that query, but state of the art, One-to-Many constructed software would not.

In a further example, if a state of the art database or Search engine had in it data containing all seven of the different meanings of email in Record ID 14 through Record ID 20, and it was queried with state of the art keyword technology, it would return data with all seven different meanings in it, which is seldom what the human is likely to want, because the human is computing with meanings of words and not with words themselves. This points the relevance of the Any-to-Any data machine (working as just described) to search engines, because the invention's Any-to-Any data machine construction technology would have the clear simple and obvious advantage of making search engines much more precise. Today, search engines do return what the user wants. The problem though, is because they query with basket-of-meaning words, they return items containing all the records matching all of the baskets-of-meanings of all the words in the query. In addition to returning items containing the meanings the user does want, they return a great many items containing meanings the user did not have in mind and does not want. In practice, in the test ExoBrain, and for these exact reasons, the find proved very accurate, always returning only those items the user did want and never returning those he had not intended to specify; it did sometimes return items that were a correct answer to the query, but were items the human had forgotten existed. This was a clear demonstration of an advantage of the Any-to-Any data machine construction system of this invention which produced far fewer wrong data query answers than the art One-to-Many software construction system.

An unavoidable prerequisite, in order to be able to correctly relate an action to the correct data target for the action, is knowing which meaning of a word such as "email" is in use in any one particular case, because the activities that can be done (or that cannot be done) depends entirely on what the data—the particular meaning of a given word that is in use. One can fax to someone, an email which is a piece of paper (one meaning of "email") but one cannot fax to someone the activity of emailing, which is another meaning of "email"—how can anyone fax an activity? An Activity is unfaxable. So the computer has to be enabled to know which meaning is which before there is any chance of relating the correct action to the correct meaning and the Any-to-Any data machine enables a computer to detect the meaning in use. However, the state of the Art, One-to-Many word-based data machine has no clue if the spelling of "email" concerns a piece of paper, something electronic, an action, a time or a place to move to, and hence and in general, ExoPonents and the Any-to-Any data machine as now described are absolute, obvious and unavoidable, irreplaceable prerequisites to enable many other advances (such as a computer correctly relating actions to things when ordered to do so) just as the invention of transistor was an absolutely necessary and equally unavoidable and equally irreplaceable prerequisite and prior enablement in order to enable computers to compute what they can do today.

As mentioned previously, ExoPonents (particularly non-Life Data Category ExoPonents) are mostly the same in all languages, though some languages may have ExoPonents that others do not and these can always be translated into an ExoPonent combination. Words (which are generally a basket of meanings) often do not have a totally equivalent word in another language that contains the same basket of meanings. ExoPonents (except those from the Life Data Category) are a reflection of the characteristics and behavior of the physical universe itself and this does not vary from one language area to another.

The Any-to-Any data machine provides the basic infrastructure for accurate translation as follows. The Base Concept for email in the above description was Record ID 8. In an Any-to-Any data machine that is dealing with more than one language there will be one Base Concept Record, Record ID 8 for each different language and each Base Concept Record ID 8 will reference the appropriate spelling record for that language in its Field 11, Base Concept field. Each one of these Record ID 8s will have the name of its language recorded in its Language field in the Administration Fields.

When translating a language into ExoPonents, the Meaning Processor will use Spelling and Base record records for the language it is processing. No matter which language the original data was in, the (non-Life Data Category) ExoPonent records will be identical because they are using Base Concepts that are a reflection of the physical universe itself. When it is required to output ExoPonent data in a particular language, the ExoPonents concerned are looked up in the Spelling records of the language concerned only, and then output. The result is that data can be input in any installed language and output in any installed language.

This is one of the main reasons that a Record ID number is used rather than a Record ID. Record IDs are assigned by FieldLogics and not by the database, which can number records however it needs to—its numbering system is ignored by the Any-to-Any system. In an Any-to-Any system, there can be Any number of Any component, including number of any one Record ID number; it is only in a One-to-Many system that there has to be only one of something. As soon as there can not be two of something, that component is not an ExoPonent because Any of that ExoPonent can not be related to Any of that ExoPonent because there can only be one of it. Unique IDs—such as Record IDs—are a One-to-Many, non-human method of specifying things. Humans do not generally say "give me letter number 141A24b dash one" which is a unique ID. They say "give me the letter from Joe about apples" which is a Co-Reducing Concept Exclusion Specification, described earlier. Similarly, in an Any-to-Any system, records—and anything in the Any-to-Any system—are uniquely specified and uniquely identified only by using the Co-Reducing Concept Exclusion Specification Principle because to do otherwise introduces unnecessary limits and violates the Unlimited Principle by limiting the human in a way he does not limit himself. Hence Records are identified not by unique IDs by combination of values in their fields.

In some applications such as an Any-to-Any system on a chip for use in embedded applications such as for a printer, car, watch or cellphone, it may be preferred to store ExoPonents in a logical grid rather than a real grid. Such a logical grid can be created in the following manner in which the system used is exactly the same as for a spreadsheet cell reference. Therefore, referring again to FIG. 1, in order to convert the value (which is 2) in Record ID 8 Field 11 into logical grid format, the Row reference Record ID 8 is converted to a Row Reference to which is allocated a fixed number of digits that is adequate for the planned implementation. In this example, that might be 0008, 80, allowing for 9,999 rows. Similarly, a fixed number of digits can be allocated for the field reference, which in this example (where the field was Field 11), allowance might be made for 9,999 fields and the reference for Field 11 would therefore be 0011, 81. The complete logical grid reference to Record ID 8 Field 11 would then be 00080011. The value 2 is presently referenced in Field 11 of Record ID 8 and this would convert to 0002, 82. Hence the complete logical grid reference to Field 11 of Record ID 8 and its referenced value would be obtained by putting the three references together, which would give 000800110002 as shown by 80, 81, 82. While a logical grid can be very compact it can be difficult to see what is happening when constructing it, and hence a logical grid is best prepared in a grid display in an Any-to-Any system that looks much like table 10, and then converted into logical grid format using automatic conversion ExoLogics, and then downloading the finished data in logical grid format to the device that will use it.

The ExoPonent translations of words illustrated in FIG. 1 are created to start with by a human with a very large dictionary and a good understanding of the teachings of this invention. Once number of such records can be created, the Any-to-Any system can assist with the creation of the necessary word-to ExoPonent translations. For example, pretty well all physical universe describing words are going to have many of the meanings shown in FIG. 1 for email, so when a new word is encountered, the basic set of translation records for a standard word can be coped and suitably modified. Furthermore, this process only ever has to be done once as thereafter, the records produced can just be copied from one Any-to-Any system to another.

FIG. 2

Figure 2:
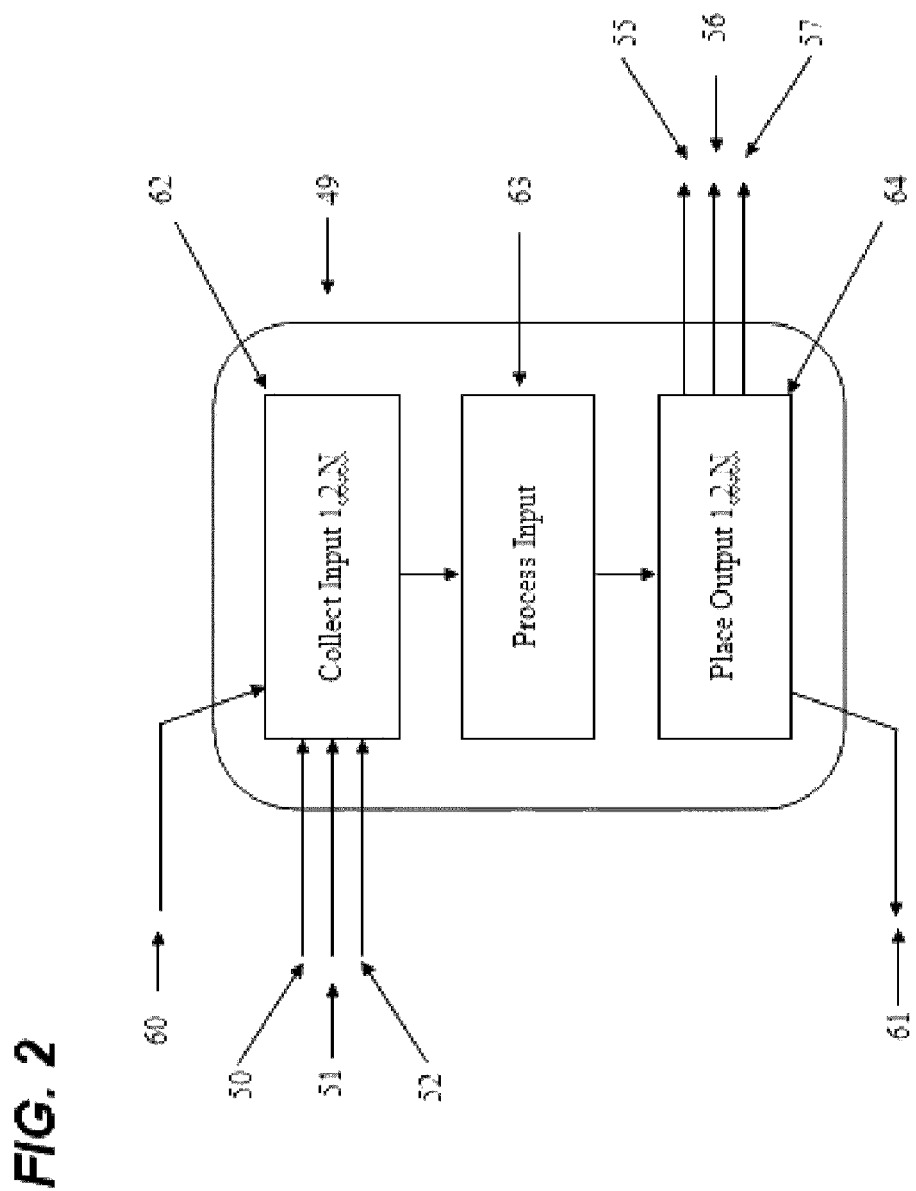

FIG. 2 illustrates a typical code ExoPonent from an Any-to-Any computer code machine. It shows a functional block diagram of a generalized code ExoPonent, called a FieldLogic 49, from a code Any-to-Any machine. Such FieldLogics are activated 60 by their Controller FieldLogic which is always referenced in the Controller Administration field of any Execution record that contains FieldLogics in its fields (only ever one per field) or (in the preferred embodiment) contains the record ID of one FieldLogic in each field. If the system in use is to reference in each field the record ID of the FieldLogic to use in that field, then, when the Execution record is to be executed, the Find facility Is used to retrieve each of the FieldLogic records specified in the Execution record, and a Load ExoModule copies the actual FieldLogic out of its record and into the actual working copy of the Execution record, replacing the FieldLogic record reference with the actual working code FieldLogic. This copy of the original code FieldLogic with code in its fields is discarded after use and is not re-saved.

When the ExoPonent (single function) FieldLogic 49 is activated, its input collection function 62 (when executed by the kernel) obtains data from its first data input 50, and from its second data input 51, and from its N data input 52. These data inputs are values from individual fields of other (data) records and generally, (if FieldLogic 49 is Field Parallel FieldLogic) in the same field in the other data record/s as the field the FieldLogic 49 occupies in the Execution Record where it is. The inputs are processed by the code processing function 63 in whatever manner the FieldLogic has been written to do and the processed data or the result of the operation it performs is then output by its output function 64 to its first data output 55, and to its second data output 56, and to its N data output 57. These data outputs are output to individual fields of other records (one to a field) and generally, (if it is a Field Parallel FieldLogic as being described in these Figures) in the same field in the other record/s as the field the FieldLogic 49 itself occupies in the Execution Record where it is. When the FieldLogic has been able to complete whatever it was written to do, it communicates 61 to its Controller FieldLogic that is in the Controller field of whatever record it is in (not shown) that it is finished with its activity.

Some typical examples of ExoPonent FieldLogic operations are as follows and in each case, the operation the FieldLogic performs is described together with the record types that need to be related to it by the BossModule in order for it to execute correctly.

A FieldCopy FieldLogic is set up with (as a minimum) 1) a Data record that is to be copied, 2) a WhichField record to state which fields are be processed, 3) an output record into which to copy its output on a field parallel basis.

A FieldCompare Field parallel FieldLogic is written to compare the data value in the same number field in the data record (with which it is supplied) with the value in the same number field in the Condition record (with which it is supplied). One example of the FieldLogic might be written to return to its Controller FieldLogic the (Execution) record ID found in the corresponding field of the Director Record, if the fields it is comparing do match. Another FieldLogic might be written to return to its Controller FieldLogic the record ID found in the corresponding field of the Director Record, if the fields it is comparing do not match. (DoMatchThis and DoNotMatchThis FieldCompare FieldLogics could be used in different fields of the same record producing a test which is must have this, must not have that). This kind of FieldLogic is set up with, 1) a data record that is to be checked, 2) a WhichField record to state which fields are be checked, 3) a Condition record where each field contains the data to compare to the corresponding field in the data record, and finally, 4) a Director record that has in each field the Record ID of an Execution record to be activated. Note that If-then-else chains are complex small One-to-Many machines—One condition statement, Many conditions checked by it, Many actions taken as a result and are therefore not used by the Any-to-Any system. The Any-to-Any system equivalent is an unlimited number Condition/Director record pairs (which are If-Then pairs that work on a field parallel field-by-field mono value ExoPonent basis), and as many of which as desired can be checked successively, in any desired order. In this manner each field of a data record can be subject to an unlimited number of tests and branches that depend on the results of those tests and any error only requires changing the part that was wrong and not the whole construction. The sequence is ended or capped with an EndCondition Record that is a Condition Record containing a value to match that a FieldCompare FieldLogic is written to recognize as matching any value—much like a wild card in a file name search. This EndCondition is paired with a Director record, and this particular Condition/Director is tantamount to saying "if none of the above matched, do this." This is the Any-to-Any equivalent of an End-If statement and is called an IfNotMatched record—a member of the IfNot family of which IfNotFound referred to elsewhere is another family member which is almost identical in functioning.

Because all the IF records (Condition records containing data to be tested), and Then records (Director records) are recorded separately, any number of IF records (IF X and IF X and IF N) can be paired with one or a thousand Then records (Director records) to launch one or a thousand actions if one or a thousand conditions are met. Any previously assembled set of If-then records (Condition Director record pairs) can be used with any previously or newly assembled pairs of Condition Director records in a manner that is not intrinsically hierarchical and is intrinsically unlimited and is therefore qualified for use in an Any-to-Any system.

This illustrates the principle that one test as to whether a structure or activity is Any-to-Any qualified or not is whether it can be used with any number of itself, in a manner that is not intrinsically hierarchical and is intrinsically unlimited. If it can, the structure or activity may be qualified, if it cannot, it is definitely not Any-to-Any qualified.

In the above manner, any data can be subject to an unlimited number of tests, with an unlimited number of resulting activities as consequences of passing or failing the test either wholly or partially. These mechanisms are the basic infrastructure that is necessary to easily assemble executable commands such as "if Joe emails Bill, saying "bananas" (Condition Record) then (Director records) do the accounts for the last year, email my wife saying I will be home late and call all the accounts staff and tell them to get back to the office."

Other simple FieldLogics such as SumOf or Add, or Divide perform their operations on a cell of one record and output to a cell of the same or another record. Which cell they output to is controlled by different varieties of WhichRecord records previously described and, in combination with Any-to-Any RemoteSave transmission ExoModules (systems that worked very well in the tested ExoBrain) can save a single or many output values to one or a thousand Any-to-Any systems anywhere in the world.

Subtypes of FieldCompare FieldLogics are ValueCompare FieldLogics such as: 1) GreaterThan 2) LesserThan 3) EqualTo. (GreaterThan or EqualTo in an Any-to-Any system is a GreaterThan run first, followed by EqualTo run next. Both of them output to their own data records. A FieldCompare, combined with a WhichField, then checks their output records against two Condition Director pairs one of which does something if there IS a mark in the same field and another of which is set to do something if there is NOT a mark in that field. With just four code Any-to-Any machine ExoPonent FieldLogics (GreaterThan, LesserThan, EqualTo and a compare FieldLogic) it is then possible by combining their operations to do things like Greater than all of these, Lesser then all of those, Not equal to any of the other, and so on. Ignoring the fact that any of these can be used with any of these—in the Any-to-Any manner, namely in a manner that is not intrinsically hierarchical and is intrinsically unlimited, and just calculating the combinations of 9 possible operations on 200 data fields, with any result being able to be true or not true gives 720,000 possible combinations of result (before repeating any one operation on any of the outputs) and 720,000 dynamically decided different courses of action possible as the result of just five FieldLogics which would roughly total to 75 k of code.

FIG. 3

FIG. 3 illustrates the assembly of code ExoPonents together with the data ExoPonents they need to control their operation into a small scale example of an operating Any-to-Any code machine. In FIG. 3, 20 are the Administration Fields and 21 are the Data Fields of an Any-to-Any machine grid table 10; the row 32 contains the numbers used as field "names" in a the single table in a state of the art One-to-Many database in which the machine can be built. The row indicated by 31, shows the field names considered to be in use for the Administration fields 20 only, while for the data fields 21 it shows the Data Categories to which various data fields belong if optionally using a Data Relation Table as the high level table. Gray shaded areas indicated by 20, 21 and 31 are informative only and are not part of the structure. For the remainder of the explanation of FIG. 3, Column or Field numbers indicated by 32 and row numbers indicated by 199 will be used as if they were numbers in a figure and will be shown in bold as Field 1 or Record ID 76, for example.

Record ID 76 of table 10 is an ExoPonent record of the code Any-to-Any machine, and is an Execution Record as indicated by the number 5 in the Record Type Field 2, and, just like a data ExoPonent record in the Any-to-Any data machine, in which each record contained a single meaning ExoPonent, a record in the Any-to-Any code machine contains a single function code ExoPonent FieldLogic in Field 14 as indicated by the term FL1 (FieldLogic 1) in Field 14 of Record ID 76. The name of this FieldLogic is recorded in Field 7 "Name" where it has been abbreviated to "Comp." as short for "Compare" indicating it is a Compare FieldLogic of a type to be described shortly. Field 8, Label Record Number of Record ID 76 has recorded in it the Record ID 30, showing that it uses Record ID 30 (not shown) as its label record; since Record ID 76 is an Execution Record build by programmers. Record ID 30 would be a Label record used by programmers also.

Record ID 130 of table 10 is a User BossModule Commanded Record of the Any-to-Any code machine, as indicate by the number 25 in the Record Type Field 2. User BossModules are BossModules that run functions used by the user— such as (in this instance) to add an email address as indicated by the abbreviation of "E-Add" (Email address Add) in the Name field for the BossModule Field 7, the Administration Name field.

Field 5 in Record ID 130 is labeled "CTRL" (as an abbreviation for "Controller") and references Record ID 205 (not shown), this being the record that would contain the BossModule's Controller Logic. Record ID 130 Field 14, per Label Record ID 70 is using the Label of Action (i.e. activity) and in that field has a value of "Add" which (in the manner already described) would resolve to the Base Concept of "add" although the records concerned are not shown.

Field 15 of Record ID 130 is using the label of (Matter) "Type" as shown by Field 15 of Label Record ID 70. Field 15 of Record ID 130 references Record ID 8 which is the Record ID 8 of FIG. 1—a Base Concept record whose Field 11 references Record ID 2 that is a Spelling record and contains the ExoPonent spelling of "email", thereby stating that the Type of Matter that gets added is "email" The field numbered Field 16 is referencing the ExoPonent Base Concept record for "email address" and hence the Data fields of Record ID 130 say it is a BossModule whose activity (shown in its data fields) is to Add (activity) a Matter thing, which is an Email Address. Clearly, if a user's order to "Add an Email Address" is entered into a record in ExoPonent format, it will produce a record with these same ExoPonent values in Fields 13,14 and 15. If that user record is then used as Find Spec (with suitable values in the Administrative fields) to find matching records, it will retrieve Record ID 130, the appropriate BossModule required to perform the user's order and the user's order will have been matched to the code activity needed to perform it. (Note that in this instance, an "email address" is not an address in the standard sense, as it does not describe an physical location. Instead it is a reference for a physical thing—a mail box—which may move locations (disks and computers) without the address changing. Hence, this meaning of the word "address" is a meaning which is a physical thing and not a location, which the more widely used meaning family of the word "address" concerns).

The BossModule Record ID 130 also has the Record ID 131 referenced in its List field, Field 4, and the referenced Record ID 131 is a BossModule Execution Control List record that lists the record IDs of records the BossModule needs to accomplish its task. The BossModule's Field 3, "View" references Record ID 100 which is the record ID of the View BossModule that will control the screen display that the user will use to control the activity of this AddEmailAddress BossModule Record ID 130.

Record ID 131 is the BossModule List record, as indicated by its record type of BoosModuleList in Field 2. In its data fields, Field 9 through Field 18, it contains the list of records—including both data and code Execution records— that it needs to perform its function. It is the fact of combining references to both data and code records in the same record (a List Record of a Boss Module) that is one key mechanism to create the bridge between code ExoPonents and data ExoPonents and causes the data and code Any-to-Any machines to harmoniously interact so as to create an Any-to-Any system. Record ID 131 also contains punctuation in the form of a "?" in Field 10, which, as explained previously, indicates an instruction to a FieldLogic to copy here the record ID of the data record it needs to write. Note that the data fields of this record (since it is a list record) are read and used sequentially from left to right, whereas the data fields of all other records being described here, are used in a vertical, field parallel manner. List records can have their own Label records (although this one, as shown by the absence of an Record ID in its field 8, Label record Number, does not), but in any case, one should avoid the mistake of relating any Field parallel Label record (such as Record ID 70) to them as they are not field parallel records but serial records. The data fields 21 of Record ID 131 also contain the values of 70, 72, 73, 74 and 75 which are the record IDs of Record ID 70, Record ID 72, Record ID 73, Record ID 74, and Record ID 75 respectively—the records the BossModule needs to accomplish its task.

Record ID 70 is a different Label Record to the Label Record of Record ID 1 of FIG. 1, in that, for the sake of this explanation, the label for Field 16, which was "Matter Sub-Type" in Record ID 1 of FIG. 1, is now "Email address", a sub-type of Matter sub-type. More strictly, if space allowed, one additional field would be added showing Matter, Reference Number and another showing Matter reference Number Type, and it is the latter field that would contain the Label "email address" while the Matter Reference Number field would contain the email address itself. In effect the change of field names in Record ID 70, creates another Virtual Table within Table 10 of FIG. 1, in which all records using that Label Record ID 70, are a part, such as Record ID 71, which is a user data record that references Record ID 70 in its Label Field 8, indicating that it is using Record ID 70 as its Label Record and is therefore part of the virtual Table created by Label Record ID 70. The Record Sub-type Administration Field (not shown) would state that this User Data record is of sub-type email address.

Record ID 70 is referenced in Field 9 of Record ID 131 and is the first of the records the BossModule is going to need for is execution as Record ID 70 occurs in the first data field, Field 9 of the BossModule's List Record, Record ID 131. The next data field in the BossModule List Record ID 131, is Field 10 which is showing a "?" symbol that in effect means, "the first data record, record ID to be written in to the BossModule List record, Record ID 131 is to be written here." Since the BossModule is one used to create an Email Address, it is likely to be handed a record such user data Record ID 71, by the Command Matcher when activating it and if so, it is that number that would be written into Field 10, overwriting the "?" symbol that is there now.

Record ID 71 is a User Data Record as shown by the number 6 in its Field 2, Record Type field and in this example, is supposed to be a record in which the user is going to record an email address, and will therefore be using Label Record, Record ID 70 as is label, as shown by the reference to Record ID 70 in its Field 8, Label Record field.

Record ID 72 indicates in its Field 2 that it is an Execution record and therefore (and as an example of a Generic Exo-Module), can be expected to contain the same FieldLogic in all or any of its data fields Field 9 through Field 18 and in fact each data field in this example does contain reference to Record ID 76. Record ID 76 in its Field 16, contains the actual code of FL 1 (FieldLogic 1). As it is an Execution Record, Record ID 72 contains a reference to a Controller FieldLogic (as previously described) that is in Record 200 (not shown) referenced in Field 5 of the Execution Record, Record ID 72. The Name of the Execution Record, "Comp" (short for "Compare") is shown in Field 7 of Record ID 72, while Field 8, Label, shows that Record ID 72 uses Record ID 1 of FIG. 1 as its Label if a programmer ever wants to display the Execution Record itself. If the programmer did use it in that fashion, the Label record would allow him to observe which FieldLogic in the Execution record is in each case related to each field that is labeled by the Label Record ID 1.

Record ID 73 is a WhichField record, as is stated by the number 8 in Field 2, the Record Type field. WhichField records are used to tell an Execution Record which fields it is to act on. Note that the View Execution records that appear later, will all also use this same record, thereby only displaying the fields that are marked in the Which Field record, which are only those fields on which the FieldLogics are also going to act. Field 16 of the WhichField record, Record ID 73, is the only data field of Field 9 to Field 18 to be marked (with "X") which is a mark that FieldLogics designed to check their own field in a WhichField record will take as an instruction to execute. Note that Field 12 of BossModule List Record ID 131 specifies that Record ID 73 is to be used (the Which Field Record that specifies that only Field 16 is to be processed), hence effectively limiting the execution of Execution Record ID 72 to Field 16. Other BossModules could use the same Execution record and, by using different WhichField records, process and also display a completely different field selection from the same or a different data record.

Record ID 74 is a Condition record as indicated by the number 9 in Field 2 record Type, and therefore contains conditions to be matched by an Execution Record of Condition Checker type. Field 16 of this record contains the abbreviation "Adr Fmt" to indicate that it would contain an address format (i.e. an email address format) to match with the user's data entry. Note that Field 13 of BossModule List Record ID 131 specifies that Condition Record ID 74 is to be used.

Record ID 75 is the last of the records to be called by the BossModule Record ID 130 as listed in its List Record ID 131 Field 9 through Field 14. Record ID 75 as indicated by the number 10 in Field 2, Record Type, is a Director record, containing in each field a record ID of an Execution record that a field parallel FieldLogic will activate if, on comparison of the values in the same field of the data record and of the Condition Record handed to it by its BossModule, it finds the data to be the same (or to be different, depending on how it is written). In this case, the record ID of the Execution Record to be activated is shown by "Y" (to show that the Record ID of an Execution record would be referenced here) in each data field, Field 9 to Field 18 of Record ID 75. In Record ID 75, the FieldLogic in each data field, Field 9-Field 18 is the same (making it a generic Execution Record), but it could perfectly well be different also (making it non-generic). Note that Field 14 of BossModule List Record ID 131 specifies that Record ID 75 is to be used.

The remaining records shown after Record ID 75 to the last example of Record ID 102 at the end of the table, are all examples of the types of records needed to display and control a View on a screen (a Screen View) or for a printer (a Print View) and operate in the same manner as already described for a Data BossModule. However, because the number of different things or parameters that can be controlled on the screen is extensive, the number of different types of View Module data records (each specifying a single and different parameter that the user might want to control) tend to be extensive also. Since the principles of functioning throughout an Any-to-Any system are all the same and do not vary (as they re-use the same mechanisms over and over again as already described), the remainder of the description for these records of this figure is an outline designed to show the principles of functioning.

Record ID 100 is a BossViewModule and performs the same functions for View control that the BossModule Record ID 130 does for user data and operates in the same manner. Field 4 references Record ID 101, thereby stating that Record ID 101 is the number of the List record the ViewModule Record ID 100 uses to list all the other records it needs to operate. Field 5, Controller, of Record ID 100 references Record ID 201, (Record ID 201 is not shown) showing that Record ID 201 is the ID of the record where its Controller Logic is to be found. Field 6, Help, references Record 209 (record 209 not shown) which is the record ID of the Help BossModule that this ViewBossModule will use for its own Help if it needs to be displayed—by a programmer for example.

Record ID 101 is a View List type record as the number 12 in its Field 2 Record Type shows, and is the List record that was referenced in Field 4, the List Field, of the ViewBossModule Record ID 100. This record's data fields, Field 9 to Field 18 of the View list record, Record ID 101, lists the records that the ViewBossModule will use—in one manner or another—to display its View. Each individual ExoModule and all the records that particular module needs to call are separated by a semicolon ";" as previously described. Thus Field 9 through Field 12 of Record ID 101 reference Record IDs 102,103,104 and 105 that are needed in order to control the display of the user's data record, Record ID 71. The record ID in Field 14 of Record ID 101 after the first semi colon in Field 13, is Record ID 106, which is the record ID of the ViewBossModule required to display the Prompt. The Record ID appearing in Field 16 of Record ID 101, after the second semi-colon in Field 15, is the Record ID 109 which is the record ID of the HelpBossModule that will be used with the Prompt and the user's data record and completes the records needed by the ViewBossModule. (Note that the data record, Record ID 71, already contains in its Field 8, the number of the Label record (Record ID 70) that is to be used with it. If this Label record were needed to be displayed (which is supposed in this example not to be the case) the number of the Label record to use (Record ID 70) would be written into the Field 8 of the View BossModule List record, Record ID 101.

Record ID 102 is a standard ViewDisplayExoModule; with the exception of the User Master View, all screen display is produced by different instances of this same ExoModule working with different examples of View Control data records such as the examples of such records provided by Record ID 103 to Record ID 105; the displays for Help and for Prompt use the exact same View ExoModule Record ID 102 (in this description, Record ID 102 is shown several times, but only for clarity of understanding—there is only one View Module Record ID 102 but there could be several instances of that same View Module Record ID 102, that would be loaded into memory together with their FieldLogics concerned and all operating in memory at the same time to display different data). Field 5 of Record ID 102, the Controller field, is referencing Record ID 202 (not shown) which is the record containing its Controller ExoLogic. Record ID 102's data fields, Field 9 through Field 18, all reference the same FieldLogic 2 (ExoPonent record for FieldLogic 2 not shown), that is responsible for displaying on the screen of whatever is found in its Field parallel records supplying its data to display and information controlling that display. Each field of Record ID 102 would reference the FieldLogic concerned in the form of that FieldLogic's Record ID, which would be written in the data field, rather than the symbol "FL2" used in this example, which is used only in the interests of clarity.

Record ID 103 as indicated in Field 2 Record type, is a View Control record of type Shape Coordinates that says where the shape specified in each field of Record ID 104 is to go on the screen relative to the Container Field (an Administration field not show here) of the ExoItem.

Record ID 103, 104 and 105 are all examples of typical View Control records that contain View Control Data in each of their data fields, Field 9 to Field 18 that will control the appearance of the same field as that in which the View Control Data occurs, on a field parallel basis. View Control Data such as that of Record ID 103, 104 and 105 data is used by the ViewBossModule on a field parallel basis to control the appearance of the corresponding Active Element in each field to be displayed. Which fields are to be displayed is controlled by whatever WhichField record it is using (Record ID 73 in this case). It will be appreciated that the controllable ExoPonents for a single shape visible on the screen can be some 40 or more, with each one having its own record type. There is a temptation for a programmer to make things "easier" by giving each field a List Record with some 40 fields or so, to contain all ExoPonent parameters. This method proved easier to program initially but (as it was a small One-to-Many machine) extremely complex to write changes correctly and extremely slow and error prone, and subsequently had to be re-written in a correct field parallel manner. The list method is not recommended and the preferred method is the correct Any-to-Any machine manner of each record containing only one type of ExoPonent, and hence, and for this example, Record ID 103 would only contain Shape coordinates in all its data fields, while Record ID 104 would only contain reference to the record containing the specification of the shape of the display to be used for that field (round, rectangle, clover leaf, box, cloud, etc). The Values of XXX in each of the data fields Field 9 through Field 18 of Record ID 103,104,105, 108,111 and 112, all indicate that the field would contain in those fields the appropriate data or reference to the appropriate data for the record type and field in question.

Record ID 106 is the BossViewModule displaying the Prompt as indicated by the number 17 in Field 2, Record Type. In the Any-to-Any display, to save screen space, the Prompts—which are advices to the user such as "Enter EMAIL ADDRESS HERE"—normally occupy the same space as the data will and disappear when they are overwritten with data. To achieve this effect, the background of the data entry area (which overlays the same coordinates as the Prompt display) is transparent until data is entered and then it goes opaque, obscuring the Prompt. The Prompt BossModule Record ID 106 has a List Record referenced in Field 4, List, and is Record ID 107 and has a Controller record, Record 201 (not shown) specified in its Controller field, Field 5.

Record ID 107 in Field 2, Record Type states it is a type 18 record (List record used by a Prompt) and is the record that lists the records that the PromptViewBossModule (Record ID 106) needs to call. The List Record, Record ID 107 lists in its data Field 9 and data Field 10, Record ID 108 a record that contains the prompt data to be displayed and Record ID 102. Record ID 102 is the ViewDisplayExoModule already been described above, and Record ID 107 is simply referencing another instance of its use.

Record ID 108, as the number 19 in its Field 2, Record Type, indicates, contains in its data fields Field 9 to Field 18

Prompt data to be displayed by the PromptViewBossModule Record ID 106 displaying the Prompt View, and hence, the Prompt Data record contains in each of its data fields Field 9 through Field 18, the data to be displayed for the corresponding field of the data display, such as "Enter EMAIL ADDRESS HERE" and in Record ID 108, this data is represented in each of its data fields by the symbols XXX.

Record ID 108 shows just below it, still another instance of Record 102, which the number 13 in Field 2, Record Type, indicates is the View Display ExoModule, and which was referenced in Field 10 of the Prompt List Record ID 107, and so is the Execution record to be used by the PromptViewBossModule Record ID 106. Record ID 102 is the same View ExoModule that was already used to display all other Views. Every time an View ExoModule displays any data, it needs a full battery of View data display records of which Record ID 103, 104 and 105 are just samples, which (for the sake of clarity, brevity and comprehension) are not repeated either for the PromptViewBossModule, nor for the HelpViewBossModule to be described now.

Record ID 109 is a HelpViewBossModule record as is indicated by the number 21 in Field 2, Record Type; the entry in its Field 4, List field references a List record which is Record ID 110, and in Field 5 Controller, references that its Controller Logic is to be found in Record ID 203 (Record ID 203 is not shown).

A human, working with another human, can give help (useful information) concerning absolutely anything they can both see or agree exists—Any help can be used or given by a human with Any data in the Any-to-Any manner (that is not intrinsically hierarchical and is intrinsically unlimited), and the Any-to-Any computing machine needs to be able to do this too. A human will also tailor the help to the level of expertise (or lack of it) of the particular person he is teaching or helping, and a computer should be able to do this.

For these reasons, Help is provided on a field parallel basis—every discrete thing visible on the screen is a field or made up from fields and every field that is detectable by the human in the display has its own help which means that each and every identifiable element on the screen is made self-explanatory. Because one size does not fit all in anything, let alone when it concerns help, Help in the Any-to-Any machine may be provided in any number of levels and six levels proved adequate in normal use—to the degree that out of 585 people who tested the ExoBrain, not one walked away from it, or failed to be able to use its visual interface, which none of them had ever seen before and which operated in a totally differently to anything in the state of the art—it proved to be a zero learning curve interface. In this test version, the 6 help levels varied from very detailed, using simple language suitable for child beginner, up to compact and technical for the expert. Help in the ExoBrain was implemented in the form of Hover Help, in which hovering the mouse over anything at all, produced that Active Element's associated Help Field, appearing at one of the levels 0-6 as set for or by that user. Whichever Level was in use except the top and bottom ones, displayed More Detail and Less Detail buttons that changed the Help to the next more detailed or the next less detailed view as appropriate. Because anything in an ExoBrain can be overwritten and stored under a new name, all Help was designer or user written and did not need programming, as it was just data—being used differently—but just data like any other data. Consequently any of the Help text records show here could be over-written by the user, (or a new additional Help record created and added to the set by the user, in similar fashion to that which will be described in FIG. 26 by which a user adds a "Name" record (which is in reality an extra Label Record). Translating an application was simply a matter of overwriting any Prompt, Help, or Label in the new language and saving it, with the correct language name in its Administration language field which was then always displayed. A great deal of the reason that the non-users and others who tested ExoBrain found it easy and did not need outside help was because the Any-to-Any and hence ExoPonent based system enabled Any Help to be placed Anywhere in the Any-to-Any manner (non hierarchical, non limited, etc) and the user was never lost for what to do.

Record ID 109 then, as the number 21 in its Field 2 Record Type, shows, is a Help BossModule using List record ID 110 in its List Field 4, and the record containing its Controller—Record 203 (not shown)—is referenced in its Controller Field 5. Help BossModules are BossModules just like any others so far described, the only difference being that several of them (one for each available level of Hover Help) are loaded into memory at once. The More Detail and Less Detail buttons just described, that change between levels of Help, are ExoModules related to the Help BossModule concerned, by having their Record ID referenced in a List record that is referenced in the BossModule's Administration Button/Menu Field (not shown), that lists the Buttons (and lists their associated Commander Records) that the BossModule uses. Each button listed is a Button Record that when its button is clicked causes an execution to occur as described elsewhere and in this case, causes the Help Levels to change to More detailed or Less detailed levels, depending on the button that was clicked.

Record ID 110 is the List record for the HelpViewBossModule Record ID 109, and lists in its data Field 9 and Field 10, two other records, Record ID 111 and Record ID 102; Record ID 111 is the record containing in its data fields, Field 9 to Field 18, help data for level 1 Help to be displayed, with the data for display represented by the symbols XXX in each data field, Field 9 to Field 18. Record ID 102 is yet another instance of Record ID 102, the ViewDisplayExoModule Execution record needed to display data, that will this time be used to display the data of Record ID 111, the Level 1 Help data record. Field 11 of the Help BossModule Record ID 110, contains the symbol ";" which, as previously explained is the symbol that tells a BossModule that the preceding field to the left of the ";" contained the last record reference needed by a particular ExoModule and that therefore, the specification of the records needed preceding ExoModule was now complete. It also tells the BossModule that there is another ExoModule following after the ";" symbol.

Field 12 and Field 13 of Record ID 110, the List record for the BossModule Record ID 109, contain reference to Record ID 112 and Record ID 102 respectively. Record ID 112 is the record containing in its data fields, Field 9 to Field 18, Help data for level 2 Help to be displayed, with the data for display represented by the symbols XXX in each data field, Field 9 to Field 18. Record ID 102 is yet another instance of Record ID 102, ViewDisplayExoModule to display data, which will this time be used to display the data of Record ID 112, the Level 2 Help data record.

In the example just described, one HelpViewBossModule is controlling two Help Modules, and is itself controlled by a View Module, that is itself controlled by a BossModule, in the chain-of-command manner previously referred to in which code ExoPonent FieldLogics are foot soldiers of different specialties, brought into play to deal with ExoPonent data as needed by their chain of command built into the Any-to-Any Environment structure by its twelve different relationship systems previously described. It is in this manner that the Any-to-Any data machine and the Any-to-Any code machine are integrated so as to harmoniously interact with a useful result, much as the binary Any-to-Any machine and the transistor Any-to-Any harmoniously interact with a useful result, but in this case with the result of producing an Any-to-Any system.

As this description has shown, where the Code Any-to-Any machine is concerned, most of the Code or code related parts of the Any-to-Any environment, are on-the-fly code assembly plans, that do not contain any code, but just specify how to assemble it from basic code ExoPonents whenever code is needed, and the errors can only ever come from a miswritten ExoPonent, or from an easily rectified mistake in the Assembly plan. Humans have been getting very complex assembly plans right for a long time—just that for a single car contains many thousands of parts, that for a CPU chip stretches the imagination and correctly putting together extremely complex assembly plans is well within human ability in a great many disciplines.

Those skilled in the state of the art can easily estimate the complexity and how many megabytes of code would be required to perform the functionality described in FIG. 3 and will also see the benefits that the functionality described in FIG. 3 is performed by two FieldLogics totally perhaps 50-100 k.

FIG. 4

Figure 4:
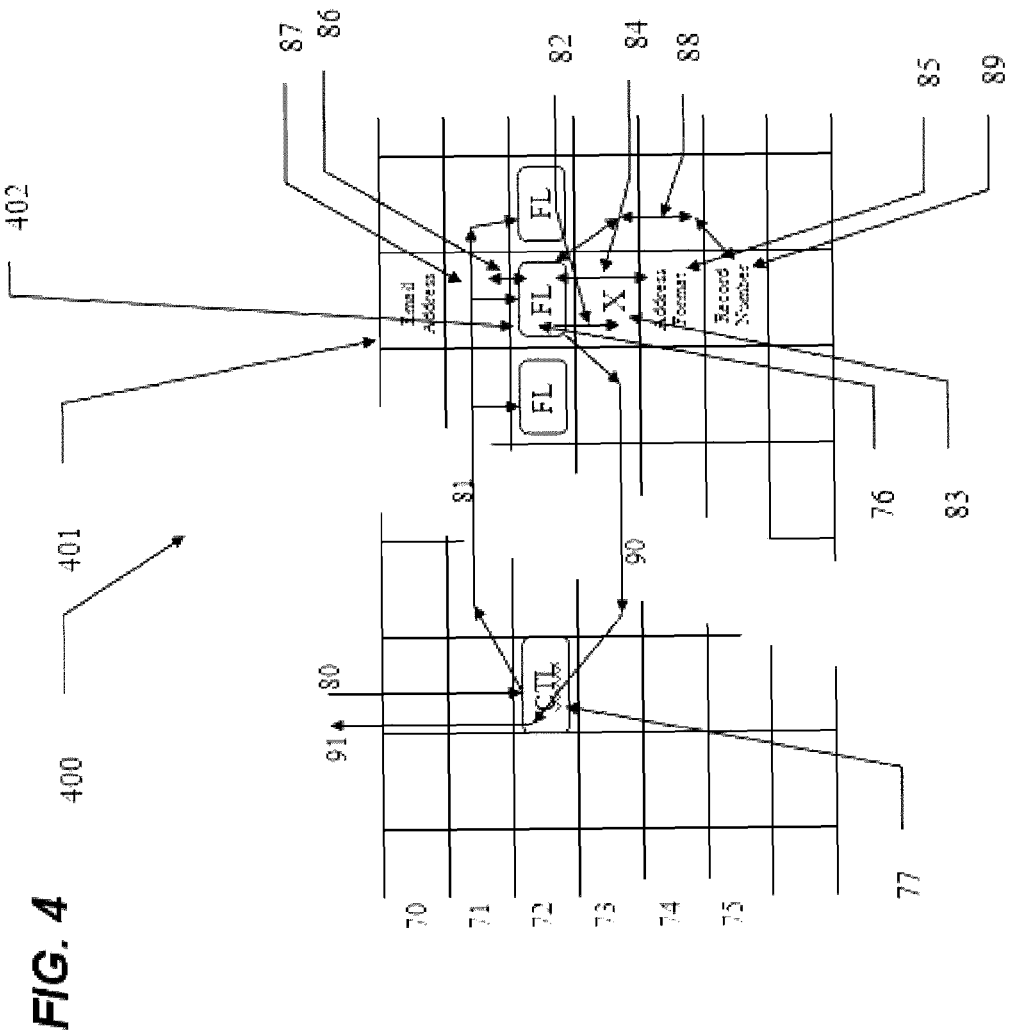

FIG. 4 illustrates the operation of a field parallel code ExoPonent in an Any-to-Any code machine and the operation of the code communication system it uses. It is an operational diagram of an ExoModule from the code Any-to-Any machine and shows the field parallel processing method of the invention, by showing how an ExoPonent FieldLogic 402 operates in a generic Execution record, with the chosen example being the use of a Field Parallel FieldCompare FieldLogic to detect if the user has entered an email address and if so, if it is of the correct format, and, if neither of these are true to cause something to be done about it. FIG. 4 is an operational snapshot of the operation of controlling the user entry and format of an email address that appeared in FIG. 3, in the Field 16's of each the Record IDs 70, 71, 72, 73, 74 and 75, and these record IDs in FIG. 4 are the same numbers as the record ID numbers in FIG. 3. FIG. 4 is an operational close-up of the operational interaction of the Field 5 (controller) ExoLogic and FieldLogic of Record ID 76 that is appearing in each data field 21 of Record ID 72 but only being activated in Field 16, because the Which Field Record ID 73 is only marked in Field 16 in FIG. 3. FIG. 4 is also an operational close-up of the Field 16s (email address) of Record ID 70 through Record ID 75 of FIG. 3.

Hence 400 of FIG. 4 shows a number of records of the Any-to-Any code machine acting on the Any-to-Any code machine, in which Record ID 70 is a Label Record showing in the field in question 401, the Label of a Matter Sub-type called "Email Address" that was being shown by Field 16 of Label Record ID 70 of FIG. 3. Similarly, Record ID 71 is the user data record of Record ID 71 of FIG. 3 and Record ID 72 is the Execution record, Record ID 72 of FIG. 3 containing in each of its fields reference to a code Any-to-Any code machine code ExoPonent 402—in this case a Compare FieldLogic as described for FIG. 2, and further described under FIG. 3. This is the FieldLogic that was stored in Field 14 of Record ID 76 of FIG. 3 and then referred to in each data field of Record ID 72, a Generic Execution record. Record ID 73 is the WhichField record of Record ID 73 of FIG. 3 which is marked 82 with an "X" in Field 401 to show that this field is to be processed by whatever FieldLogic accesses it. Record ID 74 is the Condition Record of Record ID 74 of FIG. 3 containing in 401 (the field in question) the format 85 for the required data entry that the FieldLogic is to compare with the user's data in Record ID 70. Record ID 75 is the Director Record of Record ID 75 of FIG. 3 that has 89 a BossModule Record ID in the field of Record ID 75 indicated by 401. Only one field will be required to be processed by the called BossModule (which also lists the WhichField Record ID 73 in Field 12 of Record ID 131 the BossModule List Record of FIG. 3). Using this WhichField Record ID 73, the FieldLogics in each field detect if they have to execute or not. Note that a Compare Logic can perfectly well be written to write an X into its own field of a blank Which Field Record, thereby creating a new WhichField which is fed to another BossModule and causes any desired operations to occur on that field.

The process of using a WhichField record to state the ExoPonent data of whether a field is to be processed or not means that instead of creating some new structure to handle a problem in a particular field, as in the state of the art manner, one Any-to-Any structure handles any of this particular type of problem in Any field Anywhere. If 2, 10, or 200 fields all have the same problem then 2, 10 or 200 of the instances of the same BossModule are executed.

The User Master View sorts out what to display where. If there is too much to display all at once, the User Master View can switch the display to Conversation Mode and display them one at a time or in any other suitable manner. If 200 wrong ExoPonents, each in a different field of a data record all require a different correction in any combination, one single FieldLogic operating with any available Condition Director record pair, can handle that. This is another example of where the need shown in the Background is met for an arithmetic increase in complexity (adding one 35 Kb FieldLogic) to produce a logarithmic increase in functionality.

In operation the Controller Logic 77 (which is the same Controller Logic 200 referenced in Field 5 of Record ID 72 of FIG. 3), after being handed to the kernel by the BossModule, receives a start order 80 from the Controller Logic referenced by the number 205 in Field 5 of Record ID 130 the BossModule performing the operation. This start order 80 to the Controller 77 also contains the locations in memory of the kernel's register that contains the data record 71 that the Controller needs—the exact mechanism to be used depends on the operating system in use. The Controller 77 sends a start command 81 to the FieldLogics in each data field of its Record ID 72, including to the FieldLogic in question 402 in the field indicated by 401. Receipt of the Start command 81 from the Controller 77, causes the FieldLogic (which in this instance is a field parallel operating FieldLogic) to check 82 the corresponding field of the WhichField record, Record ID 73. Capturing 82 the X (marking) 83 from the field 401 of the WhichField record, Record ID 73, the FieldLogic 402 interprets this as a command to execute its remaining code. Had it not captured a marking value X 83 from field 401 of WhichField record, Record ID 73 it would have returned instead an "Action completed" report 90 to the Controller Logic 77, which, when all other FieldLogics similarly reported complete would have a) reported complete 91 to the Controller Logic 205 of the BossModule that called it (Field 5 of Record ID 130 of FIG. 3) b) handed back the number of its output data record to the BossModule that called it and then c) cleared itself from memory without saving any of itself.

Since the FieldLogic 402, captured 82 an execute Symbol X 83 from Field 402 of WhichField Record 73, it proceeds with the function its code was written to perform, which in this case, is supposed to be a) to capture 84 the Address format 85 found in field 401 of Condition Record ID 74, and compare it 86, with the format of the data it finds 87 in the corresponding Field Parallel field, 401 of the User data record 71. Had there been a match, it could have reported complete on its communication channel 90 to its Controller Logic 77, as previously described. Supposing that it did not find a match, it then captures 88 the record ID 89 found in the corresponding field 401 of the Director Record ID 75 and returns this to its Controller Logic 77, along its communication channel 90. When the Controller 77 receives such a report from a Field-Logic (much like a sergeant calling for reinforcements), it forwards the Record ID 89 that FieldLogic 402 captured from the Condition Record ID 75 and the memory location of the problem data Record ID 71 to the Controller of the BossModule that called it (205 of Field 5 of Record ID 130 of FIG. 3) which treats the request to launch the Record ID 89 of Record ID 75 just like a request in its List Record to launch an ExoModule and gets the ExoModule concerned found, hands it to the kernel and hands the kernel the (faulty) data record or the location of the faulty record. The FieldLogic 402 periodically repeats the matching process 84 through 88 until either a) the data is corrected and it can report complete or b) the user or a Time-Out ExoModule either aborts the process, or saves the whole record package in memory, as-is, but with a new Time Saved stamp (which is a field with corresponding Field-Logics in the Administration fields (not shown in FIG. 3 or FIG. 4) and creates a "Pending" Base record for it that other pending handling ExoModules find and process as the user requires.

FIG. 5

Figure 5:
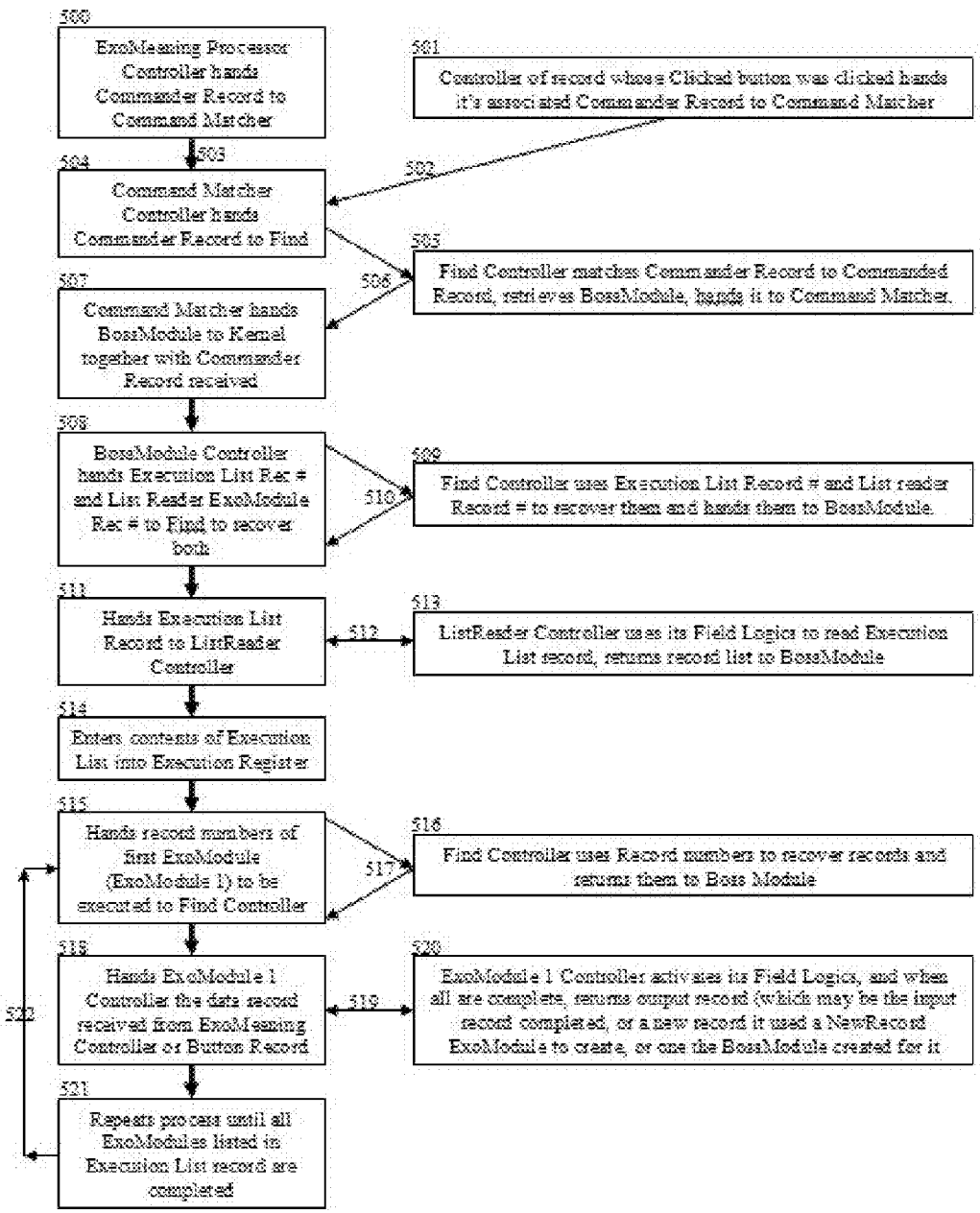

FIG. 5 illustrates the operation of Boss Modules that manage the execution of code ExoPonents on data ExoPonents so as to create a bridge between the Any-to-Any data machine and the Any-to-Any code machine and cause them to harmoniously interoperate as an Any-to-Any system. It is a block flow diagram showing the general operating methods of the structures built with the invention methods that bridge the computing Any-to-Any system to the human Any-to-Any system so that they harmoniously interact to product an Any-to-Any system complex—an Any-to-Any system complex being two or more Any-to-Any systems all interacting harmoniously.

The Command Matcher 504 may receive 502 a Commander data record from the Controller Logic of a Button Record 501. A Button record is a record that makes a button available for display by a ViewModule as just one more ActiveElements to display on the screen; a Button Record has an accompanying List record which lists, in its data fields, the record ID of the Commander record/s to hand 502 to the Command Matcher 504 when the Button Record's Controller detects that its button has been clicked. Hence, clicking a button can launch one action or a thousand, and the user can decide what a Button does, by pointing and clicking to add or remove as many BossModule's Commander Records to its execution list as he wants.

Alternatively the Command Matcher 504 may receive a Commander Record 503 from an ExoMeaning Processor 500 if one is installed and either case, the Command Matcher 504 always receives as a first step a Commander record (which it can also receive from any other source such as a distant Any-to-Any system). When it receives a Commander record, the Command Matcher 504 calls a Find ExoModule 505 and hands it 506 the received Commander Record 502 or 503 that the Find ExoModule 505 uses as a Query by Example Find Spec to match with a Commanded Record. (When a Commanded record is not found, it can be set up that an IfNotFound record is then found instead and the Execution Record specified in the IfNotFound Administration Director field (as elsewhere described) is then handed instead by the Command Matcher to the Kernel to be processed, so as to cause a chosen alternative action to occur in the event that there is no Commanded record to Find). The Find ExoModule 505 returns 506 the matching retrieved BossModule to the Command Matcher. (If the Any-to-Any machine is written so that the ExoModules in general and the Boss ExoModule in particular do not contain actual code but only the IDs of the records containing the code ExoPonents, then, the Command Matcher hands all (Execution) records concerned to a Substituter ExoModule (not shown) which 1) uses a Reader ExoModule to read the Record IDs in the Execution record's fields that reference ExoLogics (the BossModule Controller field in this case) and 2) uses the Find ExoModule to retrieve the ExoPonent records containing the code FieldLogics needed (a Controller Logic in this case) and then 3) uses a Copy ExoModule to copy the ExoLogics into the Execution Record and thereby replace the references to code with actual code that is ready to execute, and finally 4) returns the records (that now contain actual code) to the ExoModule that called it—the Command Matcher in this case. This sequence 1 to 4 is always followed on Execution records prior to execution in an Any-to-Any machine which is constructed so that only one instance of each ExoPonent exists. Similar self-evident steps are followed when a data record needs to have references to ExoPonents replaced by spellings prior to processing). Note that in the preferred embodiment, when one ExoModule gets another to do something, the second ExoModule always reports back to the first and hands any records it was asked to get back to the first also, rather than going on and handing these to a third ExoModule directly. This is so that the first ExoModule always knows whether an action it ordered has completed or not and if it does not complete, can do something about it.

The Command Matcher hands 507 the BossModule whose Controller is now actual code to the kernel to execute the BossModule Controller Logic, and also hands to the BossModule the Commander record 502 or 503 it originally received from either the ExoMeaning Processor 500 or a Button record Controller Logic 501.

When it is executed by the kernel, the BossModule 508 hands 510 its Execution list record ID and the record ID of the ListReader ExoModule it uses to the Find ExoModule 509, which retrieves the List Record listed in the BossModule List field and the ListReader ExoModule (specified by the BossExoModule) and hands them 510 to the BossModule.

The Boss ExoModule Controller 511 hands 512 the Execution List record it received 510 from the Find ExoModule 509 to the ListReader ExoModule 513 that it also received 510 from the Find ExoModule 509.

The ListReader ExoModule 513 reads the list record it received 512 from the BossModule and sends back 512 to the BossModule 511 the List of record IDs it has read from the BossModule's list record, and the terminates without saving.

The BossModule 514 enters the record IDs it received 512 from the ListReader 513 into its Execution Register and begins the sequence of executing the ExoModules read from its List record. The BossModule 515 takes the record IDs required by the first ExoModule to execute from its Execution register and hands these 517 to the Controller of the Find ExoModule 516 to Find and recover the listed records and return them the BossModule 517. When Execution Records are retrieved, if Execution records are built so that they do contain the actual code but only reference to the record containing the code, the BossModule hands the Execution Record concerned to the Substituter ExoModule (not shown) that replaces the Code ExoPonent record IDs with actual code and returns the Execution records to whichever ExoModule called it—the BossModule in this case (all as previously described).

The BossModule 518 hands the Execution record 520 of the first ExoModule, ExoModule I that it received 517 from the Find 516 to the kernel to Execute its Controller and FieldLogics. The BossModule 518 hands 519 to the Controller of ExoModule 1 520 the other records the ExoModule needs to execute (which were handed to it 517 by the Find 516) such as Condition records such as those already described, and particularly the user Commander record as originally received 503 from the ExoMeaning processor 500 or received 502 from the Controller of a Button record 501.

The Controller of the first ExoModule to execute 520 ExoModule I activates its FieldLogics in the manner already described and when they are complete a) returns 519 a report stating it has completed its work to the BossModule 518, or b) returns 519 the record ID of one or more Execution records its FieldLogics have retrieved (as previously described). Those of its FieldLogics which have requested the BossModule to execute the Execution Record whose record ID the Execution Controller 520 has just returned 519 to the BossModule 518, continue attempting to execute until either a) successful (in which case the Controller of ExoModule 520, reports 519 completion to the BossModule that called it 518 or b) Execution is stopped by the user or by an ExecuteLater ExoModule and the package saved for execution later (as previously described) or c) the ExoModule is terminated by another Terminate ExoModule that is used to abort execution of any ExoModule.

The BossModule 521 repeats 522 the sequence 515 to 520 until all other ExoModules in its Execution list record/s are executed, or one of them is saved for later or aborted.

In this manner the BossModule is the mechanism that seamlessly integrates the data Any-to-Any machine with the code Any-to-Any machine so that they harmoniously interact to create an Any-to-Any System, in which the data Any-to-Any machine both controls the Code Any-to-Any machine and is acted upon by it, so as to produce a useful result in similar manner to the way the Binary code Any-to-Any machine and the transistor Any-to-Any machine harmoniously interact to produce the Binary/transistor system that does all computing today. The Command Matcher seamless integrates the human's orders with BossModules, thereby integrating the human's Any-to-Any data-activity system with the Computer's Any-to-Any data-activity system to produce an Any-to-Any human-computer data-activity complex.

Further detail of the operation of the Command Matcher is as follows:

FIG. 6

FIG. 6 illustrates the operation of the Command Matcher to enable meaning data ExoPonents to select and cause the execution of code ExoPonents, thereby creating a bridge between the human and the functioning Any-to-Any system resulting in an Any-to-Any human-computer data-activity system computing machine (aka Any-to-Any computer). It is a small scale example showing the principles of operation of the Command Matcher that forms the bridge between the human Any-to-Any data-activity system and the functioning computer Any-to-Any data-activity system so far described, so that he can control the Any-to-Any human-computer computer in a fashion that is sufficiently similar to the way the user is accustomed to control other humans since birth that he finds it instinctive and easy.

Referring now to FIG. 6, the parts in gray color 20, 21, and 31 are informative and not part of the Any-to-Any environment itself. In FIG. 6, the table 10 has Administration Fields 20 and Data Fields 21, and what is in those fields is indicated in row 31 as previously described. The row indicated by 32 shows the field numbers that are used as field names to satisfy the requirement of state of the art One-to-Many machine database systems for a field name, all as previously explained in detail for FIG. 1.

The Command Matcher 601 will process any Commander Record it is handed (such as (in this illustration) Record ID 133 that is the same Record ID 133 as that shown in FIG. 3). These Command Matcher records can be provided by a Button that is clicked or by an Meaning Processor that creates correctly structured data ExoPonent records or Record structures (as described in FIG. 5) or by other sources such as by a distant Any-to-Any system that wants the local Any-to-Any system to perform an execution The Meaning processor itself can be screen fed by typed-in orders, or, if workable voice recognition exists, then it can be fed words from the voice recognition system, words which can come from a microphone or by phone; equally it could be fed by Morse code or another signaling system.

The test ExoBrain environment showed that the Command Matcher can also be fed Commander Records generated by remote Any-to-Any systems, which resulted in transparent remote processing being performed by distant local Any-to-Any system. The Command matcher also provides the basic enablement mechanism for WAN Remote Finds and Puts with other internet connected Any-to-Any computing systems. Using Sub-Destination fields to specify the ID of the remote Any-to-Any system (or list of Any-to-Any systems) to which the answer should be sent means that the answer does not have to be sent to the same Any-to-Any system that requested the Remote Find. These abilities provide the basis of executing user orders that are the equivalent of, "find out from Bill the address of the restaurant and tell Bill to tell everyone in the office where it is". In this manner the Command Matcher Group IV relational mechanism bridges Any other Any-to-Any machine or a human to an Any Any-to-Any machine in a manner that is not intrinsically hierarchical and is intrinsically unlimited. In short, simple as it is, the Command Matcher system is a high level Wan-capable human-computer relational system. (In the ExoBrain, security of this ability was ensured by a transparently encrypted transmission system to be described under FIG. 14 ensured that any incoming Execution requests could not be read by the Any-to-Any system unless they come from a source with which RSA public-private key pairs had been exchanged, and even then would not execute without user permission and even then could not destroy anything for various reasons).

Referring to FIG. 6, the Command Matcher 601 receives a Commander Record ID 133 from any of the sources just described. Record ID 133 Field 14, per Label Record ID 70 is using the Label of Action (i.e. activity) and in that field has a value which (in the manner already described) would resolve to the Base Concept of "Add" although the records needed to do that are not shown. Field 15 of Record ID 133 is using the label of (Matter) "Type" as shown by Field 15 of Label Record ID 70. Field 15 of Record ID 1332 references Record ID 8 which is the Record ID 8 of FIG. 1—a Base Concept record whose Field 11 references Record ID 2 of FIG. 1 that is a Spelling record and contains the ExoPonent spelling of "email", thereby stating that the Type of Matter that gets added is "email" The field numbered Field 16, (per Field 16 of Record ID 70) is using the label Email Address in the Sub-Type of Matter field and references the ExoPonent Base Concept record for "email address" and hence the Data fields of Record ID 133 say that the user has requested to add (activity) a Matter thing, which is an Email Address—he has given the order to add an email address. Field 12 Time contains the Record ID of 12, which, as per FIG. 1, traces back to the Base Concept that has a spelling of "present" (Time) and this field therefore states that the action of adding an email address is to be done in present time—i.e. now. However, any time value for the execution will be ignored during the Command Matching Process. This is because as a last step of BossModule execution all Boss Modules call an Execution Scheduler Boss Module which checks the time value in the Commander Record ID 131 Time Field 12 and schedules the execution according to the value it finds there—this is a further illustration of the efficiency of the Any-to-Any system in which one small piece of scheduling code, enables every action of which the Any-to-Any system to be scheduled for any execution time.

The BossModule Record ID 130 is the same Record ID 130 that was fully described under FIG. 3 and FIG. 5. It also contains in its fields Field 14, Field 15 and Field 16, the same identical ExoPonent values that the Commander Record ID 133, contains in its fields, Field 14, Field 15 and Field 16. The Command Matcher 601 takes this Commander record 133 and, after removing any time values in its Field 12, calls the Find ExoModule (not shown) to which it gives the Commander record to use as a Find Spec to find matching records and thereby retrieves the matched Commanded record of BossModule Record ID 130, whose operation was already previously explained in connection with FIGS. 3 and 5 and to some extent in FIG. 4 also, and elsewhere.

With the above actions, the Command Matcher matches the human's orders, to the Any-to-Any computer's execution abilities, and in this example, has matched the human's order to add an email address, with the code that will add an email address. It should also be observed that in a working Any-to-Any machine the values in fields Field 14, Field 15 and Field 16, will all be ExoPonent numbers that are record IDs for Base Concept records. There is absolutely no need or requirement to look these up and convert them into spellings before performing the find—the Find can perfectly well be performed using the numbers that are the Record IDs in the fields Field 14, Field 15 and Field 16 of both Record Id 133 and Record ID 130—in effect, one set of numbers in one record (numbers are always unambiguous ExoPonents from the numbers Any-to-Any machine) is matched with another set of numbers in another record. This illustrates the point that Base Concept Record IDs are ExoPonents that essentially constitute a language-independent Numbers Concept Language, into which all human languages can be translated and that can be translated into all human languages. This also illustrates that the Any-to-Any machine, internally, computes using numbers—numbers also being fast for a computer to use. The Any-to-Any machine only converts these numbers into human-readable spellings when it has to interface with the human, but is otherwise a computing entity that computes internally in numbers.

In summary, the activity of the Command Matcher in just this small example is quite the equivalent of clicking a "new Email address" well known in state of the art email programs and will cause the similar action—the preparation of an email address, in which the previous FIGS. 2 to 5 and their explanations, stepped through the actions occurring in the harmoniously interacting the data Any-to-Any machine and Any-to-Any code machine so as to prepare one part of an email—an email address, with the useful advantage that the email address is in such a format that the Any-to-Any system in which it exists can reuse it at anytime anywhere by reference to its Record ID and consequently there only ever needs to be one single example of that particular email address recorded anywhere in the system, and, by inference, only one Joe Brown instead of the data insanity of hundreds of John Browns—and no idea of which is which—commented on in the background. All other executions than Adding an email address are performed using exactly the same set of methods and mechanisms just described.

FIG. 7

FIG. 7 illustrates the use of meaning ExoPonents to enable Virtual Tables in the Data Relation Table relational system in part of a data Any-to-Any machine which is then enabled to store any kind of data and relate it usefully in a computer image of the useful relationships of that data that exist in real life. FIG. 7 shows a small scale example of typical contents of grid storage for a general purpose Any-to-Any computer, and illustrates the use of a DRT and the ability of the Any-to-Any computer to store any kind of data in a single grid-like storage structure such as a single database table and relate it usefully (where useful relationships do exist in the data) using the 14 Any-to-Any relationship mechanisms previously described and a DRT. FIG. 7 also shows the use of the Discoverable ExoPonent Commonality Relationship System using a miniature version of the Data Relation Table.

Part of the value of the DRT is its elasticity. A DRT can be as small as the one now being described, and still be useful as will be shown. Yet it can be made smaller still—to fit in a phone for example—or larger—to a 250 column office application for instance—or larger still to a 1,000 column or N column DRT for more powerful applications. Yet despite this elasticity, the data from any size of DRT can fit into any size of DRT using the mechanisms previously particularly those that enable any type to be represented as a column, or a row or both if necessary.

Even with no further explanation and teaching than that given here, the DRT is separately useful and while it may be terra incognita, a first time Any-to-Any machine constructor needs no further description than that given herein to make it work usefully. The following description shows in general how the relational systems already described are key to enabling a single grid storage or table to accept any data no matter how different. It also shows how the Discoverable ExoPonent Commonality Relational system is used to discover relationships that exist both within received data.

To illustrate these facets, FIG. 7 shows a curtailed version of sample records that an Any-to-Any computing machine (such as an ExoBrain) might hold for a person called Jackson. The example supposes that Jackson 1) is the head of household for which 2) he maintains accounts, 3) is a member of several clubs, and is 4) the accountant of a carpet manufacturing company for which he does the accounts and 5) controls manufacturing and also uses his Any-to-Any system to electronically control the carpet making machines the carpet company uses, and who 6) also owns and runs a fast food restaurant, and that he does all this using a single Any-to-Any system. FIG. 7, is intended to illustrate the way the data relationship systems work and accordingly, does not contain or show Code ExoPonents or ExoModules, but contains only data ExoPonents that could be entered into a database and immediately function as a working data Any-to-Any machine, correctly answering questions on the ExoPonent data it contains. In this illustration, in the interests of ease of understanding all ExoPonents are represented by spellings and not by record references in the manner previously explained, as would normally be the case. However, test have proved that a workable if limited Any-to-Any system can be made using spellings instead of using the preferred embodiment of Base Concepts and can serve as a gradient step to understanding the building a more thoroughbred Any-to-Any system.

Referring now to FIG. 7, the parts in gray color 20, 21, and 31 are informative and are not part of the Any-to-Any environment itself (records in the table shaded in gray are Label records, shaded to enable them to be identified more easily). The table 10 has Administration Fields 20 and Data Fields 21, and what is in those fields is indicated in row 31 as previously described. 32 indicates the field numbers that are used as the field names required by state of the art One-to-Many machine database systems, all as previously explained in detail for figure for FIG. 1. In the same convention used previously, Row numbers will be referred to by the column of Record IDs appearing in the first column at the left below the column heading of "ID#", and column numbers will be referred to by referencing the column (field) numbers appearing in the row referenced by 32.

In the row of field numbers indicated by 32, the field numbers used are the same ones as were used in all previous figures except where some fields have been omitted and new ones 700, 701, 702, 703, 704, 705, 706 added for the purpose of this description. As previously described, in the preferred embodiment, all word meaning data is entered as ExoPonents that are Base Concepts and the record IDs of these ExoPonents are then used to create individual records, in the manner described for FIG. 1. While that method is needed for a best implementation, it is hard and slow to comprehend, and therefore, throughout the description of FIG. 7, instead of entering the Base Concept record ID itself, the spelling that would be referenced by the Base Concept record is shown in the cells of this illustration instead as that spelling is human-understandable whereas a record ID is not. A test ExoBrain was produced entirely using this method and still produced spectacular results.

Field 700 in 32 is Record Subtype, and serves to further sub-divide record types and, depending on extensiveness of the nature of the application envisaged, additional such Sub-sub type fields may be used for the Record Type field and similarly for other fields also when needed. As previously described, sub-type fields together with the field of which they are a sub-type are always treated together as a single entity for the purposes of most searches. This is because most human searches use Co-reducing types and sub-types and almost never specify a specific group member by an unambiguous identification. For example, a person says "get the letter from Joe"—"letter" being a type of thing, "get" being a type of activity, "Joe" being a name that is a type (the type of all "Joe's) and these Co-reduce one another to exclude everything that is not wanted. The human does not often use an unambiguous specification such as "get me letter 1590" and even if he does, "get", "me" and "letter" are still Co-reducing types).

Field 701 of 32 is labeled with the term "Senior Label Record" to indicate that this field contains the record ID of the next highest level (senior type) Label Record in use by a given record and thereby states which is its senior type, and that it is therefore part of that Senior type's own virtual table. (Since anything can be made the senior of anything else in an Any-to-Any computer, it is important that the Any-to-Any computer designer studies carefully what occurs in real life so as to capture and create the real-life seniority of structures in the Any-to-Any computer using the mechanisms provided. Since the human does know and remember how things are in real life and uses real life matters to specify things, if the Any-to-Any system has been constructed to distort that in some way, perhaps because a programmer or Any-to-Any system designer preferred it that way, he is likely to make that things unfindable and unusable as another human does not know which distortion he used. Therefore the best and single reference point for constructing an Any-to-Any system is what goes on in real life, which should be reflected as accurately as possible in the Any-to-Any system).

The most senior virtual tables in a given Any-to-Any system (such as the senior Virtual Tables associated with senior Label Record ID 1, Record ID 19 and Record ID 25) are related to one another by being in the same physical table or grid structure. From this it will seen that senior virtual tables or even any virtual table, or even any one identifiably different record type (which is its own Virtual Table) may be stored in a separate and potentially distant physical host, provided that self-evident and adequate bridging mechanisms exist to make the dispersed logical parts into a virtual whole. Similar mechanisms can be used to park older records (all records being time-stamped as previously described) (and those within any given time block constituting their own virtual table) in distant hosts, and, when that is done, an IfNotFound record (exactly as previously described for cascaded internet search Any-to-Any computers ("SearchBrains") is left in the original table and is automatically matched and acts to transparently retrieve the missing data when required (using the Remote Find mechanisms already outlined and described in more detail in later Figures).

Field 702 in 32 is a field from the DRT table and Field 702 of Record ID 1 Label record shows this to be "Capacity"—the Capacity in which a person named in the Last Name Field 10 is acting in a given record.

Field 703 of 32 is from the DRT and is provided to record names of groups that contain people (the term "people group" is used to distinguish it from groups of times, places, activities or things, for example).

Field 704 in 32, Space, Direction is a field that is used to state the physical direction of something—there is no direction in a physical universe where there is no Space.

Field 705, Quantity, as it occurs in the Matter Data Category of data 21 (the Matter Data Category is represented by Fields 15, 16 and 706) is actually a Life Data Class being applied to the Matter Data Category only and hence is the Quantity of whatever is stated in the Matter Data Classes in the record in which it occurs. Hence, Field 705 of 32 is the quantity of Matter—the number of payments, amount of weight etc. Quantity is a Life Data category field (there is no quantity without life). Because Quantities are a frequently used Life Data Category Quality for each physical Universe Data Category, a suitable form of one of more Quantity fields are provided for each Data Category in the DRT; such fields are normally accompanied by a unit field (not shown here) which is used to record the unit of the quantity—kilometers, tons, minutes etc. The more correct way is to parallel a data record with Quantity and Unit records, enabling every data field to have its own quantity and unit. In practice, this is mostly not necessary as the human does not often use quantities for individual Data Class entries, but rather for entries in a given Data Category as a whole.

Field 706 of 32 is a cost field from the DRT and normally the next fields would specify the currency of the cost (e.g. dollars) and the unit in which the cost is recorded (cents, millions of dollars etc).

Turning now to the records themselves:

Record ID 1 is the most senior Label record in table 10 and is a version of the DRT that has been shortened for illustrative purposes. Because it is the highest level Label in the table being described, it has no senior Label record referenced in its Field 701.

Record ID 1 is a High Level Label Record of type DRT as shown by the entry in Field 700 Record Sub-Type. Record ID 19 and Record ID 25 are other High(est) Level Label Records and each of these High Level records may have its own family of virtual tables within the same grid. Families of virtual tables (a set of virtual tables using the same high level label record) may be somewhat related to one another (as will be shown later) by having some of their fields in common (which is not obligatory), and if they do, the data records in the family are also related by reason of those common fields. Since the common factor that relates all data of any kind is humans—without humans there is no data—it can be useful to keep at least some of the Life Data Category fields in all high level Label records the same, thereby enabling data in different virtual table families to be related to one another by the people concerned in every case. The High Level records in table 10 (Record ID 1, Record ID 19 and Record ID 25 show how these common fields can be used to relate Virtual Table families and their data to one another).

Record ID 2 and Record ID 3 are the only records directly using the high level Label of Record ID 1 as is shown by the fact that they are the only records that reference Record ID 1 in their Label Used Field, Field 8 in row indicated by 32.

While such high level records always (and usually all records in a given Any-to-Any system) have the exact same Administration fields in common, some of the data field labels they use will be different. In this example, data fields 10 and 702 are the same in all three high level records Record ID 1, Record ID 19 and Record ID 25, but the other data Fields 703, 704, 705, 15, 16 and 706 contain one set of values in Record ID 1, that are values from the Data Relation Table and in Record ID 25 these same fields, Fields 703, 704, 705, 15, 16 and 706 contain completely different values that have no relationship to the values in the same fields of Record ID 1. (Note that, in life itself, people are the center of everything and everything else revolves around them, and are always involved in some manner hence, whatever other fields may be required in a High Level Label Record (and hence in a virtual table), it is often advisable to the keep the DRT fields that concern people the same in all High Level Tables).

Record ID 2 in Field 700 Record sub-type, shows that is the record for the owner of the Any-to-Any system—an ExoBrain in this instance—and is the equivalent of the Administrator in state of the art parlance, and is the person who allows or withdraws permission for others to use the Any-to-Any (computer) system.

Record ID 3 in Field 700 identifies the Record Subtype as being the record for the Any-to-Any system itself which is an "ExoBrain" in this instance. Any-to-Any systems are generally named (just like secretaries), using the Name Administration Fields (not shown here) and additionally showing the name in the ExoBrain's own Record ID 3, in the Life First Name Field (not shown here) and Last Name Fields and shown in this example with the ExoBrain's First Name (deliberately misplaced for convenience in this figure) in the Last Name field, Field 10 as "Jill". All Any-to-Any systems have a unique ID created at first start that also would be recorded in the Any-to-Any system ID Administration field (not shown) of every record and of the Any-to-Any system's own record, Record ID 3. All records created by that Any-to-Any system ("Jill") have the Any-to-Any system's name record referenced in their Creating Any-to-Any system ID Administration field (not shown), which in this example, would show the number 3 (for Record ID 3) as being the Creating Any-to-Any system. Because Any-to-Any systems are named, users can identify Any-to-Any systems easily by name, in the manner they are used to identify people and can phrase queries and orders in the same manner they are used to querying or ordering other people, for example with orders such as, "Jill, ask Paula (the name of another Any-to-Any system) where her owner is scheduled to be right now". Exceptionally, the name of the Any-to-Any system is stated in the Life fields, which would never be the case for inanimate matter, except that an Any-to-Any system is a computer reflection of part of a person and therefore in some respects can behave in a similar manner to that part of a person's behavior that it reflects. Using a first name for the Any-to-Any computer also sets the user's expectations on the one hand, and on the other acts as a guide for the designer's functionality construction which should be as human-normal as possible so as to make it as easy and as predictable as possible for the human user.

Permission to use an Any-to-Any system is recorded in a (Permission) Record whose Record ID appears in the Any-to-Any system's Administration Permission field (which is not shown, but is an Administration field in every record). A person unknown as an authorized user in the Any-to-Any system's permission records who attempts to Logon to the Any-to-Any system concerned, (if they are trying to use the Any-to-Any system directly (either locally or remotely), results in the Command Matcher finding the only Commanded record it can match (because the Administration Field user Number and Any-to-Any system ID combination cannot be found the Any-to-Any system (Permission List) record) results in a UserAddRequest ExoModule being activated which shows the Any-to-Any system owner (or someone to whom he delegates the function by using suitable ReDirect ExoModules) who it was that attempted to control the Any-to-Any system and what they tried to do or order, and requests authorization to add them to the list of authorized users in the Any-to-Any system's Permission record, User Permission type, List record. This addition occurs in the form of adding a newly-created record ID for the person concerned—for example the first record ID to be added to the Permission List automatically would be Record ID 2, that of the Any-to-Any system owner.

More sophisticated permission control is available in an Any-to-Any system using CanDo and CantDo records which are also represented as Administration Fields in every record. At the most granular level, CanDo and CantDo records can be created by a Permission Authorizer—a person authorized to control access for each user. CanDo or CantDo records (one per user) can field parallel any particular data record or any particular virtual table of records. Permissions can be constructed in a number of ways and the following describes one such possibility. A single CanDo or CantDo Record lists one action of which the Any-to-Any system is capable and one user that the record concerns. Each field is marked if that Activity can be done (or can't be done) on that field in that record or Virtual table) by that user—CantDo records are similarly marked if that Activity is not allowed to be done by that user. CanDo records are used if the Permission Authorizer has chosen to set up the Any-to-Any system so that a user is not allowed to do anything unless specifically approved to do it. CantDo records are used if the Permission Authorizer has chosen to set up the Any-to-Any system so that a user is allowed to do everything unless specifically refused permission to do that. Grouping ExoModule mechanisms can be used to group the activities into groups to speed up marking them. As many CanDo or CantDo records can be used for each data record or Virtual table or any combination of these as necessary, and in this manner what every action a given user can do on every field of every record can be controlled if required.

CanDo and CantDo records can be accompanied by a WhichField record and used to turn on or off specific fields of a CanDo or CantDo record. If this method is chosen, the CanDo and CantDo records are not user specific but the Which Field record is specific for each user. Any basket of CanDo or Can't Do records can then be associated (by referencing a Permission List record in the Permission Administration field) with any one data record, or with any Virtual Table in the Any-to-Any system, or with the Any-to-Any system itself or with any combination of same. Permission Checking ExoModules are then positioned between the Command Matcher and the kernel and check the CanDo and CantDo records associated with the data record being sent for processing to see if the Activity ordered by that user is authorized or not for the user ordering it, and then either allow execution to proceed (by sending the record package on to the kernel) or preventing execution by not sending the record package to the kernel. The Any-to-Any system could be set up to send such refused executions to the recorded Permission Authorizer, for review—thereby generating immediate positive notice of each and every unauthorized action that is attempted by anybody. Apart from detecting potential criminals, such notifications can also serve the useful purpose of notifying the Permission Authorizer that over-restrictive permissions may be preventing staff from accomplishing their tasks.

In this way it is possible to control Any Action for Any User for Any ExoPonent or ExoPonent Assembly, and of course, one of the actions that can be controlled is whether or not an ExoPonent appears on the screen at all, since View ExoModules are Actions subject to permissions just like any other action. Because of this unauthorized data can be made to appear not to exist at all, or, a notice to or concerning the person who attempted to use it can be generated by suitable BossModules. Very similar mechanisms apply to Encryption and Decryption, since if suitable ExoModules are added, Any ExoPonent or ExoPonent Assembly (which includes any Table or Virtual table) can be separately and multiply RSA encrypted with public and private keys and this too can be specified by field parallel Encryption records. So an almost absurd level of security can be provided in which each single data ExoPonent could be separately encrypted and accompanied by fields in field parallel records that state whether each specific user can, or cannot do to that single ExoPonent, each and every single action of which the Any-to-Any computer is capable. Between that, and no security at all, every other possibility that can make a suitable level of security is available using the flexibilities of the Any-to-Any computer. Of course, because it is an Any-to-Any system, some data records can have individual ExoPonent CanDo and CantDo records for each data ExoPonent and individual encryption for each ExoPonent (that might be advisable for signature records, or password records or records of Visa cards) while others have lesser security and some have none at all. The Any-to-Any system provides totally flexibility; it is up to the ingenuity of the programmer to employ that flexibility usefully.

Record ID 4 and Record ID 6 are two Label Records for the two sides of an Email—the "from" or "out" side (Label Record ID 4) and "To" or "In" side (Label Record ID 6). Matter fields in a DRT contain a "Content" field (not shown in this table) and "Content" in this context is taken to mean the text of the body of an email, letter, or a presentation etc—everything that is not addresses, dates or signatures and such like). A Meaning Processor can be built just to turn user language orders into ExoPonent DRT records to processes orders an Any-to-Any system will receive. With quite a lot more work, a Meaning Processor can be built to meaning process the much wider selection of words and meanings of more or less the entire language in reasonably normal use and then, niche Meaning Processors built to deal the language of medicine, astrophysics, etc and then that can all be done in multiple languages. This does not require building more code, as the code does not change, it just requires more data entry. While that only has to be done once, it is a lot of (not very difficult) work to do it the first time. If an Any-to-Any system is not required to answer questions or act on the meaning of text that is in the Content as defined above, a semi-workable shortcut can be taken and the content recorded as a Non-ExoPonent lump of words in the Matter Content Field of the DRT, instead of taking the time to build a full ExoPonent library and Meaning Processing for almost the entirety of a given language. In a full blown implementation with full Meaning Processing installed, the Content field refers to a List record that contains the records specifying the Content in ExoPonent form. If it is desired to keep this ExoPonent recording of the Content compact, then the Content can be recorded as a single string of joined records with each field containing a single Logical grid reference created as described under FIG. 1; however, while this is compact, it requires extra processing ExoModules and extra processing time and delay when needing to discover relationships between particular ExoPonents in content, or between ExoPonents in Content and elsewhere.

When a document is generated, such as the Email being described, the Content of the email entered by the user is entered in the Content field in one of these manners.

While both the Out and the In side of a communication might appear at a superficial glance to be "the same" they never are. The Time of sending (Time fields in the Out record), is never exactly the same as the Time of Receipt (that will appear in the In Record) especially if sender and receiver are not in same time zones. While the Content that was sent, is (hopefully) also the same content that was received, sometimes (and especially in the case of a fax) it often is not. The Content that is sent is placed in the content field of the OUT record and the content that is received is placed in the Content field in the IN record. The Action on the outside is Send email while on the In side it is receive Email, and this is visible in a typical user query to a secretary—that could just as well be answered by a find—"Has Joe received my email?" which in effect, is a query for ExoPonents of Email+Sender Name+Action+receive+past time, and cannot be correctly answered if the only action record is "sent" which is Action+send+future time. This makes the point that the Sending Any-to-Any system creates the Outgoing record and as much of the of the Incoming record as is known at the time of sending and may attempt later to fill in the rest (like the receipt time, by querying or getting an acknowledgement from the receiving Any-to-Any system). If the Any-to-Any system knows that it is another Any-to-Any system that will be receiving the email in the form of Any-to-Any system records, then it sends both OUT and IN records; the receiving Any-to-Any system records both the OUT Side and the IN Side and fills in missing data in the IN record (such as receipt time, and the Content it actually received). The receiving Any-to-Any system can return the completed IN record to the sending Any-to-Any system, which can a) compare the IN and OUT records and rectify any discrepancy and b) report to its user that the Email or other document) arrived safely.

It is always important to remember that the Any-to-Any machine is not there to minimize programmer effort or minimize use of host resources; it is there to provide the most accurate possible reflection and computer mirror image of real life and the physical universe that the human is used to dealing with. If the reflection or mirror image of life and the universe in the Any-to-Any machine is accurate, the user will automatically know what to do and what to expect and will be able to proceed without pause, but if the Unlimited Principle is violated and the user is limited in a way he does not limit himself—such as by a missing IN side of a record that is not created because "the In and Out are really the same" (when they are not), trouble will result in some form, such as nowhere to record the receipt time or whatever contents actually arrived. Much of the universe is two-terminal—a letter goes out from someone and in to someone else; the early monks who invented double entry accounting realized that money or an asset goes out from somewhere and in to somewhere else and if the two sides do not balance, something is wrong. Hence many records in an Any-to-Any system, to accurately reflect life, have to be paired, one side for In and One side for out. Each side will need its own Label Records as the two sides are not identical.

For the sake of brevity in FIG. 7, this paired record aspect has only been shown for Record ID 4 through Record ID 7, email records.

Hence Record ID 4 states in Field 2 that it is a Label Record, while Field 700 of Record ID 4 Record Sub-type states the type of the record is "Email Out". Field 701 of Record ID 4, Senior Label Record says its Senior Label Record and the senior of the Virtual table it creates, is Record ID 1. Field 8 of Record ID 4, Label Used, has no entry as this record is itself a Label record. Field 10 of Record ID 4 uses the same value of Last Name as Record ID 1, the senior level Label record to which it is related. Field 702 of Record ID 4 uses the same value of Capacity as Field 702 of Record ID 1, the senior level Label record to which it is related. Field 703 of Record ID 4 would have originally been named "People Group" when first created using the senior label of Record ID 1 that was used to create it (in the manner described for creating an ExoItem from scratch), which described that the most senior Label record available in a given High Level table is always the default and first Label record that the user overwrites with what seems to him to be more suitable values for the objective he has in mine). It is supposed in this example that the user overwrote "People Group" and renamed it "Clubs" in response to a prompt such as "enter the type of the People group HERE (or hover the mouse over this to receive Help)". Field 704 of Record ID 4 is the field that, in Field 704 of Record ID 1, has the value of Direction (with the meaning of movement in space), a field of the Space Data Category, and Direction in the context of Record ID 4, an Email sending Label record, is Sender. In ExoPonent form, "sender" is translated into ExoPonents a) an entity b) a capacity c) an activity d) a direction of OUT. In this case the spelling "sender" is intended to represent the "OUT" ExoPonent and is just written "sender" for clarity of explanation). Field 705 of Record ID 4 is (Matter) Quantity)—the number of emails sent. In the case of a mailing, a single email Out record might result in 24 emails sent, and consequently there would be 24 Email In (received) records generated, one for each addressee—the sender's address being referenced in the Out (sender) record and the recipient's email address in the In (receiver) record (both not shown). The previously described Next H and Previous H (H for horizontal) (both not shown) fields are used to logically join the Out and In records, and therefore, each of the 24 In records have the record ID of the single Email out record in their Previous H field, while the Next H field of the Out record contains the record ID of a List record that lists the record IDs of each of the In (receiver) records. Field 15, Field 16 and Field 706 of Record ID 4 all show the same values for their fields as the Label record, Record ID 1 that is their immediate senior label record.

Record ID 5, Field 2, Record Type, contains the ExoPonent value needed to state the record is a user Data Record, while Record ID 5, Field 700, Record Sub-Type, contains the ExoPonent value needed to state it is an Email Out record while Record ID 5, Field 701, Snr Label Record, says that the Senior Label record of the Label record it uses is Record ID 1 and it is therefore part of Virtual Table of Record ID 1. Field 8 of Record ID 5, Label Used, has an entry showing it uses the Label record which is Record ID 4, the Email Out Label record. Field 10 of Record ID 5, Last Name, has the last name of Jackson recorded, which is the same value as that of the Any-to-Any system owner recorded in Record ID 2 Field 10 and the fact that the two records have the same value of "Jackson" in this field automatically relates them and makes them part of a virtual table that concerns all matters to do with Jackson, just as all matters to do with Jackson are related in a person's head. Field 702 of Record ID 5, Capacity, records that Jackson's capacity in which he acts in this (email out) record is that of "member". Remembering now that Field 703 of Label Record ID 4 being used by this user data record (Record ID 4) was renamed by the user to "Clubs", Field 703 of Record ID 5 has recorded in it, the name of the Club of which Jackson is member and is emailing in the capacity of member, and is Premiere Golf. Field 704 of Record ID 5, called Sender/Receiver, has the value "Sender" to show that this record (concerning Jackson) is the Sender, or "out" record. Field 705 of Record ID 5 is Matter Quantity and has the value 1 to show that the number of sender records is one (and always would be for an electronic email, but might not be for a printed email, or a letter or other document where one could put 5 copies in the same envelope). Field 15 of Record ID 5, Type (of Matter) records the value of "electronic" to show that this is an Electronic (as opposed to a printed or handwritten or scanned) email. In the case of an office suite type of application, because document of different types are frequently used and specified, The Matter Type Data Class is further divided into additional (sub) Data Classes such as Document Type (not shown) with additional coupled fields such as Document Format. Accordingly the type of the document (email) would be shown in the Document Type field and its format (Any-to-Any system, or Outlook for example) in the Document Format field (none of which are shown).

Field 16 of Record ID 5, Sub-Type of Matter has no value recorded in this instance because one of its own subtypes (document format—not shown) is being used to record the Matter Sub-Type information). Field 706 of Record ID 5, Matter, Cost has no value recorded in this instance—but for a mailed parcel for example, or a courier, or a lawyer who bills by the minute for emails, the cost Field could be relevant. Other fields that can be found in the DRT are available to record Title and Subtitle, Content, and any description or nickname the sender wants to give the email such as "the 'funny email' "our wakeup email" and so on.

Record ID 6 states in Field 2 that it is a Label Record, and Field 700 of Record ID 6 Record Sub-type, states the type of the record is "Email In" and therefore this is the Label record for the IN side of emails. Field 701 of Record ID 6, Snr Label Record says its senior Label record and the senior of the Virtual table it is part of, is Record ID 1 and hence this is a second Virtual Table (this one being of received emails) in the senior Virtual table created by the presence of Record ID 1. Field 8 of Record ID 6, Label Used, has no entry as this record is itself a Label record. Field 10 of Record ID 6 uses the same value of Last Name as Record ID 1, the senior level Label record to which it is related uses in its Field 701. Field 702 of Record ID 6 uses the same value of Capacity as Field 702 of Record 1, the Senior Label record to which it is related. Field 703 of Record ID 6 uses the value of Clubs. Field 704 of Record ID 6 shows the value of Receiver as this is the other—IN side of the Email record pair. Field 705 of Record ID 6 is (Matter) Quantity)—the number of emails received which might be many, with multiple addressees (While one addressee would only receive one email, the Quantity field could be used to show the number of recipients in the send—that is a matter of convention and an example of one of many conventions that the Any-to-Any machine creator has to decide). Field 15, Field 16 and Field 706 of Record ID 6 all show the same values for their fields as the Label record, Record ID 1 that is their immediate senior label record.

Record ID 7, Field 2, Record Type, has a value showing it is a user Data Record, while Record ID 7, Field 700, Record Sub-Type, contains the ExoPonent value needed to state it is an Email In record. Record ID 7, Field 701, Snr Label Record, says that the senior Label record of the Label record it uses is Record ID 1. Field 8 of Record ID 7, Label Used, has an entry showing it uses the Label record which is Record ID 6, the Email In Label record. Field 10 of Record ID 7, Last Name, has the last name of Jones recorded, this being the supposed name of the addressee. Field 702 of Record ID 7, Capacity, records that Jones' capacity in which he is receiving this email is that of "President". Field 703 of Record ID 7, Clubs, has recorded in it, the name of the club of which he is President which is "Premiere Golf. If, the future, the user were to search for Premiere Golf, not only would he find the email, but he would also learn two people who belong to it, and what their capacities are—just as if one person asked another, "who do you know at Premiere Golf?" Field 704 of Record ID 7, Receiver, has the value "Receiver" to show that this is the Receiver or "In" record. Field 705 of Record ID 7 is Matter Quantity and has the value 1 to show that the quantity of the received email is 1. Field 15 of Record ID 7, Type of Matter records the value of "electronic" as being the matter type of this email. Field 16 of Record ID 7, Sub-Type of Matter has no value recorded in this instance as the Matter Sub-type and Sub-Sub Type are recorded in this instance in Document Type and Format fields as previously described. Field 706 of Record ID 7, Matter, Cost, has no value recorded in this instance. So far, eight records (Record ID 1 to Record ID 7) have recorded the ID of the Any-to-Any system, who its owner is, one of the owner's emails and created one senior and two junior virtual tables. The two records that follow, Record ID 8 is the Label record and Record ID 9 is the data record for the Receiver side of a letter sent by Jackson to someone called Harriman—the Sender side would normally be there but is not shown to keep the table smaller. The Receiver side of the letter is being described to show that the receiver side is relevant to the sender and in fact, is not very different from the receive side of an email, or of any communication for that matter.

Record ID 8 states in Field 2 that it is a Label Record and is therefore creating a third virtual table. Field 700 of Record ID 8 Record Sub-type has recorded in it "Letter In" to show it is the Label to be used with the "In" side of a Letter (when actually displaying a Letter, an email or any other communication ExoItem, fields of both the Out and the In records will be displayed simultaneously, as between them, they make up what we think of as "a Letter" or "an email" or any other communication). Field 701 of Record ID 8, Snr Label Record says its senior Label record and the senior of the Virtual table it creates, is Record ID 1 and hence this is another Virtual Table (consisting of the Receiver side of letters) in the senior Virtual table created by the presence of Record ID 1. Field 8 of Record ID 8, Label Used, has no entry as this record is itself a Label record. Field 10 of Record ID 8 uses the same value of Last Name as Record ID 1, the senior level Label record to which it is related by the values in its Field 701. Field 702 of Record ID 8 uses the same value of Capacity as Field 702 of Record ID 1 the Senior Level Label record to which it is related. Field 703 of Record ID 8 uses a different value for the type of People Groups, this time using the value of "Company Name", a Sub-type of people groups. Field 704 of Record ID 8 uses the value of Receiver, "receiver" being the IN side of a communication. Field 705 of Record ID 8 is (Matter) Quantity)—the quantity of letters received (which could be more than if an original and three copies were sent, for example). Field 15, Field 16 and Field 706 of Record ID 8 all show the same values for their fields as the Label record, Record ID 1 that is their immediate senior label record.

Record ID 9, Field 2, Record Type, has a value showing it is a user Data Record, Field 700, Record Sub-Type, shows it is a Letter In record, while Record ID 9, Field 701, Snr Label Record, says that the Senior Label Record of the Label record it uses is Record ID 1. Field 8 of Record 9, Label Used, has an entry showing it uses the Label record which is Record ID 8, the Letter In Label record. Field 10 of Record ID 9, Last Name, has the last name of Harriman recorded showing that the letter was sent to Harriman. Field 702 of Record ID 9, Capacity, records that Harriman's capacity in which he was sent this letter is that of "Salesman". Field 703 of Record ID 9, Company Name, has recorded in it, the name of the Company at which Harriman is being addressed and is "Supplier Inc". Field 704 of Record ID 9, Receiver, has the value "Receiver" to show that this is the Receiver or "In" record. Field 705 of Record ID 9 is Matter Quantity and has the value 2 to show that the quantity of the received letter is 2 (perhaps a signature copy and a retain copy). Field 15 of Record ID 9, Type of Matter records the value of "printed" showing it was a printed letter and not (for example) an email attachment letter. Field 16 of Record ID 9, Sub-Type of Matter has no value recorded in this instance. Field 706 of Record ID 9, Matter, Cost has a value of $0.21 cents. The Cost field could have been conveniently relabeled to "postage" (for example). Since "postage" is a type of cost, any search for costs would find any entries that were made using the label of "postage". Alternatively, a Cost Type field could be added if a given virtual table will have many different types of cost recorded in it. Where alternatives such as these occur and (as in this case) there is no theoretical preference for which of them is chosen, the one that most suits the likely data to be received should be chosen. Conversion of date from one Any-to-Any system using one method, to send to another Any-to-Any system using a different method, is easily possible using Translation (mapping) ExoModules, which can also be used to change the way data is recorded in a given Any-to-Any system. However, consistently using one method, or the other, in a given Any-to-Any system is vital as otherwise, code ExoPonent assemblies will not correctly mirror data ExoPonent assemblies), and ability to find related data will be lost as it is not recorded in a consistent manner.

Record ID 10 Field 2 states that it is a Label Record and is supposed to be a label record that creates a virtual table of the clubs Jones deals with. Field 700 of Record ID 10 Record Sub-type has recorded in it "Clubs" and is an example of a single ExoPonent, which is an ExoPonent which is itself a sub-type (of People Group) (the ExoPonent of "Clubs" that was created by the user in Record ID 4 Field 703) being expanded into an entire virtual table of its own type. (As previously described a single ExoPonent can be expanded into a record of its own type; this example shows how a single ExoPonent, whether it is a type or not (and most of them are types) can be expanded into its own virtual table and yet the data the virtual table contains will still be related in a relevant manner to other data in the table). Field 701 of Record ID 10, Snr Label Record says its senior Label record is Record ID 1 and it is therefore yet another Virtual Table within the virtual Table of created by Record ID 1. Field 8 of Record ID 10, Label Used, has no entry as this record is itself a Label record. Field 10 of Record ID 10 uses the same value of Last Name as Record ID 1. Field 702 of Record ID 10 uses the value of Capacity as was used in Record ID 1. Field 703 of Record ID 10 uses the value of "Clubs". Field 704 of Record ID 10 uses the value of Direction. Field 705, and Field 16 of Record ID 10 all show the same values for their fields as the Label Record ID 1 that is the immediate senior Label record. Field 15, shows the value if "Fee Type" and Field 706 shows the value of "amount".

The ability of the user to change a Label record (which automatically creates a new Virtual Table) and the ability to "Make a Table of This" (ExoPonent) (which would be the operation that created the "clubs" Virtual Table just described) adds power to the Any to Any system. For example, a user might have a standard blank address template record set (an Address ExoItem) which he calls with an ExoModule when he wants to enter a new address for someone. Because he knows that labels can be overwritten, where he sees a field in it displaying a Label "name of this type of group of people" he would just overwrite that with "club" "company" "school" "Hockey team"—whatever struck him as most relevant. Whatever he wrote would be saved as a new Label Record used by that data record and doing so would also create a new Virtual table which would be a sub-type of the Address virtual Table. By overwriting the Label value, Query by Type would now operate on that field of the senior Virtual table and its junior virtual tables enabling an Any-to-Any system to respond to questions such as "what is the name of that hockey club/company/club Joe belongs to?"

It is inevitable that users will make mistakes that will make their Any-to-Any systems appear insane. While Any-to-Any systems will not need many of the technology specialties that exist today, it is expected that Any-to-Any systems will create new ones, with some specialties creating and selling ExoPonent vocabularies and others acting as Any-to-Any system doctors to straighten out Any-to-Any system that users have accidentally messed up.

Record ID 11 and Record ID 12 are similarly both user data records with the values as shown in FIG. 7 entered into each of their fields. Record ID 11 is an example of the base record for an Address (which as previously described would also be an assembly with other records such as those giving the street address, phone number records and so on, all listed by a list record ID referenced in this record's List field (not shown). Record ID 11 also shows the Matter Data Category fields, Fields 705,15,16,706, being used to record the Membership fee (which would actually be recorded as a separate record but is shown here to illustrate how DRT Matter fields can be used to record such information).

Record ID 12 is supposed to be a Personnel record for someone called Newman who is the leader of the Recipe Circle Club.

Record IDs 13, 14 and 15 are a set of three records with Record ID 14 and Record ID 15, using Record ID 13 as their label, and all of which together make up virtual table of type "Household" as shown by the value of "Household" value in Field 700, record Sub Type of the Label Record ID 13. Similarly to Record ID 11, Record ID 14 is part of an Address, while similarly to Record ID 12, Record ID 15 is a Personnel record, this time for personnel associated with the household, such as the Accounts Manager of a Health Insurance company. Hence, if a search is done on the Record Type field, for "Address" or for "Household" the relevant records will be found and will display, each using the Label record that is relevant to it, which is referenced in its Field 8, Label used field. It will be obvious that each of the Addresses that are found (or each of the personnel records that are found too) can each have a different label record and equally a different assembly yet each will be found by a query for "addresses" or for "personnel", and hence addresses for Russia can have one format while those for USA have another. As discussed previously, a group of things such as "addresses" is really a Named Dynamic Commonality of ExoPonents Relationship Method that in this instance is named "addresses". It was also stated that these Dynamic groups are found with a Find Spec (a record used to find other records on a Query By Example basis. In this example, the FIND Spec record for addressed would simply have the ExoPonent "Address" shown in its Field 700 Record Sub-type field and this record, used as a Find Spec, would find all address records, on a Query by Type Named Dynamic ExoPonent Commonality basis. Obviously, creating a button labeled "addresses" and an ExoModule that runs the Address Find Spec and hence displays the "address book" is trivial, but this is now an unlimited address book, in which there can be as many addresses for one person as required, and as many phone numbers et as required, and Russian address can be formatted differently from US ones etc—and the same panorama of flexibility applies to all Any-to-Any constructed with the methods described herein.

Record ID 16, which is a Label record as the value of Label in Field 2 of Record ID 16 shows, is a different label record to those so far described as indicated by Field 701, Senior label Record, shows that it is using Record ID 13, the Household Label record as its Senior Label Record, and therefore, whatever Record ID 16 will Label, is a virtual sub-table or second level Virtual table (and there is no limit to the number of sub-levels that can be created) of the Household Virtual table, which is itself a virtual Sub-table of one of the two highest level virtual tables, the one created by Record ID 1. Field 700, Record Sub-type, shows that Record ID 16 is a Sub type of Accounts, and since it has Record ID 13 as its senior type and Label, it is a Label record for Household Accounts. The remainder of the values in its fields Field 10 through Field 706, are self evident from the values written in the row designed by Record ID 16.

Record IDs 17 and 18 are each one side of a sample transaction (of which the record for the other side is not shown), with the values in Record ID 17 showing $100 payment to Jones of Plumbers inc for 4 hr of labor and Record ID 18 showing a monthly paycheck for Father of the family, and ExoBrain owner Jackson of $4,014. Note that, although it has not been shown here, the same double or paired records that were relevant to email and letters, are also relevant to double entry accounts. It will also be evident from the above description that the cast-in-stone separate accounts that are common in accounting programs are just a number of easily adjusted virtual tables in an Any-to-Any system, in which the output of one record from one table is the input for another record in another virtual table. The amount of money appearing in the OUT and the IN records are quite directly equivalent to the Content of emails that appears in both side of paired email records.

Record IDs 19 and 20 are 2 sample records from a fast food operation that a record that is not shown here would show Jackson owns, in which Record ID 19 is the Label record for user data Record ID 20. This Label record does not reference any Senior Label Record in Field 700 record Sub-Type and is therefore a new high level record and new high level Virtual table in its own right, and is an example where the non-Matter Data Category fields (Fields 1, 2, 700, 701, 8, 10, 702, 703, and 704) are the same or subtypes of all other Label records so far described, but Matter fields 705, 15, 16 and 706 are completely different and are not sub-types of any Label value in the high level Virtual Table created by Record ID 1, or any Virtual tables created under it and Record ID 19 is therefore recorded as new High level record in its own right. Record ID 20 is a record for a sales check recording how many of which product the Server called Mason sold. This example is given to show how a new virtual table can be created and partly related to some values in another virtual table if the need arises. The more normal way to record restaurant sales would be with one record per item sold, enabling the various records to be fully incorporated into the Accounts virtual table. Note that all sales are properly two terminal represented by two records with a sale in one side and a payment on the other, with the sale also reducing stock—all of which can be accomplished easily by CrossRecord FieldLogics previously described, with the seller being the sales side and the customer being the purchase side. Extrapolating from what is shown and has been described, and since an Any-to-Any system has already operated successfully in a small memory cellular phone, one can imagine that an Any-to-Any machine with a reduced size virtual table represented by Record IDs 19 and 20 could operate in a portable device that remote saves records that are orders to the kitchen, another set to the cash desk, and a third to the company accounts computer. Further it can be imagined that the sale total of $9.53 in Field 706 of Record ID 20 can be copied by a suitable ExoModule into field 706 of an accounts record such as Record ID 17 or Record ID 18, or into a suitable field in more sophisticated company account records such as those in Record IDs 21-24 that are about to be described.

Assembling an accounting application in Any-to-Any system is a relatively simple process. The complexity of state of the art style of multiple tables does not exist, only virtual tables as have been described, and with FieldLogics that can be an (undisplayed) part of a data record (or parallel a data record) that have the ability to output their results to the "other" side of the double entry record pair, double entry is not complex. As has been shown one single field in a single record can receive its data from an underling complex of records. Nothing therefore prevents a "profit" field in a data record receiving its results from a complex underlying virtual spreadsheet that derives its inputs from a wide selection of records, leading to the profit on every individual sale being calculated as it occurs—the basis for real time accounting.

This would result in a system where servers are entering sales, purchasers are entering purchase orders and recording deliveries, and the company financial picture is permanently up to date, with accounts data being able to be sliced and diced on the fly in any manner that suits the users of the data, resulting in real-time accounting, something that is an impossibility today, as it is essentially not practical with today's accounts systems to calculate the profit of each individual item sold—on each hamburger sold—which is the founding principle of real-time accounting.

It should also be realized that the name of the person making the sale—"Mason" as shown in Field 10 of Record ID 20—will also occur in payroll records in the Accounts virtual Table. When consulting payroll entries for Mason, those entries will automatically be related on Discoverable ExoPonent Commonality basis to Mason's home address, to his employment records, and to every sale he has ever made for the company, and to absolutely anything else that is known in the Any-to-Any system about him, and this discoverable data will all be available with no prior setup by Right clicking on the name Mason and then selecting a right click menu ExoItem which says "Find other records that use this term".

Those data relationships do not need to be recorded as with state of the art One-to-Many methods, but they are instantly discoverable on the fly when this invention's Any-to-Any methods are used.

Record ID 21 to Record ID 24 are largely self-explanatory sample accounts records in a "Company Accounts" virtual table from which is seen that Jackson, the ExoBrain owner, is also the company accountant in Field 702 of Record ID 24 and is the one who is drawing up the balance for Profit Center A shown in Field 703 of Record ID 24. Record ID 21 shows the Label Record for the accounts application and virtual table. Record ID 22 shows an invoice to a company called Good Client Ltd, represented by Jones, their purchaser, to which Jackson's company sold 44 Renaissance pattern curtains for $11,921.21. Record ID 23, shows that a company called Supplier Inc, whose salesman is called Harriman, has been paid $4,314 for 22 units of thread planned for Job 14.

Records IDs 25 through 31 show a third high level virtual table in which Label record, Record ID 25 creates a Manufacturing Virtual Table and provides high level label values for production units in fields 704, 705 15, 16 and 706. There is no requirement for all virtual tables to have the same number of fields.

Record ID 26 creates a virtual table (within the high level Virtual Table created by Record ID 25) for recording a particular manufacturing machine, a carpet stitching machine in this case, together with who maintains it and Id numbers of the assemblies making it up. Record ID 27 is a sample data record for a machine identified as "Schon 2" that is maintained by someone whose name is Pronor, and has a Control unit identified in Field 704 as an Ah ff-1 and so on.

Record ID 28 is an example of a Label record for a virtual table that controls the Schon 2 carpet stitching machine of Record ID 27, (as shown by the fact that the Label Record Sub Type in Field 700 is "Schon 2 Stitch" (if space allowed, the Record Sub-Type field would show "Schon 2" and the record Sub-Sub-Type field would show the value for "stitch". Fields 705, 15, 16, 706 and many other fields not shown, each control one needle, with the parameters for the field parallel needle recorded in Records IDs 29, 30 and Record ID 31. It may be supposed that a particular batch of records, Record IDs 29, 30 and Record ID 31 control individual parameters for their field parallel needle's stitch, while a field parallel Instruction record executed by a BossModule (not shown) sequences and repeats as necessary the instruction records to be used such as Record IDs 29 to Record ID 31. It is foreseeable that a designer drawing on a suitable screen or, or a scanned-in color drawing or photograph could be turned by suitable ExoModules into ExoPonent machine instructions such as Records IDs 29, 30 and Record ID 31, and those could be fed straight to the Schon 2's Any-to-Any controller computer, and result in a completed carpet some few hours later and it is foreseen that much manufacturing could go straightforwardly and quickly from approved design to production in this manner and create and sell carpets or clothes made to order much as better computer manufacturers build computers to order with little waiting time.

The above completes the description of the virtual table mechanisms and even this 31 line example DRT shows 4 high level virtual tables and 7 junior virtual tables, with all of their data related in a sensible manner.

Commenting now on some of the observable features and benefits presented by even this microscopic Any-to-Any data machine, it shows the basic data for, 1) an email program, 2) a Word Processor, 3) an Address book, 4) a personal accounts program, 5) a restaurant sales program, 6) a company accounting program, and 7) a machine process control program all in one single grid, or, as it would most likely be implemented, in a single database table, that could still be physically divided over different hosts while remaining a logical whole. Using the Discoverable ExoPonent Commonality Relation method, relations that actually exist in this data could be discovered on the fly. Hence it could be discovered in each case with a single search that could be ordered by language control (if such existed) or by entering the appropriate values into a query by example Screen, that: 1) Jackson is a) the owner of the ExoBrain b) is a member of the Premiere Gold Club, c) received a paycheck of $4014 into his household account, and d) prepared an Account Balance for unit A of a Manufacturing company where e) he is accountant. 2) Jones who is a) President of Premiere Golf is also b) the Acts Manager of Plumbers Inc and the same Jones is also c) the purchaser for Good Client Inc and therefore seems to have two jobs. 3) It could also be discovered that the Personnel who are known to the household are a) Newman and b) Hiprem (Record ID 12 and Record ID 15). 4) It could be found that a) the 22 units of thread that cost $4,314 that was sold to Manufacturing Co by Mr. Harriman of Suppliers Inc for Job 14 (Record ID 23) is being b) used by the Schon 2 machine to produce Job 14—this latter is an Example of cross field ExoPonent search that has worked well in actual practice and frequently turned up data or relationships that not even those who entered had realized existed. The above are just an illustrative few of the discoverable relationships that exist and can be found in this very small 31 row, 13 column, 403 ExoPonent Any-to-Any DRT data machine. One can imagine what Discoverable relationships would be found in a 250 column (the size of the test ExoBrain) Any-to-Any DRT system with several million records, containing a few hundreds of millions of ExoPonent entries or references. A further benefit of the DRT is that even when used in a shortened 14 field version without code as a ToDo list in a spreadsheet, it proves able to usefully and correctly relate all tasks

FIG. 8

Figure 8:
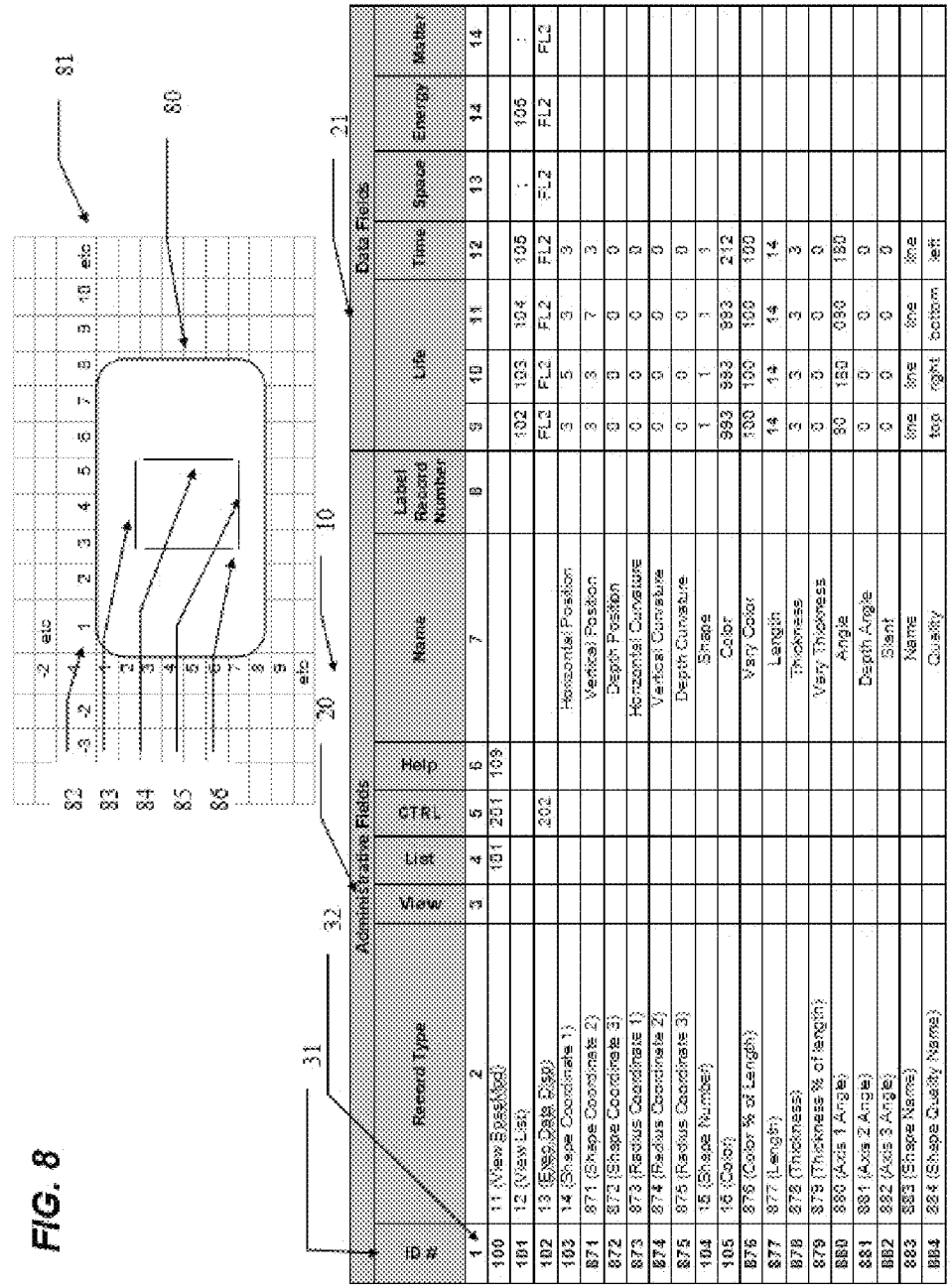

FIG. 8 illustrates how graphical data ExoPonents enable atomic control of GUI display so that a user can control whatever he wants to, in a small scale example of part of an operating Any-to-Any data machine. FIG. 8 shows how visual data—in this case the 4 lines bordering a box—are deconstructed with the ExoPonent Principle for Computers into ExoPonents and then used as ExoPonents, thereby enabling each one of the properties controlling their display to be individually and separately accessed and controlled, either using screen mechanisms or by language control if this is installed. This is shown in relation to part of the same small scale. miniature example of an operational Any-to-Any code machine as was shown in FIG. 3, and all descriptions are identical to those for FIG. 3 except for descriptions concerning numbers 80-86 and Record ID 103, Record ID 104 and Record ID 105, and Record IDs 871 to Record ID 884 which will now alone be additionally described.

Visual data, such as the four lines making up a box being described here is a useful way to study and understand data ExoPonents in general and the power of the Any-to-Any data system use of them, because visual data such as a line is more concrete and more comprehensible to many people than the meaning of words, where the general level of understanding of meanings is often foggy and confused at best. Therefore, when practicing this invention the new practitioner is encouraged to begin with visual data as described here and then progress to meaning data, and then only when armed with the largest dictionary in existence and a determination to understand each meaning with crystal clarity.

In FIG. 8, number 80 represents a computer display screen which is displaying a View Container that for simplicity of illustration is considered to be the same size as the display area of the screen 80. This View Container 80 is displaying (and hence the screen is displaying) a square that is created by four lines designated by 83-86.

In the method of the invention, the square shown being displayed by the View Container on the screen 80 is shown visually partly deconstructed (applying the ExoPonent Principle) into 4 lines 83-86, which for clarity of illustration only, are shown separated from one another and not touching and joining one another as they would be, if correctly displayed to create a square on the screen. Again for clarity and simplicity, the background of the box—the space encompassed by the four lines creating the square—is not separately illustrated.

The row 81 and the numbers minus 3 though to plus 10 in the row 81 illustrate virtual vertical coordinates, whilst the column 82 and the numbers minus 2 though plus 10 in the column 82 illustrate virtual horizontal coordinates. Between them, row 81 and column 82 create a virtual grid for the purpose of precisely situating visual data relative to the View Container. For the sake of clarity and simplicity, only a few divisions are shown in the coordinate row 81 and the coordinate column 82, but in the actual implementation these can be as fine grained as is useful and would (in the preferred embodiment) be a grid where the increments are the smallest that can be displayed, namely 1 pixel.

In constructing visual displays for the (language-controllable) Any-to-Any system in a computer, two factors must be taken into account. The first of these is the Unlimited Principle (in which the computer should not limit the user in any manner in which the user does not limit himself). The second of these is the definition of the Any-to-Any machine itself which states that Any of anything can be assembled with Any of anything else in a manner that is not intrinsically hierarchical and is intrinsically unlimited. Because of these two guiding principles, all data (where applicable) and the display of it (which always is applicable) is considered to be an infinitely large three dimensional grid where one axis can be time. The visual starting point of the grid on a computer screen is considered to be much like the center of a shooting target and to extend an infinite distance in all directions from that center. This Central Point is placed at the top left hand corner of the screen when the display is first opened. The area visually displayed on a screen or by a View Container on the screen can then be moved over this data grid, much as a magnifying glass is moved over an infinitely large piece of paper, or the displayed area of a spreadsheet is moved over the spreadsheet (but in that case with the difference that the Any-to-Any display area can move into negative coordinates whereas a spreadsheet can not). ExoModules can be arranged to prevent the view moving into negative coordinates if desired. The "home" button as found on many keyboards, then moves the display so that the Central Point corresponds with the top left of the View Container concerned.

In the Record ID 103, Record ID 104 and Record ID 105, and Record ID 871 to Record ID 884, all data in all Field 9s of these Record IDs only describes the line 83 forming the top border of the box; all data in Field 10 of these Record IDs only describes the line 84 forming the right border of the box; all data in Field 11 of these Record IDs only describes the line 85 forming the bottom border of the box and finally all data in Field 12 of these Record IDs only describes the line 86 forming the left border of the box.

In each Record ID 103, Record ID 104 and Record ID 105, and each Record ID 871 to Record ID 884, for Fields 9 to Field 12, each cell records one single property applicable to the visual data of the particular one line 83-86 that is being described by each one of the Field 9 through Field 12. The cells in these Record IDs are each providing data to the FieldLogic FL 2 found in their column, shown in each of Field 9 though Field 12 of Record ID 102. Each FieldLogic FL 2 in each Field 9 to Field 12 is collecting input data on a Field Parallel basis from its own fields of Record IDs 103, Record ID 104 and Record ID 105 and Record IDs 871 through Record ID 884 and uses this input data to create and adjust its visual output of the lines 83 through 86; hence (for example) the FieldLogic FL 2 in Field 9 of Record ID 102 runs the display of line 83, while FL 2 in Field 10 of Record ID 102 runs the display of line 84, and so on.

Referring now in turn to the contents of the cells of Record IDs 103, Record ID 104 and Record ID 105 and Record ID 871 to Record ID 884 contained in the block of fields Field 9 though Field 12, each of the cells in this block of cells contain one ExoPonent property pertaining to the line that is being displayed as the result of data in their particular field in the block.

Record ID 103 shows in Field 2, Record Type that it is as a record of type Shape Coordinate 1, while Field 7 Name, shows that the particular name of this type of record is "Horizontal Position". Similarly, Record ID 871 shows in Field 2, Record Type that it is as a record of type Shape Coordinate 2, while Field 7 Name, shows that the particular name of this type of record is "Vertical Position". Finally, Record ID 872 shows in Field 2, Record Type that it is as a record of type Shape Coordinate 3, while Field 7 Name, shows that the particular name of this type of record is "Depth Position".

Record ID 103, Record ID 871 and Record ID 872 of Field 9 through Field 12 each contain one of the three position coordinates of the visual data being displayed (a line in this case). How position coordinates are used and therefore how they are interpreted by FieldLogics (such as by FL 2 in Field 9 of Record ID 102) is a question of the convention that the Any-to-Any system builder chooses to adopt and it does not matter what this convention is, as long as it is consistent throughout the system so that all parts work interchangeably together by reason of using the same convention. In this illustration, the convention used is that, for a shape, the coordinate that is recorded is the position of the leftmost point of the shape, and if the shape comprises one leftmost point that is higher than another, then the coordinate recorded is the coordinate of that leftmost point which is also the topmost point. Hence for line 83 its leftmost point has a horizontal coordinate of 3 as shown in Field 9 of Record ID 103 and a vertical coordinate of 3 as shown in Field 9 of Record ID 871, the Vertical Coordinate Record. When true three dimensional display becomes possible in which the display itself has physical depth, then the depth coordinate would be recorded in the cell designated by Field 9 of the Depth Coordinate record, Record ID 872.

Record ID 873 shows in Field 2 that it is a record of type Radius Coordinate 1 and in Field 7 Name, that it is named Horizontal Curvature. Record ID 874 shows in Field 2 that it is a record of type Radius Coordinate 2 and in Field 7 Name, that it is record of a type called Vertical Curvature. Record ID 875 shows in Field 2 that it is a record of type Radius Coordinate 3 and in Field 7 Name, that it is record type named Depth Curvature.

As calculus teaches us, a line is a series of points and in fact, everything seen on a screen is describable as a series of points that are pixels. Consequently if a "line" is given no curvature—i.e. there is no radius of curvature as is shown by the absence of any radius coordinate in the block of cells formed by Record ID 873, Record ID 874 and Record ID 875 and Field 9 through Field 12—then the "line" will be straight and it will be said to be "a line" by the user, while it is in fact as series of coordinates in which there is an angular difference between one point and another—one pixel and another—of zero. However if a coordinate point is designated using the three coordinates records of Record ID 873-Record ID 875, then doing so also states a distance from the coordinate of the shape itself, as recorded in Record ID 103, Record ID 871 and Record ID 872. If FieldLogic 2 is so constructed as to calculate and use this distance as a radius with which to calculate the curvature of the "line", the line then becomes a curve and if the length of the now curved line is increased, it eventually becomes a circle whose diameter can be varied by varying the position of the radius coordinates. If further records are added 1) to specify a % of the length of the line and another (Execution) record) 2) to vary the Radius coordinates at different percentages of the line a multi facet circle or an ovoid can be produced.

Record ID 104 shows in Field 2, Record Type that the record type is Shape Number and in Field 7 Name, that this record type has a name of "Shape". In the case of each of each of the four lines 83-86 making up the square shape shown in the View Container on the Screen 80, the shape is recorded as the number one in each of the Fields 9 through Field 12 of Record ID 104. The purpose of such a number is to tell FieldLogic FL 2 how to process the data it is receiving from the field parallel records supplying it, Record ID 103, Record ID 104, Record ID 105 and Record ID 871-Record ID 884. Supposing that the Shape was not a line but a screen area with the Shape Number of 2, then the listed inputs would be processed differently for example, so that in that case the Radius Coordinates of Record IDs 873-Record ID 875 might instead be used to compute the curvature of the surface area so as to show it (for example) as part of the surface of a sphere.

Record ID 105 shows in Field 2, Record Type that the record type is Color and in Field 7 Name, that this record type has a name of "Color". The number 993 in Field 9 to Field 11 of Record ID 105 and the number 212 in Field 12 of the same record are each supposed to represent a particular color. It will be noted that the number in each of the Field 9 to Field 11 is 993 represents one particular color, while the number 212 in Field 12 (corresponding to line 86 at the left edge of the box) represents another different color and hence, the color of the left edge of the box is different to that from the other edges of the box and is separately and directly controllable without having to control or change anything else.

Record ID 876 shows in Field 2, Record Type that the record type is Color of Length and in Field 7 Name, that this record type has a name of "Vary Color", while Field 9-Field 12 of this record all contain the value 100%. If it was desired to change the color of the line at various places along the length of the line, then Record IDs 105 (named "Color" in Field 7) and Record ID 876 (named "Vary Color" in Field 7) could be used in multiple pairs, where the Record ID 104s state the color concerned and the paired Record ID 876s state the % of the length of the line at which that color starts to apply. If these records were themselves paralleled by an Execution record in which the FieldLogics varied the color values and the FieldLogics of another Execution Record varied the % of length for each color, a rippling effect would result with changing colors appearing to move along the line—but doing so would not require any change to FieldLogic 2 controlling the display of the line. Note to that the code required to change or cycle the values in a data record would itself be extremely simple code and one such FieldLogic would be adequate to cycle numerical values in all numerical value data records. If the code producing the variation itself accepts data inputs that one record containing numerical variation FieldLogics could vary the input values to another such record. Because each of these can be named and made user-controllable the user can have more or less infinite control over graphical data.

Record ID 877 shows in Field 2, Record Type that the record type is Length and in Field 7 Name, that this record type has a name of "Length", while Fields 9-Field 12 of this record all contain the value 14 corresponding to a particular length (of their respective lines).

Record ID 878 shows in Field 2, Record Type that the record type is Thickness and in Field 7 Name, that this record type has a name of "Thickness", while Field 9 to Field 12 of this record all contain the value 3 corresponding to a particular thickness. Note that the computer would be able to comply with a command to create an invisible line by setting the thickness to 0. The code could detect that the line is there and use the line but the line would not be visible.

Record ID 879 shows in Field 2, Record Type that the record type is Thickness % of Length and in Field 7 Name, that this record type has a name of "Vary Thickness". If it was desired to change the thickness of the line at various places along its length, then Record IDs 878 (Thickness) and Record ID 879 could be used in multiple pairs, where the Record ID 878s state the thickness concerned and the paired Record ID 879s state the % of the length of the line at which that thickness begins. If these records were themselves paralleled by an Execution record in which the FieldLogics varied the thickness values and the FieldLogics of another Execution Record varied the % of length for each thickness, a rippling effect would result with changing thicknesses appearing to move along the line, or behave in other interesting ways, but again, doing so would not require any change to FieldLogic 2 controlling the display of the line which would just be constructed to check its input values at given intervals (intervals which could be set and controlled by another "intervals" record (not shown).

Record ID 880 shows in Field 2, Record Type that the record type is 880 which is Axis 1 Angle and in Field 7 Name, that this record type has a name of "Angle" while Field 9 (corresponding to line 83 forming the top of the box) states that the angle is 90 degrees, (based on a 360 degree angular notation system and on the convention that 0 degrees and 360 degrees are vertically up in relation to the display). This angle, in the convention being illustrated, is the angle at which the object being represented, departs from its recorded coordinate point, in this case expressed by the values in Field 9 of Record ID 103 Shape Coordinate 1 and Record ID 871, Shape Coordinate 2. Since this angle is 090 degrees, the line is a horizontal line departing to the right of the recorded coordinate point. Similarly Field 10 of Record ID 880 shows that the line shown by 84 departs at an angle of 180 degrees from recorded coordinate point, and Field 11 and Field 12 show that their respective lines, 85 and 86, depart at angle of 090 and 180 from their respective departure points. The fact that 1) these angles in each case represent a 90 degrees angle to the various other lines 83-86 and 2) the fact that all the lines 83-86 are of equal length (as shown in Field 9 to Field 12 of Record ID 877) and dictates that the resulting display will be considered to be a square by the user.

Record ID 881 shows in Field 2, Record Type that the record type is 881 which is Axis 2 Angle and in Field 7 Name, that this record type has a name of "Depth Angle" and Record ID 882 shows in Field 2, Record Type that the record type is 882 which is Axis 3 Angle and in Field 7 Name, that this record type has a name of "Slant". In a true 3D display system, or in a solid modeling system, Record IDs 881 and Record ID 882 would serve to provide parameters with which to create true three dimensional objects.

Record ID 883 shows in Field 2, Record Type that the record type is 883 which is Shape Name and in Field 7 Name, that this record type has a name of "Name". Record ID 884 shows in Field 2, Record Type that the record type is 884 which is Shape Quality Name and in Field 7 Name, that this record type has a name of "Quality". Between these two records, Record ID 883 and Record ID 884, they name each of the lines in fields Field 9 to Field 12 and name them Top Line, Right line, Bottom Line and Left line respectively. Providing these name records Record ID 883 and Record ID 884, and the Name Field 7 following the human convention of a) naming something with a language name and then b) handling it my name. Note that the combination of the name in the field and the name in the field parallel record clearly identifies a cell with a value. If the user gives an order "I want the Left Line . . . " he has identified the line specified in the Field 12s of the records concerned. If the user goes on "I want the Left Line Length . . . ." He has used language meanings to identify the cell that is at the cross coordinates of Field 12 and Record ID 877—the cell containing the length of that line. This points out that these methods enable graphical data to be related to language meanings, and hence, provide the foundation for them to be controlled with language meanings.

The invention method of enabling everything in the Any-to-Any system to be named—to name visual ExoPonents in this case—enables the user to address and identify whatever he can see on the screen by name and control it by name, provided adequate ExoPonent code mechanisms exist to do so along the lines of those described. For example, it does not need a great stretch of the imagination to see how, with the records just described, and with the addition of suitable field parallel code ExoPonents, it would be possible to enable orders such as the following to be executed:

"Curve the top line upwards and turn it blue."
"Rotate the box clockwise/flat/horizontal."
"Make each of the edges of the box spin in place and change color as they do so"
"Make the square box bigger/smaller/flatter/taller"
"Squash the square to half its height and make the vertical edges bulge outwards"

As a further advantage of the invention methods as relates to graphical shapes, by using a single small piece of code several times—FieldLogic 2—and only nine records (three shape coordinate records, three radius coordinate records, three axis angle records) and some other small parts to relate the starting coordinates to one another (not shown) it is then possible to construct very many geometric shapes, rather than, as in the state of the art, requiring a different block of code for each and every geometric shape. Lastly, by providing field parallel execution records in which each cell contains the same FieldLogic, and other cells contains data it uses, it is then possible to use field parallel code ExoPonents to change the values in their corresponding cell in a data record from which the display Logic—FieldLogic 2—draws its data and thereby change the object being displayed in a very flexible, dynamic and animated manner. Further, the manner in which any of these graphical items change can be related to the outcome of tests on (word) meaning data as already described and hence these mechanisms under user control can be used to give orders such as "if an email arrives from Joe, turn the screen blue"—and then make the screen turn blue when such an order arrives.

FIG. 9

It comes as a strange and counter instinctive understanding to realize that individual ExoPonent meanings of meaning words in language are almost never specific and are almost always types. If, as an exercise, one reviews each meaning of each meaning word in this paragraph on its own in isolation, every one of them, on its own, specifies a type. Only in combination, due to the Co-Reducing Concept Principle, do they specify unique, specific things. Hence meaning ExoPonents are each a meaning type, and the use of meaning ExoPonents is the use of meaning TYPES. In order to show the usefulness of ExoPonents, and hence of this invention, FIGS. 9, 10, 12, 13, and 16 describe different ways of using meaning ExoPonents (remembering these are meaning types) and the understand of them taught herein in order to enable a computer to do things that computers do not do today.

FIG. 9 illustrates the use of data ExoPonents in coupled meaning type fields to economize on quantity of storage fields in a small version of a data Any-to-Any machine using a Data Relation Table structure. FIG. 9 is a small scale, miniature example of part of an operational Any-to-Any code machine in which 20 are the Administration Fields and 21 are the Data Fields of an Any-to-Any machine grid table 10. The row indicated by 31, shows the field names considered to be in use for the Administration fields 20 only, while for the data fields 21 it shows the Data Categories to which various data fields belong. Gray shaded areas indicated by 20, 21 and 31 are informative only and are not part of the structure. For the remainder of the explanation of FIG. 9, Column or Field numbers indicated by 32 and row numbers indicated by 199 will be used as if they were numbers in a figure and will be shown in bold as Field 1 or Record ID 923, for example.

In FIG. 9, Record ID 913 is a Label Record as its Record Type in Field 2 indicates. A Matter Reference Number is any set of characters that acts as an identifier to a physical thing or of a plant or animal or human body (which is also a physical thing). Field 911 and Field 912 are treated as coupled fields for record Matter Reference Numbers in which Field 911 contains a value from its Data Category (in this case from the Matter Data Category) and the associated paired field, Field 912, contains another value from the same Data Category, but one which is the senior type of the value with which it is paired in Field 911.

Record IDs 914 to Record ID 920 are each user data records in which various kinds of Matter Reference number data are recorded either directly (as shown here) or (in the case of the Matter Reference Number Type) in the form of references to Base Concepts which (for clarity of understanding) are represented in this illustration by spellings. Further Matter Reference Number Sub-Type fields might be needed to describe the type, but the same principals still apply and all the Matter Reference Number Type fields (if more than one) are treated as block with the Matter Reference Number field itself.

When the data is entered, both the Matter Reference Number and its type are entered at the same time into the appropriate fields. In order to use the data, if Field 912 is queried for "telephone number" for example, Record ID 914 and Record ID 919 will be found. If the same field is queried for "Fax Number" Record ID 917 and Record ID 920 will be matched and recovered etc.

The advantage of this coupled method (which takes advantage of the type mechanisms built into the meanings in the language) is that a considerable economy of fields can be achieved thereby. For example, there may well be tens of thousands or even millions of different types of Matter Reference numbers in use in the world, and in the state of the art practice, each of these would require its own database field just as telephone numbers in an address book data base each need their own field which also intrinsically limits how many telephone numbers can be record in a given address record and violates the Unlimited Principle by limiting the user in a way that he does not limit himself. However, with the methods shown here, one or a thousand phone numbers can be recorded for the individual—there is no intrinsic limit.

Note that whenever paired or coupled fields (more than 2 fields may be usefully coupled for some uses) are used in any manner where one field is a sub type of another, Any term may usually appear in either or any of the coupled fields and therefore, when being searched or using those fields for all purposes except those specifically using the coupled fields individually, all the coupled fields are treated as if they were one single field—only when type-subtype activities are being performed are the paired or coupled fields treated separately.

Field 910 also illustrates use of an "Other" field in a given Data Category as repository for values from that Data Category which may be needed but the application in question does not merit giving each type of them the status of its own Data Class field. In this example Record ID 921 through Record ID 923 all contain such Matter Data Category values. One of the key uses of the DRT is to exactly specify things in term of meaning. In a certain application, if fruit (such as bananas and apples of Record ID 922 and Record ID 923) frequently occur, or items of furniture such as the chair of Record ID 923 frequently occur—i.e. both these types of value are often needed in the same record so as to be able to specify the item concerned in one record in instead of two, then the items should be moved out of the "Other" field for that Data Category and into their own separate Data Classes in that Data Category. Note that "Other" fields can be coupled in the manner described above with an "Other Type" field used to state the type of the data which is in the Other field.

FIG. 10

Figure 10:
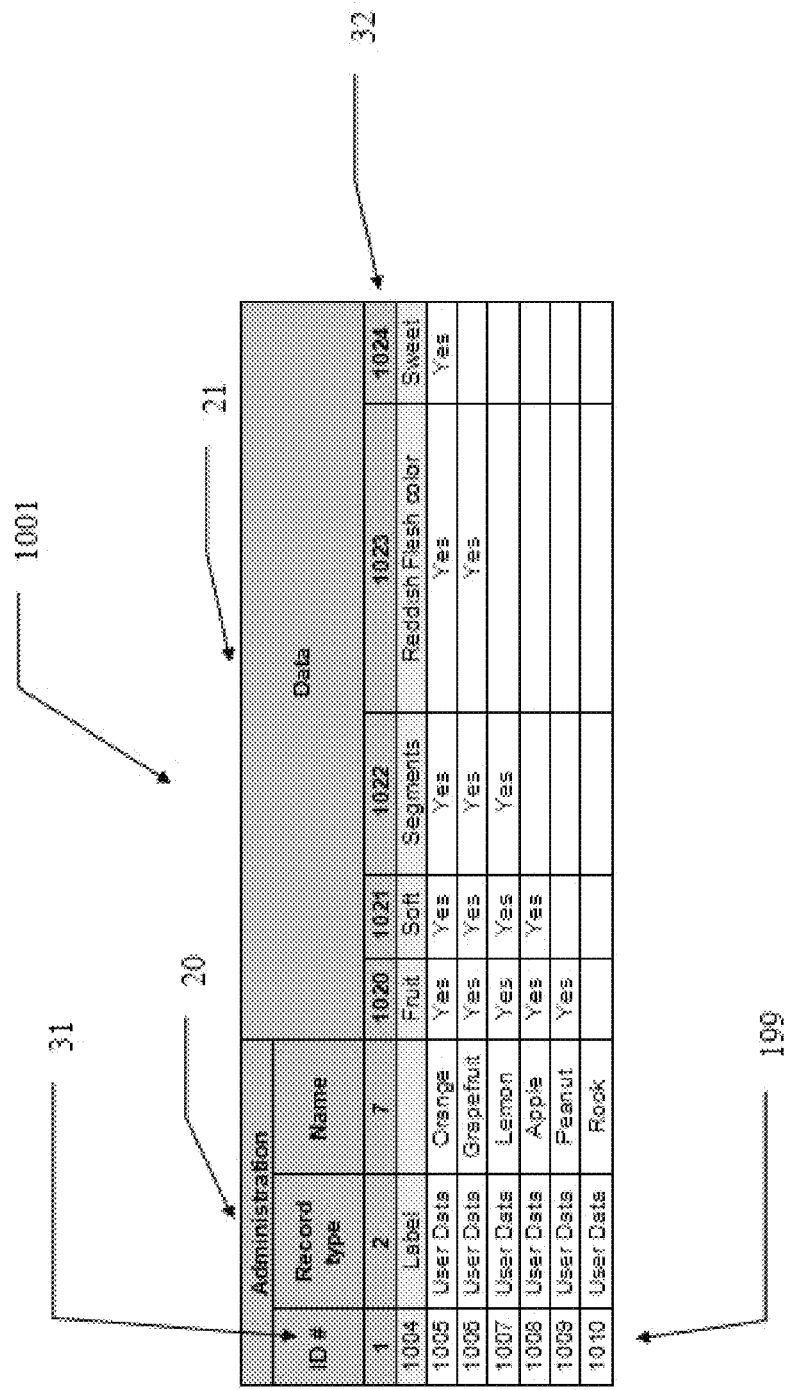

FIG. 10 illustrates the use of ExoPonents to enable a computer to discover differences, similarities and degrees of similarity, and identity, in and between data, thereby enabling those discoveries to be used in further computing operations. FIG. 10 is a small scale, illustrative version of part of an Any-to-Any code machine in which 20 are the Administration Fields and 21 are the Data Fields of an Any-to-Any machine grid table 1001. The row 32 contains the numbers used as field "names" in a single table in a state of the art One-to-Many database in which the Any-to-Any machine can be built. The row indicated by 31, shows the field names considered to be in use for the Administration fields 20 only. Gray shaded areas indicated by 20, 21 and 31 are informative only and are not part of the structure. For the remainder of the explanation of FIG. 10, Column or Field numbers indicated by 32 and row numbers indicated by 199 will be used as if they were numbers in a figure and will be shown in bold as Field 1 or Record ID 1007 for example.

FIG. 10 needs to be considered in the light that a working Data Relation Table (DRT) for use in a normal office application would consist of something like 200 fields with only those needed being displayed at any one time in the manner already described. It will be appreciated that as the fields in use are increased from the 8 shown in this illustration, to the 200 or so in an office application, and potentially far beyond that, the power of the results of these methods will increase also.

Firstly, FIG. 10 illustrates the process by which the Any-to-Any Data machine can detect differences, similarities (and the degree of similarity) and identities, making these available for other computing purposes.

Record ID 1004 is a Label record and shows values of Fruit, Soft, Segments, Reddish flesh color and Sweet in individual data columns of the data section 21. This has been done for illustrative purposes only, and in the preferred embodiment these values would not necessarily be Data Classes and additionally in the preferred embodiment all fields of Record IDs 1005 to Record ID 1010 would be showing numbers that represent Base Concept records. In the Record IDs 1005 to Record ID 1010 used in this illustration and to make the principles easy to understand, values are shown in the grid as being Yes values (shown as "Yes") or values other than yes (left blank for clarity).

It is a principle of the preferred embodiment of the Any-to-Any system that the format of the data used for a query and the format of the data for recorded data are identical and that all data is recorded in the form of grid records. Hence each of the records, Record ID 1005 to Record ID 1010 in FIG. 10 could equally well be both a query (if used as a query) and be recorded data in a record recorded in the grid storage system. This means that a particular record that has been retrieved as the result one find can then be used as a query for a further find, for example to find other records similar to itself, since, in an Any-to-Any system, everything is in the form of a record (except for a minor number of service code entities).

Imaging now that Record ID 1005 did not exist as a record in the data storage grid 1001, but was instead used as a query, clearly none of the records, Record ID 1005 to Record ID 1010 would be matched and found—all data in the table would be found to be different to Record ID 1005.

Equally, imaging also that Record ID 1005 did exist as a record in the data storage grid 1001, and a record with the same data was used as a query, clearly Record ID 1005 would be found and the data of Record ID 1005 used as a query would be identical to the recorded Record ID 1005.

So far this is exactly as databases operate in the state of the art, where they either find differences (no match), or identities (exact match) in a two-valued, yes-no logic system very unlike the human infinity-valued logic system.

Now suppose that, before being used as a query, Record ID 1005 had some of its terms removed, manually or by computer code designed for the purpose of automating similarity queries and that only the terms in Field 2 (user data), and Field 1020 (fruit) were used to query the grid storage system 1001. The query would return Record ID 1006, Record ID 1007, Record ID 1008 and Record ID 1009, none of which would be identical to (exactly the same as) Record ID 1005, none of which would be completely different to Record ID 1005, all of which would have some similarity to Record ID 1005.

In order to answer the question, "how similar are these Record IDs 1006, Record ID 1007, Record ID 1008 and Record ID 1009 to one another and to Record ID 1005?" it would only be necessary to provide code to calculate the number of terms that each has in common with one another and with Record ID 1005, such code would provide answers such as: "Record ID 1006 is more similar to Record ID 1005 than it is to Record ID 1004 (because it has more components in common with Record ID 1005 than it does with Record ID 1004)."

Note that the already described naming methodologies of the Any-to-Any system enable responses to be made in more human terms than by just presenting found records or responding with "not found". In this case, each of the records is Named in a user intelligible manner Field 7, and each of the data fields Field 1020, Field 1021. Field 1022, Field 1023 and Field 1024 are also named in a user-intelligible manner by Label Record ID 1004 that is servicing this particular virtual table. Note that the cross reference of field names and record names unambiguously identify a cell and hence the data in that cell.

These naming mechanisms provide the basis necessities for couching such replies in human terms, using the record names and the virtual table field names. Hence the code would be able to respond to the query with responses such as; "a grapefruit is more similar to an orange than it is to a lemon". If asked why, the code could respond "because oranges and grapefruits are sweet, while lemons are not". Similarly code could answer, that "a Lemon is more similar to an orange than it is to a peanut"—always basing the answer on the fact that the more components one thing has in common with another, the more similar humans say it is to that other thing.

Obviously, simple computer code can calculate the percentage of components in common and the degree of detected similarity can be used to control other executions: "if is more similar to an orange than it is to a peanut do this and if it is more similar to an apple than it is to an orange, do the other."

Secondly, FIG. 10 illustrates the Discoverable ExoPonent Commonality relationship method of the invention, in which no attempt is made to pre-record relationships between data but instead, relationships that exist between different data are discovered when needed, and discovered on the fly based on Commonality of Components (which are ExoPonents in the preferred embodiment) between the two data items for which a relationship needs to be detected or used.

For example, if it is desired to be known whether the data of Record ID 1008 is related to anything, querying the grid 1001 using Record ID 1008 (apple) as a query will find that an apple is related to Record ID 1006—and to an orange, Record ID 1007—and to a grapefruit, Record ID 1008—and to a lemon and is related because they have data components in common. The query can also find that Record ID 1008—an apple—is not related in any way to Record ID 1010 a rock, because they have no data components in common. Similarly, if Record ID 1005, an orange, was used as a query and found to have no relationships, then by removing some of its data components in Field 1020 to Field 1024 in the manner previously described, and then querying again with the truncated record, its relationships to grapefruit, lemons, apples and peanuts could be discovered. In essence, this method enables a computer to answer the question "what do we know that is similar to this (an orange)?" This ability is a computer implementation of the Greater Similarity Principle which answers the question "why is a cat a cat and not a dog?" According to the Greater Similarity Principle, one thing is more similar to another than it is to other things, because it has more ExoPonents in common with the thing to which it is most similar than it does to anything else in the universe. Hence, an apple is more similar to an orange than it is to a peanut because it has more ExoPonents in common with an orange than it does in common with a peanut, which is the principle that the above ExoPonent-based Any-to-Any system methods implement.

Note that, none of the above-described relationships were specifically pre-recorded in any way—the relationships were discovered dynamically, based on Commonality of Components, the same relationship system as is used by humans. As this description shows, the Discoverable Component Commonality relationship method of the invention, and "the ability to tell differences, similarities and identities" (Hubbard)— one simple but surprisingly profound and workable definition of intelligence—are flip sides of the same thing and both are component based and (in the preferred embodiment) ExoPonent based.

FIG. 11

Figure 11:
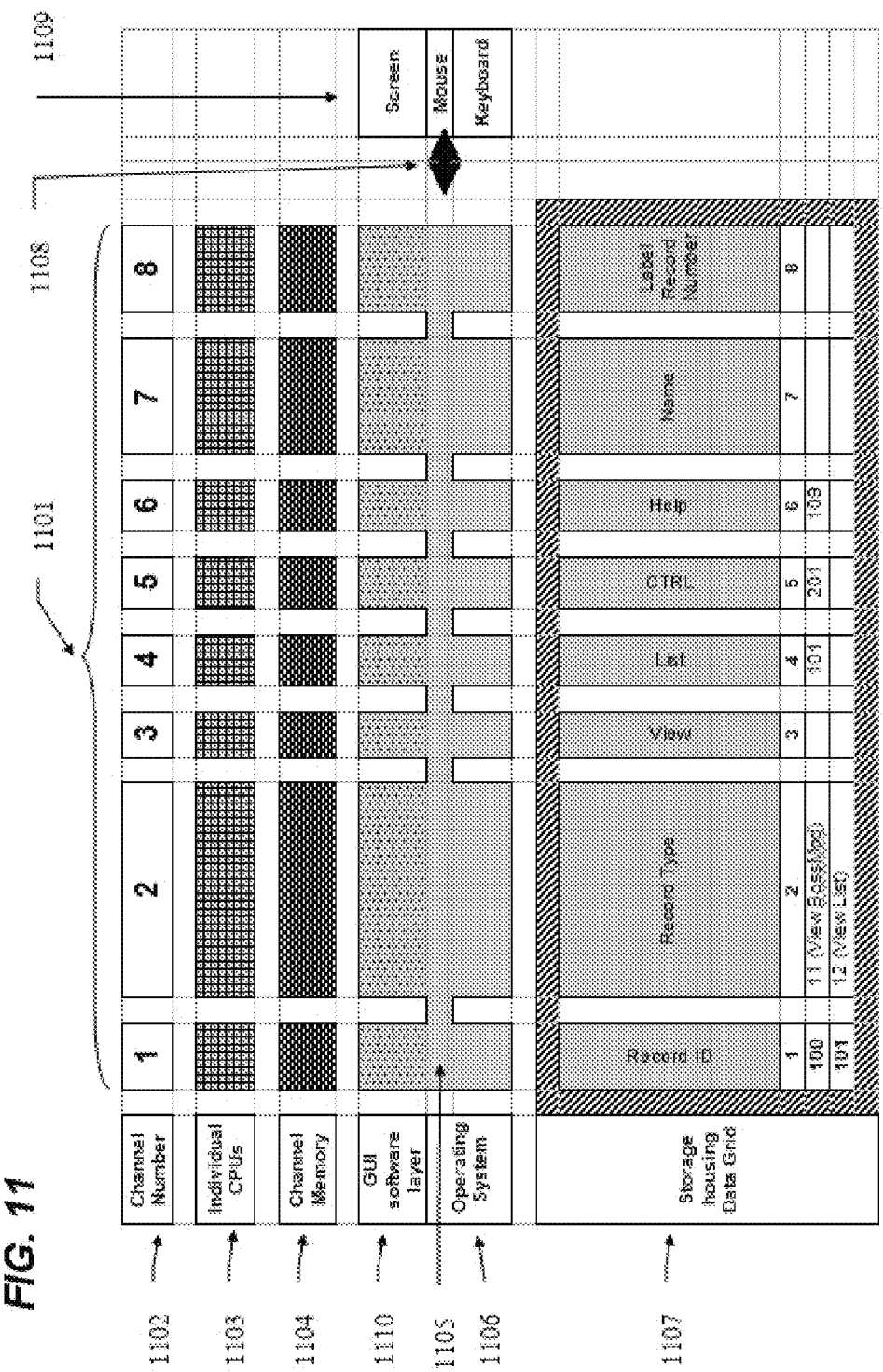

FIG. 11 is a block diagram showing how an ExoPonent Any-to-Any system constructed on a field parallel basis enables a field parallel operating system and GUI system to be used, and a field parallel memory, CPU and hardware system to be used, all of which considerably augment the computing power of a computer.

1107 shows part of the Any-to-Any system grid storage system of FIG. 3 and FIG. 8, in which only Field 1 to Field 8 are shown for sake of clarity. It will be appreciated that a full size Any-to-Any system suitable for performing office suite functionality in an Any-to-Any manner would normally be between 200 and 300 fields, and nothing stops an Any-to-Any system being thousands or hundreds of thousands of fields wide, or more.

In the case of FIG. 11, the Any-to-Any grid storage system 1107 is shown being housed in storage such as that provided by a hard disk.

Each Field 1 to Field 8 of the field parallel operating Any to Any system stored on disk 1107 is provided with its own field parallel processing grid channel which is designated by the numbers 1 to 8 indicated by 1101 and the various elements of each field parallel processing channel are found in a vertical column below the number of the channel indicated by 1101. The elements of each field parallel processing channel are as follows:

1106 indicates a field-parallel operating system in which the operating system provides one processing channel for each field parallel processing channel 1-8 of the Any-to-Any system as indicated by 1101. Because there is a certain amount of cross connection between field parallel processing channels, particularly to furnish a communication system between code units stored in or referenced by individual fields of Execution records, this interconnection is provided by a communications layer in the operating system indicated by 1105.

In the preferred embodiment, the field parallel Any-to-Any system 1107 and the field parallel operating system 1105 and 1106 just described are further paralleled by a field parallel GUI system or layer 1110 which provides the code necessary to process and create the Any-to-Any screen display required by the field parallel operating system 1106 and 1105 and by the field parallel Any-to-Any system 1107. The field parallel operating system 1106 and 1105 and the field parallel Any-to-Any system 1107 interchange data 1108 with the screen keyboard, mouse and screen 1109 and with other devices in the usual manner.

Each field parallel processing channel 1-8 indicated by 1101 is provided also with its own memory channel 1104 and with its own CPU 1103. In the standard manner, hardware devices 1103 CPUs, 1104 Memory, and disk storage 1107 are connected together by hardware busses—which, in this case, would be field parallel also (now shown)—and provided with the other hardware paraphernalia needed for a computer to operate and well known to those skilled in the art of computer hardware.

It will be appreciated that by 1) the Any-to-Any system enabling each field parallel processing channel to operate to a great extend independently of every other field parallel processing channel, yet 2) do so in a simple, comprehensive and controllable manner, and by 3) supporting these field parallel processing channels with a field parallel OS and GUI structure and by 4) bringing to bear on these paralleling Any-to-Any systems the power of multiple inexpensive CPUs, by these means, the power of the computer can be dramatically increased (bypassing the expensive effects of Moore's law) and materially increase results while doing so in a programmatically comprehensive manner. It will also be appreciated that ExoPonent DRT based architecture which enables these benefits also enables the hardware of a computer to be constructed as a single sold-state block containing storage, working memory, and CPU all of which house and operate the Any-to-Any operating system and Any-to-Any system itself

FIG. 12

FIG. 12 is a diagram showing the use of data ExoPonents to enable a computer to perform human-like-method Co-Reducing Concept Principle searches and data identifications and shows the method for operating a Co-Reducing Concept Principle search or data identification in a computer. The principles are the same in both cases, the only difference is that when a search is done, the output is to the user via a screen or some form of auditory output and when a specification is in question, the computer does the search itself in order to identify the data on which to perform an order such as "send the email to Jim that I sent to Joe". The computer has to do a Co-reducing Concept search to identify "the email that I sent to Jim" in order to perform the user's order.

When humans "search" between themselves, or identify data to one another (which is the same thing) they use a Co-Reducing Concept search and continue adding terms to eliminate all previously found items that do not contain ALL the terms so far specified to the other person. The following typical conversation between a boss and secretary illustrates this procedure between humans:

Boss: Get me the letter from Joe

Secretary Which one? I have at least 500? (Secretary prompts for more concepts with which to reduce those already found)

Boss The one about apples

Secretary Which one? I have at least 10? (prompts again for further data).

Boss The one he sent last week.

Secretary Well, why didn't you say so in the first place? Here it is.

In each case, the secretary prompts for more terms and eliminates all already-found items that do not ALSO contain or comply with the newly-specified term. FIG. 12 illustrates the computer emulation of this human find and specification procedure.

1201 in FIG. 12 represents a number of Field Labels appearing on a computer screen, each accompanied by a data entry field for the user to enter whatever data he wishes that matches the label displayed for that field. Accompanying instructional text to the user is optional but would encourage him to enter whatever he can remember about the thing he wants to find.

1202 represents the database of information or the informational pool that the user intends to search in order to find the items he wants and shows a number of grid storage system records that are fairly similar in their content. The screen representation 1201 shows that the user has just entered the value of "Bill" into the field labeled as First Name and 150 into the field with the Label of Salary, after which he will instruct the computer to perform its search.

1204 shows the resulting screen display that occurs when the terms Bill and 150 are matched with the storage system records on a Query by Example basis and shows that four records were found that contained both "Bill" and "150".

1203 represents the screen input area seen previously as 1201, into which the user (after getting the results of the first search) now enters the term "cleaner" into the field that is labeled "Activity". In this example it is easily seen than 3 out 4 records in 1204 will also contain the term "cleaner", but in a real database with millions or billions of records, the first search 1201 and 1202 might return millions of records and what terms do or not occur in them would be invisible to the user.

In 1206, the newly entered term "cleaner" in the data entry screen in 1203 has been used, in method of the Co-reducing Concept Search, to search WITHIN the group of records already found in 1204 to eliminate all those that do not ALSO contain the new term, thereby excluding all records that do not contain all three terms.

In 1205 the user adds the term "LA" to the field with the label "City" and then instructs the computer to continue the find. Again, the computer conducts a Co-Reducing Concept search to search WITHIN the group of records already found in 1206 to eliminate all those that do not ALSO contain the new term, thereby excluding all records that do not contain all the specified terms.

In 1208 the computer displays the records—one in this case—that contain ALL the terms in the users input 1207 and, as per the Co-Reducing Concept Principle Search, whatever is left when the user stops adding terms, is whatever he wanted to specify or find.

While sophisticated users can construct sophisticated searches in state of the art computers and search engines, such sophisticated searches are beyond the comprehension of the 5 billion people who do not use computers, and beyond the comprehension of a large part of the 1 billion who do use computers. Co-reducing Concept searches are easy and instinctive for users as they follow the procedures that people use each day every day since soon after they were born.

As has been shown, the DRT is close to essential to bring order to otherwise structureless meaning ExoPonents derived from words. In order to make ExoPonents work and do something useful, these DRT-classified Meaning ExoPonents then have to be able to be used in some manner, and the manner or method of their use in order to identify data to the code on which the code can act, is by implementation of Co-reducing Concept Principle searches and data identifications.

FIG. 13

Figure 13:
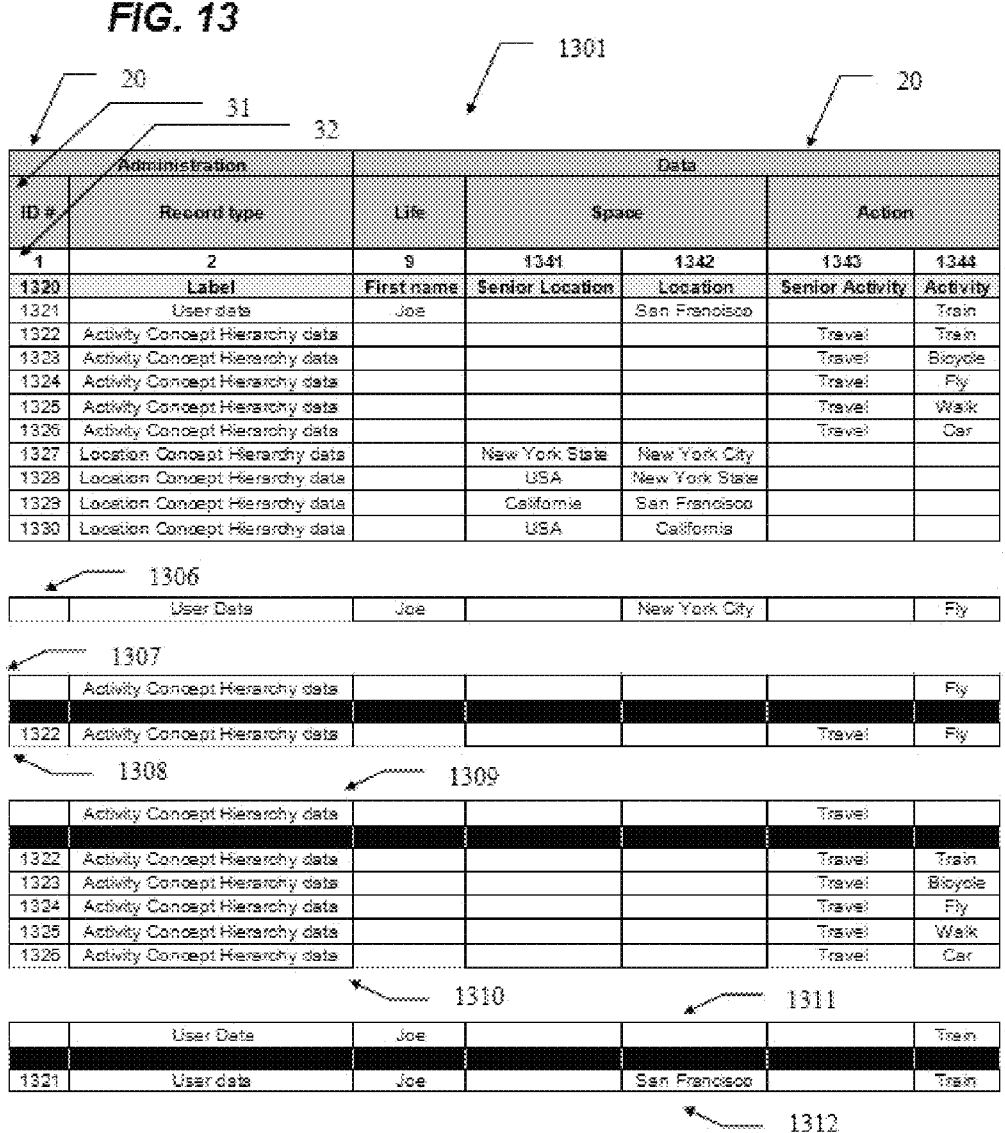

FIG. 13 is a diagram showing the use of data ExoPonents that are meaning types to enable a computer to Return Nearest Truth when it is queried for an answer to which there is no exact match, so that it can then find for a user the nearest or closest answer to his query that is true when his exact query was not true. When humans are queried (receive a question) to which the answer is "no" they will often then supply the answer that is the closest approximation to the question and this is illustrated by the following typical questions and responses:

"Is Joe in New York?"
"No, he is in LA."
"Do you have a copy of the Daily Banner Newspaper?"
"No, but I have the Daily Herald if you'd like that."
"Do you have a pair of scissors?"
"No, but I have a penknife if you want."

These observable mechanisms that are detectable in language use are founded on the relationships that a human considers to exist between meaning types. The following methods emulate these mechanisms in a computer. While these mechanisms will work in an ordinary database, in the preferred embodiment, they are implemented in an Any-to-Any system that is using a Data Relation Table (DRT).

1301 is a miniature DRT in which 20 are Administration fields and 21 are data fields. The row designated by 31 shows the field names in use for the Administration Fields only, and otherwise shows the Data Categories in use for the data fields of the table. The row designated by 32 shows the field numbers that replace field names if using a state of the art database, but which are otherwise ignored. In table 1301, the numbers in the first column of the row indicated by 31 is the column headed ID # and this column contains Record ID numbers, which will be used together with Field Numbers in bold face as figure numbers in the following fashion: Record ID 1320, Field 9, for example.

Note that the terms "Location" and "Senior Location" and "Activity" and "Senior Activity" are being used in this Figure to help to make the description that follows more readily comprehensible. The DRT of FIGS. 17-24 provides for these fields; the Space Data Category includes a field called Given Name of Space which is the field "(name of) Location" as used above and also includes a field called Type of Space, which is the field "Senior Location" as used above. The Energy Data Category fields in FIGS. 17-24 similarly include Given Name of Action and Action Type that are the fields called "activity" and "Senior Activity" in this figure.

In table 1301, Record ID 1320 is a Label record containing values with which to label each of the Data fields 21. Hence Field 9 is labeled First Name, Field 1341 is a Space Data Category Data Class called Senior Location, while its companion Field 1342 is a Data Class called Location. Field 1342 contains values that are Locations and Field 1341 contains values that are Locations that are senior to the values in the Field 1342 in the same record. Similarly, Field 1343 and Field 1344 are also operated as a pair, though this time as a pair of Data Classes in the Action or Energy Data Category, with Field 1343 being the junior activity and Field 1344 being the senior activity which is senior to the junior activity entered in the other field of these paired fields.

These two fields Field 1341 and Field 1342 are coupled and operate as a pair when used for Return Nearest Truth functionality, just as two fields functioned in a coupled fashion as was described for FIG. 9. (In FIG. 9 data was also recorded in coupled fields using senior and junior types, and showed a different way for a computer to take advantage of type meaning mechanisms built into the language. But note too, that any time data is recorded so that a quantity of junior data types each has a recorded relationship to a senior data type, a way can be found to implement the mechanisms now being described so as to Return Nearest Truth. Paired fields used in this manner are just one method for recording Concept Hierarchies in a grid storage system and the preferred embodiment is to do so in any Any-to-Any data machine, in which case the values stored are ExoPonents; however it is trivial to devise other storage plans which achieve the same result of relating one value to another as senior and junior to one another. In the preferred embodiment these Concept Hierarchies can be record in grid storage system records of a type called Concept Hierarchy records, as shown in Field 2 of 1301, where Records IDs 1321 to Record ID 1330 are all Concept Hierarchy records each of which record a relationship between a senior and a junior value for a one Data Category. Return Nearest Truth operates within each Data Category and does not cross Data Categories because of the Data Category Integrity Principle—data from one Data Category can not (workably) be used as a response to a query on a different Data Category.

The values in Record ID 1321 to Record ID 1326 illustrate some examples of Concept Hierarchies for the Action or Energy Data Category, while Record ID 1327 to Record ID 1330 illustrate some Concept Hierarchies for the Space or Location Data Category.

A Concept Hierarchy is a computer recording of a hierarchy of values that humans treat and operate as senior and junior values to one another—which can equally well be stated as treating them as types and sub-types of one another. For example, flying, going by train, bicycling, walking and going by car are all different methods of performing the action of travelling from one place to another and hence all have "travel" as a senior concept. Similarly, emailing, phoning, faxing, SMSing are all methods of communicating with someone and hence all have "communicating" as their senior concept. In turn, "travel", "trucking", "throwing", "sliding" and so on are all different ways of "moving" something and have "move" as a senior Concept. There is no book anywhere to go to look up Concept Hierarchies. The Any-to-Any system designer—who is a human behavior observer as much as anything else—has to observe the Concept Hierarchies in use between humans, record them in the Any-to-Any system using the methods being taught herein, and then adjust them and add to them to the point that, in practice and in practical use, they cover virtually all uses. Thus the Concept Hierarchies being described here are not one and only cast-in-stone Concept Hierarchies; they are examples of Concept Hierarchies of which there are many others, and are best adjusted by practical experience.

While computers usually query by instance, asking the computer if X exists, or query by alternatives (does X or Y exist) or query by range, humans rarely do so, and instead mostly Query by Type and the type is an ExoPonent. For example, humans will say, "pass me the newspaper", but "Newspaper" is a type of thing; it is not an instance, which would be "Daily Prophet 1494-22". As part of this human Query By Type methodology, which is implement in this instance and enabled through the Any-to-Any data machine being described, humans frequently use the phenomenon that the highest type in a Data Category IS the ExoPonent of that Data Category itself. Hence they often querying by Data Category and do so using some form of the ExoPonent that IS that Data Category. For example, humans query one another with the senior ExoPonent value of the Action Data Category, when they ask "what did you do?" "What did you do?" is a request to return any past time activity that the person did in relation to the topic in question—i.e. to return any value at all from the Data Category that also includes a) the person queried (Life Data Category value) and past time (a Time data Category value). Fact that any Action Data Category value whatsoever (that occurred in past time) is acceptable is an acceptable shows that Data Category values are related by type within the Data Category and Concept Hierarchies are a more detailed expression of this within-Category meaning type relationship and Return Nearest Truth is simply one use of with-Category Concept Hierarchies.

The nature of the particular Concept Hierarchies in each Data Category is different (though sometimes similar) in each Data Category. In the Energy or Action Data Category, the Concept Hierarchy consists of activities, where one type of activity is considered by humans to be a sub-type of another type of activity, and the highest concept in the Hierarchy and the single senior value in the Data Category is the ExoPonent value of the Data Category itself—i.e. Action or Energy.

Time Concept Hierarchies are used by humans in terms of names of times, where the junior Concept Hierarchy name of a Time is a smaller amount of Time than the name of another, bigger amount of Time other. Second, minute, hour is a good example of a Time Data Category Concept Hierarchy. In a minute, each of the sixty seconds in it is different—the $13^{th}$ second is not the $14^{th}$ second for example—and all sixty of them have "minute" as their senior in the Concept Hierarchy and the same pattern repeats through the names of times. The single most senior member of the Time Data Category is Time itself as expressed in the query "what time is it?" or "When?" or simply "Time?"

Space or Location Concept Hierarchies are constructed by humans in terms of the coordinates of one named space being located within the coordinates of another named space, and Space Concept Hierarchies occur in terms of nested named spaces. Hence, New York City is in New York State which is its senior in the Space Concept Hierarchy. Various other towns in New York State will have Counties as their senior followed by New York State as the senior Concept of all the Counties in New York State. A single Data Category can have more than one Concept Hierarchy and most of them do; for example, distance is another Concept hierarchy in the Space Data Category. Millimeter, centimeter, meter, is a good example. In a centimeter, each of the ten millimeters in it is different—the $5^{th}$ millimeter is not the $6^{th}$ millimeter for example—and all ten of them have "centimeter" as their senior in the Concept Hierarchy and the same pattern repeats through the names of space measurements. The single most senior member of the Space Data Category is Space itself as expressed in the query "Where?"—i.e. "what space?" and any Space Data Category value is acceptable, though not all Space values will be appropriate.

The Matter Data Category has several Concept Hierarchies—weights and measures (but not distances) and currency systems are two Matter Concept Hierarchies that behave similarly to Time and distance Concept Hierarchies and all of them are a type of Concept Hierarchy termed a Measurement Concept Hierarchy—they are all Concept Hierarchies of some kind of Measurement. There is another group of Concept Hierarchies called Meaning Concept Hierarchies where the Concept Hierarchy is made out of meanings and not out of measurable physical phenomena. The Action Concept Hierarchy of movement and travel and so on are examples of a Meaning Concept Hierarchy. In the Matter Data Category, Meaning Concept Hierarchies occur were one meaning is considered by humans to be a type of another meaning. For example, chair, table, cupboards and so on are all types of furniture and have "furniture" as their senior Concept. "Furniture", "cars", "cutlery" and so on are all of the type "Man Made Object" and the single most senior member of the Data Category is Matter itself as expressed in the query "what is that?"

The Life Data Category has a profusion of Concept Hierarchies of which Hierarchies of Quality are very frequent and these are hierarchies such as good, better best; grandmother, mother, daughter, granddaughter; darkest, darker, dark, normal, light, lighter, lightest and so on. Additionally, the Life Data Category contains Concept Hierarchies which are straightforward organizational hierarchies—who is the boss of whom in a given organization and this includes hierarchies of organizations themselves, including particularly the Concept Hierarchy of government organizations many of which affect computer uses quite widely and which will therefore appear in data record in a computer.

However, all Concept Hierarchies behave in the same manner, namely that humans treat and use values as related when they are members of the same Concept Hierarchy, and that relationship is provided by the Concept Hierarchy itself. It is these human Concept Hierarchy methods that the invention emulates in a computing environment with the following methods and the following methods are applicable computer emulations of all Concept Hierarchies.

In 1301, Record ID 1321 is a User Data Record as its Field 2 Record Type entry shows. This record, in its Field 9, using the Record ID 1320 Field 9 label of First name has an entry of Joe. Similarly Field 1341 Senior Location, is blank, while Field 1341 shows a value of San Francisco. Field 1343 of Record ID 1321 is also blank with no entry, while Field 1344 shows an entry of Train. In effect, Record ID 1321 shows that Joe went to San Francisco by Train.

Record IDs 1322 to Record ID 1330 are all Concept Hierarchy records, with Record IDs 1322 to Record ID 1326 recording Activity Concept Hierarchy data and Record IDs 1327 to Record ID 1330 recording Location Concept Hierarchy data. For example, Record ID 1322 shows that the value "Travel" in Field 1343 is a senior Concept Hierarchy member for the value in the coupled Field 1344 of the same record, which has the value of "train" in it. The other Activity Concept Hierarchy records, Record ID 1323 to Record ID 1326 are constructed in the same way. Between them these records state that various terms are conceptually junior to—i.e. are types of—travel.

Note that these Concept Hierarchy values must be manually created and entered, since, at the outset, the computer has no idea which term the human considers to be a junior or senior of which other term. However, once a reasonable library of such Concept Hierarchy records have been created in an Any-to-Any system, it is trivial to copy them or send them to another Any-to-Any system, and equally trivial to provide mechanisms to allow the user to a) change them as he seems fit b) add new ones or c) prompt the user to enter juniors and seniors of new terms that the Any-to-Any system is seeing for the first time.

It is important to understand that when a DRT is in use as shown in this illustration, and when a term such as "travel" is entered into one of the DRT fields, as for example, the act of entering the letters "t.r.a.v.e.l." into Field 1343 of Record ID 1322, converts the multi-meaning word package of "Travel" into a mono-meaning ExoPonent (that happens to be visually represented to the user by the same set of letters t.r.a.v.e.l as the word package "travel"). The conversion occurs unnoticeably by the mere fact of entering the letters t.r.a.v.e.l. into a specific DRT field (as opposed to entering it into any field of any database). The reason for this is as follows.

Firstly a "word package" is the name for that package or assembly of things represented by a particular written or spoken word, namely, the spelling (or the sound) plus all meanings of that spelling+Base Concept+other things of consequence to Meaning Processing but outside the sphere of this invention. Secondly, entering the letters "t.r.a.v.e.l" into Field 1343 of Record ID 1322 assembles whatever the letters represent for the user with the field label of "Senior Activity" in Field 1343 of Record ID 1320; that Field 1343 is itself a sub-type of the Data Category of Action (as shown by the row indicated by 31) within which it occurs. Assembling these two spellings of "Action" and "travel" (which occurs when the letters t.r.a.v.e.l. are entered into Field 1343 of Record ID 1322) co-reduces the meanings of both word packages as per the Co-Reducing Concept Principle of Human Specification. Consequently the meaning that is now being represented in the cell that is the cross reference of Record ID 1322 and the Field 1343 is that meaning of the word package "Travel" which is an Action and equally, that meaning of "Senior Activity" (Field 1343) which is Action—they have each reduced (i.e. co-reduced) the whole of the meaning (package) that was specified by the other. In this manner and in many cases, the process of recording a word a spelling representing a package of meanings) in a Data Category of the DRT magically turns that spelling into a representation not of the word package of meanings any more, but into a written representation of a single ExoPonent meaning. In some cases this magical transformation does not occur and these are cases where more than one meaning associated with that spelling occurs in that same Data Category. For example, fax the piece of paper and fax the machine on which one sends faxes are both Matter meanings packaged into the spelling "f.a.x." and therefore, if the letters "f.a.x." are just entered into the Data Category of Matter or into an "Other" field of a Data Category, they cannot really be used by code as a basis for any computation as the spelling represents either of two completely different meanings and the code has no idea which meaning is to be used this time.

When two or more meanings occur in a single Data Category, if they are both stored in the same Data Category or in an Other field in that Data Category and both are represented by a single spelling, they are not ExoPonents as the computer code has no way to identify and compute with each meaning separately and this will cause errors if the Any-to-Any data machine and system has to use either of those meanings, with a 50:50 chance of a wrong result if two meanings are being represented with one spelling. However, if the same spelling is used to represent two different meanings belonging to a single Data Category, and each meaning is co-reduced by being in a different Data Class (i.e. recorded in relation to a different type) in that Data Category, then each meaning is a Mono-Meaning due to Co-Reduction with the label in use for each Data Class, and hence (other things being equal) each spelling that represents a single meaning that is an ExoPonent. Equally, if the same spelling is used to represent two or more meanings recorded in coupled fields and each spelling is Co-reduced by being recorded in relation to a different type in the other coupled field, then each one is Co-reduced into an ExoPonent. Again this demonstrates that the key vital requirement, usefulness and purpose of a meaning ExoPonent is that it is an individual, unique mono-meaning, which the user may in some manner wish to separately manipulate and this is necessary because different meanings require different manipulations and if two meanings are glued together with a spelling, it becomes impossibly complex to try and do anything of consequence with the individual meanings. Hence, while spellings can be used instead of Base Concept numbers to represent ExoPonent meanings, in order to do so correctly, a thorough understanding of the Co-reducing Concept Principle and of the DRT and of Type meaning mechanisms in language as taught herein, is necessary in order to do successfully and is especially necessary when using Concept Hierarchies.

Continuing with the description of other Concept Hierarchy records in 1301, Location Concept Hierarchy Record ID 1327 shows that the value "New York State" in Field 1341 is a senior Concept Hierarchy member for the value in the paired Field 1342 of the same record, which has the value of "New York City" in it. The other Location Concept Hierarchy records, Record ID 1328 to Record ID 1330 are constructed in the same way. Between them these records state various terms where one term is junior to another because it is contained within the other, this being a Space Concept Hierarchy.

Record ID 1306 represents a user query to be made on a Query by Example basis to the grid storage table 1301 and essentially asks, "Did Joe fly to New York City?" (the past time ExoPonent of the query is not shown in this example). Clearly, when the grid storage system 1301 is queried, no exact matches will be found.

Failure to find a match to a query can then be used to launch the following Return Nearest Truth sequence, either automatically or when a user clicks on a Return Nearest Truth button, which could also be labeled "show closest similar thing". In the Return Nearest Truth sequence, the essential strategy is 1) to use the terms in the not-matched query one by one to locate one of the terms in the original query that was not matched, 2) then to search within Concept Hierarchy records to find the senior of the not-matched term, then 3) use the senior term to find others of its juniors, and then 4) try each of those juniors in the original query by replacing the not-matched term with the newly found alternative juniors that have the same senior and this can include trying the senior (and its seniors) in place of the no-found junior. If a match is found, but the expected overall match has not been found, the process can be repeated in other Data Categories.

In the simple straightforward sequence that does not include all the possible and self-evident variants, the sequence is as follows:

The Life Data Category in the DRT behaves as a senior Data Category and generally has to be addressed first. Much of the data in a computer centers around people or their organizations, particularly including whoever entered and created the data (remembering that an Any-to-Any system, with its Administration fields to record who entered each record, is essentially multi-user). Hence, as a first step, all terms except Life Data Category Names of the people and group in the original query (represented in this example by the Field 9 value "Joe") are removed from the query 1306, and the data storage grid 1301 is queried with those terms only. If the Life Data Category terms are found to exist at all, it means that person or group does exist in the computer, and the sequence continues. If they do not exist, then, if the user wants to go further, a Return Nearest Truth sequence as being described has to be initiated on the Life Data Category terms first, to discover if there is any close approximation to the not-found names of people or groups—a nickname for that name, someone else in the same organization, etc.

Assuming the Life Data Category name terms (people or group) were found, then each of the non-Life Data Category terms in the original query 1306 are used one at a time in turn in a query such as 1306 in order to find a term that is NOT matched. In this example, if the grid data storage 1301 were queried with the record 1306, without the Field 1342 value New York in it, the record would NOT be matched and the Field 1344 term "fly" in the original query 1306 would be an unmatched term.

In order to discover the unmatched term's Concept Hierarchy, an amended query Record ID 1307 is constructed using the unmatched terms, and this query is limited to Activity Concept Hierarchy record types by the entering "Activity Concept Hierarchy data" as the record type required in Field 2 of the query Record ID 1307.

When Record ID 1307 is used as a query on the grid data storage system 1301 the Activity Concept Hierarchy record, Record ID 1322 indicated by 1308 will be returned, containing the queried value of "fly" and essentially stating that the Concept Hierarchy senior of "fly" is "travel"—i.e. "fly" is an activity of type "travel".

As the next step the Return Nearest Truth BossModule deletes the number 1322 from the Record ID field, Field 1 of the found record 1322, and deletes the Data Category term which was in the query 1306 ("fly" in this case) and so produces a new record 1309 (containing only the senior Concept of the unmatched term) which it uses to query the data storage grid 1301. This results in returning all Activity Concept hierarchy records which have "Travel" as a Senior Activity, namely Record ID 1322-Record ID 1326.

The code then in turn takes each of the new found juniors (Train, Bicycle, Walk Car) of the Senior Activity (Travel) from Field 1344 of the found Record ID 1322-Record ID 1326 and inserts these, one at a time, into their same Field 1344 in the original query 1306, from which it also deletes other Non-Life Data Category terms (and hence deleting "New York" which was in Field 1342 of 1306. By this process it produces a new query record 1311 with which it again queries the grid storage system 1301 and this time obtains a match with Record ID 1321, the user data record. This allows the Return Nearest Truth code to construct a response of "No (=your original query failed) but Joe did go to San Francisco by train" hence effectively replying with the nearest known truth just as a human would, but using an ExoPonent-based, Any-to-Any data machine process to do so.

Note that Return Nearest Truth is one of the human approximation methods and only works because meanings are used as DRT classified ExoPonents.

It will be clear that the possibilities for using meanings that are ExoPonents that are also types are almost endless and those skilled in the art will find endless ways to play on these methods and themes and render them more efficient and powerful, from enabling Query by Type in their applications to Return Nearest Truth and proposing cars of nearest similar color when the car of the color the person wants is unavailable, to transparently finding and using alternative means of communicating to a chosen person when issued a command to "send that to Joe" which will result in the code concerned using Return Nearest Truth to find other ways of sending if the first method fails and choosing them in order of rating provided by an additional coupled field.

FIG. 14

Figure 14:
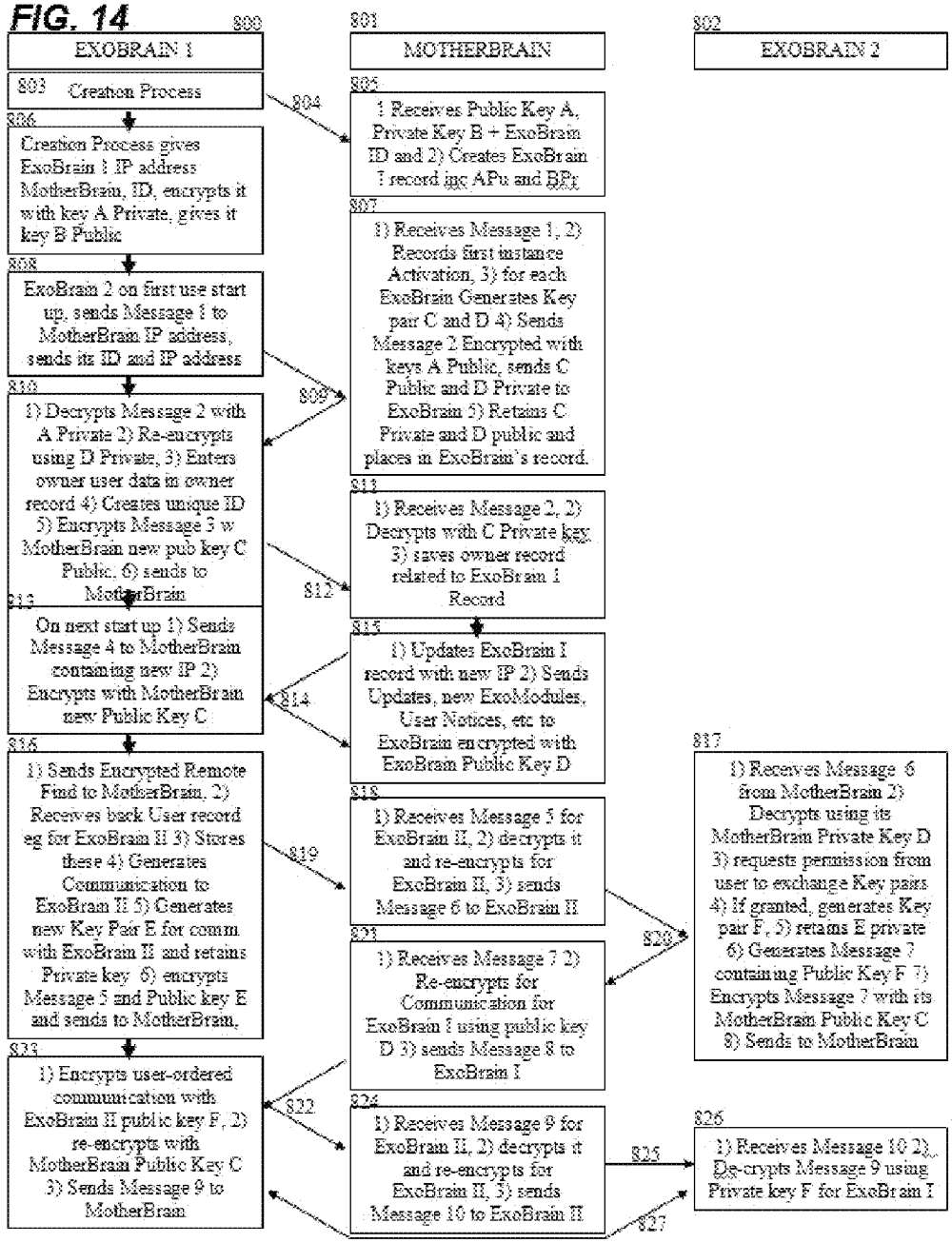

FIG. 14 illustrates a secure communication system to enable Any-to-Any systems to operate and communicate securely to one another as a first part of using ExoPonents to enable AnyDataAnyWhere in which Any-to-Any systems running on different computer-enabled hosts are enabled to freely and securely interchange data between one another in a variety of useful ways.

Firstly, it should be understood that 1) all user data and all user-accessible functionality in an Any-to-Any system is in the form of records in the grid storage system and in the preferred embodiment these records contain data ExoPonents and code ExoPonents. 2) In the preferred embodiment, these ExoPonents are classified and stored in a grid storage system structured with the DRT classification system 3) the combination of a) DRT classification b) of ExoPonents, enables any data to be stored in any and all Any-to-Any systems that are either compatible either because i) they use the identical DRT structure, relational mechanisms and conventions or ii) they can have code mechanisms to convert transmitted or received records between their own DRT, relational mechanisms and conventions and that of another Any-to-Any system using different ones. 3) All execution starts with a Commander record that the Command matcher uses as a Find record to find the appropriate Boss Module, thereby launching the desired execution as described under FIG. 6 Command Matcher. 4) Hence any and every execution in an Any-to-Any system starts with a Find. 5) Hence any given Commander record can cause execution to occur either in the Any-to-Any system in which it was created, or in any other compatible Any-to-Any system provided that a) a communication system exists between compatible Any-to-Any systems with which to transmit records in a secure and safe fashion and b) all code ExoPonents needed to execute the transmitted record exists at the recipient Any-to-Any system or can be obtained by it.

The preferred secure communication for Any-to-Any system is a computer emulation of (and improvement on) the secure communication system used by humans. For example, in an office environment any two secretaries (whether in the same building or on different Continents) each authenticate (identifies) their own boss; the two boss' secretaries then identify and authenticate themselves to one another. Thereafter each secretary will accept any transmission from the other and act on it—do something with it or forward it to her boss etc—based on the assumption that the sending secretary has herself adequately authenticated the transmission with her own boss. The bosses do not have to identify themselves to one another, nor do they have to authenticate each document—it is the transmission channel itself that is previously authenticated and is an authenticated communication channel and this authenticated state is conferred on whatever is transmitted by the authenticated channel. The computer version of the human system is implemented as shown by the following description.

FIG. 14 is a block flow diagram showing the general operating methods of the transparent security system that is used to enable Any-to-Any computing systems using a DRT classification structure to communicate freely to one another while protecting both the Any-to-Any computing systems, and the communications between them from destructive intrusion from others. This security system with or with or without the communication system built into it could equally well be used to pro-actively protect a state of the art program or computer from attack, as opposed to the re-active protection methodology that is common in the state of the art. In summary, a computing software entity consisting of data and code—an Any-to-Any system in this instance—exists and operates encrypted, and all transmissions between Any-to-Any systems is transparently encrypted with RSA key pairs. Rather than the state of the art approach of encrypting individual communications individually, the approach used is that any two computing entities—Any-to-Any systems in this case—authenticate themselves to one another when first communicating to one another and thereafter send or ask one another for any data their users allow, transparently encrypting each communication as follows.

In FIG. 14, the column of blocks 800 describe the activities of a first Any-to-Any computing system ExoBrain I, the column of blocks 801 describe the activities of another and web-based Any-to-Any computing system called MotherBrain and the column of blocks 802 describe the activities of a second Any-to-Any computing system ExoBrain, ExoBrain II. ExoBrain I, 800, and ExoBrain II, 802, are both Any-to-Any systems in the manner previously described. MotherBrain is an Any-to-Any system also, and is the same as ExoBrain I or II, only with a different selection of ExoModules. Firstly, it does not have the ExoModules needed for preparing and handling user data for a user. It does have normal ExoModules needed for Inter-ExoBrain communication, and these (as will be described) enable it to act as a communication server (which means any Any-to-Any system can act as a communication server if it has a fixed IP or some mechanism to achieve the same effect. Optionally it has ExoModules to supply updates, particularly including new ExoModules that could be supplied with or without extra charge to the ExoBrains it services and can also have ExoModules to charge and collect monthly or other subscription fees from supported ExoBrains.

The ExoBrain creation process 803 to prepare an ExoBrain for distribution (for example ExoBrain I 806) takes an otherwise ready-to-run ExoBrain and starts the preparation process by 1) generating an RSA encryption 128 bit (or more) key pair A and encrypting all of the ExoBrain 806 using the private key A. The entirety of ExoBrain I 806 is encrypted with this Private Key A except for a very small Communication Non ExoPonent bootstrap Module that exists outside the encrypted shell and is capable of performing the communication, encryption and decryption activities to be described. 2) The Creation Process 803 gives 804 MotherBrain 805 the Public Key A, so that MotherBrain can encrypt messages that ExoBrain I can decrypt with its private key A. 3) The Creation Process 803 includes providing 806 ExoBrain I's unencrypted Communication Module with MotherBrain's 805 IP address and an ID so MotherBrain will be able to identify this ExoBrain when it contacts MotherBrain in the future. 4) The Creation Process 803 generates key pair B and supplies 804 the public Key B to the ExoBrain I, 806, Communication Module and 5) supplies 804 the MotherBrain 805 with the Private key B, so that MotherBrain 805 will be able in the future to receive ExoBrain I's 806 encrypted messages that ExoBrain I 806 can encrypt using the Public key B. 6) The Creation Process also Supplies 804 the MotherBrain with the ExoBrain I's Public Key A. The encrypted ExoBrain I 806 is then released into circulation for distribution.

When someone tries to start the distributed ExoBrain I 808, ExoBrain I sends 809 a Message 1 to the MotherBrain 807 at the IP address it was provided with by the Creation process 803, and encrypts this message with MotherBrain Public Key B. it includes the ID it was provided with by the Creation process 803, and also sends its present IP address that the Communication module ascertains by accessing its local host.

The MotherBrain 807 1) Receives Message 1 which it decrypts with its Private Key B, 2) Records in the distributed ExoBrain ID's record that it has been activated once (and can be activated any number of times in the future by anyone also, because with the process being described, each activation is separately identifiable and gets its own new encryption key pair with which to communicate to MotherBrain) 3) Generates a new key pair C Public (for ExoBrain I) and C Private (for MotherBrain) that is a specific pair for that particular ExoBrain I 808, to communicate to MotherBrain 807 (any other ExoBrain/MotherBrain pair will have a different key pair created for its communications with MotherBrain, so that no two ExoBrains use the same key pair to communicate to MotherBrain). 4) In addition MotherBrain will generate another key pair D private (for ExoBrain I) and D public (for MotherBrain) that ExoBrain I will use both to re-encrypt itself and to receive encrypted messages from MotherBrain 807. Both of the new Key pairs C and D are individual for that particular activated ExoBrain/MotherBrain pair. 5) The MotherBrain 807 creates Message 2 to ExoBrain I 810, encrypting it with ExoBrain I's public key A that was created by the Creation process 803, and encloses MotherBrain's new individual C public key (for ExoBrain I to use to send communications to MotherBrain) and the new ExoBrain I private key D with which ExoBrain will re-encrypt itself and receive communications from MotherBrain that MotherBrain has encrypted for it with Public Key D. 6) MotherBrain 807 retains and places in that ExoBrain I, 808 record, the C Private key to receive communications from ExoBrain I 808 and the D public key with which the MotherBrain 807 can encrypt messages to send 809 to that ExoBrain I, 810.

ExoBrain I 810, 1) receives 809 Message 2 from MotherBrain 807 and decrypts the message using the A private key it was provided with by the Creations Process 803. 2) ExoBrain I 810 uses the A Private key to decrypt itself, and then re-encrypts itself using the D private key supplied 809 by the MotherBrain 807. 3) ExoBrain I 810 obtains basic info from the first user who is starting it for the first time and enters this in the Owners Record ID 2 of FIG. 7. 4) Creates a unique ID for itself, so it is now a clone of the distributed ExoBrain, which can be given or sent to others to activate also 5) ExoBrain I 810 creates a new Message, Message 3, containing the owner Record and its new ID and encrypts the message with the MotherBrain Public key C, that it just received and then 6) sends 812, this Message 3 to MotherBrain 811

MotherBrain 811 1) receives 812 Message 3 from ExoBrain I 810 and 2) decrypts it using private key C that it recently created and has retained and stored in ExoBrain I's record, and 3) Updates ExoBrain Is record with the ID and stores the Owner Record and relates it to ExoBrain's 1 record by putting the Owner Record ID in an Administration field called User in ExoBrain I's record. From then on the MotherBrain 815 is in communication 814 with ExoBrain I 813, sending it updates, new ExoModules, User alerts, invoices for payment and taking its payment, etc, all of which it encrypts with ExoBrain I 813 public key D that ExoBrain 813 decrypts with its Private Key D. ExoBrain I replies to MotherBrain as necessary, encrypting communications for MotherBrain with MotherBrain's Public key C for that ExoBrain I.

The second and subsequent times that 813 ExoBrain I starts again, it checks its IP and sends 1) 814 a message 4 to MotherBrain containing its new IP that it encrypts with its public key for MotherBrain key C. MotherBrain 815 updates ExoBrain I's record with the new IP. When not working, ExoBrain encrypts itself again and when started by the user, decrypts itself with a second public key for its private D key (which is a combination made from the logon ID and password for that user). Hence, when idle the ExoBrain can be destroyed, but can only be broken into with considerable difficulty and built-in traps make that even more difficult. Even if the ExoBrain is successfully broken into, the person doing so will only recover key pairs for one ExoBrain and even these from time to time are automatically changed. ExoBrains receiving unencrypted communication just ignore them and if they receive incorrectly encrypted communications, they forward these to MotherBrain.

In the above manner, secure communications are automatically and transparently established between ExoBrain I and MotherBrain without the user having to do anything. This secure communication channel is then used to create other secure communication channels between ExoBrain I and other ExoBrains, as follows:

When an 816 ExoBrain I wishes to communicate to another ExoBrain, 817 ExoBrain II, 1) it sends an encrypted Remote Find Record to MotherBrain 818 and 2) receives back public fields of Owner records (if the owner has approved them being discoverable) of other ExoBrain's that meet its search criteria. 3) It stores the ones the user indicates wants to use now or in future. When the user 4) creates a communication which he wants to send to a chosen ExoBrain II 817, his 816 ExoBrain I 5) generates a new key pair E and retains key E Private. 6) It generates a new message 5 containing the E public key and the communication addressed to 817 ExoBrain II, and designates message for the ExoBrain chosen from the downloaded owner records and encrypts this Message 5 with its own individual public Key C for MotherBrain and sends it 819 to MotherBrain 818.

MotherBrain 818 1) receives 819 Message 5 and 2) decrypts it with its private Key C for 816 ExoBrain I, and 3) re-encrypts the message as new Message 6 with its different public key D, public key D1 for 817 ExoBrain II and sends it 820 to 817 ExoBrain II.

ExoBrain II, 817, 1) receives 820 Message 6 from MotherBrain 818 and 2) Decrypts it using its own different Private key D1 for its MotherBrain communications. 3) ExoBrain II, 817 requests permission from its owner to exchange keys with ExoBrain I. If 4) its owner grants permission, then 817 ExoBrain II stores the 816 ExoBrain I public key E that ExoBrain I generated for ExoBrain II's use in a record it generates for ExoBrain I. ExoBrain II then generates a new key pair F for communications with ExoBrain I only (if it sets up communications with another ExoBrain III, it would generate a new key pair G for that purpose). 5) ExoBrain II 817 retains F Private key and 6) Generates a reply Message 7 to 823 ExoBrain I, in which it encloses Public Key F. 7) It encrypts the message 7 with its MotherBrain public Key C1 and 8) sends it 820 to MotherBrain 821.

MotherBrain 821 1) receives 820 Message 7 from 817 ExoBrain II, 2) Decrypts it and re-encrypts it for ExoBrain I 823 using ExoBrain I's public key D and 3) sends 822 Message 8 to 823 ExoBrain I.

ExoBrain I 823 receives 822 Message 8 from MotherBrain 821 and Creates and Saves a record for 817 ExoBrain II, including in the record ExoBrain II's public key F and then 1) uses that key to encrypt the communication its user originally wanted to send to 817 ExoBrain II. Then 2) ExoBrain I encrypts the already encrypted message with its Public key C for MotherBrain and 3) sends 822 Message 9 to MotherBrain 824.

MotherBrain 824 1) receives 822 Message 9 destined for 826 ExoBrain II 2) decrypts the message and re-encrypts it for 826 ExoBrain II and 3) Sends 825 message 10 to 826 ExoBrain II.

ExoBrain II 826, 1) receives 826 Message 10 and 2) Decrypts it with its private Key F for 823 ExoBrain I Thereafter 827, ExoBrain I 823 and ExoBrain II 826 communicate 827 via MotherBrain using the 128 bit or more keys they have exchanged, and since they are double encrypted they are extremely difficult to break if intercepted.

In implementing this security system it needs to be repeated that the body10,000 of Any-to-Any system transmissions a) always consist of records only b) the visual display data they send consists of View data records (i.e. record containing view-controlling parameter data) that are the data that the View display FieldLogics (whether in the sending or recipient Any-to-Any systems) need to display the data correctly, c) code seldom needs to be transmitted because a new data item in an ExoBrain is almost wholly a new relationship of data, that uses the same functionality that the Any-to-Any systems in the particular network all have in common d) if code is needed by the transmitted application that does not exist on the recipient Any-to-Any system, the latter can obtain such missing code transparently and automatically using IfNotFound mechanisms (as will be described under FIG. 15) applied to obtaining missing code. Hence Any-to-Any data transmissions between Any-to-Any systems are small and hence fast. In actual practice it was found that the first start up of the test Any-to-Any system (an ExoBrain) including decrypting and re-encrypting it, took about 10 minutes and exchanging key pairs and receiving the first communication between any two ExoBrain test Any-to-Any systems took 10 to 20 seconds, and thereafter there was no user perception of delay on subsequent transparently encrypted communications. All Any-to-Any test system (ExoBrain) inter-communication was encrypted including all ExoItem transmissions, collaboration, chat, and game playing. An ExoBrain could not decrypt, let alone execute any FieldLogics that did not have the correct MotherBrain encryption and signature for the specific ExoBrain trying to decrypt them. All foreign Commander records require user permission to execute (and can be arranged to execute in a quarantine). No ExoModules exist to delete ExoBrain records and ExoBrain records are never overwritten, only copied and changed (and the database handles for any method to make it make it delete anything are not accessible). Further, various ExoPonent traps can be created that cause MotherBrain to quarantine the ExoBrain concerned for further investigation if they are triggered.

In the test ExoBrain there were three exceptions to encrypted transmissions. One was emails received from non-ExoBrain sources which were displayed in the normal manner and would need viral scanning if received from a conventional source. The second was for what was termed the ExoWeb. By clicking one button to activate one ExoModule, any ExoItem could be designated as available for the ExoWeb (an Any-to-Any equivalent of the web in which every ExoBrain was its own web server) any ExoBrain could search and view such items without encryption. Hence "publishing" anything at all in the ExoBrain to the ExoWeb only required pushing one button that made it available to all ExoBrains. The third exception was that normal web pages could be displayed by the ExoBrain provided that they had certain tags in them, tags that it was estimated would not take more than 1 or 2 man days per site to do, and the result, using the Any-to-Any screen display that was part of the ExoBrain, was that a webpage could be rearranged (or different web pages combined or mixed with normal ExoItems) on the screen so as to display however the person wanted it to, without changing the server's web page itself. Effectively, parts of N websites could be combined by the user with parts of N ExoItems without programming.

When the encrypted security system just described is applied to a computing entity, whether an Any-to-Any system or to a conventional software application and its data, it is harder for destructive software to penetrate the system. If the user's data is protected during transmission with transparent encryption just described, then there is an additional benefit that the source of received data is known to be safe and the likelihood of it having been interfered with during transmission is remote.

FIG. 15 A-C

Figure 15:
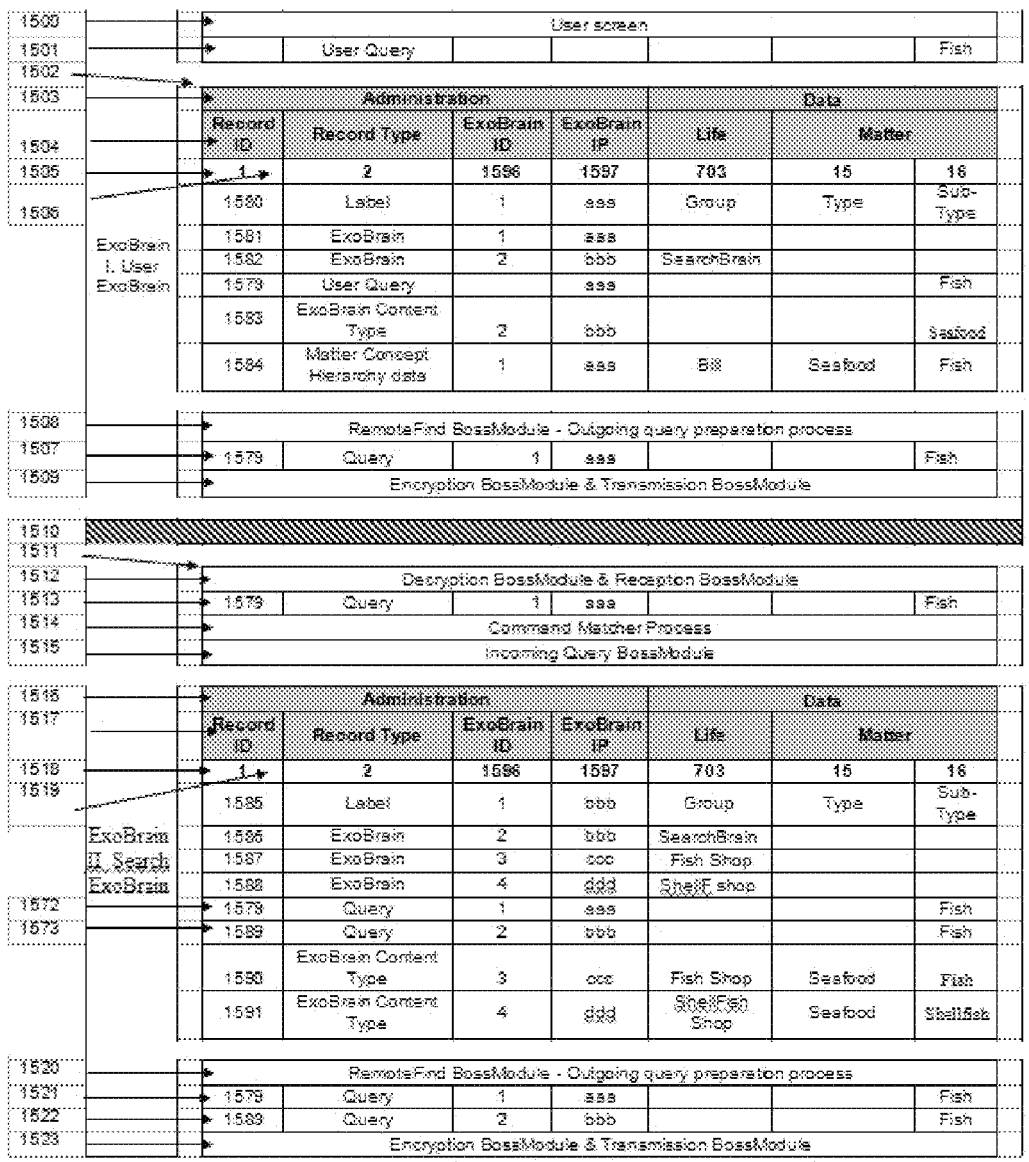

FIG. 15 A-C (A table extending over three pages) illustrates methods for using ExoPonents to enable Remote Chained Save and Remote Chained Find elements of AnyDataAnyWhere functionality. The basic concept of AnyDataAnyWhere is that any data came be obtained from anywhere, or saved anywhere by computers themselves without human assistance no matter which computing device may be storing that data. ExoPonents in an Any-to-Any system operating with a DRT enable this to occur, with the result that data servers and their added layer of complexity can be dispensed with (except for backup storage). Data can now remain in the computing enabled device that created it, from which it can be transparently obtained on demand by the computing-enabled device that needs it, when that computing-enabled device needs it. Every computer becomes a server and it becomes pointless to put applications "in the cloud" as the cloud is itself then made up of every Any-to-Any computing enabled device that exists. Except as limited by their owners every computing enabled device is at the service of every other computing-enabled device, effectively capitalizing on the vast amount of mostly idle computing power available across the broad domain of billions of desktop and other computers. The essential requirement for AnyDataAnyWhere to work is that computers can ask for and obtain data and code from one another in human-specifiable terms but without human intervention and this requirement itself has two aspects; the first of these is Chained Search ability—the secretary-like ability by which a computer that does not itself have whatever data or code was requested to be able to know which computer to ask for what it needs, and for that computer, if it too does not have the requested data or code, to be able to ask another computer, and for all these computers to return the requested data or code from wherever it is eventually found, to whichever computer originally requested it. The second requirement and additional ability for AnyDataAnyWhere is the ability for a computer, whenever it is missing data or code, to itself instigate and execute an appropriate Chained Search so as to get what it needs and to do so without bothering the user. This ability is referred to as IfNotFound ability. Both of these abilities are made possible by ExoPonents operating in an Any-to-Any system using the DRT classification system to classify, manage and relate ExoPonent. ExoPonents can enable these abilities because they are atomic meanings that at each stage unambiguously identify the data on which to act.

FIG. 15 A-C (A table extending over three pages) describes the role of ExoPonents in the first of these methods, the Chained Search. 1502 is a first Any-to-Any system designated as ExoBrain I, which is a user's ExoBrain in this instance; the user of this Any-to-Any system issues a search for "fish". ExoBrain I has no data with which to reply to this request and so passes the request to another Any-to-Any system, 1511, designated ExoBrain II, which is an Any-to-Any system acting as the Any-to-Any equivalent of today's well-known Internet search engines. In the AnyDataAnyWhere system, search engines do not crawl the internet to obtain searchable data; instead, they can ask other computers for the data they want, and those user of Any-to-Any systems who wish their sites to be visible, supply ExoPonent data records to the Any-to-Any search engine which then searches them on demand and uses them to direct the inquiry to the source of the indexed record, in the manner to be described. The Search ExoBrain II, 1511, does not have any data about fish, but does know that 1525 (which is a third Any-to-Any system ExoBrain II at a fish shop, has a data about that type of thing—which is fish. The ExoBrain III at the fish shop knows its available stock, no doubt because purchased fished were entered into the ExoBrain accounting system as were sold fish, and the difference is its stock of fish. This fish shop ExoBrain III passes its reply back to 1540, which is the ExoBrain II search engine which was 1511, but now shows what happens when it receives the reply from the fish shop ExoBrain 1525. The Search ExoBrain 1540 then passes the fish shop ExoBrain 1525, back to the requesting ExoBrain 1557, which is the same as the requesting ExoBrain 1502, but showing how it processes the response it receives.

The structure of these ExoBrains 1502 (and 1557), 1511 (and 1540) and 1525 are all the same and is described in relation to the ExoBrain 1502. The rows indicated by 1503, 1516, 1548, and 1564 in ExoBrains 1502, 1511, 1525, 1540 and 1557 respectively, indicate which of their fields are Administration fields and which of them are data Fields; the indicated rows are not part of the structure itself. The rows indicated by 1504, 1517, 1532, 1549, 1565 in ExoBrains 1502, 1511, 1525, 1540 and 1557 respectively, indicate (for the Administration fields) the field names in use and for data fields, the Data Categories to which the fields belong. The indicated rows are not part of the structure itself. The rows indicated by 1505, 1518, 1533, 1550 and 1566 in ExoBrains 1502, 1511, 1525, 1540 and 1557 respectively indicate the field numbers which serve as a field names if a classic field-name-requiring database is used, but are otherwise ignored. The columns indicated by 1506, 1519, 1534, 1551 and 1567 in ExoBrains 1502, 1511, 1525, 1540 and 1557 respectively, contain Record IDs as indicated by the first columns of 1504, 1517, 1533, 1550 and 1566. In the remainder of this description, field numbers shown in 1505, 1518, 1533, 1550 and 1566 and Record IDs shown in 1506, 1519, 1534, 1551 and 1567 will be used as figure numbers when shown in bold like these examples: Field 102; Record ID 102.

ExoBrain 1502 contains a first record, Record ID 1580. As its record type in Field 2 shows, this is a Label record. This record shows this ExoBrain has an ExoBrain ID (as shown by Field 1596) which is shown as '1' for the sake of simplicity but would normally be a complex unique ID generated at the time of first activation of the Any-to-Any system. Field 1597, ExoBrain IP, shows that this ExoBrain has an IP address represented by "aaa". This IP address is shown as a field only for ease of understanding; it would not normally be a field as the IP address of many computers changes from one moment to the next and it not relevant to data record or any other records and would be recorded in the form of a separate IP address record. Field 703 has a label of Group in Record ID 1580 and is the same Name of a Life Group field as used in FIG. 7. Field 15 and Field 16 are Matter Type and Matter Sub-Type respectively as used in FIG. 7 and will be used to show how the functionality of ExoPonents that are meanings and are types that is built into the language can be used in yet another way, in addition to the Find by Type and Return Nearest Truth functionality already described.

Record ID 1581 is a record for ExoBrain 1502 itself and is analogous to Record ID 3 in FIG. 7 which was also an ExoBrain record. Record ID 1582 is a record identifying another ExoBrain which has an ID of 2 as noted in Field 1596. Field 703 of Record ID 1582 shows that this ExoBrain is called "SearchBrain" and this is a record that identifies ExoBrain II, 1511, one of several Search ExoBrains that would be distinguished for the user by the different data each SearchBrain "knows" as expressed by ExoBrain Content Type records such as Record ID 1583, which shows SearchBrain, with the identification of 2 in Field 1596, "knows about" Matter type "Seafood" as shown by the entry in Field 16. Record ID 1584 is a Matter Concept Hierarch Data record of the Concept Hierarchy type described in FIG. 13 and in this case shows that there is a Concept Hierarchy in which the value Fish in Field 16, has a Senior Concept which is "Seafood" in Field 15.

In the user screen 1500 of ExoBrain I 1502, the user enters a query into a screen query View on a Query by Example basis that is then saved as a User Query record, Record ID 1579. In this case the user enters the letters "f.i.s.h." Since this is entered into a field that is labeled with "Sub Type" (of Matter) provided to the screen by the Label Record, Record ID 1580, the meaning specified by the spelling is an ExoPonent, due to the Co-Reduction of the meanings of the spelling with the meanings of the label, as explained under FIG. 13. In Record ID 1579 the user is asking for data about the ExoPonent meaning of "fish" which is a type of matter—i.e. the kind of fish that swims.

The user's order is recorded as Record ID 1579 because it is an observable fact that humans routinely utilize an activity that was performed on something as a manner of specifying that something in the future—the following examples show this:

Suppose there was a first order 'send an email to Joe" that was carried out. Later there may be a query such as "Where is the email you sent to Joe?" In this query the email is being specified in terms of the action that was done to it.

The following human search term examples all use the action performed on something in order to specify it at a later time:

"Get me the letter that you mailed to Joe last week"
"Show me the letter you just printed"
"Where is the card we projected to the class last week?"

Things are also specified in terms of the results of executions:

"Get me the email you could not send to Joe last week"
And in terms of times:
"Get me the letter I wrote before I went out yesterday"
And in terms of events:
"Get me the letter you printed on the printer that broke last week"

Therefore Any-to-Any systems always record 1) all orders they have been given 2) all results of executions performed 3) all surrounding events and 4) as much details as the user will give them about what he is doing, since to fail to record these things is to render the items un-identifiable in some of the ways humans may identify them, and will cause user orders that use such specification methods to fail.

Therefore, in this illustration the user's query order Record ID 1579 given to ExoBrain 1, 1502, to find "fish" is recorded as Record ID 1579 in the data storage grid of ExoBrain I, 1502.

When the user query is queried on the data storage grid of ExoBrain I, 1502 the query will fail, as there are no user data records in the storage grid 1502 with the value of "'fish" in Field 16. The Any-to-Any system can be set up by the user to automatically search more deeply using IfNotFound mechanisms to be described under FIG. 16, or the failed execution can be used to ask the user if he wishes to search more deeply or to "check other computers", or buttons can be provided to enable the user to perform a "Remote Find" on other computers and any of these cases, can be used to launch a RemoteFind BossModule 1508 to manage the following sequence as one way of using ExoPonents in an Any-to-Any framework using the DRT classification and relational system to enable Chained Find.

Since the initial query failed, the Any-to-Any system RemoteSearch Boss Module 1508 could be configured to search specified remote Any-to-Any systems, or in a more sophisticated implementation to be described now, to perform a Return Nearest Truth sequence (as described under FIG. 13) on the Data Category of the failed query (Matter) as a first step of the Remote Search. This would result in finding Record ID 1584, in which "Seafood" is recorded in Field 15, as a senior type of the failed query term "fish" in Field 16 of Record ID 1584. Searching the data storage grid of ExoBrain I, 1502, for ExoBrain Content records (records that state the general type of records held by a remote ExoBrain) will find the ExoBrain Content Type record, Record ID 1583, which states in Field 1596 that ExoBrain ID 2, which has an IP address of bbb, has information of the type of thing stated in Field 16, namely about seafood, the term that was found for as a result of the Concept Hierarchy data of Record ID 1584.

The fact that ExoBrain I has a record 1582 for SearchBrain is confirmation that it has exchanged encryption keys and established secure communications with that ExoBrain as per the methods and system described in FIG. 14.

The RemoteFind Boss Module 1508 prepares an outgoing query 1507 which is Record ID 1579 (the user's query) which contains the identify of the requesting ExoBrain, ExoBrain 1 record in Field 1596 with the IP address of aaa recorded in Field 1597 of Record ID 1579 shown at 1507. This outgoing query includes the addressing and encryption information for SearchBrain, which the RemoteFind BossModule obtained when it found the SearchBrain Record ID 1582 and at the same time. The RemoteFind BossModule 1508 hands the completed query package to the Encryption BossModule, which hands the encrypted package to the Transmission BossModule 1509 to transmit to SearchBrain 1511 via the internet 1510.

The query package transmitted by 1502, ExoBrain I, is received by the Decryption BossModule 1512 of 1511 ExoBrain II, which, as its own Record ID 1586 shows in Field 703, is called "SearchBrain" and as Field 1597 states, has an IP address represented by "bbb". The Decryption BossModule 1512, if it cannot decrypt the package, simply discards it. If it decrypts it successfully it passes the package to the Reception Module, which uses the Command Matcher 1514 to match Condition/Director record pairs in the manner already described to find what kind of records it has received and therefore, using the Director record of the pair, adjust the incoming record appropriate to make it into a Commander Record, or to create or to find and to modify an appropriate Commander Record, which it hands to the Command Matcher 1514 together with the now decrypted incoming query record 1513.

The Incoming Query Boss Module 1515 that is called by the Command Matcher 1514 records the incoming query 1579 and uses the incoming Query record 1513 that was originated by ExoBrain I to query SearchBrain's ExoBrain Content Type records, of which two examples are shown, Record ID 1590 which is a record for an entity named "Fish Shop" in Field 703 and has a value of "Seafood" in its Field 15 and "fish" in Field 16, and Record ID 1591 which is a record for an entity called "Shellfish Shop" in Field 703, which also has a value of "Seafood" in Field 15, Matter Type, but has a value of "Shellfish" in Field 16 Matter Sub-Type. (At a previous time, the presence of these two or more ExoBrain Contents records for the same type of thing, Record ID 1590 and Record ID 1591 both having the same type Field 15, Matter Type of Seafood would have been used by a WhatDoIKnow BossModule to create the record that was found earlier as the ExoBrain Content Type Record ID 1583 in ExoBrain I, 1502, which states that ExoBrain II "knows several things about" a type called "Seafood". These ExoBrain Content type records would have been pushed to ExoBrain I when it first contacted Search ExoBrain) in a session in which ExoBrain II essentially tells ExoBrain I what it knows about.

The Incoming Query Boss Module 1515 as a first step searches its own user Data records just as ExoBrain I did. IN the same way that search failed because there were no user data records for "fish", but it did match an IfNotFound Condition/Director record pair that calls another BossModule that attempts to match the incoming records with ExoBrain Content Type records such as Record ID 1590 and Record ID 1591 and finds that Record ID 1590 matches the incoming request because it shows the value of "fish" in Field 16 Matter Type. This Record ID 1590 has an ExoBrain ID of 3, which is not the same as SearchBrain's own ID of 2, showing it came from elsewhere and in fact came from an ExoBrain with a Record ID of 1587, with an IP of ccc as shown in Field 1597 and a name of Fish Shop shown in Field 703. The Incoming Query Boss Module hands the incoming request query record 1513 and the matching record 1590 it found, and the Record ID 1587 of the ExoBrain record for the Fish Shop ExoBrain that contains the needed data to ExoBrain II's copy of the RemoteFind BossModule 1520—exactly the same RemoteFind BossModule 1508 that was used by ExoBrain I to prepare its remote find request to ExoBrain II.

Just as it did for ExoBrain I, 1511 ExoBrain II's RemoteFind Boss Module 1520 prepares an outgoing query which includes 1522, Record ID 1589 (its recorded version of the original User Query Record ID 1679) and includes the original request 1521, that it received 1513 from ExoBrain I—this is so that when the query is returned packed with the answer the appropriate Boss Module can determine where the request that is being answered actually came from in order to return the reply there. The RemoteFind BossModule 1520 also includes the addressing and encryption information for Fish Shop ExoBrain, and at the same time saves 1573 a copy of its own outgoing query request Record ID 1589. The RemoteFind BossModule 1520, hands the prepared package to the Encryption Boss Module 1523, which encrypts it and hands it to the Transmission Boss Module 1523, which transmits it over the internet 1524 to the Fish shop's ExoBrain, the third ExoBrain in the series, 1525. Clearly, this sequence could be chained indefinitely through ever more detailed sub types held by lower Any-to-Any systems. Eventually, the query will reach an ExoBrain that has the requested data or code, as follows:

ExoBrain III, 1525 receives the incoming package including the records 1527 and 1528 and using the exact same Decryption and Reception Boss Modules 1526, that ExoBrain II used (1512), decrypts the incoming package, constructs a correct Commander Record, and hands the Commander Record and the incoming records to the Command Matcher 1529, which results in calling its own copy of the Incoming Query BossModule 1530. The Incoming Query BossModule 1530 uses the incoming Query Record 1528 as a Find Spec (a Find Spec is a record used as a Query on a Query by Example basis) to find matching User Data Records of which Record ID 1594 and Record ID 1595 are examples. The Incoming Query Boss Module 1530 tries to match the data in the incoming query with its User Data records. The term "fish" in Field 16 Matter Type is the only data in the data fields 1531 of the incoming query record 1528. When searching, the Incoming Query Boss Module 1530 treats the coupled Matter Fields, Field 15 and Field 16 as a single entity because (in the manner already describe for FIG. 13 when coupled fields are not being used for a ReturnNearestTruth search or for another purpose that needs coupled fields to be treated separately) and finds Record ID 1594 and Record ID 1595. It hands these records 1594 and 1595, together with the incoming query records it received, 1535 and 1536 to the Encryption and Transmission Boss Modules 1539 together with the instruction to return the package to ExoBrain II, the ExoBrain from which it received the query records 1527 and 1528. The Transmission Boss Module transmits the package across the internet 1510 to ExoBrain II, 1540.

The Decryption Boss Module and Reception Boss Module 1541 of 1540 ExoBrain II, the Search Brain that issued the query, receives the incoming package of records, 1542, 1543, 1544, and 1545 and hands it to the Command Matcher, together with a properly prepared Commander Record, which this time is configured to call the Incoming Response Boss Module 1547 due to the fact (which it detects with Condition/Director records) that the incoming package contains both query records and data records (which is indicative of a response to a query). It hands the package to the Command Matcher 1546 as previously described, which calls the Incoming Response BossModule 1547 and hands it the package of incoming records 1542, 1543, 1544, and 1545. The Incoming Response BossModule 1547 uses Condition Director record pairs to detect that one of the incoming Query records is its own record (by the fact that its own ExoBrain ID 2 is in the ExoBrain ID field, Field 1596 of 1543 and that the other query record 1542 has an ExoBrain ID of 1 which is neither its own ID nor that of the ExoBrain from which it received the incoming package. Had there been several other Record IDs included in the incoming package, indicating that there had been several previous ExoBrains in the query chain that had passed on the records to this Search ExoBrain, it would use Origin and Prior Origin Administration fields (as previously described) to choose the correct ExoBrain to send the response back to. Having determined the correct ExoBrain to reply to, the Incoming Response BossModule hands the returned data records, 1554 and 1555, together with the original query 1553, to the Outgoing Response Module 1552 which prepares the response and hands it to the Encryption BossModule to encrypt, which in turn hands it to the Transmission BossModule 1556 to transmit over the internet 1510 to the originally-querying ExoBrain 1, 1557.

In exactly the same manner and with exactly the same BossModules as used by ExoBrain II, 1557 ExoBrain 1 decrypts and processes 1558, the incoming records 1559, 1560 and 1561, and determines that the incoming data Record ID 1594 and Record ID 1595 (1560 and 1561 respectively) are the response to its user's query 1559 because the data of 1559 matches the data of a User Query records 1574 which it has recorded. It therefore displays 1570 and 1571 the records received from the Fish shop via the SearchBrain, in response to the user's query 1569, on the screen 1568.

AnyDataAnyWhere is a push/pull system in which queries are pushed—just as humans do—to those Any-to-Any systems that have the ability to answer them, and the responses of those entities are forwarded to the questioner. In this manner, the search system is based on each ExoBrain pushing the TYPE of information that it has that it wants others to find, rather than a search engine "crawling" websites and serving a haystack of chaff hiding relatively few grains of wheat, which was out of date already seconds after it was found, whereas push-search data is always up to date. The model also enables search to be a revenue earner, as ExoBrain owners who wish to sell their products both provide the necessary records and pay for type records to available in a SearchBrain.

Observation of the above steps show that a) One Any-to-Any system is controlling another and is ordering and causing remote processing to take place, the results of which are supplied to it, and b) one Any-to-Any system is causing a remote save of records it supplies to occur at a remote Any-to-Any system and c) one Any-to-Any system is causing a remote find to occur in another and that d) these activities can occur with an unlimited number of Any-to-Any entities in the chain and finally e) none of these things require user intervention to achieve—they are transparent for the user. While this description has used a very simple inquiry as an illustration, it is evident that if a multi-record-multi field construction such as a letter, presentation or spreadsheet is used for the query, the same principles and methods apply. It is also obvious that for a user to conduct a remote find or a remote save requires only obvious variations on the theme of the described methods. Further it should be realized too, that activities such as a Chat or Collaboration on any data type whatsoever (any data record assembly whatsoever), merely involves detecting which record has been changed by any one of the ExoBrains in the communication and sending that changed record to the others to display. It will also be obvious after a moments reflection that with these mechanisms 1) servers are only needed to forward communications between Any-to-Any systems and to backup data, which removes a layer of considerable complexity and 2) these mechanisms can effectively weld all Any-to-Any systems anywhere into a single homogenous whole (for all Any-to-Any computers in system which use the same set of DRT fields or have mechanisms to convert data between different DRT field sets).

These benefits are all made possible uniquely because data ExoPonents—atomic meanings—enable precise identification and handling of data in human-understandable and human-specifiable meaning-based terms, and because code ExoPonents enable atomic data manipulations to be performed on or by reason of atomic meanings and due to the Data Relation Table enabling ExoPonent meanings in all data to be stored and related to one another manageably.

FIG. 16

Figure 16:
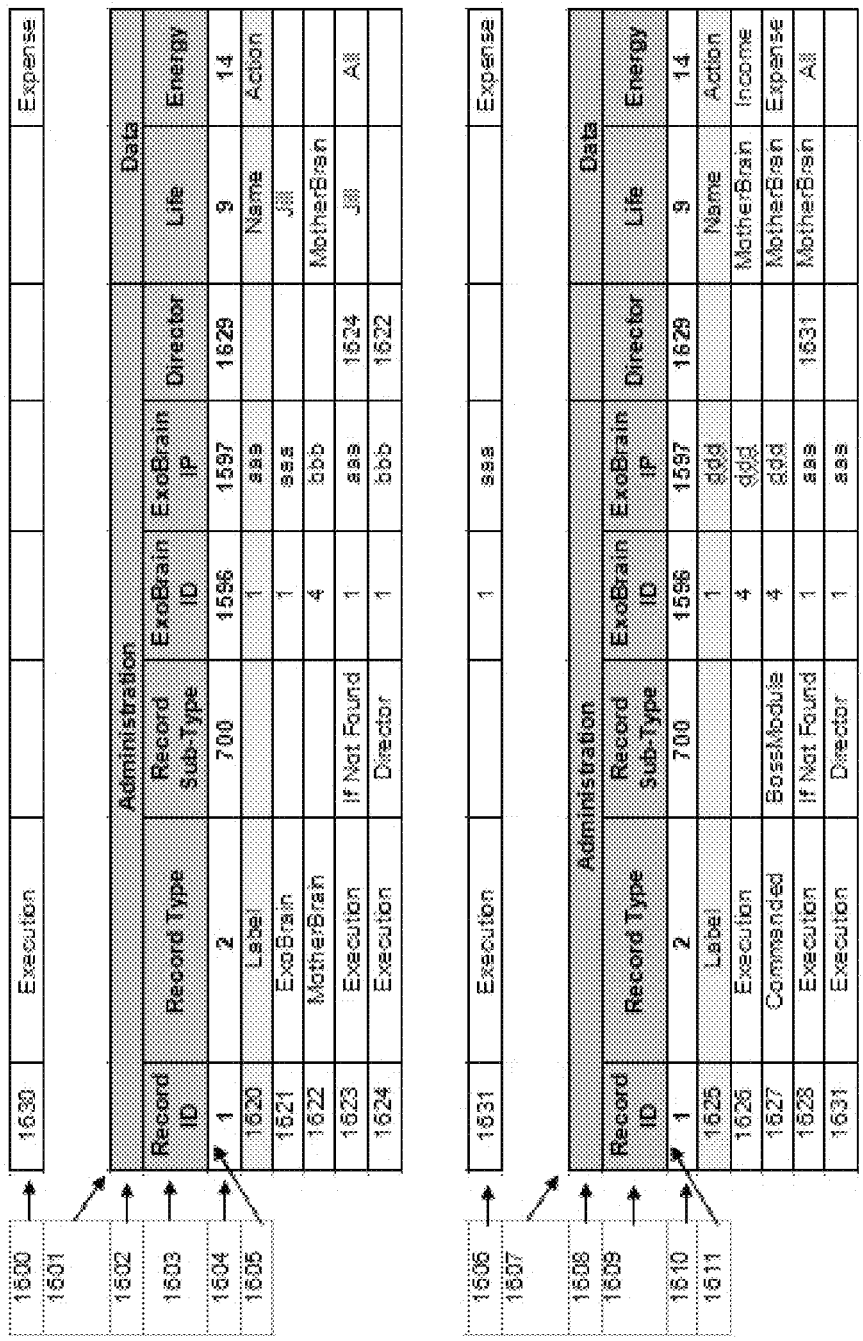

FIG. 16 illustrates methods for using ExoPonents to enable the second requirement for AnyDataAnyWhere, namely IfNotFound ability that enables a computer that is missing something to execute and manage an appropriate Chained Search so as to get what it needs from other. Any-to-Any systems elsewhere without bothering the user; the something that it gets can be either data or computer code. In fact IfNotFound is simply a sub-type of IfNot functionality in general, otherwise described as Condition/Director record pairs in which if a part or all of a Condition record is matched, and part or all of the ExoModules in fields of a Director record that is paired with it causes other actions to occur. Typically, IfNotFound functionality is used to refer to the functionality where one Any-to-Any system that is missing something it needs, uses remote execution to transparently obtain this what it is missing from remote Any-to-Any systems. If not found functionality is chainable, from one system to another. FIG. 16 will describe IfNotFound ability in relation to transparently obtaining missing code but could just as easily be described in relation to obtaining missing data.

In FIG. 16, the methods by which one Any-to-Any system such as an Any-to-Any system sends and receives records from another Any-to-Any system such as another Any-to-Any system have already been described under FIG. 15 and will not be repeated here.

In FIG. 16, 1601 is a first Any-to-Any-system such as ExoBrain I and 1607 is a second Any-to-Any system configured as a service entity and communication server for other Any-to-Any systems termed a MotherBrain, some of whose functionality has already been described, for example in FIG. 14 which describes its role in setting up secure encrypted communications between any two Any-to-Any systems. For the purposes of describing the methods and mechanics by which ExoPonents enable IfNotFound ability, the MotherBrain will assumed also to be a code warehouse, where ExoBrains that find they are missing code to do something they have been ordered to do, can go to ask MotherBrain to give them or sell them code they need to perform some function— code which is paid for by a credit card debit system that MotherBrain may also run. While FIG. 16 will be described in relation to an Any-to-Any system ExoBrain missing code that it needs to carry out a user command, the methods described apply equally to data since both code and data are in the same record ExoPonent format already described and code, after all, is only just another form of data until such time as it is executed.

The structure of these ExoBrains 1601 and 1607 are the same as one another and as other Any-to-Any systems and ExoBrains previously described. The rows indicated by 1602 and 1608 in ExoBrains 1601 and 1607 respectively, indicate which of their fields are Administration fields and which of them are data fields; the indicated rows are not part of the structure itself. The rows indicated by 1603 and 1609 in ExoBrains 1601, 1607 respectively, indicate (for the Administration fields) the field names in use and for data fields, the Data Categories to which the fields belong. The indicated rows are not part of the structure itself. The rows indicated by 1604 and 1610 in ExoBrains 1601, and 1607 respectively indicate the field numbers which serve as a field names if a classic field-name-requiring database is used, but are otherwise ignored. The columns indicated by 1605 and 1611 in ExoBrains 1601 and 1607 respectively, contain Record IDs as indicated by the first columns of 1603 and 1609. In the remainder of this description, field numbers show in ExoBrains 1601 and 1607, and Record IDs shown in the columns 1605 and 1611 will be used as figure numbers when shown in bold thus: Field 102; Record ID 102.

In Any-to Any system 1601, record ID 1620 is a Label Record as its Record Type of "Label" in Field 2 shows. This ExoBrain has an ExoBrain ID of 1 as per the Field 1596 value and an IP address represented by "aaa" as per the value in Field 1597. The only data fields shown are Field 9, Life Data Category Name and Field 14, Action, from the Energy Data category. This Any-to-Any system has two ExoBrain records, one for itself, Record ID 1621 and one for MotherBrain Record ID 1622.

1600 shows a User Order record to "enter an expense", and as can be seen there are no record in the grid storage system 1601 that the Command Matcher can match to this order, as per the Command Matcher procedures described under FIG. 6. It is up to the ExoBrain designer as to how the IfNotFound functionality would be configured but in the preferred embodiment, the IfNotFound functionality would be configured to go to MotherBrain automatically to obtain any missing code, in the following manner.

The user order will be configured as a Commander Record by the entity giving the order, which might be a Button Execution record called by clicking a button on the screen, or by a Meaning Processor (if one is installed to accept language input and create ExoPonent record output from received language) or by another Any-to-Any system, so that the user order Commander Record 1600 contains the value of Execution (record) in its Field 2 Record type, thereby limiting the records that the Command Matcher will match to just those records that state they are records of Execution type as per their value recorded in their Field 2.

When the Find Module under the control of the Command Matcher (neither of which are shown) uses the Commander Record 1600 derived from the user order as a Find Spec it will fail to find any Execution record which has a value of Expense in Field 14, Action, to match the value of Expense in Field 14 of the user order 1600. But the Find Module (which is used by the Command Matcher and by all ExoModules that need to find records) is configured so that a specific symbol in a record field (represented by the word "All" in Field 14 of Record ID 1623) will match any value, but only if no other value can be found to match the value being searched for. Because of this mechanism, the value of Expense in Field 14 of the user order 1600 will be matched to the "all" value in Field 14 of Record ID 1623 instead and this record will be retrieved by the Command Matcher in this case and in all cases where an execution order cannot be matched, effectively, thereby in all cases, launching the IfNotFound sequence that follows.

Record ID 1623 retrieved by the Command Matcher (not shown) is an Execution IfNotFound record as the values in ties Field 2 Record Type and Field 700 Record Sub-Type show. The Controller Logic of IfNotFound records (and hence the Controller Logic (not shown) of this Record ID 1623 are configured to look for a record number value in their IfNotFound record's Administration Director Field 1629 and pass this to the kernel for execution together with the Record ID of the recorded user order that resulted in the IfNotFound record being called. Accordingly, the IfNotFound Controller Logic (not shown) of Record ID 1623, finding Record ID 1624 in the Director Field 1629 of Record ID 1623, will recover this Record ID 1624 and pass it to the kernel for execution to with the User Order Record ID 1630.

Field 2 of the Director Record ID 1624 has a value of Execution, while its Field 700 value shows that it is a Director record. Director records are a kind of execution records that are usually paired with a Condition record and cause one or more executions to occur if the Condition record with which they are used is found to match, or not to match a data record in some way. Different types of Director record (that are distinguished from one another by additional Administration record Sub type fields (not shown) may contain either code or code references or (as in this case) a specification of somewhere to go to (such as MotherBrain in this case) if they are invoked. In the case of Record ID 1624, the Director field contains the Record ID 1622, which is the record for MotherBrain and contains its ID, IP address and other info.

The code ExoPonents referenced by the Director Record ID 1624 will repackage the user order 1600 adding the ExoBrain 1601 ID of 1 in Field 1596 and the ExoBrain 1601 IP address designated by "aaa" in Field 1597, package it with the appropriate MotherBrain record 1622 and pass it to the Encryption and Transmission Modules as described in FIG. 15. MotherBrain will receive and unpack this transmission package also as described for FIG. 15.

MotherBrain's Command Matcher attempts to match the supplied user record 1606 to Execution Records it has available for distribution such as Record ID 1626 and Record ID 1627, from which it will select Record ID 1627 as matching the users request, Record ID 1627 being the Commanded record (as per Field 2) for the BossModule (Field 700) needed to perform the activity (Field 14) of Expense that the user originally called for in Record ID 1630. Record ID 1627 is then supplied to MotherBrain's modules for packaging and return to the requesting ExoBrain, all as already described for FIG. 15. In turn, the requesting ExoBrain 1601 receives the MotherBrain package, unpackages it and, after saving the received records, immediately executes the received BossModule 1627. In actual practice when this mechanism was tested, it caused a 3-4 second delay (with DSL connection) for this sequence to be performed, compared to the time required to perform the execution with the requisite code already in place in the requesting ExoBrain 1601.

However, it could be that MotherBrain did not have the necessary code to perform the requested functionality. In this case, the exact same and unmodified IfNotFound mechanism (s just described) in MotherBrain would cause the IfNotFound Record 1628 to be matched by the MotherBrain Command Matcher. In this case, as shown by the value 1631 in Field 1620 of the IfNotFound Record ID 1628, Record ID 1631 would be called and result in any suitable set of actions being performed, such as a) sending the requester an apology and advising him the missing module he needed will be forwarded to him when available; b) marking the recorded unmatched user order in such a way that MotherBrain can run a find and find all orders users tried to do for which MotherBrain did not have code, enabling programmers to create whatever BossModules are in most demand, and so on, basically automating the system for finding out the code users need most. It proved to be equally trivial to use these mechanisms and those described in FIG. 15 to distribute new functionality when available to those who had already requested it when available, storing it also in MotherBrain for ExoBrains to find and download when needed, as just described With these ExoPonent-enabled mechanisms, both data and code can be saved anywhere or obtained from anywhere, and this can be automatic and transparent for the user if that is desirable. Equally, with the mechanisms just described, faulty code or data can be swapped out and replaced with correct data or code, transparently for the user, and without ever requiring a restart of the computer concerned.

FIG. 17-25 in General

FIG. 17 to FIG. 25 between them are different parts of a single Data Relation Table such as might be used to classify ExoPonents in a general office suite application and as such would be stored in a grid storage system such as a database modified to ignore field names in the manner already described. Much of the description is identical for each of the FIG. 17 to FIG. 25 in that it applies to the DRT in general (of which FIG. 17 to FIG. 25 are simply parts) and will therefore be made under this "general" heading, while descriptions that concern only one individual part of the DRT will be described under the heading for the figure concerned.

The Data Class fields will not be described individually as doing so requires a book in its own right. Practice has shown that just the Data Class names as given here have proven sufficient for programmers and non-programmer users and application designers alike to use them to produce adequate applications. While some Data Class names may appear to be not self-evident when read, they becomes self evident when a programmer or user has something he needs to store somewhere in the DRT and looks for a place to put it, he will, in practice, find a field, and from time to time the field he realizes is most suitable will be one of the Data Classes that did not seem so obvious before. This is because the Data Classes in these figures (as well as the relational mechanisms described have been derived from classifying extensive selections of ExoPonents found in normal office suite data and from extensive efforts to fit widely different data into the DRT.

It should be clear that any ExoPonent type or date type whatsoever within a Data Category may be designated as its own Data Class within that Data Category—there is no particular restriction to this, or to any other set of Data Classes in a particular DRT. The choice of what is and what is not designated as a Data Class is entirely down to the application designer who designates as a Data Class whatever types of values occur most frequently in a given application and which should therefore be designated as a Data Class and given their own field in so as to make them available in a single DRT record in a given application to record data concerning a particular data type in that application, but it must always be kept in view and clearly understand that these Any-to-Any machine are type machines—they operate on types, because, in essence the language if composed of meanings that are types.

As previously described, a Data Class within a Data Category can be a field, or a record of its own type or both, and those values in a Data Category that are not assigned their own Data Class are then classed in the "Other" field in each Data Category, which is there as a catch-all repository for Data Category values that have not been assigned their own Data Class.

It is self-evident that it is easiest if all Any-to-Any systems that are intended to be able to exchange data transparently as described in FIG. 15 and FIG. 16 all use the same DRT field selection, but if they do not, it is only a question of providing conversion routines to perform the needed transformations such cutting unneeded fields or reconstituting and adding missing ones or to convert records to fields and vice versa. When different Base Concept record numbers are assigned by different systems, self-evident routines are needed obtain the spelling records of the sender using the mechanisms of FIG. 15, match those with the spelling records of the receiver and then convert the Base Record IDs in the sender records to those of the receiver. It is also self evident that maintenance routines will be needed for Any-to-Any systems to convert chosen values in the "Other" Data Class for a given Category into fields when necessary, or to remove excessive fields and arrange for their values to be record in the "Other" Data Category. The values in the Other Data Class for each Data Category can be made more intelligible and useful by coupling them with Type and Sub-Type fields in the manners already described.

The Administration Data Category Data Classes can themselves be divided into Data Categories of Life, Time, Space, Energy and Matter and doing so is an interesting if not very useful exercise.

Where the Physical Universe Data Categories used for user data (Time, Space, Energy and Matter) are concerned, they all behave in a similar fashion in which ExoPonents of one Data Category cannot be used to specify, or respond to a query from another Data Category, a phenomenon that is referred to as Data Category Integrity. For example, a question asking for a response from the Time Data Category such as "What time is it?" cannot be responded to by a value from another Data Category. An adequate answer for the question "What time is it?" cannot be answered by a value from the Space (Location) Data Category (e.g. "New York" or "102 Funny Street"), nor by a value from the Energy (Action) Data Category (e.g. "Jump" or "Print"), nor by a value from the Matter Data Category (e.g. "Letter" or Chair"). In fact only a value from the Time Data Category will serve and in fact practically any value from the Time Data Category will somewhat serve. Hence the Data Category Integrity Principle states that "a value from one physical Universe Data Category can not be used in another Physical Universe Data Category." However in considering this Principle, it is important to realize that most meaning words have one meaning that belongs to each of the Physical Universe Data Categories and therefore when using this Principle care needs to be taken to identify exactly which meaning is in question.

Physical Universe Data Category values are easily detected by the fact that they are visible and measurable. Life Data Category values on the other hand can be detected by the fact that the meaning concerned would not exist if there were no sentient life on earth. The value of "blue" as a color does not exist in the absence of sentient life. The measurable wavelength to which we ascribe the quality of "blue" exists, but "blue" does not exist in the absence of someone to say "that wavelength is called blue". Similarly qualities (such as "quickly", "beautiful", "fast", "good") do not exist in the absently of Life. Life Data Category values behave completely differently to Physical Universe Data Categories, and their main characteristic is that unlike the Physical Universe Data Categories which obey concrete rules of which the Data Category Integrity Principle is one example, Life Data Category values obey only one rule, which is that they obey no rule at all and because of this they have to be treated completely differently to Physical Universe Data Category values. Again a note of caution is that most meaning words have meanings—not necessarily found in any dictionary—that are actually Life Data Category meanings and unless strict mental discipline is exerted as to the exact meaning in question, the matter rapidly deteriorates into a quagmire of confusion. For example, various meanings of the word "f.a.x."—i.e. of meanings associated with that spelling—have already mean discussed; for example there is a Matter meaning—fax the piece of paper; an Activity meaning—"fax that to Joe"; a Space meaning—"walk over to the fax"; a Time Meaning—"it is fax time". But there are also Life Data Category meanings too—"that is a faxy text"; where "faxy" is a quality of a Matter thing and "send it faxily" which is a quality of an Action or "I am feeling faxy today" which is a quality of an emotion, and an example of where one Life value is co-reducing another Life value.

Because of the undisciplined behavior of Life Data Category values, in which they are a law unto themselves, special arrangements need to be made in the DRT to accommodate them, and failure to do so produces a DRT that is not able to accommodate all data.

In the DRT described in FIGS. 17-24, two provisions are made to accommodate the quirks of Life Data Category values. Firstly, each Physical Universe Data Category is provided with a selection of Life Data Category fields and such fields are all shown by the presence of the term "Life" in the column labeled "Parent Data Category if Any". Secondly, since any Life Data Category value can be used with any other value at all, including with another of itself, the more comprehensive way to accommodate this behavior is to provide for Life Data Category records to be able to accompany (assembled with using a List mechanism) any other records at all on a field Parallel basis and if there is a need to be very comprehensive, then each type of Life Data Category value, such as a number a Quality, an Emotion, a Name and essentially all of the fields seen in the Life Data Category itself can have Life Data Category record of its own Type or Sub-type or Sub-Sub-type and any of these can accompany any other record and do so on a field parallel basis so that a value in field X of record 1 applies to the value in field X of record 2 and so on. Since an unlimited number of records can be added and treated in this way, an unlimited number of things can be said about whatever is in one data record by whatever is in another data record. These field parallel Life Data Category records can either contain values, or reference records that do, or reference list records that contain records that contain values or reference record that do, A particularly important record type is the TYPE record type which is mostly used on a field parallel basis with other records and which can be used to state Concept Hierarchies either on a field parallel basis or as List records. One kind of Type record has already been described, namely as the Label record described for FIG. 7 and elsewhere. Label records are simply a specific kind of (field parallel usage) Type records used in a specific way to achieve specific purposes.

It should be clear at this point that the structure of meanings carried by meanings words in the language is that of a co-reducing concept type ExoPonent meaning system with the most senior types being Life, Time, Space and Matter and all else being sub-types of those highest level types, and hence the subject of meaning types and how they work together as explained herein has to be thoroughly grasped and then accommodated in the DRT and the records types and mechanisms it uses, if a true Any-to-Any system is to be constructed and a full study and clear understanding of meanings in words and language is essential.

It has been seen in the mechanisms so far described that there are two clear divisions in all that has so far been discussed and these are data on the one hand and code on the other, with data being the matter of the Any-to-Any data machine and computer code being the matter of the Any-to-Any code machine, with code being a sub-division of data—it is just data that can cause a computer to do something when fed to a computer appropriately. So the Any-to-Any system is really composed of one thing—data—of two types: one type conveys meanings when presented to a human, and the other type causes activity on meanings when presented to the computer.

That structure is strangely parallel to what occurs in language where instead of one thing which is data that has two aspects there is one thing which are words and strangely these two have two aspects. Whereas data is of two kinds—one conveying meaning and the other one (code) performing operations on those meanings in order to transform them, words are of two types—those conveying meaning when presented to a human, and another type of word, termed Operator Words that are the strict equivalent of computer code and perform operations on MEANINGS of meaning words and thereby transform the meaning concerned in some way. The nature of these operations is the subject of language understanding and is well outside the scope of this invention, but some examples of Operators (with a strict warning of avoiding the subject of grammar in attempting to understand meanings and operations) are some facets of words normally thought of as conjunctions and prepositions amongst others, and again, just as words are multi-meaning, Operator words are often multi-operation—in other words they perform several different operations which often seem to be superficially the same, but are different and often quite different.

The relevance of Operators Words to the DRT is that they do not appear in the DRT directly, except in the Matter Content fields, or in original text records both of which contain text that has not been transformed into ExoPonent format. This is because the DRT records meanings after the Operators have performed their transformation on the meanings concerned. This transformation by Operators words is outside the scope of this invention but is done ether by Meaning Processing code (which uses an Any-to-Any system to transform words into ExoPonent meaning records) or by the human himself who does so instinctively in the manner he knows instinctively how to do. For example, if a human has to record "jump quickly" in a DRT record display, it will occur to him that "jump" is an action or an activity and he will then enter it into an Action field of the DRT because that is the closest field he can find to what he is looking for. He may then wonder what to do with "quickly". If each Data Category field on display has a field displayed next to it (or that can be displayed next to it at the click of a button) that displays another field labeled "Quality of this?", he will enter "quick" into the (quality) field that has been provided by a field parallel quality record or by the life Data Classes in the Action Data Category and which is displayed next to the Action field, which now contains his entry of "jump". By doing so he will perform the exact same transformation that a Meaning Processor would do when it detects the operator word (usually called a suffix) "ly" that follows (is joined to) the letters q.u.i.c.k., since in this case, "ly" is an operator word, which, when following a spelling that has one meaning that is a Life Data Category quality, performs two operations—firstly it selects from all available meanings of the word to which it is attached, that meaning which is a Life Data Category Quality, and secondly states that that Quality Meaning concerns the next following available Action Meaning.

In the preferred embodiment, all values in DRT records except for spelling records and their equivalent in other media (sound records and image records) contain only record ID numbers and when these record IDs are found and retrieved, the appropriate FieldLogics, in using Condition/Director record pairs, determine what type of record has been found and hence what to do with it. The only time that the found records have to go back to and retrieve the Base data (spellings, sounds or images) is when something has to be output to the human user; otherwise, all computation can be completed in terms of Record ID numbers.

If this system appears very fluid and unconstrained, then it should be realized that it has to be in order to accommodate human data which is itself completely fluid and unrestrained and that the objective of the DRT and its mechanisms is to be able to accommodate and record this fluidity, while keeping the result as comprehensible as possible for the human programmer, and keeping it 100% comprehensible for the computer code and for the user.

FIG. 17

FIG. 17 illustrates Part I of Data Relation Table (DRT) Administration Data Class Fields for use with office suite data and functionality that are not user accessible. Part I and Part II are two parts of the same thing and are only shown in separate figures for convenience of page display.

FIG. 18

FIG. 18 illustrates Part II of Data Relation Table (DRT) Administration Data Class Fields for use with office suite data and functionality that are not user accessible. Part I and Part II are two parts of the same thing and are only shown in separate figures for convenience of page display.

The 79 non user-accessible Administration fields shown between FIG. 17 and FIG. 18 together are not obligatory, and an Any-to-Any system designer can add to them or remove to them as necessary, always remembering that the DRT is a type machine and not an instance machine and that therefore, when feeling the need to add a field in order to better control the data to be recorded in the data part of the record, the programmer should always work to identify the highest level type of which that thing he wishes to record is an instance. Hence, the DRT field choice is a matter of constructing it from the top down (from the highest level types—i.e. the Data Categories—downwards, and not from specific instances upwards.

Administration fields can either be constructed as shown, where the Administration fields are part of the same record, or as a separate record, in which case a single "Administration" field in every record a) in a data record, records the Record ID of the Administration record that controls the data record concerned, and b) in an Administration record, records the Record ID of the data record that the Administration record administrates.

FIG. 19

FIG. 19 illustrates Data Relation Table (DRT) Administration Data Class Fields for use with office suite data and functionality that are user accessible. It is easy to devise mechanisms by which fields are not available to use a user— for example, a field will not be available to a user if no View FieldModule is provided in that field to even display the field. However, the user-accessible Administration fields shown in this figure (which can be added to or removed as desirable for any given application) provide a selection of fields the user can use to better access and control his data or say something important about it.

Alternatively, the user-accessible Administration Fields can be turned into their own record type/s as was described for the Administration fields that are not user accessible.

FIG. 20

FIG. 20 illustrates Life Data Category Data Class fields in a Data Relation Table (DRT) for use with office suite data and functionality.

FIG. 21

FIG. 21 illustrates Time Data Category Data Class fields in a Data Relation Table (DRT) for use with office suite data and functionality.

FIG. 22

FIG. 22 illustrates Space (Location) Data Category Data Class fields in a Data Relation Table (DRT) for use with office suite data and functionality.

FIG. 23

FIG. 23 illustrates Energy (Action) Data Category Data Class fields in a Data Relation Table (DRT) for use with office suite data and functionality. Note that Field 196 (Code/Software Name) is the name of the code ExoPonent if the record concerns a code ExoPonent, and is the name of conventional software if that is what the record is describing.

FIG. 24

FIG. 24 illustrates Matter Data Category Data Class fields Part I in a Data Relation Table (DRT) for use with office suite data and functionality.

FIG. 25

FIG. 25 illustrates Matter Data Category Data Class fields Part II in a Data Relation Table (DRT) for use with office suite data and functionality.

FIG. 26

FIG. 26 illustrates use of various described Any-to-Any assembly mechanisms to enable a) the Any-to-Any system to function in different languages and b) to function with different names applied to the same things by different users and c) to create Concept Hierarchies in another way and finally d) to enable a series of code actions to be launched by using the name of the group of code actions.

FIG. 26 is identical to FIG. 10 with the addition only of the following: Field 8 of FIG. 7, that is using the label of Label Used per 32, Field 2601 using the label of Language per 32; Field 2602 using the label of User Number per 32; Record ID 2603, Record ID 2604, Record ID 2605, Record ID 2606, Record ID 2607, Record ID 2608, Record ID 2609, Record ID 2610, and Record ID 2611. Hence only these listed different parts that are added will be described here.

Since anything can be used with anything in an Any-to-Any system, it is axiomatic that nothing in it is intrinsically limited to a quantity of one, and hence nothing prevents data and code using multiple different records of the same kind. For example, a given data record is not limited to just one Label record but can use many of them. Similarly any data or code record using other records—for example Help or Prompt records—is not obliged to use just one record but could use multiple different records, for example, to accommodate different languages or different user experience levels and nothing stops any of them being pictograms, showing images, photos or videos or even just playing sounds for the visually impaired. With the identical principle, while something in an Any-to-Any system may have a given generally accepted name, nothing stops users of that Any-to-Any system from giving that thing many other names that can be specific to one user or to a group of users. Concept Hierarchies and execution lists can equally be created on the same basis—the basis being that in an Any-to-Any system, anything can be related to anything, just as a human does.

Hence, FIG. 26 illustrates examples of the general types of uses of previously described methods to create such relationships.

Field 2601 of Record ID 1004 now shows in that field that is a Label in the English Language. It also shows in Field 7 Name, the record ID of 2604. Referring to that Record ID 2604, the value recorded in its Field 2, shows that it is a Record of type Name. A Name record is a Life Data Category Record and hence is used on a field parallel basis with other records, and in this case on a field parallel basis with the Label Record ID 1004 which references it. Name records allow users to create nicknames, or their own preferred names for anything to which the Name record is related to on a field parallel basis. Taking Field 1021 of both Record ID 1004 and of Record ID 2604 as an example (similar descriptions apply to Field 1020, Field 1022, Field 1023, and Field 1024 of Record ID 1004 and Record ID 2604 and will not be repeated for those fields), Field 1021 of Record ID 1004 shows the value of "Soft". Supposing that the user whose ID number is 1 as shown in Field 2602 of Record ID 2604, does not like the term "soft" which—for him—is something that is used only for cushions, whereas—for him—fruits that are soft should be said to be "Squishy". He can therefore click suitable buttons to open a Name Record or a Nickname record, (whatever he prefers to call it—they are effectively the same thing), and open a record such as Record ID 2604, into which he enters his preferred term of "Squishy" for Field 1021.

This Name Record ID 2604 is related back to the Label record ID 1004 that was in use when the Name Record was created—essentially, the Name record is a subtype of the Label Record applicable to User 1 only—and is used to Label the exact same data records. The Name Record ID 2604 is related to the Label Record ID 1004 by the Record ID number of 1004 in Record ID 2604's Label Used Field 8. Through this relationship it is related to all the data records (Record ID 1005, Record ID 1007, Record ID 1008, Record ID 1009, and Record ID 1010) that show they are using the same Record ID 1004, in their Field 8 Label Used fields.

Note that when the user searches by type (by specifying what turns out to be a Name record value and searches for the term "Squishy") he will find the appropriate data records just as if he had searched using the term "Soft" (in the manner already described elsewhere). Note too, that what Joe calls it ("Squishy") and what everybody else calls it ("Soft") is clearly identifiable, which means that questions such as "What does Joe call this?" and "What do other people call that"" What is that usually called?" can all be answered.

Administration fields can be used to make an Any-to-Any system into a multi language system and some of the basic principles of doing so are as follows. In order to prevent the description from becoming confusing with multiple users, languages, labels and names all at the same time, the following description is restricted to describing how different languages are used with just one data record, Record ID 1006 that originally had the Name of "grapefruit" in Field 7 Name. When multiple languages are in use, a Label record can no longer be related directly to a data record as previously described, but must now first be related to a List record that lists which label record is in which language and then other mechanisms look up the list record found, and from that obtain the Label (or any other record) for the correct language.

Describing this process in outline, Field 2601, Language, of Record ID 2603 states that the Language of this record French and it is a record in which the non-Administration fields of Record 1004 have been translated into French.

Record ID 2606 is a List Label record—i.e. it is a Label Record for a List (series) record and in this case is a list of languages—English in Field 1020, French in Field 1021. List Label records work in a field parallel manner with the records they label, in this case for Record ID 2605 and Record ID 2607 (as is shown by the List Label Record ID of 2606 appearing in each of the Field 8 (Label Used) fields of Record ID 2605 and Record ID 2607.

Record ID 2607 which its Field 2 record type shows it to be a "List of Label Records" type of record lists the Record ID 1004 in Field 1020 and Record ID 2603 in Field 1021. Record ID 1004 is the Label Record in English and Record ID 2603 is the same Label Record in French.

Now the Data Record ID 1006 which is the only data record in relation to which multi-label-language mechanisms are being described, shows Record ID 2607 in its Field 8 Label Used, as being the label record in use and this is the List of Label Records just described.

Hence, when a user who is operating a multi-language Any-to-Any system wishes to use Label Records in French language selection mechanisms will be in place and operate generally as follows.

When the user attempts to access Record ID 1006—the "grapefruit" record—in some manner, Field 8 Label Used field parallel FieldLogics will detect Record ID 2607 specified in their Field 8 Label Used field and cause this record ID to be found and recovered. Condition/Director pairs will use the recovered record's Field 2 Record Type value to detect the fact that Record ID 2607 is a Series Record and not a field parallel one and will therefore launch a find to identify and recover the records it lists and will recover Record ID 1004 (the English Label record) and Record ID 2603 (the French Label record). Further mechanisms then match the Field 2601 Language of the Label Record to the Language in Use Record which will also show "French" as the value in its Field 2601, and in consequence, Data Record 1006 will be displayed using the French Label Record 2603. Obviously, changing the language being displayed is a matter of clicking a button that changes the language record all finds are referring to and getting them to re-execute and is a matter of fractions of a second. Obviously too, if two users are using the same Any-to-Any machine, one can view the data labeled in one language, whilst the other views it labeled in another language. Similar mechanisms apply to showing the Name field, Field 7 in the correct language. Field 7 of Record ID 1006 originally (in FIG. 10) showed the value of "Grapefruit" (shown in parentheses in Record ID 1006 Field 7 of FIG. 26). In Record ID 1006 Field 7, the previous value of "grapefruit" has been changed to Record ID 2605 which is a Language Label Record as per its Field 2 value and is a record that uses Record ID 2606, the List Label record previously described. Again, when a user accesses data Record ID 1006, Record ID 2605 in the Label field will result in that record being recovered, and the fact that it uses a Label Record ID of 2606 will again be detected by the field parallel Field 8 FieldLogic. Mechanisms will match the Field Label for Field 2601 ("French) with the language in use and the field parallel Field 2601 value of "Pamplemousse" in Record ID 2605 will be displayed for Field 7 Name, instead of "Grapefruit"

List records have many uses, and provide another way of recording Concept Hierarchies, as shown by Record ID 2608 which its Field 2 shows is a record of Type "Type List" that might well be recorded in response to a question such as "What X (e.g. Fruit) do you know/would you like?"

Hence a Series record can record many data sub-types (Orange, Field 1020; Lemon, Field 1021 of Record ID 2608) associated with the name of the type "Fruit" in Field 7 of Record ID 2608 (remembering that the Name Administration field is always a Name (i.e. type) for whatever data is in the Data Fields of the same record).

A Series Record can do exactly the same thing for code sub-types. For example, Record ID 2609 and Record ID 2610 are both Execution list records in which a number of code actions have been assembled under one—user provided— Name in Field 7. In the case of Record ID 2609 for example, the user has given the name of "Email Wife" to a sequence and an assembly of Boss Module 1 ("BM1") in or referenced by Field 1020 followed by BossModule 2 in Field 1021 and BossModule 3 in Field 1022.

The User has then assembled the NAMES of each of these Activities of Record ID 2609 and Record ID 2610 into a further Execution Name Record ID 2611. This assembly is easily achieved by the user pointing and clicking or giving language orders such as "when I say Bingo, I want you to do Email Wife (the Name of the execution sequence in Record ID 2609) and Copy to Home" (the Name of the execution sequence named in Record ID 2610. The mechanism enables a human to "program" (i.e. assemble code so as to do something not done before) using language orders either on a point and click basis, or, if Meaning Processing with Voice Recognition is installed, by speaking them exactly as if he were addressing those order to another human, in effect proving that the objective of the invention to provide a language controllable infrastructure has been achieved, and much else besides.

FINAL SUMMARY

In addition to other benefits already described elsewhere, when the Any-to-Any code and data machines and the Any-to-Any bridging mechanisms as described were placed in the ExoBrain test environment they showed that programmers were no longer required to build applications—programmers built functionality in the form of FieldLogics and ExoModules and environment and non-programmer designers and users used the point and click Lego-like construction system to assemble applications (combinations of data and functionality) without any further programming. Because of this point and click user creation methodology of creating applications, the test ExoBrain contained 37 applications of which 26 were built by 14 different non-programmer employees in the course a single week in their spare time—employees who had never built an application previously and had never built anything in ExoBrain before either. Each built something that he felt was useful for him or her. This ExoBrain was then tested in mall intercept tests on 582 persons of all ages and levels of experience who were told only that the portable computer was displaying new software they should try; they were given no other assistance. None of those tested walked away from the test for any reason and certainly not because they could not use it. The 584 sample had a margin of error of under 5%. From the 584 persons of all ages walks of life and computer experience that were tested, 73% said they would buy the ExoBrain plus another 12% said that they might buy it (for a total of 85% who would or might buy it at a commercially profitable monthly subscription price) while 47% of 34 non-users (people who did not own or use a computer) said they would buy one, and another 26% of that group that they might buy one for a total of 73% of people who do not use computers (and who presumably owned no software) would or might this software. This implied that a substantial percentage of the 85% of the world population referred to in the Background who do not use computers and have not been sold by state of the art software, would buy and use software constructed using the Any-to-Any construction methods of the invention and the teachings herein.

This percentage of those who do user computers today (85%) that would use or consider using a human-computer data-activity system functioning on Any-to-Any principles, a) is a very concrete demonstration of the power and benefits of the Any-to-Any system and the two Any-to-Any machines that power it and b) demonstrates the human attitude to a computer using a data-activity system functioning on the same basic principles as those they have been accustomed to use since birth in their normal human-human interchange.

The cumulative effect of the FieldLogic—Controller—BossModule—Senior BossModule is similar to that of an army hundreds of thousands of copies of very few FieldLogics strong, where lowly FieldLogics are controlled by Sergeant Controllers, that are controlled by BossModule Majors, and while there seems no need for a ranking system for BossModules, it does mean that it makes it practical and doable for a very senior BossModule, controlling hundreds or even thousands of more junior BossModules, to launch a massive international execution in thousands of machines, with a single command, to produce the benefit and useful result of correctly executing an order such as "get me the profit we made internationally on every hamburger we sold in the last ten hours in our 10,000 top outlets and list for me the top 20 profit centers."

Just the effect of the Naming Relational mechanism in combination with the other methods described, by itself, creates a powerful way for the human to control code as in the following example. Supposing that one record has a series of timings, that control the movement of a motor, that has the effect of closing one finger of one hand of a robot (while another timing record and another motor would control opening of the finger). The ExoModule that uses the timing record and runs the finger closing process is then given a name such as "Close Finger". This ExoModule is copied by an ExoModule called MakeAnother and renamed by the human to "CloseFinger 1". Five copies of the original ExoModule are made and renamed by the human to CloseFinger 1 through to CloseFinger 5. The Any-to-Any computing machine is given an order "Close hand is Close Finger 1 to 5" and this causes a MakeThis ExoModule to make an Execution record with the name of CloseHand in the name field and to put the values the human listed (CloseFinger 1 to 5) each in a different data field in the (now named) CloseHand Execution record. A generic BossModule already created to run simultaneously any ExoModule running motors is related to the Execution record with the Name Close Hand that references the executions to run (Close Finger 1 through 5). The human gives an order "Close hand", which is recorded as a Commander Record, which is matched by the Command matcher using the Discoverable ExoPonent Commonality Relationship Method with the Execute Commander record named "CloseHand" which is then executed. The hand closes. If a Meaning Processor is installed and Voice Meaning Recognition also installed, the hand closes in response to a verbal order "Joe, close your hand".

The combined eventual results of the inventions can potentially be the ability to "program" simply by giving orders and, when built up into complex assemblies, eventually can be made to result in a robot able to assemble its ExoPonent movements and ExoPonent movement assemblies on the fly, so as to be able to do activities it has never done before (such as make a cup of coffee when told to do so), just as a human can recombine known ExoPonent movements into new actions. When that is combined with the data Any-to-Any machine and named objects computed using the Discoverable ExoPonent Commonality relational method, the end result could be make a robot that can go into an environment it has never seen before and do things it has never done before—and then tell all other connected machines all about it, so they can do it too without having to waste computing time working it out for themselves.

The test Any-to-Any computer called an ExoBrain that has been described is a 250 parallel channel computer, with 250 channels—fields—that can, if some application requires that, execute independently of each other, thereby solving a further problem in the state of the art, namely the complexity of programming massively parallel computers to do normal work.

The human is an Any-to-Any data-activity system and the binary code transistor Any-to-Any machine is also a data-activity system at another level. Replacing the state of the art relatively weak One-to-Many software system that presently bridges between the two, with the Any-to-Any data-activity system built with the methods of this invention will close-couple three pairs of Any-to-Any machines. The three pairs (making three Any-to-Any systems) are the human data-activity pair, the invention's data-activity pair and the binary code-transistor data-activity pair but with a One-to-Many bridge (the OS and hardware) slowing down matters between the Any-to-Any computing system built by this invention and the Any-to-Any binary-transistor system. These three parallel and similarly systems all working on the same basic Any-to-Any principles can eventually be further paralleled by a fourth Any-to-Any massively parallel channel OS and hardware system. If each column of the previously-described ExoBrain grid is serviced by a massively parallel operating system, and is serviced by its own OS channel and its own CPU, Memory channels and its own specialized data transfer bus replacing the FieldLogic—Controller—BossModule—Kernel communication system, then the entire complex will be an Any-to-Any complex and the possibilities, and power and benefits that may then be unleashed would seem to be almost limitless and make massively parallel computers simple to produce and astonishingly easy to program since each channel (column) can be processed simultaneously and programmed semi-independently. The result should be similar to passing a cloth (the ExoBrain data grid) through a set of rollers (the CPUs and memory individually servicing each strand in the cloth) in comparison to a mostly single strand processing thread being processed by multiple cores as in the state of the art; such a system should also make it far easier to model other Any-to-Any systems such as the operational activity of the genetic code and cell function.

In short, the invention is a more than adequate solution to the self-limiting aspects of current software construction methods, the data insanities and difficulties of use noted in the background and will thereby open computer user to the other 85% of humanity that does not use them today—people who also matter.

Describing the benefit of the invention in the terms of the invention:

Since their inception 60 years ago, computers have proved themselves very powerful at computing numbers and at computing using digital data (data expressed as binary code). However, just a glance at a library proves that the majority of the world's data is not in the form of numbers but is in the form of words, and until now the ability of computers to compute with words has been limited to copying them, transmitting them, saving and retrieving them, and simple pattern matching (of keywords)—which is only a small fraction of the computing that computers can do with and by reason of numbers and binary code. The computer (transistor and controlling binary code) are both Any-to-Any machines as are numbers and digital data and clearly the computing power and ability with numbers and digital data derives from the compatibility of the different Any-to-Any machines with one another. This invention enables information expressed in words to be converted into an Any-to-Any machine format, thereby making it as compatible with computing as numbers of digital data, thereby enabling computers to apply their tremendous power to computing on the basis of word meaning data—which comprises the majority of the world's data—and enables them perform with it the equivalent of all the gargantuan array of things they can do with numerical and digital data.

The invention claimed is:

1. An any-to-any data machine stored in a hardware computing-capable host to enable computer code in the computing-capable host to manipulate data expressed by language words or symbols, by enabling computer code to directly and independently access and individually manipulate individual exponents, comprising:

an any-to-any data machine in which any number of any component can be used with any number of any component in a manner that is not intrinsically hierarchical and is intrinsically unlimited;

words deconstructed into their independent constituent data entities including one exponent which is a unique spelling and other exponents which are each individually unique and have separate meanings that together make up different individual meanings of a given word, such that further disassembly would lose the entirety of the original meaning, significance or function to be controlled, the one exponent and the other exponents separately stored from one another on computer-readable media in such a fashion that each one is individually identifiable, directly accessible and directly recoverable and can be manipulated independently of other data by data usage mechanisms;

suitable computer code able to assemble language data exponents into an exponent assembly for use and, when assembled by reference, providing a mechanism to look up a reference and replace the reference with a referenced item when needed, wherein the language data exponents and exponent assemblies manipulate language data by computer code in the computing-capable host;

exponent code constructed as individual, independently functional units of computer code written to perform a single action and which:

is responsive to an appropriate stimulus, obtains input from other code or in a standard format using a provided communication system, provides output to other code or in the standard format using the provided communication system;

the exponent code units stored separately from one another on computer readable media so that each one is individually identifiable, directly accessible, recoverable and independently controllable and usable by code control and usage mechanisms;

suitable computer code means to assemble the exponent code units for use, and when assembled by reference providing mechanisms to look up a reference and replace the reference with a referenced item when needed;

exponents and exponent code assemblies which are related by user-controllable means to target data for transformation, and code able to provide code exponents and code exponent assemblies and data exponents and data exponent assemblies to the operating system to execute and thereby perform a data transformation on targeted data.

2. The any-to-any data machine of claim 1 in which computer code in the computing-capable host is further enabled to directly and independently access and individually and independently and manipulate an individual graphical exponent of which graphical data is composed, comprising:

independent graphical data exponents including exponents that are single-significance atomic units of graphic-specifying data that are separate and physically unrelated to one another;

the graphical data exponents are stored separately from one another on computer-readable media in such a fashion that each one is individually identifiable, directly accessible, and directly recoverable and can be manipulated independently of other data by data usage mechanisms;

computer code means to assemble graphical data exponent assemblies for use and, when assembled by reference, mechanisms to look up a reference and replace the reference with a referenced item when needed;

using the graphical data exponents and graphical data exponent assemblies to manipulate graphical data by computer code in the computing-capable host.

3. The any-to-any data machine of claim 1 further configured to enable computer code in the computing-capable host to manipulate data expressed by language words, by enabling computer code to directly and independently access and individually manipulate individual base concept exoponents of which word meanings are composed, comprising:
  independent single-significance base concept exoponents which are the meaning data entity that is common to all members of a particular unique word meaning family;
  the independent single-significance base concept exoponents stored separately from one another on computer-readable media in such a fashion that each one is individually identifiable, directly accessible, and directly recoverable and can be manipulated independently of other data by data usage mechanisms;
  each independent single-significance base concept exoponent uniquely identified;
  individual sub-meanings composing each meaning of a word represented using unique identifiers of the one or more base concepts that make up a meaning concerned;
  any suitable computer code to assemble the base concept exoponents for use, and when assembled by reference, providing a mechanisms to look up the references and replace the reference with a referenced representative spelling when needed,
  wherein the base concept exoponents and base concept exoponent assemblies are used to manipulate language data by computer code in the computing-capable host.

4. The any-to-any data machine of claim 1 in which a code communication system in a computing-capable host is provided to enable otherwise independent computer code units to communicate between one another, comprising:
  communication system code instructions recorded on computer-readable media for execution by the computing-capable host, which, when executed, create a code communication system for use by independent code units;
  communication handshake and transmission protocols and a communication addressing system to which the code communication system and all independent computer code units using the communication system code instructions adhere;
  constructed such that the code communication system and the otherwise-independent computer code units using the code communication system are able to receive and transmit data, execution instructions and reports between independent code units using the code communication system,
  wherein the otherwise-independent computer code units using the code communication system execute when receiving through the communication system correctly addressed data and instructions compliant with communication system protocols, and so as to transmit through the code communication system data including data concerning a result of the execution.

5. The any-to-any data machine of claim 1 additionally including a system for controlling code exoponents and other compatible independent code units comprising:
  independent computer code units recorded on computer-readable media for execution by the computing-capable host which receive data and execute instructions received via a communication system for communicating between independent code units, and to transmit completion reports and other data using said communication system;
  controller units comprising computer code recorded on computer-readable media for execution by the computing-capable host which read, address and transmit data and execution instructions to independent code units via a code communication system, and receive execution completion reports and other reports and data transmitted through the said communication system,
  wherein the controller units receive execution instructions and data via the communication system from other code units and transmit execution instructions and data via the communication system to other code units;
  wherein the controller units control the independent code units to produce an intended result.

6. The any-to-any data machine of claim 5 in which an any-to-any data machine and an any-to-any computer code machine harmoniously interact when executed by a computing-capable host so as to produce useful results, consisting of a boss module recorded on computer-readable media for execution by a computing-capable host, which provides for recording relationships and has relationships recorded with any desired selection from uniquely specified data exoponents, data exoponent assemblies both from any-to-any data machines and of non-exoponent format but otherwise compatible data from outside the data any-to-any machine, and with any desired selection from uniquely specified code exoponents, code exoponent assemblies, and code controller units all from any-to-any code machines and non—exponent format but otherwise compatible code from outside the code any-to-any machine;
  the boss module including an independent code unit which is capable of receiving instructions and data from other code entities and to pass instructions and data to other code entities via a communication system, directly or indirectly controls the execution of code with which it is supplied or with which it has a recorded relationship, upon data with which it is supplied or with which it has a recorded relationship, when called on to do so by receiving any combination of instructions and data from other otherwise-independent code entities via the communication system in use;
  based on the receipt of these instructions and data, performing activities and issuing instructions via the communication system in use to control the execution of those code entities recorded in its data and code entity recording system, and providing the code entities it controls with data and instructions as appropriate;
  receiving reports from the controlled code entities recorded in its data and code entity recording system that it is controlling at the time via the communication system in use;
  based on the reports received from controlled code entities, activating other code entities in its data and code entity recording system via the communication system in use, and passing any combination of instructions and data to other code entitles;
  providing code and data entities to the operating system so that they interact with the operating system and computing hardware to execute correctly and thereby perform the data transformations they were designed to perform;
  sending any combination of instructions, reports and data to other otherwise-independent code entities via the communication system in use.

7. The any-to-any data machine of claim 1 in which execution of computer code occurs on a data-driven basis using a command matcher method for causing a computing-capable system to execute code execution orders in which:
  a first combination of symbols identifying code to be executed, the code to be executed together with the unique symbols stored on computer-readable media;
  a second combination of symbols identifies an execution order;

command matcher code uses the first combination of symbols to find and retrieve the code to be executed, the command matcher code supplying the code to be executed and the execution order to further code that executes the code to be executed on data.

8. An any-to-any data machine in which a data relation table (DRT) method is used to categorize data values by types of meaning, or to categorize code by types of activity, for use by computer code of a computing capable host to enable computer code to manipulate data based on the types of meanings in the data and types of functions of the code, comprising:
- an any-to-any data machine in which any number of any component can be used with any number of any component in a manner that is not intrinsically hierarchical and is intrinsically unlimited;
- words deconstructed into their independent constituent data entities including one exponent which is a unique spelling and other exponents which are each individually unique and have separate meanings that together make up different individual meanings of a given word, such that further disassembly would lose the entirety of the original meaning, significance or function to be controlled, the one exponent and the other exponents separately stored from one another on computer-readable media in such a fashion that each one is individually identifiable, directly accessible and directly recoverable and can be manipulated independently of other data by data usage mechanisms;
- suitable computer code able to assemble language data exponents into an exponent assembly for use and, when assembled by reference, providing a mechanism to look up a reference and replace the reference with a referenced item when needed, wherein the language data exponents and exponent assemblies manipulate language data by computer code in the computing-capable host;
- exponent code constructed as individual, independently functional units of computer code written to perform a single action and which:
  - is responsive to an appropriate stimulus,
  - obtains input from other code or in a standard format using a provided communication system,
  - provides output to other code or in the standard format using the provided communication system;
- the exponent code units stored separately from one another on computer readable media so that each one is individually identifiable, directly accessible, recoverable and independently controllable and usable by code control and usage mechanisms;
- suitable computer code means to assemble the exponent code units for use, and when assembled by reference providing mechanisms to look up a reference and replace the reference with a referenced item when needed;
- exponents and exponent code assemblies which are related by user-controllable means to target data for transformation;
- code able to provide code exponents and code exponent assemblies and data exponents and data exponent assemblies to the operating system to execute and thereby perform a data transformation on targeted data; and
- a data storage system in a computing-enabled host for use as a DRT in which a cell is used to store data or code values, wherein:
- the DRT is divided into data categories comprising:
  - administrative data for administrating the data storage system,
  - life data,
  - time data,
  - spatial data,
  - energy data, and
  - matter data;
- data to be stored and code are divided into one or more data categories according to meaning in the case of data and according to function in the case of code, to populate the DRT on a computer readable storage media,
- queries for querying the DRT are stored in a DRT record-like format on the computer readable storage media.

9. The any-to-any data machine of claim 8, in which precision of data specification and consequently of data manipulation is achieved by dividing a particular data category and the values belonging to that data category into data classes.

10. The any-to-any data machine of claim 9 in which data or code stored in the DRT is in the form of data or code exponents or exponent assemblies or a reference to any of them.

11. The any-to-any data machine of claim 8 in which a computing-capable host is enabled to compute on the basis of differences, identities and similarities and degrees of similarity in data recorded on computer readable media by:
- code which designates and treats stored data as being identical to the data of a query, when all the terms of the data in the query on a query-by-example basis (QBE-) are exactly matched by all of the data terms of a record in the DRT and,
- which designates and treats data as being different to the data of a query, when none of the terms of the data in the query are exactly matched by any of the terms of a record in the DRT and,
- code which is able to effectively remove different individual terms and combinations of terms from the data of a query or that is capable of determining exactly which terms in a query are found in records where at least one term in the query and one term in a record in the DRT are found to match one another exactly when queried on a QBE basis and then further:
- designating and treating the data found as being similar to the data of a query where at least one of the terms of a query used to query the DRT on a QBE basis are exactly matched by at least one of the terms of a record in the DRT,
- designating and treating the degree of similarity of matched records to the data in the query as being the proportion of the values in the query that are exactly matched by individual values in the matched records, or designating and treating the degree of similarity of the matched records to the data of the query as being the proportion of the values in each of the matched records that exactly match the individual data values in the query.

* * * * *